(12) United States Patent
Murakami et al.

(10) Patent No.: US 11,239,888 B2
(45) Date of Patent: Feb. 1, 2022

(54) TRANSMISSION METHOD, TRANSMISSION DEVICE, RECEPTION METHOD, AND RECEPTION DEVICE

(71) Applicant: Panasonic Intellectual Property Corporation of America, Torrance, CA (US)

(72) Inventors: Yutaka Murakami, Kanagawa (JP); Tomohiro Kimura, Osaka (JP); Mikihiro Ouchi, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 17/174,461

(22) Filed: Feb. 12, 2021

(65) Prior Publication Data

US 2021/0175939 A1  Jun. 10, 2021

Related U.S. Application Data

(63) Continuation of application No. 16/887,441, filed on May 29, 2020, now Pat. No. 10,972,163, which is a
(Continued)

(30) Foreign Application Priority Data

Oct. 8, 2015 (JP) .............................. JP2015-199923
Oct. 29, 2015 (JP) .............................. JP2015-213030
(Continued)

(51) Int. Cl.
*H04B 7/06* (2006.01)
*H04B 7/04* (2017.01)
(Continued)

(52) U.S. Cl.
CPC ................. *H04B 7/06* (2013.01); *H04B 7/04* (2013.01); *H04B 7/0421* (2013.01);
(Continued)

(58) Field of Classification Search
CPC ...... H04B 7/04; H04B 7/0421; H04B 7/0456; H04B 7/06; H04B 7/0615; H04B 7/0671; H04J 11/00; H04L 27/2613
See application file for complete search history.

(56) References Cited

U.S. PATENT DOCUMENTS 10,715,230 B2  7/2020  Murakami
10,972,163 B2 *  4/2021  Murakami ........... H04B 7/0615
(Continued)

FOREIGN PATENT DOCUMENTS

EP  2 854 318  4/2015

OTHER PUBLICATIONS

International Search Report (ISR) dated Dec. 20, 2016 in International (PCT) Application No. PCT/JP2016/004483.
(Continued)

*Primary Examiner* — Siu M Lee
(74) *Attorney, Agent, or Firm* — Wenderoth, Lind & Ponack, L.L.P.

(57) ABSTRACT

A transmission method includes generating a first precoded signal and a second precoded signal by performing a precoding process on a first baseband signal and a second baseband signal, outputting a third signal by inserting a pilot signal into the first precoded signal, outputting a fourth signal by applying a first phase change to the second precoded signal, outputting a fifth signal by inserting a pilot signal into the fourth signal, and outputting a sixth signal by applying a second phase change to the fifth signal.

2 Claims, 69 Drawing Sheets

Related U.S. Application Data continuation of application No. 15/766,574, filed as application No. PCT/JP2016/004483 on Oct. 5, 2016, now Pat. No. 10,715,230.

(60) Provisional application No. 62/356,770, filed on Jun. 30, 2016, provisional application No. 62/336,895, filed on May 16, 2016, provisional application No. 62/266,927, filed on Dec. 14, 2015, provisional application No. 62/251,303, filed on Nov. 5, 2015.

(30) Foreign Application Priority Data

| | | |
|---|---|---|
| Dec. 18, 2015 | (JP) | JP2015-246858 |
| Mar. 4, 2016 | (JP) | JP2016-042282 |
| Aug. 24, 2016 | (JP) | JP2016-164090 |

(51) Int. Cl.
  *H04J 11/00* (2006.01)
  *H04B 7/0417* (2017.01)
  *H04L 27/26* (2006.01)

(52) U.S. Cl.
  CPC ......... *H04B 7/0615* (2013.01); *H04B 7/0671* (2013.01); *H04J 11/00* (2013.01); *H04L 27/2613* (2013.01)

(56) References Cited

U.S. PATENT DOCUMENTS

| | | | | |
|---|---|---|---|---|
| 2010/0322349 A1* | 12/2010 | Lee | ............ | H04B 7/0671 375/299 |
| 2014/0029509 A1* | 1/2014 | Murakami | ............ | H04W 52/225 370/315 |
| 2015/0171937 A1* | 6/2015 | Murakami | ............ | H04L 5/0032 375/267 |

OTHER PUBLICATIONS

David Vargas, et al., "MIMO for DVB-NGH, The Next Generation Mobile TV Broadcasting", IEEE Communications Magazine, vol. 51, No. 7, pp. 130-137, Jul. 2013.

Armin Dammann, et al., "Standard Conformable Antenna Diversity Techniques for OFDM and its Application to the DVB-T System", IEEE Globecom 2001, pp. 3100-3105, Nov. 2001.

IEEE P802.1 11n™/D3.00, Draft Standard for Information Technology—Telecommunications and information exchange between systems—Local and metropolitan area networks-Specific requirements-, Part 11: Wireless LAN Medium Access Control (MAC) and Physical Layer (PHY) specifications, Sep. 2007.

Extended European Search Report dated Oct. 2, 2018 in corresponding European Application No. 16853269.5.

PCT/JP2013/003239, by Murakami published on Nov. 28, 2013.

* cited by examiner

FIG. 11
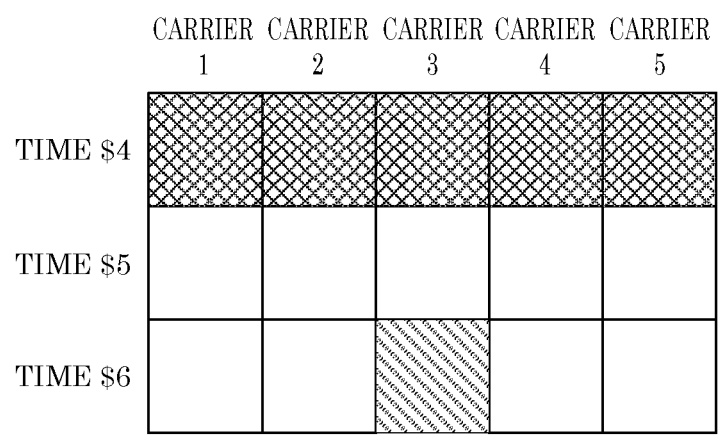
 : 501 PILOT SYMBOL (pb)
 : 502 DATA SYMBOL
 : 503 OTHER SYMBOL

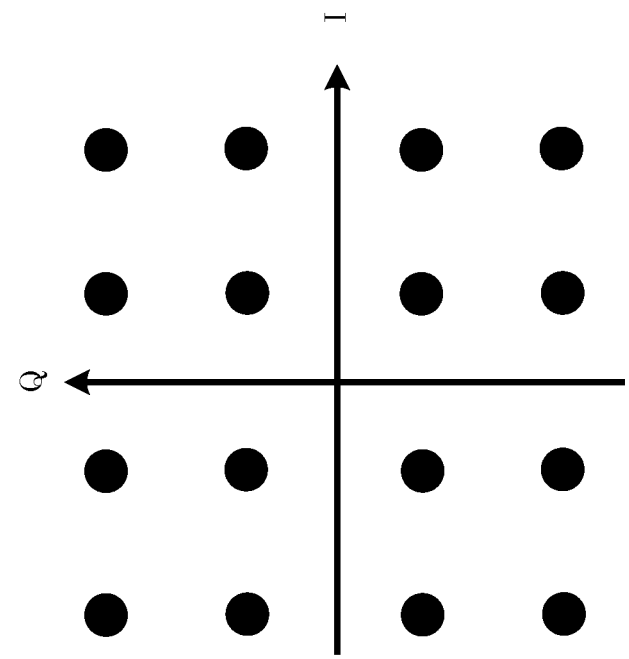
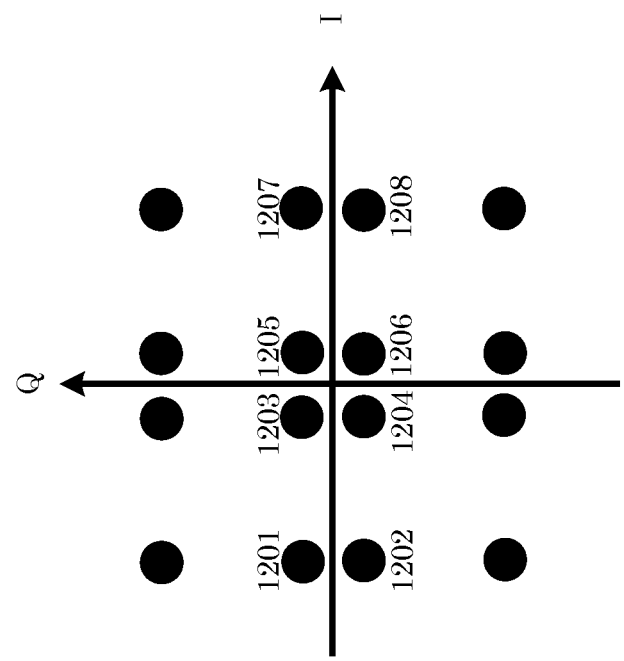
FIG. 12
FIG. 12A
FIG. 12B

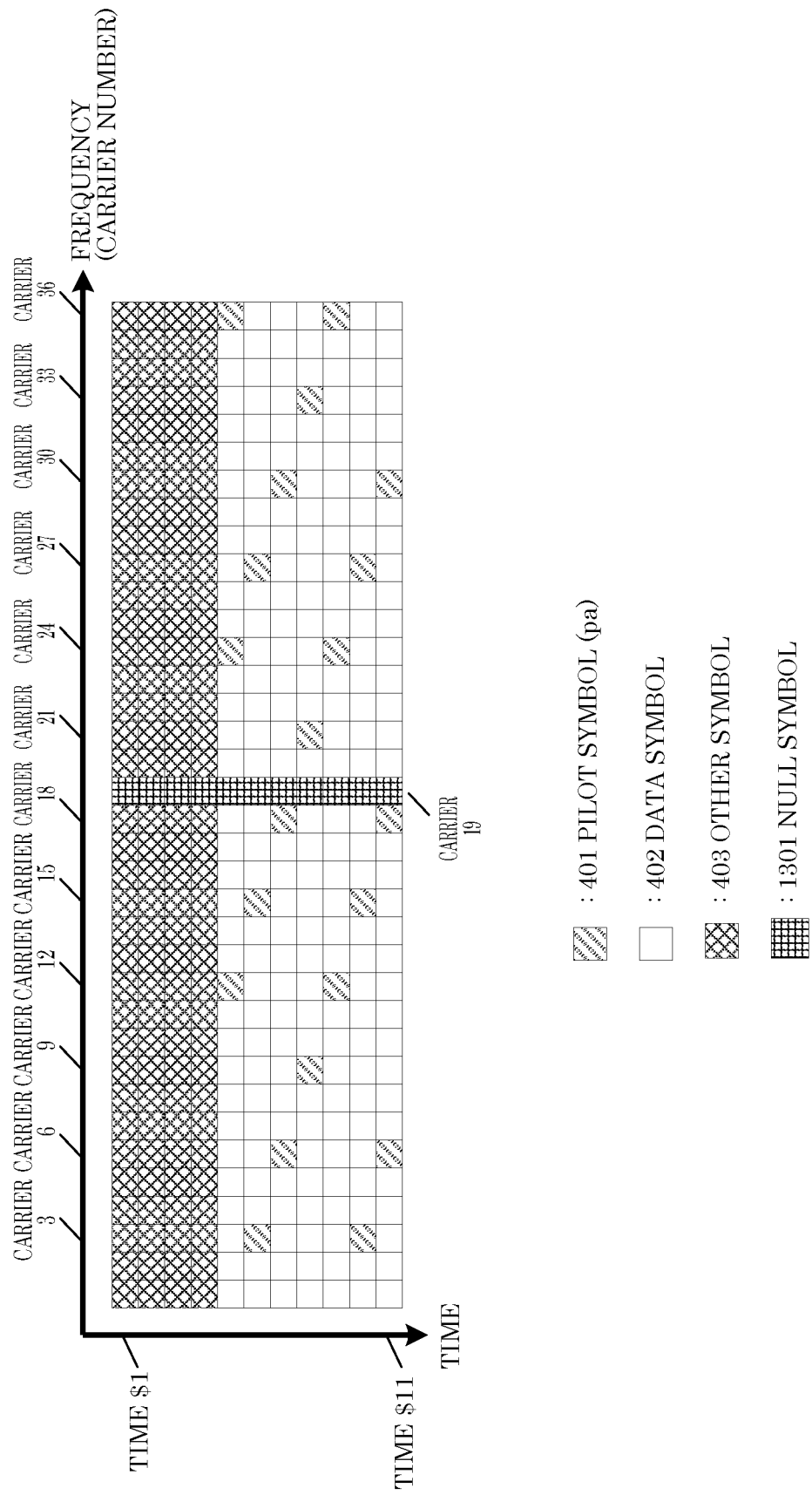

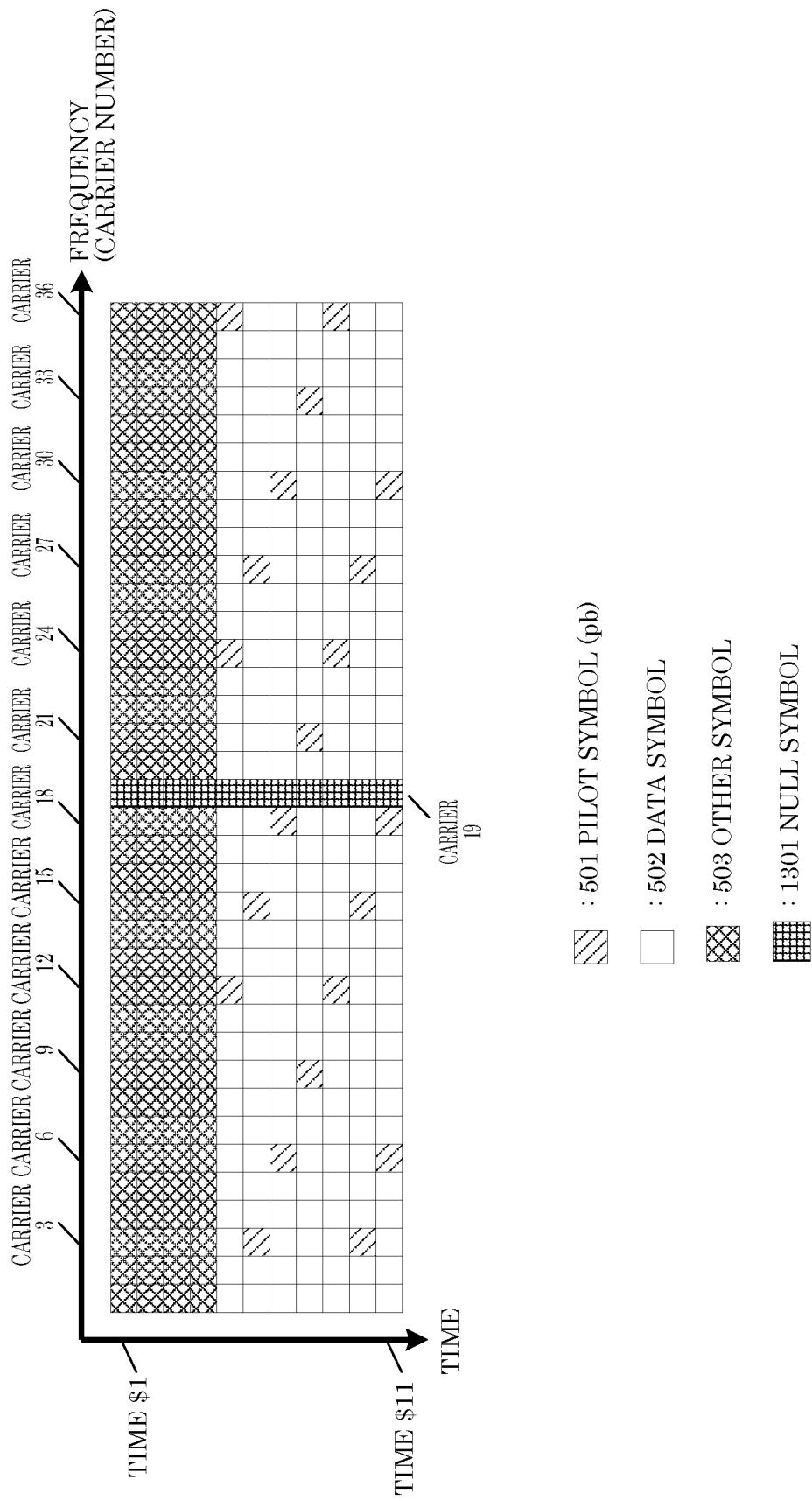

TRANSMISSION METHOD, TRANSMISSION DEVICE, RECEPTION METHOD, AND RECEPTION DEVICE

TECHNICAL FIELD

The present disclosure relates to transmission devices and reception devices, and in particular to transmission devices and reception devices that communicate by using multiple antennas.

BACKGROUND ART

In a line of sight (LOS) environment in which a direct wave is dominant, one example of a communications method that uses multiple antennas is the multiple-input multiple-output (MIMO) communications method, and one example of a transmission method for achieving favorable reception quality is the method disclosed in Non-Patent Literature (NPTL) 1.

CITATION LIST

Non-Patent Literature

NPTL 1: "MIMO for DVB-NGH, the next generation mobile TV broadcasting," IEEE Commun. Mag., vol. 57, no. 7, pp. 130-137, July 2013.
NPTL 2: "Standard conformable antenna diversity techniques for OFDM and its application to the DVB-T system," IEEE Globecom 2001, pp. 3100-3105, November 2001.
NPTL 3: IEEE P802.11n(D3.00) Draft STANDARD for Information Technology-Telecommunications and information exchange between systems-Local and metropolitan area networks-Specific requirements-Part11: Wireless LAN Medium Access Control (MAC) and Physical Layer (PHY) specifications, 2007.

SUMMARY OF THE INVENTION

One non-limiting embodiment of the present disclosure provides a transmission device that improves data reception quality in a propagation environment including LOS.

A transmission device according to one aspect of the present disclosure includes: a weighting synthesizer that generates a first precoded signal and a second precoded signal by performing a precoding process on a first baseband signal and a second baseband signal; a first pilot inserter that outputs a third signal by inserting a pilot signal into the first precoded signal; a first phase changer that outputs a fourth signal by applying a first phase change to the second precoded signal; a second pilot inserter that outputs a fifth signal by inserting a pilot signal into the fourth signal; and a second phase changer that outputs a sixth signal by applying a second phase change to the fifth signal.

A transmission method according to one aspect of the present disclosure includes: generating a first precoded signal and a second precoded signal by performing a precoding process on a first baseband signal and a second baseband signal; outputting a third signal by inserting a pilot signal into the first precoded signal; outputting a fourth signal by applying a first phase change to the second precoded signal; outputting a fifth signal by inserting a pilot signal into the fourth signal; and outputting a sixth signal by applying a second phase change to the fifth signal.

General and specific aspects of the above may be implemented as any combination of a system, device, and/or method.

Accordingly with the present disclosure, since it is possible to improve data reception quality in a propagation environment including LOS, it is possible to provide a high-quality communications service.

Further merits and advantageous effects in one aspect of the present disclosure will become apparent from the following description and figures. The merits and/or advantageous effects are realized by characteristics disclosed in the following embodiments, description, and figures, but there is no requirement to provide all merits and/or advantageous effects in order to achieve one or more equivalent characteristics.

BRIEF DESCRIPTION OF DRAWINGS

FIG. 11 illustrates part of the frame illustrated in FIG. 5.
FIG. 12A illustrates one example of a modulation scheme used by the mapper illustrated in FIG. 1.
FIG. 12B illustrates one example of a modulation scheme used by the mapper illustrated in FIG. 1.
FIG. 13 illustrates one example of a frame configuration of the transmission signal illustrated in FIG. 1.
FIG. 14 illustrates one example of a frame configuration of the transmission signal illustrated in FIG. 1.

DESCRIPTION OF EXEMPLARY
EMBODIMENT(S)

(Communications Method in LOS Environment)

In a LOS environment in which a direct wave is dominant, one example of a communications method that uses multiple antennas is the MIMO communications method, and one example of a transmission method for achieving favorable reception quality is the method disclosed in NPTL 1.

Figure 17:
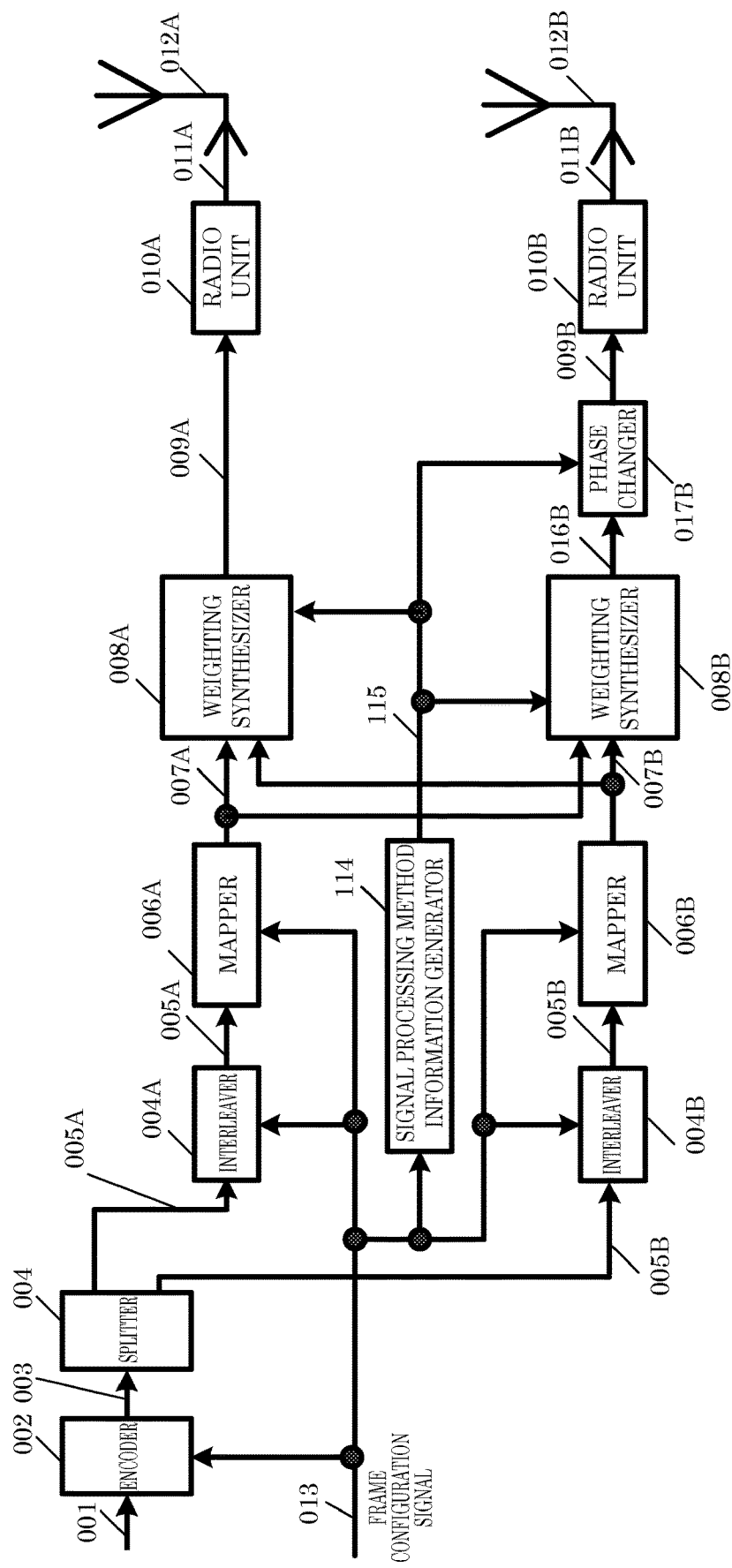
FIG. 17 illustrates an example of a configuration of a transmission device based on the DVB-NGH standard.

FIG. 17 illustrates one example of a configuration of a transmission device based on the Digital Video Broadcasting-Next Generation Handheld (DVB-NGH) standard, in a case where there are two transmitting antennas and two transmission modulated signals (transmission streams). This example is disclosed in NPTL 1. In the transmission device, data 003 encoded by encoder 002 is split into data 005A and data 005B by splitter 004. Data 005A is interleaved by interleaver 004A and mapped by mapper 006A. Similarly data 005B is interleaved by interleaver 004B and mapped by mapper 006B.

Weighting synthesizers 008A, 008B receive inputs of mapped signals 007A, 007B, and weighting synthesize these signals to generate weighting synthesized signals 009A, 016B. The phase of weighting synthesized signal 016B is then changed. Then, radio units 010A, 010B perform processing related to orthogonal frequency division multiplexing (OFDM) and processing such as frequency conversion and/or amplification, and transmit transmission signal 011A from antenna 012A and transmission signal 011B from antenna 012B.

The conventional configuration does not consider transmitting single stream signals together. In such a case, in particular, it is favorable to implement a new transmission method for improving data reception quality in the reception device that receives the single stream.

Hereinafter, embodiments according to the present disclosure will be described in detail with reference to the drawings.

Embodiment 1

A transmission method, transmission device, reception method, and reception device according to this embodiment will be described in detail.

Figure 1:
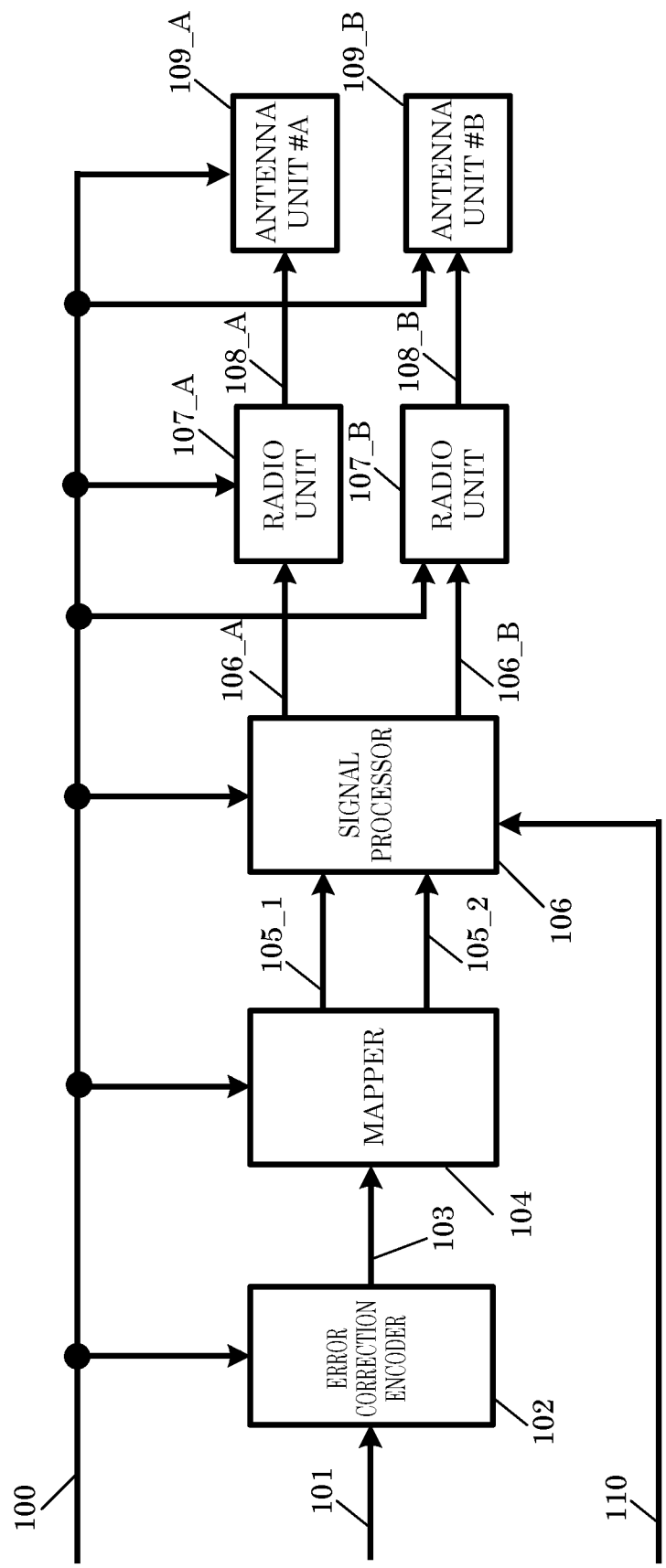
FIG. 1 illustrates one example of a configuration of a transmission device according to this embodiment.

FIG. 1 illustrates one example of a configuration of a transmission device according to this embodiment, such as a base station, access point, or broadcast station. Error correction encoder 102 receives inputs of data 101 and control signal 100, and based on information related to the error correction code included in control signal 100 (e.g., error correction code information, code length (block length), encode rate), performs error correction encoding, and outputs encoded data 103. Note that error correction encoder 102 may include an interleaver. In such a case, error correction encoder 102 may rearrange the encoded data before outputting encoded data 103.

Mapper 104 receives inputs of encoded data 103 and control signal 100, and based on information on the modulated signal included in control signal 100, performs mapping in accordance with the modulation scheme, and outputs baseband signal 1051, which is a mapped signal, and baseband signal 105_2, which is a mapped signal. Note that mapper 104 generates mapped signal 105_1 using a first sequence and generates mapped signal 1052 using a second sequence. Here, the first sequence and second sequence are different.

Signal processor 106 receives inputs of mapped signals 105_1 and 105_2, signal group 110, and control signal 100, performs signal processing based on control signal 100, and outputs processed signals 106_A and 106_B. Here, processed signal 106_A is expressed as u1(i), and processed signal 106_B is expressed as u2(i). i is a symbol number, and, for example, is an integer that is greater than or equal to 0. Note that details regarding the signal processing will be described with reference to FIG. 2 later.

Radio unit 107_A receives inputs of processed signal 106_A and control signal 100, and based on control signal 100, processes processed signal 106_A and outputs transmission signal 108_A. Transmission signal 108_A is then output as radio waves from antenna unit #A 109_A.

Similarly radio unit 107_B receives inputs of processed signal 106_B and control signal 100, and based on control signal 100, processes processed signal 106_B and outputs transmission signal 108_B. Transmission signal 108_B is then output as radio waves from antenna unit #B 109_B.

Antenna unit #A 109_A receives an input of control signal 100. Here, based on control signal 100, antenna unit #A 109_A processes transmission signal 108_A and outputs the result as radio waves. However, antenna unit #A 109_A may not receive an input of control signal 100.

Similarly antenna unit #B 109_B receives an input of control signal 100. Here, based on control signal 100, antenna unit #B 109_B processes transmission signal 108_B and outputs the result as radio waves. However, antenna unit #B 109_B may not receive an input of control signal 100.

Note that control signal 100 may be generated based on information transmitted by a device that is the communication partner illustrated in FIG. 1, and, alternatively the device illustrated in FIG. 1 may include an input unit, and control signal 100 may be generated based on information input from the input unit.

Figure 2:
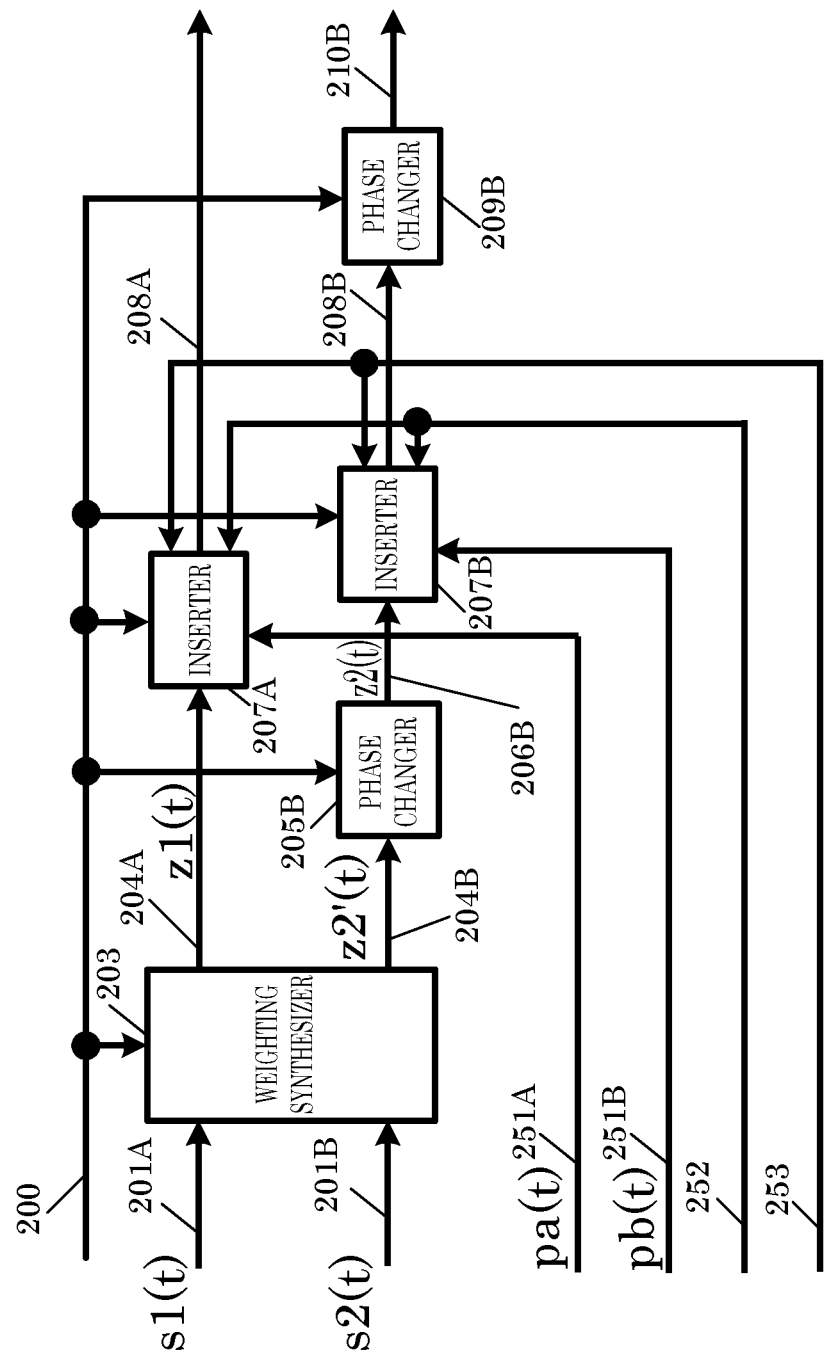
FIG. 2 illustrates one example of a configuration of the signal processor illustrated in FIG. 1.

FIG. 2 illustrates one example of a configuration of signal processor 106 illustrated in FIG. 1. Weighting synthesizer (precoder) 203 receives inputs of mapped signal 201A (mapped signal 105_1 in FIG. 1), mapped signal 201B (mapped signal 105_2 in FIG. 1), and control signal 200 (control signal 100 in FIG. 1), performs weighting synthesis (precoding) based on control signal 200, and outputs weighted signal 204A and weighted signal 204B. Here, mapped signal 201A is expressed as s1(t), mapped signal 201B is expressed as s2(t), weighted signal 204A is expressed as z1(t), and weighted signal 204B is expressed as z2'(t). Note that one example of t is time. s1(t), s2(t), z1(t), and z2'(t) are defined as complex numbers. Accordingly they may be actual numbers.

Weighting synthesizer (precoder) 203 performs the following calculation.

[MATH. 1]

$$\begin{pmatrix} z1(i) \\ z2'(i) \end{pmatrix} = \begin{pmatrix} a & b \\ c & d \end{pmatrix} \begin{pmatrix} s1(i) \\ s2(i) \end{pmatrix} \quad \text{Equation (1)}$$

In Equation (1), a, b, c, and d are defined as complex numbers. Note that a, b, c, and d may be actual numbers. Note that i is a symbol number.

Phase changer 205B receives inputs of weighting synthesized signal 204B and control signal 200, applies a phase change to weighting synthesized signal 204B based on control signal 200, and outputs phase-changed signal 206B. Note that phase-changed signal 206B is expressed as z2(t), and z2(t) is defined as a complex number. Accordingly z2(t) may be an actual number.

Next, specific operations performed by phase changer 205B will be described. In phase changer 205B, for example, a phase change of y(i) is applied to z2'(i). Accordingly z2(i) can be expressed as z2(i)=y(i)×z2'(i). Note that i is a symbol number and is an integer that is greater than or equal to 0.

For example, the phase change value is set as follows. Note that N is an integer that is greater than or equal to 2, and represents the number of phase change cycles. When N is set to an odd number greater than or equal to 3, data reception quality may increase.

[MATH. 2]

$$y(i) = e^{j\frac{2\times\pi\times i}{N}} \quad \text{Equation (2)}$$

j is an imaginary number unit. However, Equation (2) is merely a non-limiting example. Here, phase change value $y(i)=e^{j\times\delta(i)}$.

Here, z1(i) and z2(i) can be expressed with the following equation.

[MATH. 3]

$$\begin{pmatrix} z1(i) \\ z2(i) \end{pmatrix} = \begin{pmatrix} 1 & 0 \\ 0 & y(i) \end{pmatrix} \begin{pmatrix} a & b \\ c & d \end{pmatrix} \begin{pmatrix} s1(i) \\ s2(i) \end{pmatrix}$$
$$= \begin{pmatrix} 1 & 0 \\ 0 & e^{j \times \delta(i)} \end{pmatrix} \begin{pmatrix} a & b \\ c & d \end{pmatrix} \begin{pmatrix} s1(i) \\ s2(i) \end{pmatrix}$$

Equation (3)

Note that S(i) is an actual number. z1(i) and z2(i) are transmitted from the transmission device at the same time and using the same frequency (same frequency band).

In Equation (3), the phase change value is not limited to the value used in Equation (2); for example, a method in which the phase is changed cyclically or regularly is conceivable.

The matrix (precoding matrix) in Equation (1) and Equation (3) is as follows.

[MATH. 4]

$$\begin{pmatrix} a & b \\ c & d \end{pmatrix} = F$$

Equation (4)

For example, using the following matrix for matrix F is conceivable.

[MATH. 5]

$$F = \begin{pmatrix} \beta \times e^{j0} & \beta \times \alpha \times e^{j0} \\ \beta \times \alpha \times e^{j0} & \beta \times e^{j\pi} \end{pmatrix}$$

Equation (5)

[MATH. 6]

$$F = \frac{1}{\sqrt{\alpha^2 + 1}} \begin{pmatrix} e^{j0} & \alpha \times e^{j0} \\ \alpha \times e^{j0} & e^{j\pi} \end{pmatrix}$$

Equation (6)

[MATH. 7]

$$F = \begin{pmatrix} \beta \times e^{j0} & \beta \times \alpha \times e^{j\pi} \\ \beta \times \alpha \times e^{j0} & \beta \times e^{j0} \end{pmatrix}$$

Equation (7)

[MATH. 8]

$$F = \frac{1}{\sqrt{\alpha^2 + 1}} \begin{pmatrix} e^{j0} & \alpha \times e^{j\pi} \\ \alpha \times e^{j0} & e^{j0} \end{pmatrix}$$

Equation (8)

[MATH. 9]

$$F = \begin{pmatrix} \beta \times \alpha \times e^{j0} & \beta \times e^{j\pi} \\ \beta \times e^{j0} & \beta \times \alpha \times e^{j0} \end{pmatrix}$$

Equation (9)

[MATH. 10]

$$F = \frac{1}{\sqrt{\alpha^2 + 1}} \begin{pmatrix} \alpha \times e^{j0} & e^{j\pi} \\ e^{j0} & \alpha \times e^{j0} \end{pmatrix}$$

Equation (10)

[MATH. 11]

$$F = \begin{pmatrix} \beta \times \alpha \times e^{j0} & \beta \times e^{j0} \\ \beta \times e^{j0} & \beta \times \alpha \times e^{j\pi} \end{pmatrix}$$

Equation (11)

[MATH. 12]

$$F = \frac{1}{\sqrt{\alpha^2 + 1}} \begin{pmatrix} \alpha \times e^{j0} & e^{j0} \\ e^{j0} & \alpha \times e^{j\pi} \end{pmatrix}$$

Equation (12)

Note that in Equation (5), Equation (6), Equation (7), Equation (8), Equation (9), Equation (10), Equation (11), and Equation (12), a may be an actual number and may be an imaginary number, and B may be an actual number and may be an imaginary number. However, a is not 0 (zero). B is also not 0 (zero).

[MATH. 13]

$$F = \begin{pmatrix} \beta \times \cos\theta & \beta \times \sin\theta \\ \beta \times \sin\theta & -\beta \times \cos\theta \end{pmatrix}$$

Equation (13)

[MATH. 14]

$$F = \begin{pmatrix} \cos\theta & \sin\theta \\ \sin\theta & -\cos\theta \end{pmatrix}$$

Equation (14)

[MATH. 15]

$$F = \begin{pmatrix} \beta \times \cos\theta & -\beta \times \sin\theta \\ \beta \times \sin\theta & \beta \times \cos\theta \end{pmatrix}$$

Equation (15)

[MATH. 16]

$$F = \begin{pmatrix} \cos\theta & -\sin\theta \\ \sin\theta & \cos\theta \end{pmatrix}$$

Equation (16)

[MATH. 17]

$$F = \begin{pmatrix} \beta \times \sin\theta & -\beta \times \cos\theta \\ \beta \times \cos\theta & \beta \times \sin\theta \end{pmatrix}$$

Equation (17)

[MATH. 18]

$$F = \begin{pmatrix} \sin\theta & -\cos\theta \\ \cos\theta & \sin\theta \end{pmatrix}$$

Equation (18)

[MATH. 19]

$$F = \begin{pmatrix} \beta \times \sin\theta & \beta \times \cos\theta \\ \beta \times \cos\theta & -\beta \times \sin\theta \end{pmatrix}$$

Equation (19)

[MATH. 20]

$$F = \begin{pmatrix} \sin\theta & \cos\theta \\ \cos\theta & -\sin\theta \end{pmatrix}$$

Equation (20)

Note that in Equation (13), Equation (15), Equation (17), and Equation (19), B may be an actual number and may be an imaginary number. However, B is not 0 (zero) (θ is an actual number).

[MATH. 21]

$$F(i) = \begin{pmatrix} \beta \times e^{j\theta_{11}(i)} & \beta \times e^{j(\theta_{11}(i)+\lambda)} \\ \beta \times \alpha \times e^{j\theta_{21}(i)} & \beta \times \alpha \times e^{j(\theta_{21}(i)+\lambda+\pi)} \end{pmatrix}$$

Equation (21)

[MATH. 22]

$$F(i) = \frac{1}{\sqrt{\alpha^2 + 1}} \begin{pmatrix} e^{j\theta_{11}(i)} & \alpha \times e^{j(\theta_{11}(i)+\lambda)} \\ \alpha \times e^{j\theta_{21}(i)} & e^{j(\theta_{21}(i)+\lambda+\pi)} \end{pmatrix}$$

Equation (22)

-continued

[MATH. 23]
$$F(i) = \begin{pmatrix} \beta \times \alpha \times e^{j\theta_{21}(i)} & \beta \times \alpha \times e^{j(\theta_{21}(i)+\lambda+\pi)} \\ \beta \times e^{j\theta_{11}(i)} & \beta \times \alpha \times e^{j(\theta_{11}(i)+\lambda)} \end{pmatrix}$$ Equation (23)

[MATH. 24]
$$F(i) = \frac{1}{\sqrt{\alpha^2+1}} \begin{pmatrix} \alpha \times e^{j\theta_{21}(i)} & \alpha \times e^{j(\theta_{21}(i)+\lambda+\pi)} \\ e^{j\theta_{11}(i)} & \alpha \times e^{j(\theta_{11}(i)+\lambda)} \end{pmatrix}$$ Equation (24)

[MATH. 25]
$$F(i) = \begin{pmatrix} \beta \times e^{j\theta_{11}} & \beta \times \alpha \times e^{j(\theta_{11}+\lambda(i))} \\ \beta \times \alpha \times e^{j\theta_{21}} & \alpha \times e^{j(\theta_{21}+\lambda(i)+\pi)} \end{pmatrix}$$ Equation (25)

[MATH. 26]
$$F(i) = \frac{1}{\sqrt{\alpha^2+1}} \begin{pmatrix} e^{j\theta_{11}} & \alpha \times e^{j(\theta_{11}+\lambda(i))} \\ \alpha \times e^{j\theta_{21}} & e^{j(\theta_{21}+\lambda(i)+\pi)} \end{pmatrix}$$ Equation (26)

[MATH. 27]
$$F(i) = \begin{pmatrix} \beta \times \alpha \times e^{j\theta_{21}} & \beta \times e^{j(\theta_{21}+\lambda(i)+\pi)} \\ \beta \times e^{j\theta_{11}} & \beta \times \alpha \times e^{j(\theta_{11}+\lambda(i))} \end{pmatrix}$$ Equation (27)

[MATH. 28]
$$F(i) = \frac{1}{\sqrt{\alpha^2+1}} \begin{pmatrix} \alpha \times e^{j\theta_{21}} & e^{j(\theta_{21}+\lambda(i)+\pi)} \\ e^{j\theta_{11}} & \alpha \times e^{j(\theta_{11}+\lambda(i))} \end{pmatrix}$$ Equation (28)

[MATH. 29]
$$F = \begin{pmatrix} \beta \times e^{j\theta_{11}} & \beta \times \alpha \times e^{j(\theta_{11}+\lambda)} \\ \beta \times \alpha \times e^{j\theta_{21}} & \beta \times e^{j(\theta_{21}+\lambda+\pi)} \end{pmatrix}$$ Equation (29)

[MATH. 30]
$$F = \frac{1}{\sqrt{\alpha^2+1}} \begin{pmatrix} e^{j\theta_{11}} & \alpha \times e^{j(\theta_{11}+\lambda)} \\ \alpha \times e^{j\theta_{21}} & e^{j(\theta_{21}+\lambda+\pi)} \end{pmatrix}$$ Equation (30)

[MATH. 31]
$$F = \begin{pmatrix} \beta \times \alpha \times e^{j\theta_{21}} & \beta \times e^{j(\theta_{21}+\lambda+\pi)} \\ \beta \times e^{j\theta_{11}} & \beta \times \alpha \times e^{j(\theta_{11}+\lambda)} \end{pmatrix}$$ Equation (31)

[MATH. 32]
$$F = \frac{1}{\sqrt{\alpha^2+1}} \begin{pmatrix} \alpha \times e^{j\theta_{21}} & e^{j(\theta_{21}+\lambda+\pi)} \\ e^{j\theta_{11}} & \alpha \times e^{j(\theta_{11}+\lambda)} \end{pmatrix}$$ Equation (32)

However, $\theta_{11}(i)$, $\theta_{21}(i)$, and $\lambda(i)$ are functions of symbol number i, and are actual numbers. $\lambda$ is, for example, a fixed value and an actual number. However, $\lambda$ need not be a fixed value. $\alpha$ may be an actual number, and, alternatively may be an imaginary number. ß may be an actual number, and, alternatively may be an imaginary number. However, a is not 0 (zero). ß is also not 0 (zero). Moreover, $\theta_{11}$ and $\theta_{21}$ are actual numbers.

Moreover, in addition to these precoding matrices, each exemplary embodiment herein can also be carried out by using the following precoding matrices.

[MATH. 33]
$$F(i) = \begin{pmatrix} 1 & 0 \\ 0 & 1 \end{pmatrix}$$ Equation (33)

[MATH. 34]
$$F(i) = \begin{pmatrix} \beta & 0 \\ 0 & \beta \end{pmatrix}$$ Equation (34)

[MATH. 35]
$$F(i) = \begin{pmatrix} 1 & 0 \\ 0 & -1 \end{pmatrix}$$ Equation (35)

[MATH. 36]
$$F(i) = \begin{pmatrix} \beta & 0 \\ 0 & -\beta \end{pmatrix}$$ Equation (36)

Note that in Equation (34) and Equation (36), ß may be an actual number and, alternatively may be an imaginary number. However, ß is not 0 (zero).

Inserter 207A receives inputs of weighting synthesized signal 204A, pilot symbol signal pa(t)251A at time t, preamble signal 252, control information symbol signal 253, and control signal 200, and based on information on the frame configuration included in control signal 200, outputs baseband signal 208A based on the frame configuration.

Similarly, inserter 207B receives inputs of phase-changed signal 206B, pilot symbol signal pb(t)251B at time t, preamble signal 252, control information symbol signal 253, and control signal 200, and based on information on the frame configuration included in control signal 200, outputs baseband signal 208B based on the frame configuration.

Phase changer 209B receives inputs of baseband signal 208B and control signal 200, applies a phase change to baseband signal 208B based on control signal 200, and outputs phase-changed signal 210B. Baseband signal 208B is a function of symbol number i, and is expressed as x'(i). Then, phase-changed signal x(i)210B can be expressed as $x(i)=e^{j\times\varepsilon(i)}\times x'(i)$. Here, i is an integer that is greater than or equal to 0, and j is an imaginary number unit.

Although it will be described later, note that the operation performed by phase changer 209B may be cyclic delay diversity (CDD) or cycle shift diversity (CSD) disclosed in NPTL 2 and 3. Hereinafter this will be written as "CDD/CSD". Phase changer 209B then applies a phase change to a symbol present along the frequency axis. In other words, phase changer 209B applies a phase change to, for example, a data symbol, a pilot symbol, and/or a control information symbol.

Figure 3:
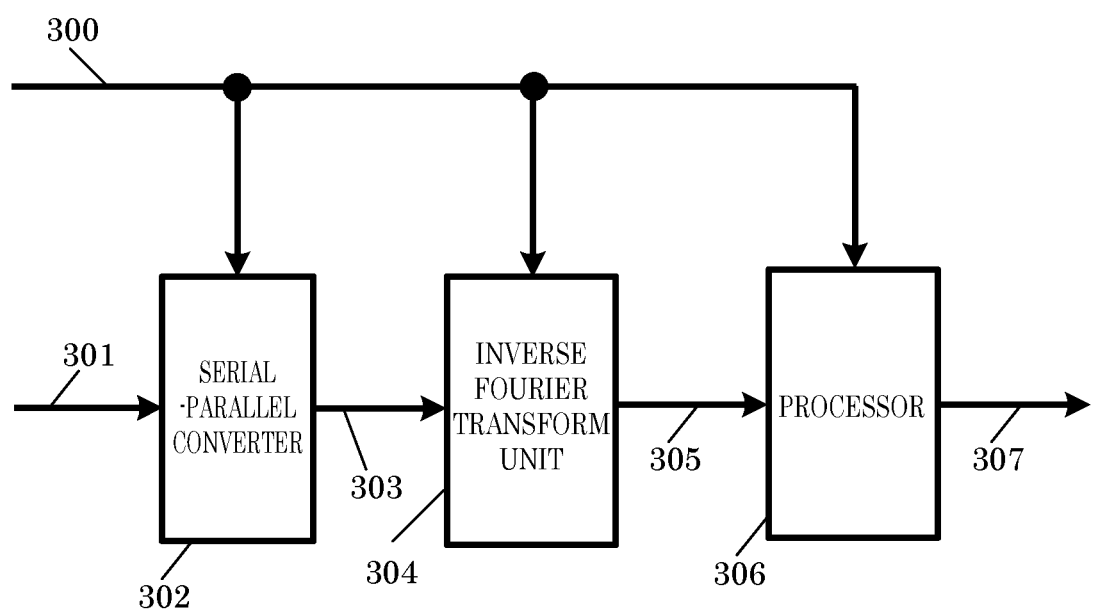
FIG. 3 illustrates one example of a configuration of the radio unit illustrated in FIG. 1.

FIG. 3 illustrates one example of a configuration of radio units 107_A and 107_B illustrated in FIG. 1. Serial-parallel converter 302 receives inputs of signal 301 and control signal 300 (control signal 100 in FIG. 1), applies a serial-parallel conversion based on control signal 300, and outputs serial-parallel converted signal 303.

Inverse Fourier transform unit 304 receives inputs of serial-parallel converted signal 303 and control signal 300, and based on control signal 300, applies, as one example of an inverse Fourier transform, an inverse fast Fourier transform (IFFT), and outputs inverse Fourier transformed signal 305.

Processor 306 receives inputs of inverse Fourier transformed signal 305 and control signal 300, applies processing such as frequency conversion and amplification based on control signal 300, and outputs modulated signal 307.

For example, when signal 301 is processed signal 106_A illustrated in FIG. 1, modulated signal 307 corresponds to transmission signal 108_A in FIG. 1. Moreover, when signal 301 is processed signal 106_B illustrated in FIG. 1, modulated signal 307 corresponds to transmission signal 108_B in FIG. 1.

Figure 4:
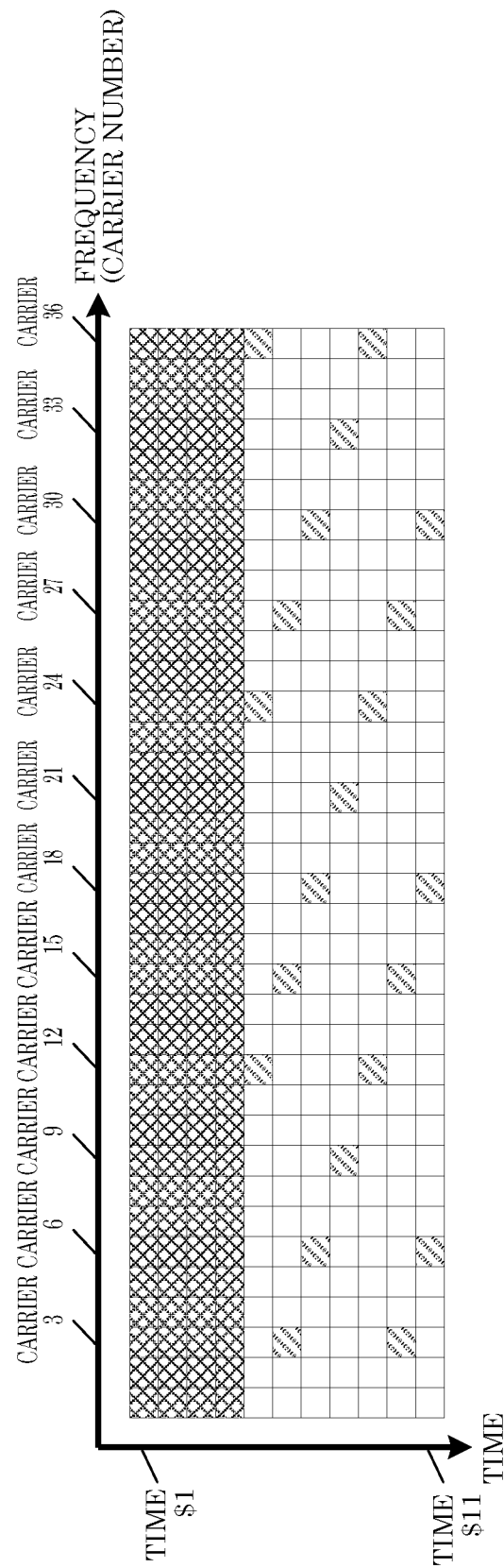
FIG. 4 illustrates one example of a frame configuration of the transmission signal illustrated in FIG. 1.

FIG. 4 illustrates a frame configuration of transmission signal 108_A illustrated in FIG. 1. In FIG. 4, frequency (carriers) is (are) represented on the horizontal axis and time is represented on the vertical axis. Since a multi-carrier transmission scheme such as OFDM is used, symbols are present in the carrier direction. In FIG. 4, all carrier symbols are shown. Moreover, in FIG. 4, symbols for time $1 through time $11 are shown.

In FIG. 4, pilot symbols 401 (pilot signal 251A in FIG. 2), data symbols 402, and other symbols 403 are shown. Here, a pilot symbol is, for example, a phase shift keying (PSK) symbol, and is a symbol for the reception device that receives this frame to perform channel estimation (propagation path fluctuation estimation), frequency offset estimation, and phase fluctuation estimation. For example, the transmission device illustrated in FIG. 1 and the reception device that receives the frame illustrated in FIG. 4 may share the transmission method of the pilot symbol.

Note that mapped signal 201A (mapped signal 105_1 in FIG. 1) is referred to as "stream #1" and mapped signal 201B (mapped signal 105_2 in FIG. 1) is referred to as "stream #2". Note that this also applied to subsequent descriptions.

Data symbol 402 is a symbol that corresponds to baseband signal 208A generated in the signal processing illustrated in FIG. 2. Accordingly data symbol 402 satisfies "a symbol including both the symbol "stream #1" and the symbol "stream #2"", "the symbol "stream #1"", or "the symbol "stream #2"", as determined by the configuration of the precoding matrix used by weighting synthesizer 203.

Other symbols 403 correspond to preamble symbol 242 and control information symbol signal 253 illustrated in FIG. 2. However, the other symbols may include symbols other than a preamble or control information symbol. Here, a preamble may transmit data (control data), and may be configured as, for example, a symbol for signal detection, a signal for performing frequency and time synchronization, or a symbol for performing channel estimation (a symbol for performing propagation path fluctuation estimation). The control information symbol is a symbol including control information for the reception device that received the frame in FIG. 4 to demodulate and decode a data symbol.

For example, all carriers from time $1 to time 4 in FIG. 4 are other symbols 403. Then, at time $5, carrier 1 through carrier 11 are data symbols 402. Thereafter, carrier 12 is pilot symbol 401, carrier 13 through carrier 23 are data symbols 402, carrier 24 is pilot symbol 401, (subsequent recitation is omitted). At time $6, carrier 1 and carrier 2 are data symbols 402, carrier 3 is pilot symbol 401, (subsequent recitation is omitted). Recitation for time $7 through time $10 is omitted. At time $11, recitation for carrier 1 through carrier 29 is omitted, carrier 30 at time $11 is pilot symbol 401, and carrier 31 through carrier 36 at time $11 are data symbols 402.

Figure 5:
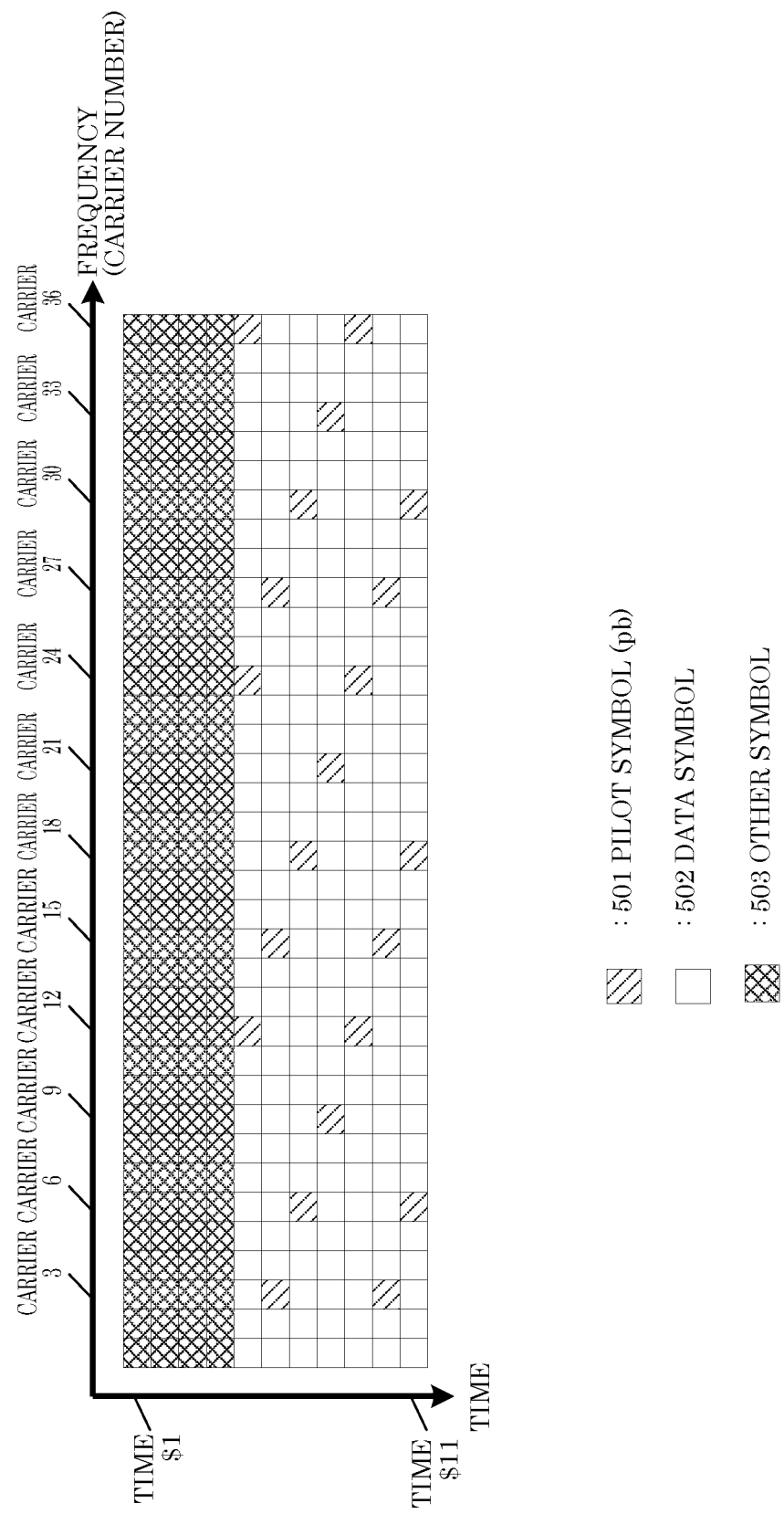
FIG. 5 illustrates one example of a frame configuration of the transmission signal illustrated in FIG. 1.

FIG. 5 illustrates a frame configuration of transmission signal 108_B illustrated in FIG. 1. In FIG. 5, frequency (carriers) is (are) represented on the horizontal axis and time is represented on the vertical axis. Since a multi-carrier transmission scheme such as OFDM is used, symbols are present in the carrier direction. In FIG. 5, all carrier symbols are shown. Moreover, in FIG. 5, symbols for time $1 through time $11 are shown.

In FIG. 5, pilot symbols 501 (pilot signal 251B in FIG. 2), data symbols 502, and other symbols 503 are shown. Here, a pilot symbol is, for example, a PSK symbol, and is a symbol for the reception device that receives this frame to perform channel estimation (propagation path fluctuation estimation), frequency offset estimation, and phase fluctuation estimation. For example, the transmission device illustrated in FIG. 1 and the reception device that receives the frame illustrated in FIG. 5 may share the transmission method of the pilot symbol.

Data symbol 502 is a symbol that corresponds to baseband signal 208B generated in the signal processing illustrated in FIG. 2. Accordingly data symbol 502 satisfies "a symbol including both the symbol "stream #1" and the symbol "stream #2"", "the symbol "stream #1"", or "the symbol "stream #2"", as determined by the configuration of the precoding matrix used by weighting synthesizer 203.

Other symbols 503 correspond to preamble signal 252 and control information symbol signal 253 illustrated in FIG. 2. However, the other symbols may include symbols other than a preamble or control information symbol. Here, a preamble may transmit data (for example, control data), and may be configured as, for example, a symbol for signal detection, a signal for performing frequency and time synchronization, or a symbol for performing channel estimation. The control information symbol is a symbol including control information for the reception device that received the frame in FIG. 5 to demodulate and decode a data symbol.

For example, all carriers from time $1 to time $4 in FIG. 5 are other symbols 403. Thereafter, at time $5, carrier 1 through carrier 11 are data symbols 402, carrier 12 is pilot symbol 401, carrier 13 through carrier 23 are data symbols 402, carrier 24 is pilot symbol 401. Recitation for the remaining carriers at time $5 is omitted. At time $6, carrier 1 and carrier 2 are data symbols 402, carrier 3 is pilot symbol 401, and recitation for the remaining carriers at time $6 is omitted. Recitation for time $7 through time $10 is omitted. At time $11, recitation for carrier 1 through carrier 29 is omitted, carrier 30 is pilot symbol 401, and carrier 31 through carrier 36 are data symbols 402.

When a symbol is present in carrier A at time $B in FIG. 4 and a symbol is present in carrier A at time $B in FIG. 5, the symbol in carrier A at time $B in FIG. 4 and the symbol in carrier A at time $B in FIG. 5 are transmitted at the same time and same frequency. Note that the frame configuration is not limited to the configurations illustrated in FIG. 4 and FIG. 5; FIG. 4 and FIG. 5 are mere examples of frame configurations.

The other symbols in FIG. 4 and FIG. 5 are symbols corresponding to "preamble signal 252 and control information symbol signal 253 in FIG. 2". Accordingly when an other symbol 503 in FIG. 5 at the same time and same frequency (same carrier) as an other symbol 403 in FIG. 4 transmits control information, it transmits the same data (the same control information).

Note that this is under the assumption that the frame of FIG. 4 and the frame of FIG. 5 are received at the same time by the reception device, but even when the frame of FIG. 4 or the frame of FIG. 5 has been received, the reception device can obtain the data transmitted by the transmission device.

Figure 6:
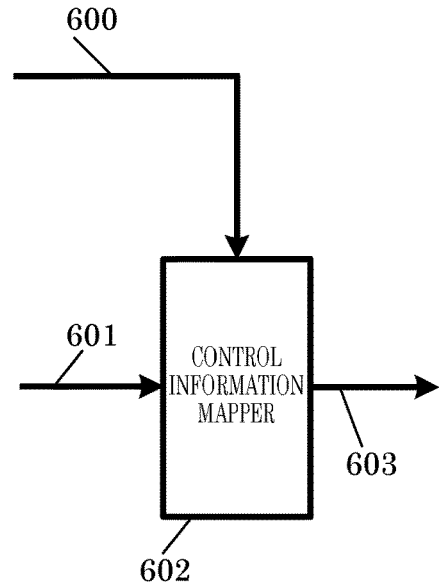
FIG. 6 illustrates one example of a configuration of components relevant to control information generation in FIG. 2.

FIG. 6 illustrates one example of components relating to control information generation for generating control information symbol signal 253 illustrated in FIG. 2.

Control information mapper 602 receives inputs of data 601 related to control information and control signal 600, maps data 601 related to control information in using a modulation scheme based on control signal 600, and outputs control information mapped signal 603 Note that control information mapped signal 603 corresponds to control information symbol signal 253 in FIG. 2.

Figure 7:
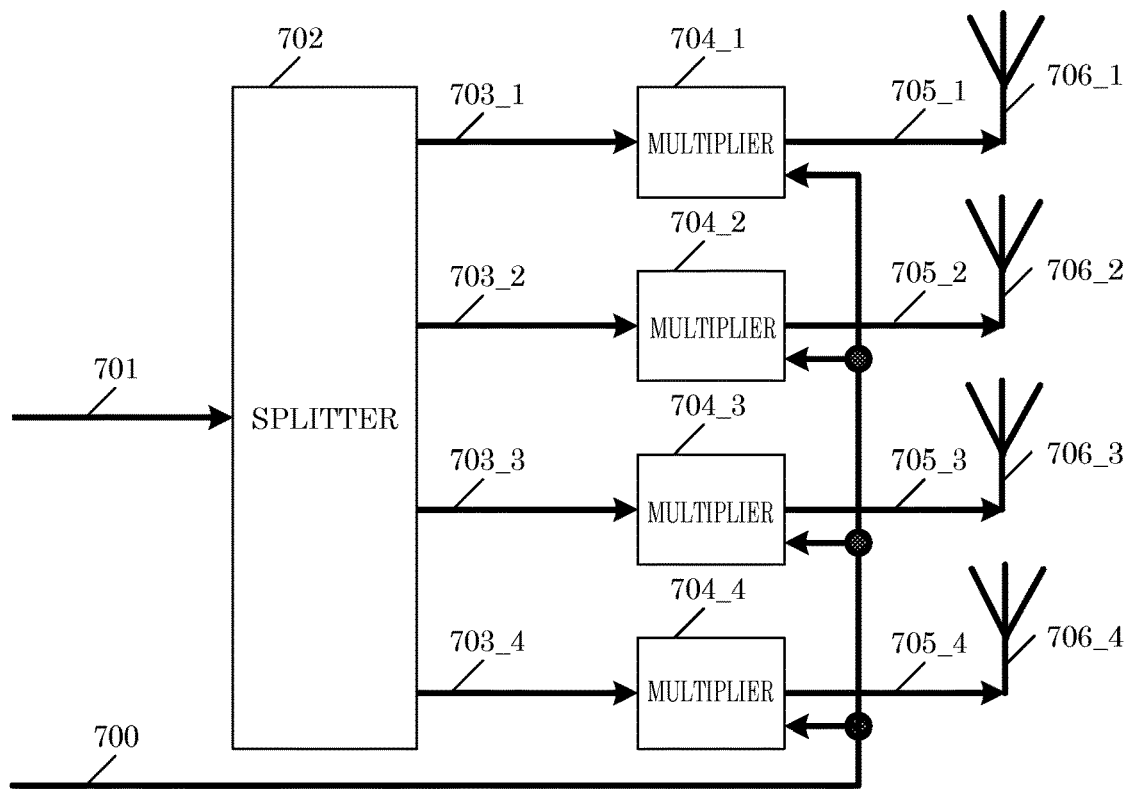
FIG. 7 illustrates one example of a configuration of the antenna unit illustrated in FIG. 1.

FIG. 7 illustrates one example of a configuration of antenna unit #A 109_A and antenna unit #B 109_B illustrated in FIG. 1. Antenna unit #A 109_A and antenna unit #B 109_B are exemplified as including a plurality of antennas.

Splitter 702 receives an input of transmission signal 701, performs splitting, and outputs transmission signals 7031, 7032, 703_3, and 703_4.

Multiplier 704_1 receives inputs of transmission signal 703_1 and control signal 700, and based on the multiplication coefficient included in control signal 700, multiplies a multiplication coefficient with transmission signal 7031, and outputs multiplied signal 705_1. Multiplied signal 705_1 is output from antenna 706_1 as radio waves.

When transmission signal 703_1 is expressed as Tx1(t) and the multiplication coefficient is expressed as W1, multiplied signal 705_1 can be expressed as Tx1(t)×W1. t indicates time, W1 can be defined as a complex number, and as such, may be an actual number.

Multiplier 704_2 receives inputs of transmission signal 703_2 and control signal 700, and based on the multiplication coefficient included in control signal 700, multiplies a multiplication coefficient with transmission signal 7032, and outputs multiplied signal 705_2. Multiplied signal 705_2 is output from antenna 706_2 as radio waves.

When transmission signal 703_2 is expressed as Tx2(t) and the multiplication coefficient is expressed as W2, multiplied signal 705_2 can be expressed as Tx2(t)×W2. t indicates time, W2 can be defined as a complex number, and as such, may be an actual number.

Multiplier 704_3 receives inputs of transmission signal 703_3 and control signal 700, and based on the multiplication coefficient included in control signal 700, multiplies a multiplication coefficient with transmission signal 7033, and outputs multiplied signal 705_3. Multiplied signal 705_3 is output from antenna 706_3 as radio waves.

When transmission signal 703_3 is expressed as Tx3(t) and the multiplication coefficient is expressed as W3, multiplied signal 705_3 can be expressed as Tx3(t)×W3. W3 can be defined as a complex number, and as such, may be an actual number.

Multiplier 704_4 receives inputs of transmission signal 703_4 and control signal 700, and based on the multiplication coefficient included in control signal 700, multiplies a multiplication coefficient with transmission signal 7034, and outputs multiplied signal 705_4. Multiplied signal 705_4 is output from antenna 706_4 as radio waves.

When transmission signal 703_4 is expressed as Tx4(t) and the multiplication coefficient is expressed as W4, multiplied signal 705_4 can be expressed as Tx4(t)×W4. W4 can be defined as a complex number, and as such, may be an actual number.

Note that "the absolute value of W1, the absolute value of W2, the absolute value of W3, and the absolute value of W4 are equal" may be true. In this case, this is the equivalent of phase change being performed. It goes without saying that the absolute value of W1, the absolute value of W2, the absolute value of W3, and the absolute value of W4 may be unequal.

Moreover, in FIG. 7, the antenna unit is exemplified as including four antennas, but the number of antennas is not limited to four; the antenna unit may include two or more antennas. Note the antenna unit may include four antenna and four multipliers.

When the configuration of antenna unit #A 109_A in FIG. 1 is as illustrated in FIG. 7, transmission signal 701 corresponds to transmission signal 108_A in FIG. 1. When the configuration of antenna unit #B 109_B in FIG. 1 is as illustrated in FIG. 7, transmission signal 701 corresponds to transmission signal 108_B in FIG. 1 and transmission signal 108_B in FIG. 1. However, antenna unit #A 109_A and antenna unit #B 109_B need not have the configuration illustrated in FIG. 7; as stated before, the antenna unit may not receive an input of control signal 100.

Figure 8:
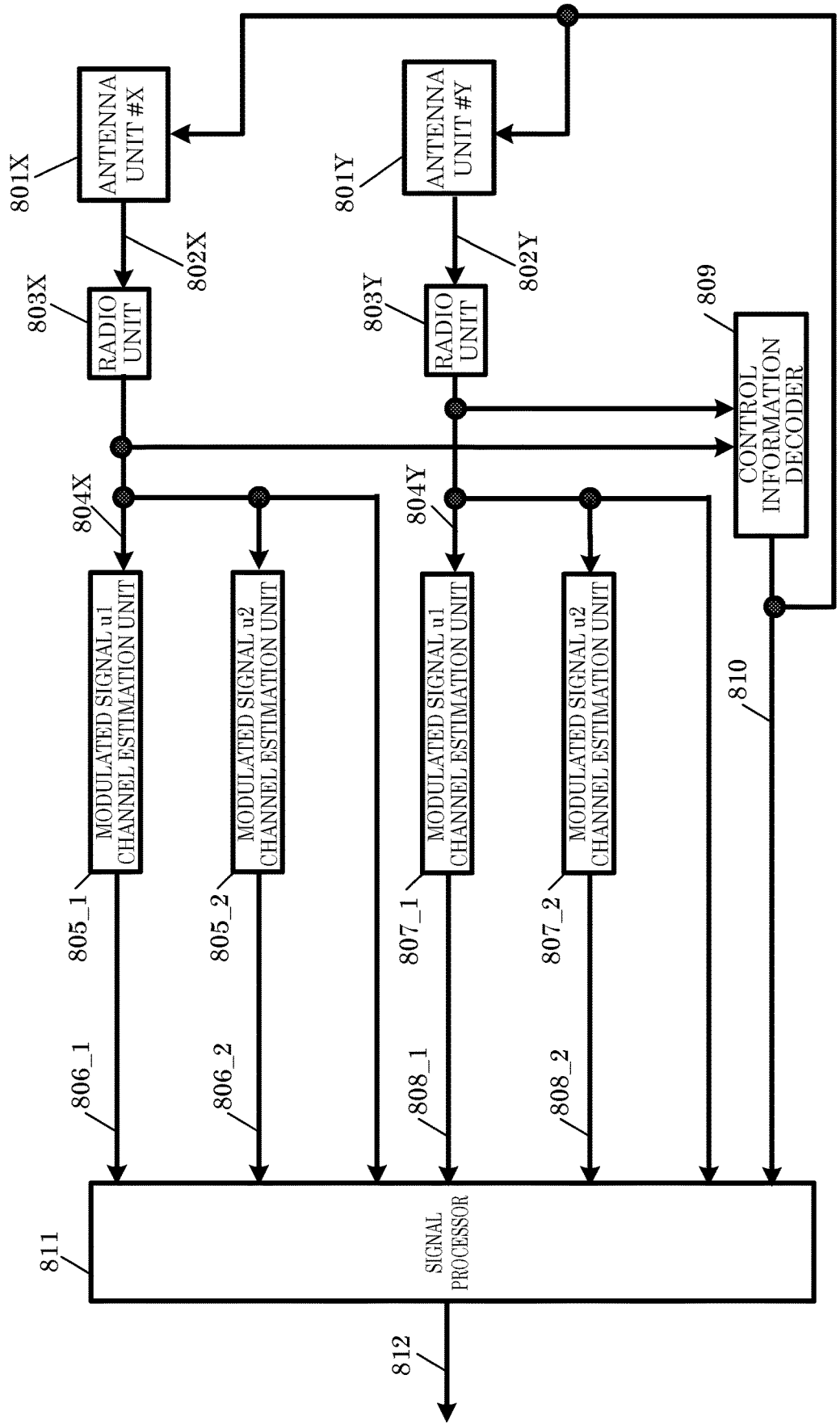
FIG. 8 illustrates one example of a configuration of a reception device according to this embodiment.

FIG. 8 illustrates one example of a configuration of a reception device that receives a modulated signal upon the transmission device illustrated in FIG. 1 transmitting, for example, a transmission signal having the frame configuration illustrated in FIG. 4 or FIG. 5.

Radio unit 803X receives an input of reception signal 802X received by antenna unit #X 801X, applies processing such as frequency conversion and a Fourier transform, and outputs baseband signal 804X.

Similarly, radio unit 803Y receives an input of reception signal 802Y received by antenna unit #Y 801Y, applies processing such as frequency conversion and a Fourier transform, and outputs baseband signal 804Y.

Note that FIG. 8 illustrates a configuration in which antenna unit #X 801X and antenna unit #Y 801Y receive control signal 810 as an input, but antenna unit #X 801X and antenna unit #Y 801Y may be configured to not receive an input of control signal 810. Operations performed when control signal 810 is present as an input will be described in detail later.

Figure 9:
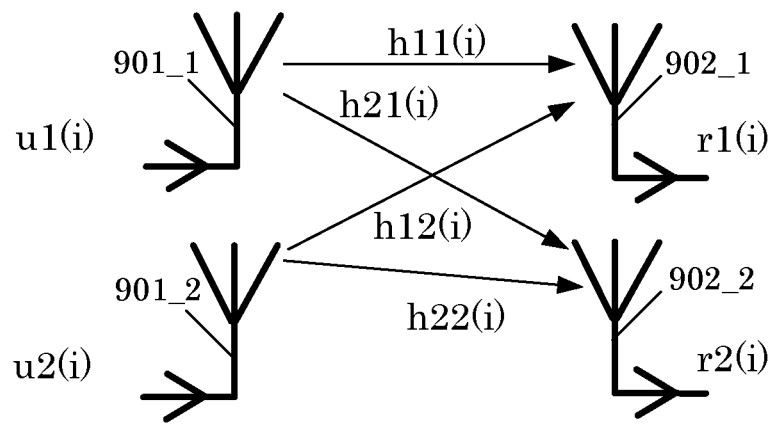
FIG. 9 illustrates a relationship between the transmission device and the reception device.

FIG. 9 illustrates the relationship between the transmission device and the reception device. Antennas 901_1 and 901_2 in FIG. 9 are transmitting antennas, and antenna 901_1 in FIG. 9 corresponds to antenna unit #A 109_A in FIG. 1. Antenna 901_2 in FIG. 9 corresponds to antenna unit #B 109_B in FIG. 1.

Antennas 902_1 and 902_2 in FIG. 9 are receiving antennas, and antenna 902_1 in FIG. 9 corresponds to antenna unit #X 801X in FIG. 8. Antenna 902_2 in FIG. 9 corresponds to antenna unit #Y 801Y in FIG. 8.

As illustrated in FIG. 9, the signal transmitted from transmitting antenna 901_1 is u1(i), the signal transmitted from transmitting antenna 901_2 is u2(i), the signal received by receiving antenna 9021 is r1(i), and the signal received by receiving antenna 9022 is r2(i). Note that i is a symbol number, and, for example, is an integer that is greater than or equal to 0.

The propagation coefficient from transmitting antenna 901_1 to receiving antenna 902_1 is h11(i), the propagation coefficient from transmitting antenna 901_1 to receiving antenna 902_2 is h21(i), the propagation coefficient from transmitting antenna 901_2 to receiving antenna 902_1 is h12(i), and the propagation coefficient from transmitting antenna 901_2 to receiving antenna 902_2 is h22(i). In this case, the following relation equation holds true.

[MATH. 37]

$$\begin{pmatrix} r1(i) \\ r2(i) \end{pmatrix} = \begin{pmatrix} h11(i) & h12(i) \\ h21(i) & h22(i) \end{pmatrix} \begin{pmatrix} u1(i) \\ u2(i) \end{pmatrix} + \begin{pmatrix} n1(i) \\ n2(i) \end{pmatrix} \quad \text{Equation (37)}$$

Note that n1(i) and n2(i) are noise.

Channel estimation unit 805_1 of modulated signal u1 in FIG. 8 receives an input of baseband signal 804X, and using the preamble and/or pilot symbol illustrated in FIG. 4 or FIG. 5, performs channel estimation on modulated signal u1, that is to say estimates h11(i) in Equation (37), and outputs channel estimated signal 806_1.

Channel estimation unit 805_2 of modulated signal u2 receives an input of baseband signal 804X, and using the preamble and/or pilot symbol illustrated in FIG. 4 or FIG. 5, performs channel estimation on modulated signal u2, that is to say estimates h12(i) in Equation (37), and outputs channel estimated signal 806_2.

Channel estimation unit 807_1 of modulated signal u1 receives an input of baseband signal 804Y, and using the preamble and/or pilot symbol illustrated in FIG. 4 or FIG. 5, performs channel estimation on modulated signal u1, that is to say estimates h21(i) in Equation (37), and outputs channel estimated signal 808_1.

Channel estimation unit 807_2 of modulated signal u2 receives an input of baseband signal 804Y, and using the preamble and/or pilot symbol illustrated in FIG. 4 or FIG. 5, performs channel estimation on modulated signal u2, that is to say estimates h22(i) in Equation (37), and outputs channel estimated signal 808_2.

Control information decoder 809 receives inputs of baseband signals 804X and 804Y, demodulates and decodes control information including "other symbols" in FIG. 4 and FIG. 5, and outputs control signal 810 including control information.

Signal processor 811 receives inputs of channel estimated signals 806_1, 8062, 808_1, and 8082, baseband signals 804X and 804Y, and control signal 810, performs demodulation and decoding using the relationship in Equation (37) or based on control information (for example, information on a modulation scheme or a scheme relating to the error correction code) in control signal 810, and outputs reception data 812.

Note that control signal 810 need not be generated via the method illustrated in FIG. 8. For example, control signal 810 in FIG. 8 may be generated based on information transmitted by a device that is the communication partner (FIG. 1) in FIG. 8, and, alternatively the device in FIG. 8 may include an input unit, and control signal 810 may be generated based on information input from the input unit.

Figure 10:
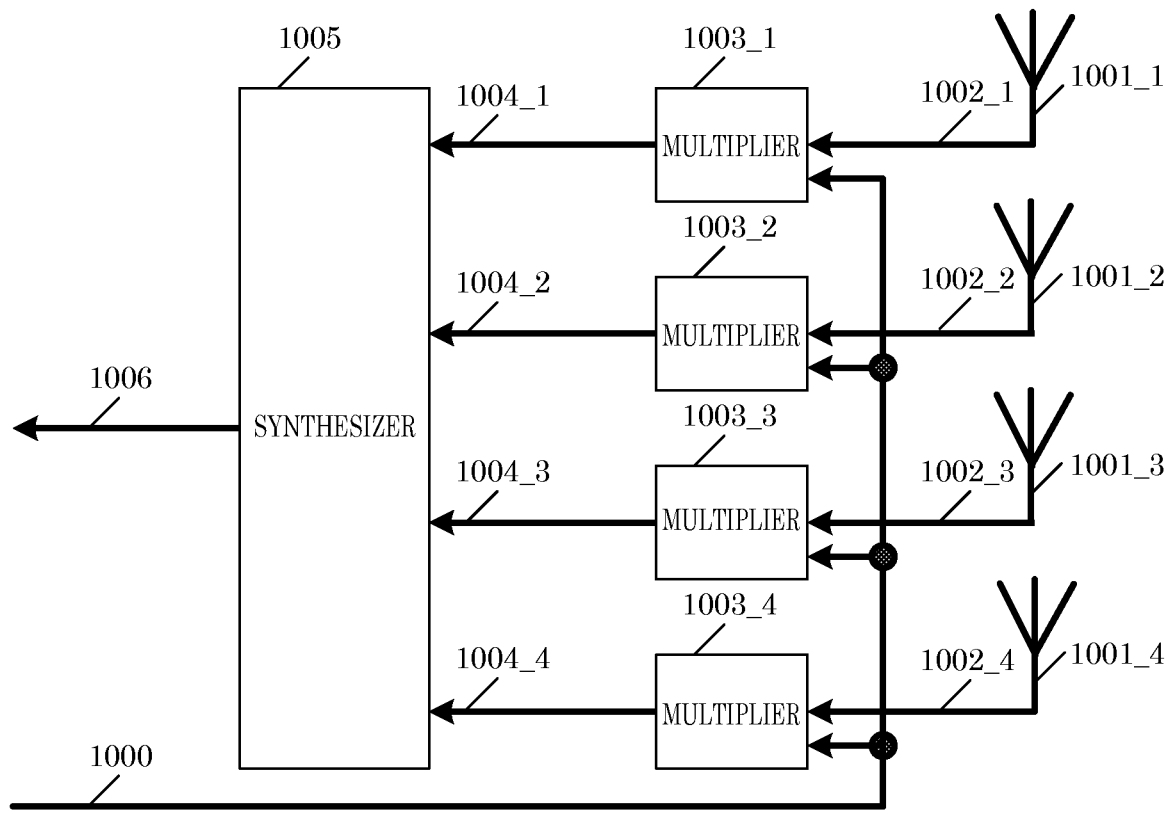
FIG. 10 illustrates one example of a configuration of the antenna unit illustrated in FIG. 8.

FIG. 10 illustrates one example of a configuration of antenna unit #X 801X and antenna unit #Y 801Y illustrated in FIG. 8. Antenna unit #X 801X and antenna unit #Y 801Y are exemplified as including a plurality of antennas.

Multiplier 1003_1 receives inputs of reception signal 1002_1 received by antenna 1001_1 and control signal 1000, and based on information on a multiplication coefficient included in control signal 1000, multiplies reception signal 1002_1 with the multiplication coefficient, and outputs multiplied signal 1004_1.

When reception signal 1002_1 is expressed as Rx1(t) and the multiplication coefficient is expressed as D1, multiplied signal 1004_1 can be expressed as Rx1(t)×D1. t indicates time, D1 can be defined as a complex number, and as such, may be an actual number.

Multiplier 1003_2 receives inputs of reception signal 1002_2 received by antenna 1001_2 and control signal 1000, and based on information on a multiplication coefficient included in control signal 1000, multiplies reception signal 1002_2 with the multiplication coefficient, and outputs multiplied signal 1004_2.

When reception signal 1002_2 is expressed as Rx2(t) and the multiplication coefficient is expressed as D2, multiplied signal 1004_2 can be expressed as Rx2(t)×D2. D2 can be defined as a complex number, and as such, may be an actual number.

Multiplier 1003_3 receives inputs of reception signal 1002_3 received by antenna 1001_3 and control signal 1000, and based on information on a multiplication coefficient included in control signal 1000, multiplies reception signal 1002_3 with the multiplication coefficient, and outputs multiplied signal 1004_3.

When reception signal 1002_3 is expressed as Rx3(t) and the multiplication coefficient is expressed as D3, multiplied signal 1004_3 can be expressed as Rx3(t)×D3. D3 can be defined as a complex number, and as such, may be an actual number.

Multiplier 1003_4 receives inputs of reception signal 1002_4 received by antenna 1001_4 and control signal 1000, and based on information on a multiplication coefficient included in control signal 1000, multiplies reception signal 1002_4 with the multiplication coefficient, and outputs multiplied signal 1004_4.

When reception signal 1002_4 is expressed as Rx4(t) and the multiplication coefficient is expressed as D4, multiplied signal 1004_4 can be expressed as Rx4(t)×D4. D4 can be defined as a complex number, and as such, may be an actual number.

Synthesizer 1005 receives inputs of multiplied signals 1004_1, 1004_2, 1004_3, and 10044, synthesizes multiplied signals 10041, 10042, 10043, and 1004_4, and outputs synthesized signal 1006. Note that synthesized signal 1006 is expressed as Rx1(t)×D1+Rx2(t)×D2+Rx3(t)×D3+Rx4(t)×D4.

In FIG. 10, the antenna unit is exemplified as including four antennas, but the number of antennas is not limited to four; the antenna unit may include two or more antennas. Note the antenna unit may include four antenna and four multipliers.

When the configuration of antenna unit #X 801X in FIG. 8 is as illustrated in FIG. 10, reception signal 802X corresponds to synthesized signal 1006 in FIG. 10, and control signal 710 corresponds to control signal 1000 in FIG. 10. When the configuration of antenna unit #Y 801Y in FIG. 8 is as illustrated in FIG. 10, reception signal 802Y corresponds to synthesized signal 1006 in FIG. 10, and control signal 710 corresponds to control signal 1000 in FIG. 10. However, antenna unit #X 801X and antenna unit #Y 801Y need not have the configuration illustrated in FIG. 10; as stated before, the antenna unit may not receive an input of control signal 710.

Note that control signal 800 may be generated based on information transmitted by a device that is the communication partner, and, alternatively the device may include an input unit, and control signal 800 may be generated based on information input from the input unit.

Next, signal processor 106 in the transmission device illustrated in FIG. 1 is inserted as phase changer 205B and phase changer 209B, as illustrated in FIG. 2. The characteristics and advantageous effects of this configuration will be described.

As described with reference to FIG. 4 and FIG. 5, phase changer 205B applies precoding (weighted synthesis) to mapped signal s1(i) 201A obtained via mapping using the first sequence and mapped signal s2(i) 201B obtained via mapping using the second sequence, and applies a phase change to one of the obtained weighting synthesized signals 204A and 204B. Note that i is a symbol number and is an integer that is greater than or equal to 0.

Weighting synthesized signal 204A and phase-changed signal 206B are then transmitted at the same frequency and at the same time. Accordingly in FIG. 4 and FIG. 5, a phase change is applied to data symbol 502 in FIG. 5.

In the case of FIG. 2, since phase changer 205B applies this to weighting synthesized signal 204B, a phase change is applied to data symbol 502 in FIG. 5. When a phase change is applied to weighting synthesized signal 204A, a phase change is applied to data symbol 402 in FIG. 4. This will be described later.

For example, FIG. 11 illustrates an extraction of carrier 1 through carrier 5 and time $4 through time $6 from the frame illustrated in FIG. 5. Note that in FIG. 11, similar to FIG. 5, pilot symbol 501, data symbols 502, and other symbols 503 are shown.

As described above, among the symbols illustrated in FIG. 11, phase changer 205B applies a phase change to the data symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6).

Accordingly the phase change values for the data symbols illustrated in FIG. 11 can be expressed as "$e^{j\times\delta 15(i)}$" for (carrier 1, time $5), "$e^{j\times\delta 25(i)}$" for (carrier 2, time $5), "$e^{j\times\delta 35(i)}$" for (carrier 3, time $5), "$e^{j\times\delta 45(i)}$" for (carrier 4, time $5), "$e^{j\times\delta 55(i)}$" for (carrier 5, time $5), "$e^{j\times\delta 16(i)}$" for (carrier 1, time $6), "$e^{j\times\delta 26(i)}$" for (carrier 2, time $6), "$e^{j\times\delta 36(i)}$" for (carrier 4, time $6), and "$e^{j\times\delta 56(i)}$" for (carrier 5, time $6).

Among the symbols illustrated in FIG. 11, the other symbols located at (carrier 1, time $4), (carrier 2, time $4), (carrier 3, time $4), (carrier 4, time $4), and (carrier 5, time $4), and the pilot symbol located at (carrier 3, time $6) are not subject to phase change by phase changer 205B.

This point is a characteristic of phase changer 205B. Note that, as illustrated in FIG. 4, data carriers are arranged at "the same carriers and the same times" as the symbols subject to phase change in FIG. 11, which are the data symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6).

In other words, in FIG. 4, the symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6) are data symbols.

In other words, data symbols that perform MIMO transmission are subject to phase change by phase changer 205B. "MIMO transmission" means transmission of a plurality of streams.

One example of the phase change that phase changer 205B applies to the data symbols is the method given in Equation (2) in which phase change is applied to the data symbols regularly such as at each cycle N. However, the method of applying the phase change to the data symbols is not limited to this example.

With this, when the environment is one in which the direct waves are dominant, such as in an LOS environment, it is possible to achieve improved data reception quality in the reception device with respect to the data symbols that perform MIMO transmission. Next, the advantageous effects of this will be described.

For example, the modulation scheme used by mapper 104 in FIG. 1 is quadrature phase shift keying (QPSK). Mapped signal 201A in FIG. 2 is a QPSK signal, and mapped signal 201B is a QPSK signal. In other words, two QPSK streams are transmitted. Accordingly, for example, using channel estimated signals 806_1 and 806_2, 16 candidate signal points are obtained by signal processor 811 illustrated in FIG. 8. 2-bit transmission is possible with QPSK. Accordingly since there are two streams, 4-bit transmission is achieved. Thus, there are 24=16 candidate signal points. Note that 16 other candidate signal points are obtained from using channel estimated signals 808_1 and 808_2 as well, but since description thereof is the same as described above, the following description will focus on the 16 candidate signal points obtained by using channel estimated signals 806_1 and 806_2.

FIG. 12A and FIG. 12B each illustrate an example of the state resulting from such a case. In FIG. 12A and FIG. 12B, in-phase I is represented on the horizontal axis and orthogonal Q is represented on the vertical axis. 16 candidate signal points are present in the illustrated in-phase I-orthogonal Q planes. Among the 16 candidate signal points, one is a signal point that is transmitted by the transmission device. This is why these are referred to as "16 candidate signal points".

When the environment is one in which the direct waves are dominant, such as in an LOS environment, a first conceivable case is "when phase changer 205B is omitted from the configuration illustrated in FIG. 2, in other words, when phase change is not applied by phase changer 205B in FIG. 2".

In the first case, since phase change is not applied, there is a possibility that the state illustrated in FIG. 12A will be realized. When the state falls into the state illustrated in FIG. 12A, as illustrated by "signal points 1201, 1202", "signal points 1203, 1204, 1205, 1206", and "signal points 1207, 1208", the signal points become dense, that is to say, the distances between some signal points shorten. Accordingly, in the reception device illustrated in FIG. 8, data reception quality may decrease.

In order to remedy this phenomenon, in FIG. 2, phase changer 205B is inserted. When phase changer 205B is inserted, due to symbol number i, there is a mix of symbol numbers whose signal points are dense, such as in FIG. 12A, and symbol numbers whose "distance between signal points is long", such as in FIG. 12B. With respect to this state, since error correction code is introduced, high error correction performance is achieved, and in the reception device illustrated in FIG. 8, high data reception quality is achieved.

Note that in FIG. 2, a phase change is not applied by phase changer 205B in FIG. 2 to "pilot symbols, preamble" for demodulating (wave detection of) data symbols, such as pilot symbols and a preamble, and for channel estimation. With this, among data symbols, "due to symbol number i, there is a mix of symbol numbers whose signal points are dense, such as in FIG. 12A, and symbol numbers whose "distance between signal points is long", such as in FIG. 12B" can be realized.

However, even if a phase change is applied by phase changer 205B in FIG. 2 to "pilot symbols, preamble" for demodulating (wave detection of) data symbols, such as pilot symbols and a preamble, and for channel estimation, the following is possible: "among data symbols," due to symbol number i, there is a mix of symbol numbers whose signal points are dense, such as in FIG. 12A, and symbol numbers whose "distance between signal points is long", such as in FIG. 12B"can be realized."

In such a case, a phase change is applied to pilot symbols and/or a preamble under some condition. For example, one conceivable method is to implement a rule which is separate from the rule for applying a phase change to a data symbol, and "applying a phase change to a pilot symbol and/or a preamble". Another example is a method of regularly applying a phase change to a data symbol in a cycle N, and regularly applying a phase change to a pilot symbol and/or a preamble in a cycle M. N and M are integers that are greater than or equal to 2.

As described above, phase changer 209B receives inputs of baseband signal 208B and control signal 200, applies a phase change to baseband signal 208B based on control signal 200, and outputs phase-changed signal 210B. Baseband signal 208B is a function of symbol number i, and is expressed as x'(i). Then, phase-changed signal 210B (x(i)) can be expressed as $x(i)=e^{j\times\varepsilon(i)}\times x'(i)$. Here, i is an integer that is greater than or equal to 0, and j is an imaginary number unit.

Note that the operation performed by phase changer 209B may be CDD/CSD disclosed in NPTL 2 and 3. One characteristic of phase changer 209B is that it applies a phase change to a symbol present along the frequency axis (i.e., applies a phase change to, for example, a data symbol, a pilot symbol, and/or a control information symbol).

Accordingly in such a case, symbols subject to symbol number i include data symbols, pilot symbols, control information symbols, and preambles (other symbols).

In the case of FIG. 2, since phase changer 209B applies a phase change to baseband signal 208B, a phase change is applied to each symbol in FIG. 5. When a phase change is applied to baseband signal 208A in FIG. 2, a phase change is applied to each symbol in FIG. 4. This will be described later.

Accordingly in the frame illustrated in FIG. 5, phase changer 209B illustrated in FIG. 2 applies a phase change to all symbols (other symbols 503) for all carriers at time $1.

Similarly phase changer 209B illustrated in FIG. 2 applies a phase change to the following symbols: "all symbols (other symbols 503) for all carriers at time $2", "all symbols (other symbols 503) for all carriers at time $3", "all symbols (other symbols 503) for all carriers at time $4", "all symbols (pilot symbols 501 or data symbols 502) for all carriers at time $5", "all symbols (pilot symbols 501 or data symbols 502) for all carriers at time $6", "all symbols (pilot symbols 501 or data symbols 502) for all carriers at time $7", "all symbols (pilot symbols 501 or data symbols 502) for all carriers at time $8", "all symbols (pilot symbols 501 or data symbols 502) for all carriers at time $9", "all symbols (pilot symbols 501 or data symbols 502) for all carriers at time $10", "all symbols (pilot symbols 501 or data symbols 502) for all carriers at time $11". Recitation for other subsequent times and carriers is omitted.

FIG. 13 illustrates a frame configuration different from the frame configuration illustrated in FIG. 4 of transmission signal 108_A illustrated in FIG. 1. In FIG. 13, objects that operate the same as in FIG. 4 share like reference marks. In FIG. 13, frequency (carriers) is (are) represented on the horizontal axis and time is represented on the vertical axis. Similar to FIG. 4, since a multi-carrier transmission scheme such as OFDM is used, symbols are present in the carrier direction. Similar to FIG. 4, in FIG. 13 as well, all carrier symbols are shown. Moreover, similar to FIG. 4, in FIG. 13 as well, symbols for time $1 through time $11 are shown.

In FIG. 13, in addition to pilot symbols 401 (pilot signal 251A in FIG. 2), data symbols 402, and other symbols 403, null symbols 1301 are also shown.

Null symbol 1301 has an in-phase component I of zero (0) and an orthogonal component Q of zero (0). Note that this symbol is referred to as a "null symbol" here, but this symbol may be referred to as something else.

In FIG. 13, null symbols are inserted in carrier 19. Note that the method in which the null symbols are inserted is not limited to the configuration illustrated in FIG. 13. For example, a null symbol may be inserted at some certain time, a null symbol may be inserted at some certain frequency and time region, a null symbol may be inserted continuously at a time and frequency region, and a null symbol may be inserted discretely at a time and frequency region.

FIG. 14 illustrates a frame configuration different from the frame configuration illustrated in FIG. 5 of transmission signal 108_B illustrated in FIG. 1. In FIG. 14, objects that operate the same as in FIG. 5 share like reference marks. In FIG. 14, frequency (carriers) is (are) represented on the horizontal axis and time is represented on the vertical axis. Similar to FIG. 5, since a multi-carrier transmission scheme such as OFDM is used, symbols are present in the carrier direction. Similar to FIG. 5, in FIG. 14 as well, all carrier symbols are shown. Moreover, similar to FIG. 5, in FIG. 14 as well, symbols for time $1 through time $11 are shown.

In FIG. 14, in addition to pilot symbols 501 (pilot signal 251B in FIG. 2), data symbols 502, and other symbols 503, null symbols 1301 are also shown.

Null symbol 1301 has an in-phase component I of zero (0) and an orthogonal component Q of zero (0). Note that this symbol is referred to as a "null symbol" here, but this symbol may be referred to as something else.

In FIG. 14, null symbols are inserted in carrier 19. Note that the method in which the null symbols are inserted is not limited to the configuration illustrated in FIG. 14. For example, a null symbol may be inserted at some certain time, a null symbol may be inserted at some certain frequency and time region, a null symbol may be inserted continuously at a time and frequency region, and a null symbol may be inserted discretely at a time and frequency region.

When a symbol is present in carrier A at time $B in FIG. 13 and a symbol is present in carrier A at time $B in FIG. 14, the symbol in carrier A at time $B in FIG. 13 and the symbol in carrier A at time $B in FIG. 14 are transmitted at the same time and same frequency. Note that the frame configurations illustrated in FIG. 13 and FIG. 14 are merely examples.

The other symbols in FIG. 13 and FIG. 14 are symbols corresponding to "preamble signal 252 and control information symbol signal 253 in FIG. 2". Accordingly when an other symbol 403 in FIG. 13 at the same time and same frequency (same carrier) as an other symbol 503 in FIG. 14 transmits control information, it transmits the same data (the same control information).

Note that this is under the assumption that the frame of FIG. 13 and the frame of FIG. 14 are received at the same time by the reception device, but even when the frame of FIG. 13 or the frame of FIG. 14 has been received, the reception device can obtain the data transmitted by the transmission device.

Phase changer 209B receives inputs of baseband signal 208B and control signal 200, applies a phase change to baseband signal 208B based on control signal 200, and outputs phase-changed signal 210B. Baseband signal 208B is a function of symbol number i, and is expressed as x'(i). Then, phase-changed signal 210B (x(i)) can be expressed as $x(i)=e^{j\times\varepsilon(i)}\times x'(i)$. Here, i is an integer that is greater than or equal to 0, and j is an imaginary number unit. Note that the operation performed by phase changer 209B may be CDD or CSD disclosed in NPTL 2 and 3.

Phase changer 209B then applies a phase change to a symbol present along the frequency axis. In other words, phase changer 209B applies a phase change to, for example, a data symbol, a pilot symbol, and/or a control information symbol. Here, a null symbol may be considered as a target for application of a phase change. Accordingly symbols subject to symbol number i include, for example, data symbols, pilot symbols, control information symbols, preambles (other symbols), and null symbols.

However, since the in-phase component I is zero (0) and the orthogonal component Q is zero (0), even if a phase change is applied to a null symbol, the signals before and after the phase change are the same. Accordingly it is possible to construe a null symbol as not a target for a phase change. In the case of FIG. 2, since phase changer 209B applies a phase change to baseband signal 208B, a phase change is applied to each symbol in FIG. 14. When a phase change is applied to baseband signal 208A in FIG. 2, a phase change is applied to each symbol in FIG. 13. This will be described later.

Accordingly in the frame illustrated in FIG. 14, phase changer 209B illustrated in FIG. 2 applies a phase change to all symbols (other symbols 503) for all carriers at time $1. However, the handling of the phase change with respect to null symbol 1301 is as previously described.

Similarly phase changer 209B illustrated in FIG. 2 applies a phase change to the following symbols: "all symbols (other symbols 503) for all carriers at time $2", "all symbols (other symbols 503) for all carriers at time $3", "all symbols (other symbols 503) for all carriers at time $4", "all symbols (pilot symbols 501 or data symbols 502) for all carriers at time $5", "all symbols (pilot symbols 501 or data symbols 502) for all carriers at time $6", "all symbols (pilot symbols 501 or data symbols 502) for all carriers at time $7", "all symbols (pilot symbols 501 or data symbols 502) for all carriers at time $8", "all symbols (pilot symbols 501 or data symbols 502) for all carriers at time $9", "all symbols (pilot symbols 501 or data symbols 502) for all carriers at time $10", "all symbols (pilot symbols 501 or data symbols 502) for all carriers at time $11". However, the handling of the phase change with respect to null symbols 1301 is as previously described. Subsequent recitation is omitted.

The phase change value of phase changer 209B is expressed as Ω(i). Baseband signal 208B is x'(i) and phase-changed signal 210B is x(i). Accordingly x(i)=Ω(i)×x'(i) holds true.

For example, the phase change value is set as follows. Q is an integer that is greater than or equal to 2, and represents the number of phase change cycles.

[MATH. 38]

$$\Omega(i) = e^{j\frac{2\times\pi\times i}{Q}}$$ Equation (38)

j is an imaginary number unit. However, Equation (38) is merely a non-limiting example.

For example, Ω(i) may be set so as to implement a phase change that yields a cycle Q.

Moreover, for example, in FIG. 5 and FIG. 14, the same phase change value is applied to the same carriers, and the phase change value may be set on a per carrier basis. For example, the following may be implemented.

Regardless of time, the phase change value may be as follows for carrier 1 in FIG. 5 and FIG. 14.

[MATH. 39]

$$e^{j\times 0\times \pi}$$ Equation (39)

Regardless of time, the phase change value may be as follows for carrier 2 in FIG. 5 and FIG. 14.

[MATH. 40]

$$e^{j\frac{1\times\pi}{6}}$$ Equation (40)

Regardless of time, the phase change value may be as follows for carrier 3 in FIG. 5 and FIG. 14.

[MATH. 41]

$$e^{j\frac{2\times\pi}{6}}$$ Equation (41)

Regardless of time, the phase change value may be as follows for carrier 4 in FIG. 5 and FIG. 14.

[MATH. 42]

$$e^{j\frac{3\times\pi}{6}}$$ Equation (42)

Subsequent recitation is omitted.

This concludes the operational example of phase changer 209B illustrated in FIG. 2.

Next, the advantageous effects obtained by phase changer 209B illustrated in FIG. 2 will be described.

The other symbols 403, 503 in "the frames of FIG. 4 and FIG. 5" or "the frames of FIG. 13 and FIG. 14" may include a control information symbol. As previously described, when an other symbol 503 in FIG. 5 at the same time and same frequency (in the same carrier) as an other symbol 403 transmits control information, it transmits the same data (same control information).

However, the following circumstance is conceivable.

Case 2: transmitting a control information symbol using either antenna unit #A 109_A or antenna unit #B 109_B illustrated in FIG. 1.

When transmission according to "case 2" is performed, since only one antenna is used to transmit the control information symbol, compared to when "transmitting a control information symbol using both antenna unit #A 109_A and antenna unit #B 109_B" is performed, spatial diversity gain is less. Accordingly in "case 2", data reception quality decreases even when received by the reception device illustrated in FIG. 8. Accordingly from the perspective of improving data reception quality "transmitting a control information symbol using both antenna unit #A 109_A and antenna unit #B 109_B" is more beneficial.

Case 3: transmitting a control information symbol using both antenna unit #A 109_A and antenna unit #B 109_B illustrated in FIG. 1. However, phase change by is not performed by phase changer 209B illustrated in FIG. 2.

When transmission according to "case 3" is performed, since the modulated signal transmitted from antenna unit #A 109_A and the modulated signal transmitted from antenna unit #B 109_B are the same or exhibit a specific phase shift, depending on the radio wave propagation environment, the reception device illustrated in FIG. 8 may receive an inferior reception signal, and both modulated signal may be subjected to the same multipath effect. Accordingly in the reception device illustrated in FIG. 8, data reception quality decreases.

In order to remedy this phenomenon, in FIG. 2, phase changer 209B is inserted. Since this changes the phase along the time or frequency axis, in the reception device illustrated in FIG. 8, it is possible to reduce the probability of reception of an inferior reception signal. Moreover, since there is a high probability that there will be a difference in the multipath effect that the modulated signal transmitted from antenna unit #A 109_A is subjected to with respect to the multipath effect that the modulated signal transmitted from antenna unit #B 109_B is subjected to, there is a high probability that diversity gain will result, and accordingly that data reception quality in the reception device illustrated in FIG. 8 will improve.

For these reasons, in FIG. 2, phase changer 209B is provided and phase change is implemented.

Other symbols 403 and other symbols 503 include, in addition to control information symbols, for example, symbols for signal detection, symbols for performing frequency and time synchronization, and symbols for performing channel estimation (a symbol for performing propagation path fluctuation estimation), for demodulating and decoding control information symbols. Moreover, "the frames of FIG. 4 and FIG. 5" or "the frames of FIG. 13 and FIG. 14" include pilot symbols 401, 501, and by using these, it is possible to perform demodulation and decoding with high precision via control information symbols.

Moreover, "the frames of FIG. 4 and FIG. 5" or "the frames of FIG. 13 and FIG. 14" transmit a plurality of streams at the same time and using the same frequency (frequency band) via data symbols 402 and data symbols 502, that is to say perform MIMO transmission. In order to demodulate these data symbols, symbols for signal detection, symbols for frequency and time synchronization, and symbols for channel estimation, which are included in other symbols 403 and other symbols 503, are used.

Here, "symbols for signal detection, symbols for frequency and time synchronization, and symbols for channel estimation, which are included in other symbols 403 and other symbols 503" are applied with a phase change by phase changer 209B, as described above.

Under these circumstances, when this processing is not performed on data symbols 402 and data symbols 502 (and data symbols 502 in the example above), in the reception device, when data symbols 402 and data symbols 502 are demodulated and decoded, there is a need to perform the demodulation and decoding in which the processing for the phase change by phase changer 209B was performed, and there is a probability that this processing will be complicated. This is because "symbols for signal detection, symbols for frequency and time synchronization, and symbols for channel estimation, which are included in other symbols 403 and other symbols 503" are applied with a phase change by phase changer 209B.

However, as illustrated in FIG. 2, in phase changer 209B, when a phase change is applied to data symbols 402 and data symbols 502 (and data symbols 502 in the example above), in the reception device, there is the advantage that data symbols 402 and data symbols 502 can simply be demodulated and decoded using the channel estimation signal (propagation path fluctuation signal) estimated by using "symbols for signal detection, symbols for frequency and time synchronization, and symbols for channel estimation, which are included in other symbols 403 and other symbols 503".

Additionally as illustrated in FIG. 2, in phase changer 209B, when a phase change is applied to data symbols 402 and data symbols 502 (and data symbols 502 in the example above), in multipath environments, it is possible to reduce the influence of sharp drops in electric field intensity along the frequency axis. Accordingly it is possible to obtain the advantageous effect of an improvement in data reception quality of data symbols 402 and data symbols 502.

In this way, the point that "symbols that are targets for implementation of a phase change by phase changer 205B" and "symbols that are targets for implementation of a phase change by phase changer 209B" are different is a characteristic point.

As described above, by applying a phase change using phase changer 205B illustrated in FIG. 2, it is possible to achieve the advantageous effect of an improvement in data reception quality of data symbols 402 and data symbols 502 in the reception device in, for example, LOS environments, and by applying a phase change using phase changer 209B illustrated in FIG. 2, for example, it is possible to achieve the advantageous effect of an improvement in data reception quality in the reception device of the control information symbols included in "the frames of FIG. 4 and FIG. 5" or "the frames of FIG. 13 and FIG. 14" and the advantageous effect that operations of demodulation and decoding of data symbols 402 and data symbols 502 become simple.

Note that the advantageous effect of an improvement in data reception quality in the reception device of data symbols 402 and data symbols 502 in, for example, LOS environments, is achieved as a result of the phase change implemented by phase changer 205B illustrated in FIG. 2, and furthermore, the reception quality of data symbols 402 and data symbols 502 is improved by applying a phase change to data symbols 402 and data symbols 502 using phase changer 209B illustrated in FIG. 2.

Note that FIG. 2 illustrates an example of a configuration in which phase changer 209B is arranged after inserter 207B and phase changer 209B applies a phase change to baseband signal 208B, but a configuration for achieving both the above-described advantageous effects of the phase change by phase changer 205B and the phase change by phase changer 209B is not limited to the example illustrated in FIG. 2.

One example of an acceptable variation is one in which phase changer 209B is removed from the configuration illustrated in FIG. 2, baseband signal 208B output from inserter 207B becomes processed signal 106_B, phase changer 209A that performs the same operations as phase changer 209B is inserted after inserter 207A, and phase-changed signal 210A, which is generated by phase changer 209A implementing a phase change on baseband signal 208A, becomes processed signal 106_A.

Even with such a configuration, similar to the example illustrated in FIG. 2 and described above, the advantageous effect of an improvement in data reception quality in the reception device of data symbols 402 and data symbols 502 in, for example, LOS environments, is achieved as a result of the phase change implemented by phase changer 205B illustrated in FIG. 2, and furthermore, the reception quality of data symbols 402 and data symbols 502 is improved by applying a phase change to data symbols 402 and data symbols 502 using phase changer 209A.

Furthermore, it is possible to achieve the advantageous effect of an improvement in data reception quality in the reception device of the control information symbols included in "the frames of FIG. 4 and FIG. 5" or "the frames of FIG. 13 and FIG. 14".

(Supplemental Information 1)

In, for example, Embodiment 1, it is described that the operation performed by "phase changer B" may be CDD/CSD disclosed in NPTL 2 and 3. Next, supplemental information regarding this point will be given.

Figure 15:
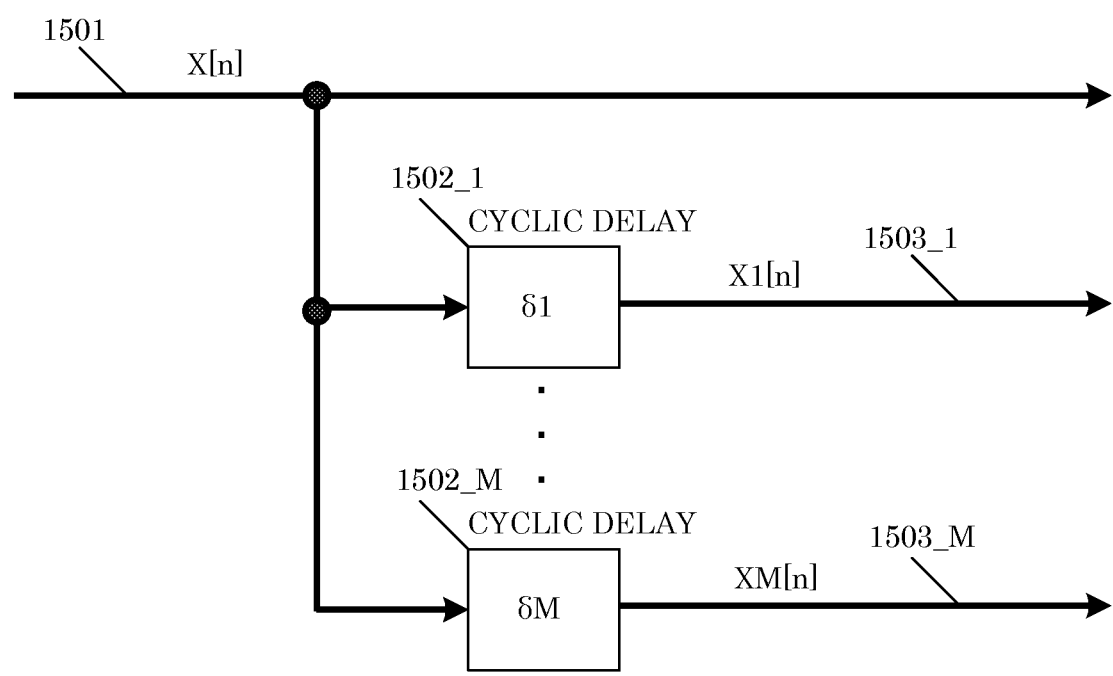
FIG. 15 illustrates one example of a configuration used when CCD is used.

FIG. 15 illustrates a configuration in the case that CDD/CSD is used. Modulated signal 1501 is a signal when no cyclic delay is implemented, and is expressed as X[n].

Cyclic delayer 1502_1 receives an input of modulated signal 1501, applies a cyclic delay and outputs a cyclic-delayed signal 1503_1. When cyclic-delayed signal 1503_1 is expressed as X1[n], X1[n] is applied with the following equation.

[MATH. 43]

$$X1[n]=X[(n-\delta 1) \bmod N] \quad \text{Equation (43)}$$

Note that δ1 is the cyclic delay amount (δ1 is an integer that is greater than or equal to 0), and X[n] is configured as N symbols (N is an integer that is greater than or equal to 2). Accordingly, n is an integer that is greater than or equal to 0 and less than or equal to N−1. Moreover, "mod" represents "modulo", and "A mod B" means "remainder when A is divided by B".

Cyclic delayer 1502_M receives an input of modulated signal 1501, applies a cyclic delay and outputs a cyclic-delayed signal 1503_M. When cyclic-delayed signal 1503_M is expressed as XM[n], XM[n] is applied with the following equation.

[MATH. 44]

$$XM[n]=X[(n-\delta M) \bmod N] \quad \text{Equation (44)}$$

Note that SM is the cyclic delay amount (SM is an integer that is greater than or equal to 0), and X[n] is configured as N symbols (N is an integer that is greater than or equal to 2). Accordingly n is an integer that is greater than or equal to 0 and less than or equal to N−1.

Cyclic delayer 1502_i receives an input of modulated signal 1501, applies a cyclic delay and outputs a cyclic-delayed signal 1503_i. When cyclic-delayed signal 1503_i is expressed as Xi[n], Xi[n] is applied with the following equation. Note that i is an integer that is greater than or equal to 1 and less than or equal to M, and M is an integer that is greater than or equal to 1.

[MATH. 45]

$$Xi[n]=X[(n-\delta i) \bmod N] \quad \text{Equation (45)}$$

Note that Si is the cyclic delay amount (Si is an integer that is greater than or equal to 0), and X[n] is configured as N symbols (N is an integer that is greater than or equal to 2). Accordingly n is an integer that is greater than or equal to 0 and less than or equal to N−1.

Cyclic-delayed signal 1503_i is transmitted from antenna i. Accordingly cyclic-delayed signal 1503_1, . . . , and cyclic-delayed signal 1503_M are each transmitted from different antennas. Note that in the above description, the signals are exemplified as discrete signals, but the same processing may be performed on continuous signals.

This makes it possible to achieve the diversity effect via cyclic delay and, for example, reduce the adverse effects of delayed radio waves, and in the reception device, achieve an advantageous effect of improved data reception quality.

For example, phase changer 209B in FIG. 2 may be replaced with the cyclic delayer illustrated in FIG. 15, and may perform the same operations performed by phase changer 209B.

Accordingly in phase changer 209B in FIG. 2, the cyclic delay amount δ (δ is an integer that is greater than or equal to 0) is applied, and the input signal for phase changer 209B is expressed as Y[n]. When the output signal for phase changer 209B is expressed as Z[n], Z[n] is applied with the following equation.

[MATH. 46]

$$Z[n]=Y[(n-\delta) \bmod N] \quad \text{Equation (46)}$$

Note that Y[n] is configured as N symbols (N is an integer that is greater than or equal to 2). Accordingly n is an integer that is greater than or equal to 0 and less than or equal to N−1.

Next, the relationship between cyclic delay amount and phase change will be described.

For example, consider a case in which CDD/CSD is applied to OFDM. Note that the carrier arrangement when OFDM is used is as illustrated in FIG. 16.

Figure 16:
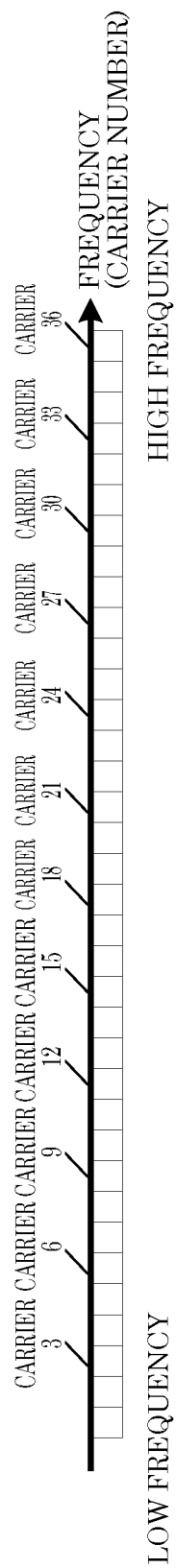
FIG. 16 illustrates one example of a carrier arrangement used when OFDM is used.

In FIG. 16, 1601 is a symbol, frequency (carriers) is (are) represented on the horizontal axis, with increasing frequency from left to right and carriers arranged in ascending order. Accordingly the carrier of the lowest frequency is "carrier 1", and subsequent carriers are "carrier 2", "carrier 3", "carrier 4", . . . .

For example, in phase changer 209B illustrated in FIG. 2, a cyclic delay amount τ is applied. In such as case, phase change value Ω[i] in "carrier i" is expressed as follows.

[MATH. 47]

$$\Omega[i]=e^{j \times \mu \times i} \quad \text{Equation (47)}$$

Note that μ is a value capable of being calculated from cyclic delay amount and/or the size of the fast Fourier transform (FFT).

When the baseband signal for "carrier i", time t before being applied with a phase change (before cyclic delay processing) is expressed as v'[i][t], the signal v[i][t] for "carrier i", time t after being applied with a phase change can be expressed as v[i][t]=Ω[i]×v'[i][t].

(Supplemental Information 2)

As a matter of course, the present disclosure may be carried out by combining a plurality of the exemplary embodiments and other contents described herein.

Moreover, each exemplary embodiment and the other contents are only examples. For example, while "a modulation scheme, an error correction encoding method (an error correction code, a code length, an encode rate and the like to be used), control information and the like" are exemplified, it is possible to carry out the present disclosure with the same configuration even when other types of "a modulation scheme, an error correction encoding method (an error correction code, a code length, an encode rate and the like to be used), control information and the like" are applied.

Regarding the modulation scheme, even when a modulation scheme other than the modulation schemes described herein is used, it is possible to carry out the embodiments and the other subject matter described herein. For example, amplitude phase shift keying (APSK) (such as 16APSK, 64APSK, 128APSK, 256APSK, 1024APSK and 4096APSK), pulse amplitude modulation (PAM) (such as 4PAM, 8PAM, 16PAM, 64PAM, 128PAM, 256PAM, 1024PAM and 4096PAM), phase shift keying (PSK) (such as BPSK, QPSK, 8PSK, 16PSK, 64PSK, 128PSK, 256PSK, 1024PSK and 4096PSK), and quadrature amplitude modulation (QAM) (such as 4QAM, 8QAM, 16QAM, 64QAM, 128QAM, 256QAM, 1024QAM and 4096QAM) may be applied, or in each modulation scheme, uniform mapping or non-uniform mapping may be performed.

Moreover, a method for arranging 2, 4, 8, 16, 64, 128, 256, 1024, etc., signal points on an I-Q plane (a modulation scheme having 2, 4, 8, 16, 64, 128, 256, 1024, etc., signal points) is not limited to a signal point arrangement method of the modulation schemes described herein. Hence, a function of outputting an in-phase component and an orthogonal component based on a plurality of bits is a function in a mapper, and performing precoding and phase-change thereafter is one effective function of the present disclosure.

In the present disclosure, when "∀" and/or "∃" is present, "∀" represents a universal quantifier, and "∃" represents an existential quantifier.

Moreover, in the present disclosure, when there is a complex plane, the phase unit such as an argument is "radian".

When the complex plane is used, display in a polar form can be made as display by polar coordinates of a complex number. When point (a, b) on the complex plane is associated with complex number z=a+jb (a and b are both actual numbers, and j is a unit of an imaginary number), and when this point is expressed by [r, θ] in polar coordinates, a=r×cos θ and b=r×sin θ,

[MATH. 48]

$$r = \sqrt{a^2 + b^2} \quad \text{Equation (48)}$$

holds true, r is an absolute value of z (r=|z|), and θ is an argument. Then, z=a+jb is expressed by $r \times e^{j\theta}$.

In the present disclosure, the reception device and the antennas in the terminal may be configured as separate devices. For example, the reception device includes an interface that receives an input, via a cable, of a signal received by an antenna or a signal generated by applying a signal received by an antenna with a frequency conversion, and the reception device performs subsequent processing.

Moreover, data/information obtained by the reception device is subsequently converted into a video or audio, and a display (monitor) displays the video or a speaker outputs the audio. Further, the data/information obtained by the reception device may be subjected to signal processing related to a video or audio, and may be output from an RCA terminal (a video terminal or an audio terminal), a Universal Serial Bus (USB), or a High-Definition Multimedia Interface (registered trademark) (HDMI) of the reception device. Note that the advantageous effects according the present disclosure can still be produced even if signal processing related to a video or audio is not performed.

In the present disclosure, it can be considered that the apparatus which includes the transmission device is a communications and broadcast apparatus, such as a broadcast station, a base station, an access point, a terminal or a mobile phone. In such a case, it can be considered that the apparatus that includes the reception device is a communication apparatus such as a television, a radio, a terminal, a personal computer, a mobile phone, an access point, or a base station. Moreover, it can also be considered that the transmission device and reception device according to the present disclosure are each a device having communication functions that is formed so as to be connectable via some interface to an apparatus for executing an application in, for example, a television, a radio, a personal computer or a mobile phone.

Moreover, in this embodiment, symbols other than data symbols, such as pilot symbols (preamble, unique word, post-amble, reference symbol, etc.) or symbols for control information, may be arranged in any way in a frame. Here, the terms "pilot symbol" and "control information" are used, but the naming of such symbols is not important; the functions that they perform are.

A pilot symbol may be a known symbol that is modulated using PSK modulation in a transceiver, and the receiver detects, for example, frequency synchronization, time synchronization, and a channel estimation (Channel State Information (CSI)) symbol (of each modulated signal) by using the symbol. Note that a pilot symbol transmitted by a transmitter can be known by a receiver by the receiver being synchronous.

Moreover, the symbol for control information is a symbol for transmitting information required to be transmitted to a communication partner in order to establish communication pertaining to anything other than data (such as application data). This information is, for example, the modulation scheme, error correction encoding method, or encode rate of the error correction encoding method used in the communication, or settings information in an upper layer.

Note that the present disclosure is not limited to each exemplary embodiment, and can be carried out with various modifications. For example, in each embodiment, the present disclosure is described as being performed as a communications device. However, the present disclosure is not limited to this case, and this communications method can also be used as software.

Moreover, in the above description, precoding switching methods in a method for transmitting two modulated signals from two antennas are described, but these examples are not limiting. A precoding switching method in which precoding weight (precoding matrix) is changed similarly in a method in which precoding is performed on four mapped signals to generate four modulated signals and transmitted from four antennas, that is to say a method in which precoding is performed on N mapped signals to generate N modulated signals and transmitted from N antennas, can also be applied.

The terms "precoding" and "precoding weight" are used in the written description. The terms used to refer to such signal processing are not important per-se; the signal processing itself is what is important to the present disclosure.

Streams s1(t) and s2(t) may transmit different data, and may transmit the same data.

The transmitting antenna in the transmission device, the receiving antenna in the reception device, and each signal antenna illustrated in the drawings may be configured of a plurality of antennas.

The transmission device notifies the reception device of the transmission method (MIMO, SISO, temporal-spatial block code, interleaving method), modulation scheme, and/or error correction encoding method; this information is present in the frame transmitted by the transmission device. The reception device changes operations upon receiving this information.

Note that a program for executing the above-described communications method may be stored in Read Only Memory (ROM) in advance to cause a Central Processing Unit (CPU) to operate this program.

Moreover, the program for executing the communications method may be stored in a computer-readable storage medium, the program stored in the recording medium may be recorded in Random Access Memory (RAM) in a computer, and the computer may be caused to operate according to this program.

Each configuration of each of the above-described embodiments, etc., may be realized as a large scale integration (LSI) circuit, which is typically an integrated circuit. These integrated circuits may be formed as separate chips, or may be formed as one chip so as to include the entire configuration or part of the configuration of each embodiment.

LSI is described here, but the integrated circuit may also be referred to as an integrated circuit (IC), a system LSI circuit, a super LSI circuit or an ultra LSI circuit depending on the degree of integration. Moreover, the circuit integration technique is not limited to LSI, and may be realized by a dedicated circuit or a general purpose processor. After manufacturing of the LSI circuit, a programmable field programmable gate array (FPGA) or a reconfigurable processor which is reconfigurable in connection or settings of circuit cells inside the LSI circuit may be used.

Further, when development of a semiconductor technology or another derived technology provides a circuit integration technology which replaces LSI, as a matter of course, functional blocks may be integrated by using this technology. Adaption of biotechnology, for example, is a possibility.

The present disclosure can be widely applied to radio systems that transmit different modulated signals from different antennas. Moreover, the present disclosure can also be applied when MIMO transmission is used in a wired communications system including a plurality of transmission points (for example, a power line communication (PLC) system, an optical transmission system, a digital subscriber line (DSL) system).

Embodiment 2

In this embodiment, an implementation method will be described that is different from the configuration illustrated in FIG. 2 and described in Embodiment 1.

FIG. 1 illustrates one example of a configuration of a transmission device according to this embodiment, such as a base station, access point, or broadcast station. As FIG. 1 is described in detail in Embodiment 1, description will be omitted from this embodiment.

Signal processor 106 receives inputs of mapped signals 105_1 and 105_2, signal group 110, and control signal 100, performs signal processing based on control signal 100, and outputs processed signals 106_A and 106_B. Here, processed signal 106_A is expressed as u1(i), and processed signal 106_B is expressed as u2(i). i is a symbol number, and, for example, is an integer that is greater than or equal to 0. Note that details regarding the signal processing will be described with reference to FIG. 18 later.

Figure 18:
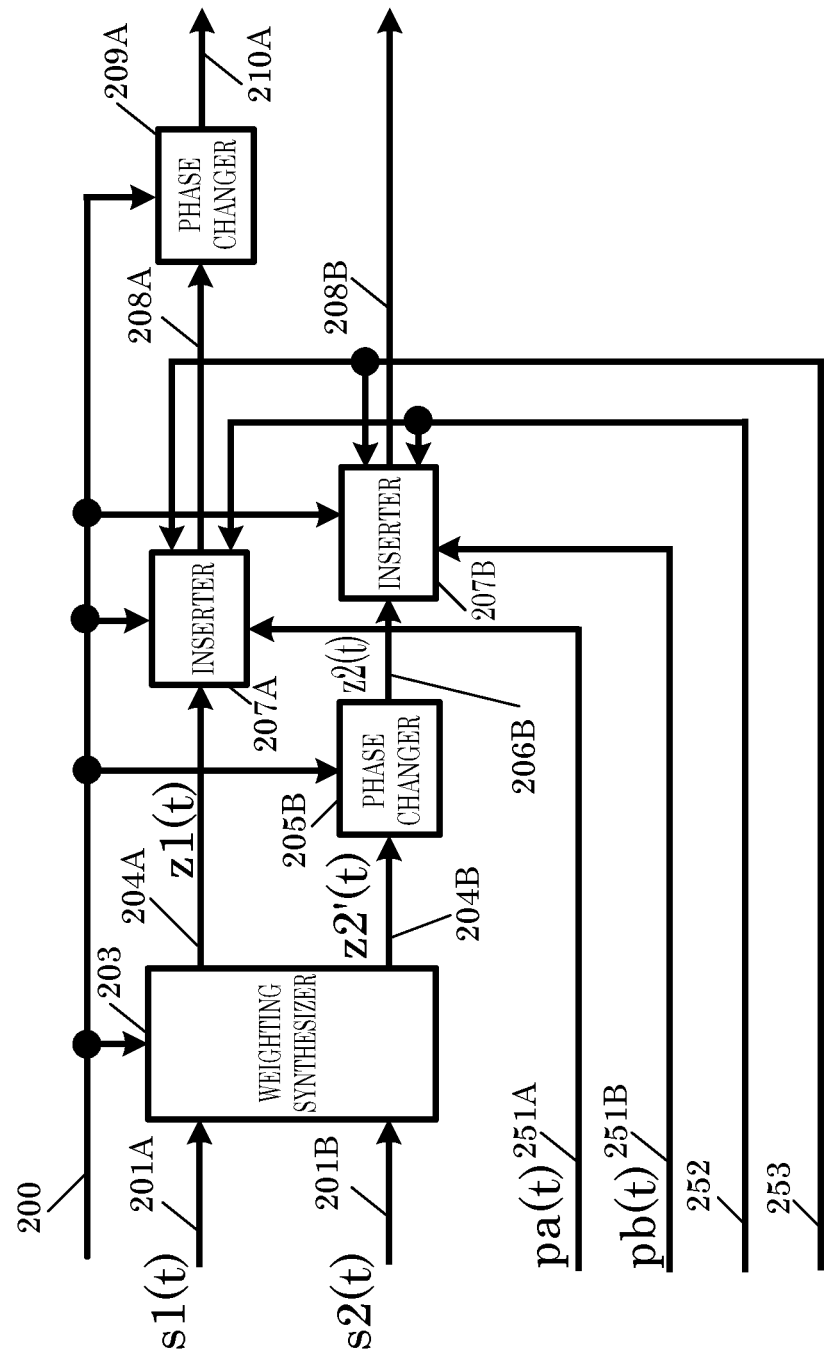
FIG. 18 illustrates one example of a configuration of the signal processor illustrated in FIG. 1.

FIG. 18 illustrates one example of a configuration of signal processor 106 illustrated in FIG. 1. Weighting synthesizer (precoder) 203 receives inputs of mapped signal 201A (mapped signal 105_1 in FIG. 1), mapped signal 201B (mapped signal 105_2 in FIG. 1), and control signal 200 (control signal 100 in FIG. 1), performs weighting synthesis (precoding) based on control signal 200, and outputs weighted signal 204A and weighted signal 204B. Here, mapped signal 201A is expressed as s1(t), mapped signal 201B is expressed as s2(t), weighted signal 204A is expressed as z1(t), and weighted signal 204B is expressed as z2'(t). Note that one example of t is time. s1(t), s2(t), z1(t), and z2'(t) are defined as complex numbers, and as such, may be actual numbers.

Here, these are given as functions of time, but may be functions of a "frequency (carrier number)", and may be functions of "time and frequency". These may also be a function of a "symbol number". Note that this also applies to Embodiment 1.

Weighting synthesizer (precoder) 203 performs the calculations indicated in Equation (1).

Phase changer 205B receives inputs of weighting synthesized signal 204B and control signal 200, applies a phase change to weighting synthesized signal 204B based on control signal 200, and outputs phase-changed signal 206B. Note that phase-changed signal 206B is expressed as z2(t). z2(t) is defined as a complex number and may be an actual number.

Next, specific operations performed by phase changer 205B will be described. In phase changer 205B, for example, a phase change of y(i) is applied to z2'(i). Accordingly, z2(i) can be expressed as $z2(i)=y(i) \times z2'(i)$. Note that i is a symbol number and is an integer that is greater than or equal to 0.

For example, the phase change value is set as indicated in Equation (2). Note that N is an integer that is greater than or equal to 2, and represents the number of phase change cycles. When N is set to an odd number greater than or equal to 3, data reception quality may increase. However, Equation (2) is merely a non-limiting example. Here, phase change value $y(i)=e^{j \times \delta(i)}$.

Here, z1(i) and z2(i) can be expressed with Equation (3). Note that $\delta(i)$ is an actual number. z1(i) and z2(i) are transmitted from the transmission device at the same time and using the same frequency (same frequency band). In Equation (3), the phase change value is not limited to the value used in Equation (2); for example, a method in which the phase is changed cyclically or regularly is conceivable.

As described in Embodiment 1, conceivable examples of the (precoding) matrix inserted in Equation (1) and Equation (3) are illustrated in Equation (5) through Equation (36). However, the precoding matrix is not limited to these examples. The same applies to Embodiment 1.

Inserter 207A receives inputs of weighting synthesized signal 204A, pilot symbol signal pa(t)251A, preamble signal 252, control information symbol signal 253, and control signal 200, and based on information on the frame configuration included in control signal 200, outputs baseband signal 208A based on the frame configuration. Note that t indicates time.

Similarly, inserter 207B receives inputs of phase-changed signal 206B, pilot symbol signal pb(t)251B, preamble signal 252, control information symbol signal 253, and control signal 200, and based on information on the frame configuration included in control signal 200, outputs baseband signal 208B based on the frame configuration.

Phase changer 209A receives inputs of baseband signal 208A and control signal 200, applies a phase change to baseband signal 208A based on control signal 200, and outputs phase-changed signal 210A. Baseband signal 208A is a function of symbol number i, and is expressed as x'(i). Then, phase-changed signal 210A (x(i)) can be expressed as $x(i)=e^{j \times \varepsilon(i)} \times x'(i)$. Here, i is an integer that is greater than or equal to 0, and j is an imaginary number unit.

Note that the operation performed by phase changer 209A may be CDD/CSD disclosed in NPTL 2 and 3, as described in Embodiment 1. Phase changer 209A then applies a phase change to a symbol present along the frequency axis. In other words, phase changer 209A applies a phase change to, for example, a data symbol, a pilot symbol, and/or a control information symbol.

FIG. 3 illustrates one example of a configuration of radio units 107_A and 107_B illustrated in FIG. 1. FIG. 4 illustrates a frame configuration of transmission signal 108_A illustrated in FIG. 1. FIG. 5 illustrates a frame configuration of transmission signal 108_B illustrated in FIG. 1. Description of these is given in Embodiment 1. Accordingly description will be omitted from this embodiment.

When a symbol is present in carrier A at time $B in FIG. 4 and a symbol is present in carrier A at time $B in FIG. 5, the symbol in carrier A at time $B in FIG. 4 and the symbol in carrier A at time $B in FIG. 5 are transmitted at the same time and same frequency. Note that the frame configuration is not limited to the configurations illustrated in FIG. 4 and FIG. 5; FIG. 4 and FIG. 5 are mere examples of frame configurations.

The other symbols in FIG. 4 and FIG. 5 are symbols corresponding to "preamble signal 252 and control information symbol signal 253 in FIG. 2". Accordingly when an other symbol 503 in FIG. 5 at the same time and same frequency (same carrier) as an other symbol 403 in FIG. 4 transmits control information, it transmits the same data (the same control information).

Note that this is under the assumption that the frame of FIG. 4 and the frame of FIG. 5 are received at the same time by the reception device, but even when the frame of FIG. 4 or the frame of FIG. 5 has been received, the reception device can obtain the data transmitted by the transmission device.

FIG. 6 illustrates one example of components relating to control information generation for generating control information symbol signal 253 illustrated in FIG. 2. FIG. 6 is described in Embodiment 1. Accordingly description will be omitted from this embodiment.

FIG. 7 illustrates one example of a configuration of antenna unit #A 109_A and antenna unit #B 109_B illustrated in FIG. 1. FIG. 7 illustrates an example in which antenna unit #A 109_A and antenna unit #B 109_B include a plurality of antennas. FIG. 7 is described in Embodiment 1. Accordingly description will be omitted from this embodiment.

FIG. 8 illustrates one example of a configuration of a reception device that receives a modulated signal upon the transmission device illustrated in FIG. 1 transmitting, for example, a transmission signal having the frame configuration illustrated in FIG. 4 or FIG. 5. FIG. 8 is described in Embodiment 1. Accordingly description will be omitted from this embodiment.

FIG. 10 illustrates one example of a configuration of antenna unit #X 801X and antenna unit #Y 801Y illustrated in FIG. 8. FIG. 10 illustrates an example in which antenna unit #X 801X and antenna unit #Y 801Y include a plurality of antennas. FIG. 10 is described in Embodiment 1. Accordingly description will be omitted from this embodiment.

Next, signal processor 106 in the transmission device illustrated in FIG. 1 is inserted as phase changer 205B and phase changer 209A, as illustrated in FIG. 18. The characteristics and advantageous effects of this configuration will be described.

As described with reference to FIG. 4 and FIG. 5, phase changer 205B applies precoding (weighted synthesis) to mapped signal s1(i) 201A obtained via mapping using the first sequence and mapped signal s2(i) 201B obtained via mapping using the second sequence, and applies a phase change to one of the obtained weighting synthesized signals 204A and 204B. Note that i is a symbol number and is an integer that is greater than or equal to 0.

Weighting synthesized signal 204A and phase-changed signal 206B are then transmitted at the same frequency and at the same time. Accordingly in FIG. 4 and FIG. 5, a phase change is applied to data symbol 502 in FIG. 5. In the case of FIG. 18, since phase changer 205 applies this to weighting synthesized signal 204B, a phase change is applied to data symbol 502 in FIG. 5. When a phase change is applied to weighting synthesized signal 204A, a phase change is applied to data symbol 402 in FIG. 4. This will be described later.

For example, FIG. 11 illustrates an extraction of carrier 1 through carrier 5 and time $4 through time $6 from the frame illustrated in FIG. 5. Note that in FIG. 11, similar to FIG. 5, pilot symbol 501, data symbols 502, and other symbols 503 are shown.

As described above, among the symbols illustrated in FIG. 11, phase changer 205B applies a phase change to the data symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6).

Accordingly the phase change values for the data symbols illustrated in FIG. 11 can be expressed as "$e^{j\times\delta 15(i)}$" for (carrier 1, time $5), "$e^{j\times\delta 25(i)}$" for (carrier 2, time $5), "$e^{j\times\delta 35(i)}$" for (carrier 3, time $5), "$e^{j\times\delta 45(i)}$(i)" for (carrier 4, time $5), "$e^{j\times\delta 55(i)}$" (carrier 5, time $5), "$e^{j\times\delta 16(i)}$" for (carrier 1, time $6), "$e^{j\times\delta 26(i)}$" for (carrier 2, time $6), "$e^{j\times\delta 46(i)}$" for (carrier 4, time $6), and "$e^{j\times\delta 56(i)}$" for (carrier 5, time $6).

Among the symbols illustrated in FIG. 11, the other symbols located at (carrier 1, time $4), (carrier 2, time $4), (carrier 3, time $4), (carrier 4, time $4), and (carrier 5, time $4), and the pilot symbol located at (carrier 3, time $6) are not subject to phase change by phase changer 205B.

This point is a characteristic of phase changer 205B. Note that, as illustrated in FIG. 4, data carriers are arranged at "the same carriers and the same times" as the symbols subject to phase change in FIG. 11, which are the data symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6).

In other words, in FIG. 4, the symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6) are data symbols.

In other words, data symbols that perform MIMO transmission, that is to say transmit a plurality of streams, are subject to phase change by phase changer 205B.

One example of the phase change that phase changer 205B applies to the data symbols is the method given in Equation (2) in which phase change is applied to the data symbols regularly such as at each cycle N. However, the method of applying the phase change to the data symbols is not limited to this example.

With this, when the environment is one in which the direct waves are dominant, such as in an LOS environment, it is possible to achieve an advantageous effect of improved data reception quality in the reception device with respect to the data symbols that perform MIMO transmission, that is to say that transmit a plurality of streams. Next, the advantageous effects of this will be described.

For example, the modulation scheme used by mapper 104 in FIG. 1 is QPSK. Mapped signal 201A in FIG. 18 is a QPSK signal, and mapped signal 201B is a QPSK signal. In other words, two QPSK streams are transmitted.

Accordingly for example, using channel estimated signals 806_1 and 806_2, 16 candidate signal points are obtained by signal processor 811 illustrated in FIG. 8. 2-bit transmission is possible with QPSK. Accordingly since there are two streams, 4-bit transmission is achieved. Thus, there are 2⁴=16 candidate signal points. Note that 16 other candidate signal points are obtained from using channel estimated signals 808_1 and 808_2 as well, but since description thereof is the same as described above, the following description will focus on the 16 candidate signal points obtained by using channel estimated signals 806_1 and 806_2.

FIG. 12 illustrates an example of the state resulting from such a case. In FIG. 12A and FIG. 12B, in-phase I is represented on the horizontal axis and orthogonal Q is represented on the vertical axis. 16 candidate signal points are present in the illustrated in-phase I-orthogonal Q planes. Among the 16 candidate signal points, one is a signal point that is transmitted by the transmission device. This is why these are referred to as "16 candidate signal points".

When the environment is one in which the direct waves are dominant, such as in an LOS environment, a first conceivable case is "when phase changer 205B is omitted from the configuration illustrated in FIG. 18, in other words, when phase change is not applied by phase changer 205B in FIG. 18".

In the first case, since phase change is not applied, there is a possibility that the state illustrated in FIG. 12A will be realized. When the state falls into the state illustrated in FIG. 12A, as illustrated by "signal points 1201 and 1202", "signal points 1203, 1204, 1205, and 1206", and "signal points 1207, 1208", the signal points become dense, that is to say, the distances between some signal points shorten. Accordingly, in the reception device illustrated in FIG. 8, data reception quality may decrease.

In order to remedy this phenomenon, in FIG. 18, phase changer 205B is inserted. When phase changer 205B is inserted, due to symbol number i, there is a mix of symbol numbers whose signal points are dense, such as in FIG. 12A, and symbol numbers whose "distance between signal points is long", such as in FIG. 12B. With respect to this state, since error correction code is introduced, high error correction performance is achieved, and in the reception device illustrated in FIG. 8, high data reception quality is achieved.

Note that in FIG. 18, a phase change is not applied by phase changer 205B in FIG. 18 to "pilot symbols, preamble" for demodulating (wave detection of) data symbols, such as pilot symbols and a preamble, and for channel estimation. With this, among data symbols, "due to symbol number i, there is a mix of symbol numbers whose signal points are dense, such as in FIG. 12A, and symbol numbers whose "distance between signal points is long", such as in FIG. 12B" can be realized.

However, even if a phase change is applied by phase changer 205B in FIG. 18 to "pilot symbols, preamble" for demodulating (wave detection of) data symbols, such as pilot symbols and a preamble, and for channel estimation, the following is possible: "among data symbols," due to symbol number i, there is a mix of symbol numbers whose signal points are dense, such as in FIG. 12A, and symbol numbers whose "distance between signal points is long", such as in FIG. 12B"can be realized."

In such a case, a phase change must be applied to pilot symbols and/or a preamble under some condition. For example, one conceivable method is to implement a rule which is separate from the rule for applying a phase change to a data symbol, and "applying a phase change to a pilot symbol and/or a preamble". Another example is a method of regularly applying a phase change to a data symbol in a cycle N, and regularly applying a phase change to a pilot symbol and/or a preamble in a cycle M. N and M are integers that are greater than or equal to 2.

As described above, phase changer 209A receives inputs of baseband signal 208A and control signal 200, applies a phase change to baseband signal 208A based on control signal 200, and outputs phase-changed signal 210A. Baseband signal 208A is a function of symbol number i, and is expressed as x'(i). Then, phase-changed signal 210A (x(i)) can be expressed as $x(i)=e^{j\times\varepsilon(i)}\times x'(i)$. Here, i is an integer that is greater than or equal to 0, and j is an imaginary number unit.

Note that the operation performed by phase changer 209A may be CDD/CSD disclosed in NPTL 2 and 3. Phase changer 209A then applies a phase change to a symbol present along the frequency axis. In other words, phase changer 209A applies a phase change to, for example, a data symbol, a pilot symbol, and/or a control information symbol. Accordingly in such a case, symbols subject to symbol number i include data symbols, pilot symbols, control information symbols, and preambles (other symbols).

In the case of FIG. 18, since phase changer 209A applies a phase change to baseband signal 208A, a phase change is applied to each symbol in FIG. 4.

Accordingly in the frame illustrated in FIG. 4, phase changer 209A illustrated in FIG. 18 applies a phase change to all symbols (other symbols 403) for all carriers at time $1.

Similarly, phase changer 209A illustrated in FIG. 18 applies a phase change to the following symbols: "all symbols (other symbols 403) for all carriers at time $2", "all symbols (other symbols 403) for all carriers at time $3", "all symbols (other symbols 403) for all carriers at time $4", "all symbols (pilot symbols 401 or data symbols 402) for all carriers at time $5", "all symbols (pilot symbols 401 or data symbols 402) for all carriers at time $6", "all symbols (pilot symbols 401 or data symbols 402) for all carriers at time $7", "all symbols (pilot symbols 401 or data symbols 402) for all carriers at time $8", "all symbols (pilot symbols 401 or data symbols 402) for all carriers at time $9", "all symbols (pilot symbols 401 or data symbols 402) for all carriers at time $10", "all symbols (pilot symbols 401 or data symbols 402) for all carriers at time $11". Subsequent recitation is omitted.

FIG. 13 illustrates a frame configuration different from the frame configuration illustrated in FIG. 4 of transmission signal 108_A illustrated in FIG. 1. FIG. 13 is described in Embodiment 1. Accordingly description will be omitted from this embodiment.

FIG. 14 illustrates a frame configuration different from the frame configuration illustrated in FIG. 5 of transmission signal 108_B illustrated in FIG. 1. FIG. 14 is described in Embodiment 1. Accordingly description will be omitted from this embodiment.

When a symbol is present in carrier A at time $B in FIG. 13 and a symbol is present in carrier A at time $B in FIG. 14, the symbol in carrier A at time $B in FIG. 13 and the symbol in carrier A at time $B in FIG. 14 are transmitted at the same time and same frequency Note that the frame configurations illustrated in FIG. 13 and FIG. 14 are merely examples.

The other symbols in FIG. 13 and FIG. 14 are symbols corresponding to "preamble signal 252 and control information symbol signal 253 in FIG. 18". Accordingly when an other symbol 403 in FIG. 13 at the same time and same frequency (same carrier) as an other symbol 503 in FIG. 14 transmits control information, it transmits the same data (the same control information).

Note that this is under the assumption that the frame of FIG. 13 and the frame of FIG. 14 are received at the same time by the reception device, but even when the frame of FIG. 13 or the frame of FIG. 14 has been received, the reception device can obtain the data transmitted by the transmission device.

Phase changer 209A receives inputs of baseband signal 208A and control signal 200, applies a phase change to baseband signal 208A based on control signal 200, and outputs phase-changed signal 210A. Baseband signal 208A is a function of symbol number i, and is expressed as x'(i). Note that i is an integer that is greater than or equal to 0.

Then, phase-changed signal 210A (x(i)) can be expressed as $x(i)=e^{j\times\varepsilon(i)}\times x'(i)$ (j is an imaginary number unit). Note that the operation performed by phase changer 209A may be CDD/CSD disclosed in NPTL 2 and 3. Phase changer 209A then applies a phase change to a symbol present along the frequency axis. In other words, phase changer 209A applies a phase change to, for example, a data symbol, a pilot symbol, and/or a control information symbol.

Here, a null symbol may be considered as a target for application of a phase change. Accordingly symbols subject to symbol number i include, for example, data symbols, pilot symbols, control information symbols, preambles (other symbols), and null symbols.

However, since the in-phase component I is zero (0) and the orthogonal component Q is zero (0), even if a phase change is applied to a null symbol, the signals before and after the phase change are the same. Accordingly it is possible to construe a null symbol as not a target for a phase change. In the case of FIG. 18, since phase changer 209A applies a phase change to baseband signal 208A, a phase change is applied to each symbol in FIG. 13.

Accordingly in the frame illustrated in FIG. 13, phase changer 209A illustrated in FIG. 18 applies a phase change to all symbols (other symbols 403) for all carriers at time $1. However, the handling of the phase change with respect to null symbol 1301 is as previously described.

Similarly phase changer 209A illustrated in FIG. 18 applies a phase change to the following symbols: "all symbols (other symbols 403) for all carriers at time $2", "all symbols (other symbols 403) for all carriers at time $3", "all symbols (other symbols 403) for all carriers at time $4", "all symbols (pilot symbols 401 or data symbols 402) for all carriers at time $5", "all symbols (pilot symbols 401 or data symbols 402) for all carriers at time $6", "all symbols (pilot symbols 401 or data symbols 402) for all carriers at time $7", "all symbols (pilot symbols 401 or data symbols 402) for all carriers at time $8", "all symbols (pilot symbols 401 or data symbols 402) for all carriers at time $9", "all symbols (pilot symbols 401 or data symbols 402) for all carriers at time $10", "all symbols (pilot symbols 401 or data symbols 402) for all carriers at time $11". Recitation for subsequent times is omitted.

However, the handling of the phase change with respect to null symbol 1301 is as previously described. Recitation for other times and carriers is omitted.

The phase change value of phase changer 209A is expressed as $\Omega(i)$. Baseband signal 208A is x'(i) and phase-changed signal 210A is x(i). Accordingly $x(i)=\Omega(i)\times x'(i)$ holds true.

For example, the phase change value is set as in Equation (38). Q is an integer that is greater than or equal to 2, and represents the number of phase change cycles. j is an imaginary number unit. However, Equation (38) is merely a non-limiting example.

For example, $\Omega(i)$ may be set so as to implement a phase change that yields a cycle Q.

Moreover, for example, in FIG. 4 and FIG. 13, the same phase change value is applied to the same carriers, and the phase change value may be set on a per carrier basis. For example, the following may be implemented.

Regardless of time, the phase change value may be as in Equation (39) for carrier 1 in FIG. 4 and FIG. 13.

Regardless of time, the phase change value may be as in Equation (40) for carrier 2 in FIG. 4 and FIG. 13.

Regardless of time, the phase change value may be as in Equation (41) for carrier 3 in FIG. 4 and FIG. 13.

Regardless of time, the phase change value may be as in Equation (42) for carrier 4 in FIG. 4 and FIG. 13. Recitation for data carriers midway is omitted.

This concludes the operational example of phase changer 209A illustrated in FIG. 18.

Next, the advantageous effects obtained by phase changer 209A illustrated in FIG. 18 will be described.

The other symbols 403, 503 in "the frames of FIG. 4 and FIG. 5" or "the frames of FIG. 13 and FIG. 14" may include a control information symbol. As previously described, when an other symbol 503 in FIG. 5 at the same time and same frequency (in the same carrier) as an other symbol 403 transmits control information, it transmits the same data (same control information).

As case 2, "transmitting a control information symbol using either antenna unit #A 109_A or antenna unit #B 109_B illustrated in FIG. 1" is conceivable.

When transmission according to "case 2" is performed, since only one antenna is used to transmit the control information symbol, compared to when "transmitting a control information symbol using both antenna unit #A 109_A and antenna unit #B 109_B" is performed, spatial diversity gain is less. Accordingly in "case 2", data reception quality decreases even when received by the reception device illustrated in FIG. 8. Accordingly from the perspective of improving data reception quality "transmitting a control information symbol using both antenna unit #A 109_A and antenna unit #B 109_B" is more beneficial.

As case 3, "transmitting a control information symbol using both antenna unit #A 109_A and antenna unit #B 109_B illustrated in FIG. 1. However, phase change is not implemented by phase changer 209A illustrated in FIG. 18" is conceivable.

When transmission according to "case 3" is performed, since the modulated signal transmitted from antenna unit #A 109_A and the modulated signal transmitted from antenna unit #B 109_B are the same or exhibit a specific phase shift, depending on the radio wave propagation environment, the reception device illustrated in FIG. 8 may receive an inferior reception signal, and both modulated signal may be subjected to the same multipath effect. Accordingly in the reception device illustrated in FIG. 8, data reception quality decreases.

In order to remedy this phenomenon, in FIG. 18, phase changer 209A is inserted. Since this changes the phase along the time or frequency axis, in the reception device illustrated in FIG. 8, it is possible to reduce the probability of reception of an inferior reception signal. Moreover, since there is a high probability that there will be a difference in the multipath effect that the modulated signal transmitted from antenna unit #A 109_A is subjected to with respect to the multipath effect that the modulated signal transmitted from antenna unit #B 109_B is subjected to, there is a high probability that diversity gain will result, and accordingly that data reception quality in the reception device illustrated in FIG. 8 will improve.

For these reasons, in FIG. 18, phase changer 209A is provided and phase change is implemented.

Other symbols 403 and other symbols 503 include, in addition to control information symbols, for example, symbols for signal detection, symbols for performing frequency and time synchronization, and symbols for performing channel estimation (a symbol for performing propagation path fluctuation estimation), for demodulating and decoding control information symbols. Moreover, "the frames of FIG. 4 and FIG. 5" or "the frames of FIG. 13 and FIG. 14" include pilot symbols 401, 501, and by using these, it is possible to perform demodulation and decoding with high precision via control information symbols.

Moreover, "the frames of FIG. 4 and FIG. 5" or "the frames of FIG. 13 and FIG. 14" transmit a plurality of streams at the same time and using the same frequency (frequency band) via data symbols 402 and data symbols 502, that is to say perform MIMO transmission. In order to demodulate these data symbols, symbols for signal detection, symbols for frequency and time synchronization, and symbols for channel estimation, which are included in other symbols 403 and other symbols 503, are used.

Here, "symbols for signal detection, symbols for frequency and time synchronization, and symbols for channel estimation, which are included in other symbols 403 and other symbols 503" are applied with a phase change by phase changer 209A, as described above.

Under these circumstances, when this processing is not performed on data symbols 402 and data symbols 502 (and data symbols 402 in the example above), in the reception device, when data symbols 402 and data symbols 502 are demodulated and decoded, there is a need to perform the demodulation and decoding in which the processing for the phase change by phase changer 209A was performed, and there is a probability that this processing will be complicated.

This is because "symbols for signal detection, symbols for frequency and time synchronization, and symbols for channel estimation, which are included in other symbols 403 and other symbols 503" are applied with a phase change by phase changer 209A.

However, as illustrated in FIG. 18, in phase changer 209A, when a phase change is applied to data symbols 402 and data symbols 502 (and data symbols 402 in the example above), in the reception device, there is the advantage that data symbols 402 and data symbols 502 can simply be demodulated and decoded using the channel estimation signal (propagation path fluctuation signal) estimated by using "symbols for signal detection, symbols for frequency and time synchronization, and symbols for channel estimation, which are included in other symbols 403 and other symbols 503".

Additionally as illustrated in FIG. 18, in phase changer 209A, when a phase change is applied to data symbols 402 and data symbols 502 (and data symbols 402 in the example above), in multipath environments, it is possible to reduce the influence of sharp drops in electric field intensity along the frequency axis. Accordingly it is possible to obtain the advantageous effect of an improvement in data reception quality of data symbols 402 and data symbols 502.

In this way the point that "symbols that are targets for implementation of a phase change by phase changer 205B" and "symbols that are targets for implementation of a phase change by phase changer 209A" are different is a characteristic point.

As described above, by applying a phase change using phase changer 205B illustrated in FIG. 18, it is possible to achieve the advantageous effect of an improvement in data reception quality of data symbols 402 and data symbols 502 in the reception device in, for example, LOS environments, and by applying a phase change using phase changer 209A illustrated in FIG. 18, for example, it is possible to achieve the advantageous effect of an improvement in data reception quality in the reception device of the control information symbols included in "the frames of FIG. 4 and FIG. 5" or "the frames of FIG. 13 and FIG. 14" and the advantageous effect that operations of demodulation and decoding of data symbols 402 and data symbols 502 become simple.

Note that the advantageous effect of an improvement in data reception quality in the reception device of data symbols 402 and data symbols 502 in, for example, LOS environments, is achieved as a result of the phase change implemented by phase changer 205B illustrated in FIG. 18, and furthermore, the reception quality of data symbols 402 and data symbols 502 is improved by applying a phase change to data symbols 402 and data symbols 502 using phase changer 209A illustrated in FIG. 18.

Note that Q in Equation (38) may be an integer of −2 or less. In such a case, the value for the phase change cycle is the absolute value of Q. This feature is applicable to other embodiments as well.

Embodiment 3

In this embodiment, an implementation method will be described that is different from the configuration illustrated in FIG. 2 and described in Embodiment 1.

FIG. 1 illustrates one example of a configuration of a transmission device according to this embodiment, such as a base station, access point, or broadcast station. As FIG. 1 is described in detail in Embodiment 1, description will be omitted from this embodiment.

Signal processor 106 receives inputs of mapped signals 105_1 and 105_2, signal group 110, and control signal 100, performs signal processing based on control signal 100, and outputs processed signals 106_A and 106_B. Here, processed signal 106_A is expressed as u1(i), and processed signal 106_B is expressed as u2(i). i is a symbol number, and, for example, is an integer that is greater than or equal to 0. Note that details regarding the signal processing will be described with reference to FIG. 19 later.

Figure 19:
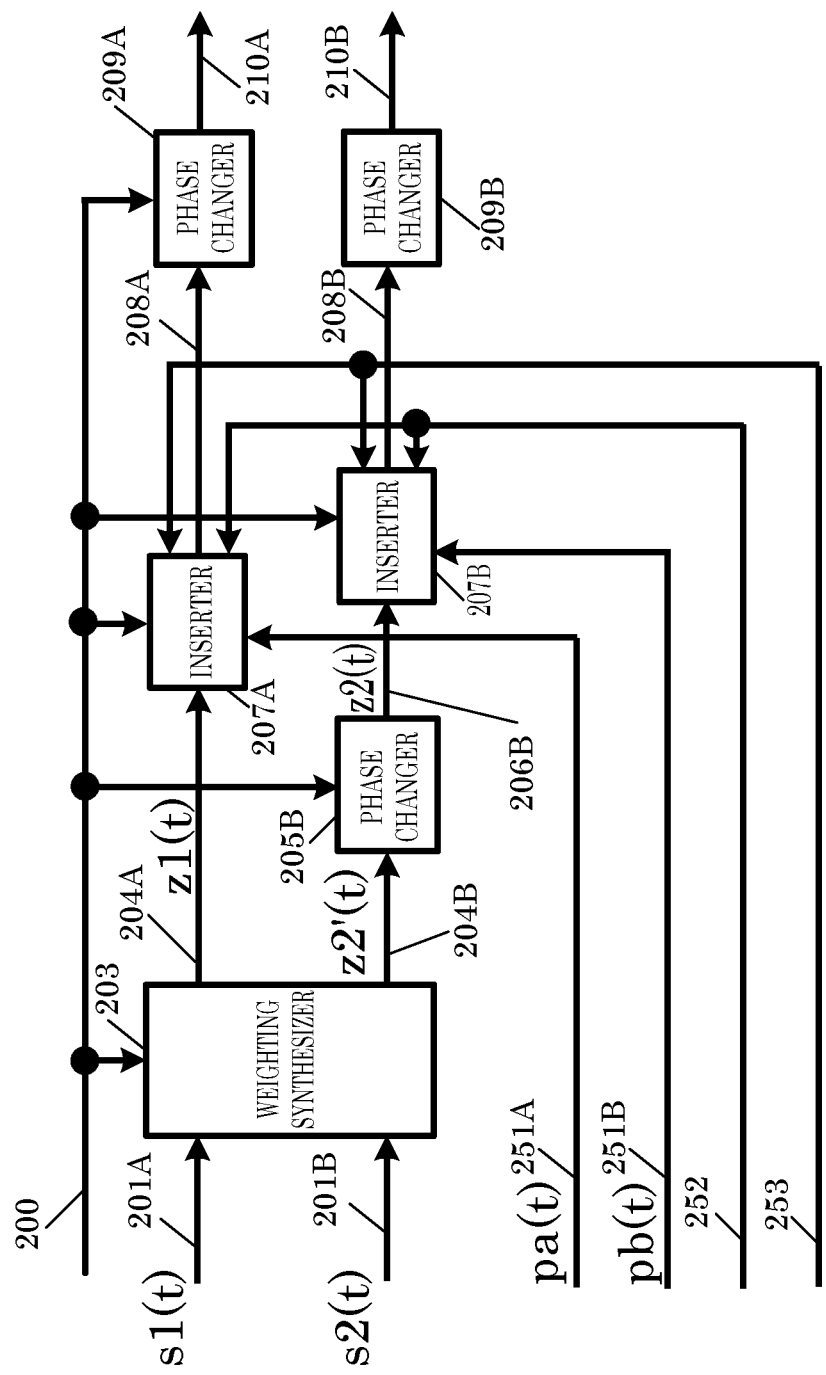
FIG. 19 illustrates one example of a configuration of the signal processor illustrated in FIG. 1.

FIG. 19 illustrates one example of a configuration of signal processor 106 illustrated in FIG. 1. Weighting synthesizer (precoder) 203 receives inputs of mapped signal 201A (mapped signal 105_1 in FIG. 1), mapped signal 201B (mapped signal 105_2 in FIG. 1), and control signal 200 (control signal 100 in FIG. 1), performs weighting synthesis (precoding) based on control signal 200, and outputs weighted signal 204A and weighted signal 204B.

Here, mapped signal 201A is expressed as s1(t), mapped signal 201B is expressed as s2(t), weighted signal 204A is expressed as z1(t), and weighted signal 204B is expressed as z2'(t). Note that one example of t is time. s1(t), s2(t), z1(t), and z2'(t) are defined as complex numbers, and as such, may be actual numbers.

Here, these are given as functions of time, but may be functions of a "frequency (carrier number)", and may be functions of "time and frequency". These may also be a function of a "symbol number". Note that this also applies to Embodiment 1.

Weighting synthesizer (precoder) 203 performs the calculations indicated in Equation (1).

Phase changer 205B receives inputs of weighting synthesized signal 204B and control signal 200, applies a phase change to weighting synthesized signal 204B based on control signal 200, and outputs phase-changed signal 206B.

Note that phase-changed signal 206B is expressed as z2(t). z2(t) is defined as a complex number and may be an actual number.

Next, specific operations performed by phase changer 205B will be described. In phase changer 205B, for example, a phase change of y(i) is applied to z2'(i). Accordingly z2(i) can be expressed as z2(i)=y(i)×z2'(i). Note that i is a symbol number and is an integer that is greater than or equal to 0.

For example, the phase change value is set as indicated in Equation (2). Note that N is an integer that is greater than or equal to 2, and represents the number of phase change cycles. When N is set to an odd number greater than or equal to 3, data reception quality may increase. However, Equation (2) is merely a non-limiting example. Here, phase change value $y(i)=e^{j \times \delta(i)}$.

Here, z1(i) and z2(i) can be expressed with Equation (3). Note that δ(i) is an actual number. z1(i) and z2(i) are transmitted from the transmission device at the same time and using the same frequency (same frequency band). In Equation (3), the phase change value is not limited to the value used in Equation (2); for example, a method in which the phase is changed cyclically or regularly is conceivable.

As described in Embodiment 1, conceivable examples of the (precoding) matrix inserted in Equation (1) and Equation (3) are illustrated in Equation (5) through Equation (36). However, the precoding matrix is not limited to these examples. The same applies to Embodiment 1.

Inserter 207A receives inputs of weighting synthesized signal 204A, pilot symbol signal pa(t)251A, preamble signal 252, control information symbol signal 253, and control signal 200, and based on information on the frame configuration included in control signal 200, outputs baseband signal 208A based on the frame configuration. Note that t indicates time.

Similarly, inserter 207B receives inputs of phase-changed signal 206B, pilot symbol signal pb(t)251B, preamble signal 252, control information symbol signal 253, and control signal 200, and based on information on the frame configuration included in control signal 200, outputs baseband signal 208B based on the frame configuration.

Phase changer 209A receives inputs of baseband signal 208A and control signal 200, applies a phase change to baseband signal 208A based on control signal 200, and outputs phase-changed signal 210A. Baseband signal 208A is a function of symbol number i, and is expressed as x'(i). Then, phase-changed signal 210A (x(i)) can be expressed as $x(i)=e^{j \times \varepsilon(i)} \times x'(i)$. Here, i is an integer that is greater than or equal to 0, and j is an imaginary number unit.

Note that the operation performed by phase changer 209A may be CDD/CSD disclosed in NPTL 2 and 3, as described in Embodiment 1. Phase changer 209A then applies a phase change to a symbol present along the frequency axis. In other words, phase changer 209A applies a phase change to, for example, a data symbol, a pilot symbol, and/or a control information symbol.

Phase changer 209B receives inputs of baseband signal 208B and control signal 200, applies a phase change to baseband signal 208B based on control signal 200, and outputs phase-changed signal 210B. Baseband signal 208B is a function of symbol number i, and is expressed as y'(i). Then, phase-changed signal 210B (y(i)) is expressed as $y(i)=e^{x}(i) \times y'(i)$. Here, i is an integer that is greater than or equal to 0, and j is an imaginary number unit.

Note that the operation performed by phase changer 209B may be CDD/CSD disclosed in NPTL 2 and 3, as described in Embodiment 1. Phase changer 209B then applies a phase change to a symbol present along the frequency axis. In other words, phase changer 209B applies a phase change to, for example, a data symbol, a pilot symbol, and/or a control information symbol.

The characteristic feature here is that the phase changing method via c(i) and the phase changing method via τ(i) are different. Another characteristic feature is that the CDD/CSD cyclic delay amount value set in phase changer 209A and the CDD/CSD cyclic delay amount value set in phase changer 209B are different.

FIG. 3 illustrates one example of a configuration of radio units 107_A and 107_B illustrated in FIG. 1. FIG. 3 is described in Embodiment 1. Accordingly description will be omitted from this embodiment FIG. 4 illustrates a frame configuration of transmission signal 108_A illustrated in FIG. 1. FIG. 4 is described in Embodiment 1. Accordingly, description will be omitted from this embodiment FIG. 5 illustrates a frame configuration of transmission signal 108_B illustrated in FIG. 1. FIG. 5 is described in Embodiment 1. Accordingly, description will be omitted from this embodiment When a symbol is present in carrier A at time $B in FIG. 4 and a symbol is present in carrier A at time $B in FIG. 5, the symbol in carrier A at time $B in FIG. 4 and the symbol in carrier A at time $B in FIG. 5 are transmitted at the same time and same frequency. Note that the frame configuration is not limited to the configurations illustrated in FIG. 4 and FIG. 5; FIG. 4 and FIG. 5 are mere examples of frame configurations.

The other symbols in FIG. 4 and FIG. 5 are symbols corresponding to "preamble signal 252 and control information symbol signal 253 in FIG. 2". Accordingly when an other symbol 503 in FIG. 5 at the same time and same frequency (same carrier) as an other symbol 403 in FIG. 4 transmits control information, it transmits the same data (the same control information).

Note that this is under the assumption that the frame of FIG. 4 and the frame of FIG. 5 are received at the same time by the reception device, but even when the frame of FIG. 4 or the frame of FIG. 5 has been received, the reception device can obtain the data transmitted by the transmission device.

FIG. 6 illustrates one example of components relating to control information generation for generating control information symbol signal 253 illustrated in FIG. 2. FIG. 6 is described in Embodiment 1. Accordingly description will be omitted from this embodiment.

FIG. 7 illustrates one example of a configuration of antenna unit #A 109_A and antenna unit #B 109_B illustrated in FIG. 1. In this example, antenna unit #A 109_A and antenna unit #B 109_B include a plurality of antennas. FIG. 7 is described in Embodiment 1. Accordingly description will be omitted from this embodiment.

FIG. 8 illustrates one example of a configuration of a reception device that receives a modulated signal upon the transmission device illustrated in FIG. 1 transmitting, for example, a transmission signal having the frame configuration illustrated in FIG. 4 or FIG. 5. FIG. 8 is described in Embodiment 1. Accordingly, description will be omitted from this embodiment.

FIG. 10 illustrates one example of a configuration of antenna unit #X 801X and antenna unit #Y 801Y illustrated in FIG. 8. In FIG. 10, antenna unit #X 801X and antenna unit #Y 801Y are exemplified as including a plurality of antennas. FIG. 10 is described in Embodiment 1. Accordingly description will be omitted from this embodiment.

Next, signal processor 106 in the transmission device illustrated in FIG. 1 is inserted as phase changer 205B and phase changers 209A and 209B, as illustrated in FIG. 19. The characteristics and advantageous effects of this configuration will be described.

As described with reference to FIG. 4 and FIG. 5, phase changer 205B applies precoding (weighted synthesis) to mapped signal s1(i) 201A obtained via mapping using the first sequence and mapped signal s2(i) 201B obtained via mapping using the second sequence, and applies a phase change to one of the obtained weighting synthesized signals 204A and 204B. Note that i is a symbol number and is an integer that is greater than or equal to 0.

Weighting synthesized signal 204A and phase-changed signal 206B are then transmitted at the same frequency and at the same time. Accordingly in FIG. 4 and FIG. 5, a phase change is applied to data symbol 502 in FIG. 5. In the case of FIG. 19, since phase changer 205 applies this to weighting synthesized signal 204B, a phase change is applied to data symbol 502 in FIG. 5. When a phase change is applied to weighting synthesized signal 204A, a phase change is applied to data symbol 402 in FIG. 4. This will be described later.

For example, FIG. 11 illustrates an extraction of carrier 1 through carrier 5 and time $4 through time $6 from the frame illustrated in FIG. 5. Note that in FIG. 11, similar to FIG. 5, pilot symbol 501, data symbols 502, and other symbols 503 are shown.

As described above, among the symbols illustrated in FIG. 11, phase changer 205B applies a phase change to the data symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6).

Accordingly the phase change values for the data symbols illustrated in FIG. 11 can be expressed as "$e^{j\times\delta15(i)}$" for (carrier 1, time $5), "$e^{j\times\delta25(i)}$" for (carrier 2, time $5), "$e^{j\times\delta35(i)}$" for (carrier 3, time $5), "$e^{j\times\delta45(i)}$" for (carrier 4, time $5), "$e^{j\times\delta55(i)}$" (carrier 5, time $5), "$e^{j\times\delta16(i)}$" for (carrier 1, time $6), "$e^{j\times\delta26(i)}$" for (carrier 2, time $6), "$e^{j\times\delta46(i)}$" for (carrier 4, time $6), and "$e^{j\times\delta56(i)}$" for (carrier 5, time $6).

Among the symbols illustrated in FIG. 11, the other symbols located at (carrier 1, time $4), (carrier 2, time $4), (carrier 3, time $4), (carrier 4, time $4), and (carrier 5, time $4), and the pilot symbol located at (carrier 3, time $6) are not subject to phase change by phase changer 205B.

This point is a characteristic of phase changer 205B. Note that, as illustrated in FIG. 4, data carriers are arranged at "the same carriers and the same times" as the symbols subject to phase change in FIG. 11, which are the data symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6).

In other words, in FIG. 4, the symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6) are data symbols.

In other words, data symbols that perform MIMO transmission, that is to say transmit a plurality of streams, are subject to phase change by phase changer 205B.

One example of the phase change that phase changer 205B applies to the data symbols is the method given in Equation (2) in which phase change is applied to the data symbols regularly such as at each cycle N. However, the method of applying the phase change to the data symbols is not limited to this example.

With this, when the environment is one in which the direct waves are dominant, such as in an LOS environment, it is possible to achieve improved data reception quality in the reception device with respect to the data symbols that perform MIMO transmission, that is to say, that transmit a plurality of streams. Next, the advantageous effects of this will be described.

For example, the modulation scheme used by mapper 104 in FIG. 1 is QPSK. Mapped signal 201A in FIG. 19 is a QPSK signal, and mapped signal 201B is a QPSK signal. In other words, two QPSK streams are transmitted.

Accordingly for example, using channel estimated signals 806_1 and 806_2, 16 candidate signal points are obtained by signal processor 811 illustrated in FIG. 8. 2-bit transmission is possible with QPSK. Accordingly since there are two streams, 4-bit transmission is achieved. Thus, there are 24=16 candidate signal points.

Note that 16 other candidate signal points are obtained from using channel estimated signals 808_1 and 808_2 as well, but since description thereof is the same as described above, the following description will focus on the 16 candidate signal points obtained by using channel estimated signals 806_1 and 806_2.

FIG. 12A and FIG. 12B each illustrate an example of the state resulting from such a case. In FIG. 12A and FIG. 12B, in-phase I is represented on the horizontal axis and orthogonal Q is represented on the vertical axis. 16 candidate signal points are present in the illustrated in-phase I-orthogonal Q planes. Among the 16 candidate signal points, one is a signal point that is transmitted by the transmission device. This is why these are referred to as "16 candidate signal points".

When the environment is one in which the direct waves are dominant, such as in an LOS environment, a first conceivable case is "when phase changer 205B is omitted from the configuration illustrated in FIG. 19, in other words, when phase change is not applied by phase changer 205B in FIG. 19".

In the first case, since phase change is not applied, there is a possibility that the state illustrated in FIG. 12A will be realized. When the state falls into the state illustrated in FIG. 12A, as illustrated by "signal points 1201 and 1202", "signal points 1203, 1204, 1205, and 1206", and "signal points 1207, 1208", the signal points become dense, that is to say, the distances between some signal points shorten. Accordingly in the reception device illustrated in FIG. 8, data reception quality may decrease.

In order to remedy this phenomenon, in FIG. 19, phase changer 205B is inserted. When phase changer 205B is inserted, due to symbol number i, there is a mix of symbol numbers whose signal points are dense, such as in FIG. 12A, and symbol numbers whose "distance between signal points is long", such as in FIG. 12B. With respect to this state, since error correction code is introduced, high error correction performance is achieved, and in the reception device illustrated in FIG. 8, high data reception quality is achieved.

Note that in FIG. 19, a phase change is not applied by phase changer 205B in FIG. 19 to "pilot symbols, preamble" for demodulating (wave detection of) data symbols, such as pilot symbols and a preamble, and for channel estimation. With this, among data symbols, "due to symbol number i, there is a mix of symbol numbers whose signal points are dense, such as in FIG. 12A, and symbol numbers whose "distance between signal points is long", such as in FIG. 12B" can be realized.

However, even if a phase change is applied by phase changer 205B in FIG. 19 to "pilot symbols, preamble" for demodulating (wave detection of) data symbols, such as pilot symbols and a preamble, and for channel estimation, the following is possible: "among data symbols," due to symbol number i, there is a mix of symbol numbers whose signal points are dense, such as in FIG. 12A, and symbol numbers whose "distance between signal points is long", such as in FIG. 12B"can be realized."

In such a case, a phase change must be applied to pilot symbols and/or a preamble under some condition. For example, one conceivable method is to implement a rule which is separate from the rule for applying a phase change to a data symbol, and "applying a phase change to a pilot symbol and/or a preamble". Another example is a method of regularly applying a phase change to a data symbol in a cycle N, and regularly applying a phase change to a pilot symbol and/or a preamble in a cycle M. N and M are integers that are greater than or equal to 2.

As described above, phase changer 209A receives inputs of baseband signal 208A and control signal 200, applies a phase change to baseband signal 208A based on control signal 200, and outputs phase-changed signal 210A. Baseband signal 208A is a function of symbol number i, and is expressed as x'(i). Then, phase-changed signal 210A (x(i)) can be expressed as $x(i) = e^{j \times \varepsilon(i)} \times x'(i)$. Here, i is an integer that is greater than or equal to 0, and j is an imaginary number unit.

Note that the operation performed by phase changer 209A may be CDD/CSD disclosed in NPTL 2 and 3. Phase changer 209A then applies a phase change to a symbol present along the frequency axis. In other words, phase changer 209A applies a phase change to, for example, a data symbol, a pilot symbol, and/or a control information symbol. Accordingly in such a case, symbols subject to symbol number i include data symbols, pilot symbols, control information symbols, and preambles (other symbols).

In the case of FIG. 19, since phase changer 209A applies a phase change to baseband signal 208A, a phase change is applied to each symbol in FIG. 4.

Accordingly in the frame illustrated in FIG. 4, phase changer 209A illustrated in FIG. 19 applies a phase change to all symbols (other symbols 403) for all carriers at time $1.

Similarly, phase changer 209A illustrated in FIG. 19 applies a phase change to the following symbols: "all symbols (other symbols 403) for all carriers at time $2", "all symbols (other symbols 403) for all carriers at time $3", "all symbols (other symbols 403) for all carriers at time $4", "all symbols (pilot symbols 401 or data symbols 402) for all carriers at time $5", "all symbols (pilot symbols 401 or data symbols 402) for all carriers at time $6", "all symbols (pilot symbols 401 or data symbols 402) for all carriers at time $7", "all symbols (pilot symbols 401 or data symbols 402) for all carriers at time $8", "all symbols (pilot symbols 401 or data symbols 402) for all carriers at time $9", "all symbols (pilot symbols 401 or data symbols 402) for all carriers at time $10", "all symbols (pilot symbols 401 or data symbols 402) for all carriers at time $11". Recitation for other times and carriers is omitted.

As described above, phase changer 209B receives inputs of baseband signal 208B and control signal 200, applies a phase change to baseband signal 208B based on control signal 200, and outputs phase-changed signal 210B. Baseband signal 208B is a function of symbol number i, and is expressed as y'(i). Then, phase-changed signal y(i)210B can be expressed as $y(i) = e^{j \times \tau(i)} \times y'(i)$. Here, i is an integer that is greater than or equal to 0, and j is an imaginary number unit.

Note that the operation performed by phase changer 209B may be CDD/CSD disclosed in NPTL 2 and 3. Phase changer 209B then applies a phase change to a symbol present along the frequency axis. In other words, phase changer 209B applies a phase change to, for example, a data symbol, a pilot symbol, and/or a control information symbol.

Accordingly in such a case, symbols subject to symbol number i include data symbols, pilot symbols, control information symbols, and preambles (other symbols). In the case of FIG. 19, since phase changer 209B applies a phase change to baseband signal 208B, a phase change is applied to each symbol in FIG. 5.

Accordingly in the frame illustrated in FIG. 5, phase changer 209B illustrated in FIG. 19 applies a phase change to all symbols (other symbols 503) for all carriers at time $1.

Similarly phase changer 209B illustrated in FIG. 19 applies a phase change to the following symbols: "all symbols (other symbols 503) for all carriers at time $2", "all symbols (other symbols 503) for all carriers at time $3", "all symbols (other symbols 503) for all carriers at time $4", "all symbols (pilot symbols 501 or data symbols 502) for all carriers at time $5", "all symbols (pilot symbols 501 or data symbols 502) for all carriers at time $6", "all symbols (pilot symbols 501 or data symbols 502) for all carriers at time $7", "all symbols (pilot symbols 501 or data symbols 502) for all carriers at time $8", "all symbols (pilot symbols 501 or data symbols 502) for all carriers at time $9", "all symbols (pilot symbols 501 or data symbols 502) for all carriers at time $10", "all symbols (pilot symbols 501 or data symbols 502) for all carriers at time $11". Recitation for other times and carriers is omitted.

FIG. 13 illustrates a frame configuration different from the frame configuration illustrated in FIG. 4 of transmission signal 108_A illustrated in FIG. 1. FIG. 13 is described in Embodiment 1. Accordingly description will be omitted from this embodiment.

FIG. 14 illustrates a frame configuration different from the frame configuration illustrated in FIG. 5 of transmission signal 108_B illustrated in FIG. 1. FIG. 14 is described in Embodiment 1. Accordingly description will be omitted from this embodiment.

When a symbol is present in carrier A at time $B in FIG. 13 and a symbol is present in carrier A at time $B in FIG. 14, the symbol in carrier A at time $B in FIG. 13 and the symbol in carrier A at time $B in FIG. 14 are transmitted at the same time and same frequency. Note that the frame configurations illustrated in FIG. 13 and FIG. 14 are merely examples.

The other symbols in FIG. 13 and FIG. 14 are symbols corresponding to "preamble signal 252 and control information symbol signal 253 in FIG. 19". Accordingly when an other symbol 403 in FIG. 13 at the same time and same frequency (same carrier) as an other symbol 503 in FIG. 14 transmits control information, it transmits the same data (the same control information).

Note that this is under the assumption that the frame of FIG. 13 and the frame of FIG. 14 are received at the same time by the reception device, but even when the frame of FIG. 13 or the frame of FIG. 14 has been received, the reception device can obtain the data transmitted by the transmission device.

Phase changer 209A receives inputs of baseband signal 208A and control signal 200, applies a phase change to baseband signal 208A based on control signal 200, and outputs phase-changed signal 210A. Baseband signal 208A is a function of symbol number i, and is expressed as x'(i).

Then, phase-changed signal 210A (x(i)) can be expressed as $x(i)=e^{j\times\varepsilon(i)}\times x'(i)$. Here, i is an integer that is greater than or equal to 0, and j is an imaginary number unit.

Note that the operation performed by phase changer 209A may be CDD/CSD disclosed in NPTL 2 and 3. Phase changer 209A then applies a phase change to a symbol present along the frequency axis. In other words, phase changer 209A applies a phase change to, for example, a data symbol, a pilot symbol, and/or a control information symbol. Here, a null symbol may be considered as a target for application of a phase change. Accordingly symbols subject to symbol number i include, for example, data symbols, pilot symbols, control information symbols, preambles (other symbols), and null symbols.

However, even if a phase change is applied to a null symbol, the signals before and after the phase change are the same. This is because a null symbol has an in-phase component I of zero (0) and an orthogonal component Q of zero (0). Accordingly it is possible to construe a null symbol as not a target for a phase change.

In the case of FIG. 19, since phase changer 209A applies a phase change to baseband signal 208A, a phase change is applied to each symbol in FIG. 13.

Accordingly in the frame illustrated in FIG. 13, phase changer 209A illustrated in FIG. 19 applies a phase change to all symbols (other symbols 403) for all carriers at time $1. However, the handling of the phase change with respect to null symbol 1301 is as previously described.

Similarly phase changer 209A illustrated in FIG. 19 applies a phase change to the following symbols: "all symbols (other symbols 403) for all carriers at time $2", "all symbols (other symbols 403) for all carriers at time $3", "all symbols (other symbols 403) for all carriers at time $4", "all symbols (pilot symbols 401 or data symbols 402) for all carriers at time $5", "all symbols (pilot symbols 401 or data symbols 402) for all carriers at time $6", "all symbols (pilot symbols 401 or data symbols 402) for all carriers at time $7", "all symbols (pilot symbols 401 or data symbols 402) for all carriers at time $8", "all symbols (pilot symbols 401 or data symbols 402) for all carriers at time $9", "all symbols (pilot symbols 401 or data symbols 402) for all carriers at time $10", "all symbols (pilot symbols 401 or data symbols 402) for all carriers at time $11". However, the handling of the phase change with respect to null symbol 1301 for all carriers at all times is as previously described. Recitation for other times and carriers is omitted.

The phase change value of phase changer 209A is expressed as $\Omega(i)$. Baseband signal 208A is x'(i) and phase-changed signal 210A is x(i). Accordingly $x(i)=\Omega(i)\times x'(i)$ holds true.

For example, the phase change value is set as in Equation (38). Q is an integer that is greater than or equal to 2, and represents the number of phase change cycles. j is an imaginary number unit. However, Equation (38) is merely a non-limiting example.

For example, $\Omega(i)$ may be set so as to implement a phase change that yields a cycle Q.

Moreover, for example, in FIG. 4 and FIG. 13, the same phase change value is applied to the same carriers, and the phase change value may be set on a per carrier basis. For example, the following may be implemented.

Regardless of time, the phase change value may be as in Equation (39) for carrier 1 in FIG. 4 and FIG. 13.

Regardless of time, the phase change value may be as in Equation (40) for carrier 2 in FIG. 4 and FIG. 13.

Regardless of time, the phase change value may be as in Equation (41) for carrier 3 in FIG. 4 and FIG. 13.

Regardless of time, the phase change value may be as in Equation (42) for carrier 4 in FIG. 4 and FIG. 13. Recitation for other times and carriers is omitted.

This concludes the operational example of phase changer 209A illustrated in FIG. 19.

Phase changer 209B receives inputs of baseband signal 208B and control signal 200, applies a phase change to baseband signal 208B based on control signal 200, and outputs phase-changed signal 210B. Baseband signal 208B is a function of symbol number i, and is expressed as y'(i). Then, phase-changed signal 210B (y(i)) can be expressed as $y(i)=e^{j\times\tau(i)}\times y'(i)$. Here, i is an integer that is greater than or equal to 0, and j is an imaginary number unit.

Note that the operation performed by phase changer 209B may be CDD/CSD disclosed in NPTL 2 and 3. Phase changer 209B then applies a phase change to a symbol present along the frequency axis. In other words, phase changer 209B applies a phase change to, for example, a data symbol, a pilot symbol, and/or a control information symbol. Here, a null symbol may be considered as a target for application of a phase change.

Accordingly symbols subject to symbol number i include, for example, data symbols, pilot symbols, control information symbols, preambles (other symbols), and null symbols.

However, since the in-phase component I is zero (0) and the orthogonal component Q is zero (0), even if a phase change is applied to a null symbol, the signals before and after the phase change are the same. Accordingly it is possible to construe a null symbol as not a target for a phase change.

In the case of FIG. 19, since phase changer 209B applies a phase change to baseband signal 208B, a phase change is applied to each symbol in FIG. 14.

Accordingly in the frame illustrated in FIG. 14, phase changer 209B illustrated in FIG. 19 applies a phase change to all symbols (other symbols 503) for all carriers at time $1. However, the handling of the phase change with respect to null symbol 1301 is as previously described.

Similarly phase changer 209B illustrated in FIG. 19 applies a phase change to the following symbols: "all symbols (other symbols 503) for all carriers at time $2", "all symbols (other symbols 503) for all carriers at time $3", "all symbols (other symbols 503) for all carriers at time $4", "all symbols (pilot symbols 501 or data symbols 502) for all carriers at time $5", "all symbols (pilot symbols 501 or data symbols 502) for all carriers at time $6", "all symbols (pilot symbols 501 or data symbols 502) for all carriers at time $7", "all symbols (pilot symbols 501 or data symbols 502) for all carriers at time $8", "all symbols (pilot symbols 501 or data symbols 502) for all carriers at time $9", "all symbols (pilot symbols 501 or data symbols 502) for all carriers at time $10", "all symbols (pilot symbols 501 or data symbols 502) for all carriers at time $11". However, the handling of the phase change with respect to null symbols 1301 is as previously described. Recitation for other times and carriers is omitted.

The phase change value of phase changer 209B is expressed as $\Omega(i)$. Baseband signal 208B is y'(i) and phase-changed signal 210B is y(i). Accordingly $y(i)=\Delta(i)\times y'(i)$ holds true.

For example, the phase change value is set as in the following equation. R is an integer that is greater than or equal to 2, and represents the number of phase change cycles. Note that the values for Q and R in Equation (38) may be different values.

[MATH. 49]

$$\Delta(i) = e^{j\frac{2\times \pi \times i}{R}} \quad \text{Equation (49)}$$

j is an imaginary number unit. However, Equation (49) is merely a non-limiting example.

For example, Δ(i) may be set so as to implement a phase change that yields a cycle R.

Note that the phase changing methods used by phase changer 209A and phase changer 209B may be different. For example, the cycle may be the same and, alternatively may be different.

Moreover, for example, in FIG. 5 and FIG. 14, the same phase change value is applied to the same carriers, and the phase change value may be set on a per carrier basis. For example, the following may be implemented.

Regardless of time, the phase change value may be as in Equation (39) for carrier 1 in FIG. 5 and FIG. 14.

Regardless of time, the phase change value may be as in Equation (40) for carrier 2 in FIG. 5 and FIG. 14.

Regardless of time, the phase change value may be as in Equation (41) for carrier 3 in FIG. 5 and FIG. 14.

Regardless of time, the phase change value may be as in Equation (42) for carrier 4 in FIG. 5 and FIG. 14. Recitation for other carriers is omitted.

Although the phase change value is described as Equation (39), (40), (41), and (42), the phase changing methods of phase changer 209A and phase changer 209B are different.

This concludes the operational example of phase changer 209B illustrated in FIG. 19.

Next, the advantageous effects obtained by phase changers 209A, 209B illustrated in FIG. 19 will be described.

The other symbols 403, 503 in "the frames of FIG. 4 and FIG. 5" or "the frames of FIG. 13 and FIG. 14" may include a control information symbol. As previously described, when an other symbol 503 in FIG. 5 at the same time and same frequency (in the same carrier) as an other symbol 403 transmits control information, it transmits the same data (same control information).

As case 2, "transmitting a control information symbol using either antenna unit #A 109_A or antenna unit #B 109_B illustrated in FIG. 1" is conceivable.

When transmission according to "case 2" is performed, since only one antenna is used to transmit the control information symbol, compared to when "transmitting a control information symbol using both antenna unit #A 109_A and antenna unit #B 109_B" is performed, spatial diversity gain is less. Accordingly in "case 2", data reception quality decreases even when received by the reception device illustrated in FIG. 8. Accordingly from the perspective of improving data reception quality "transmitting a control information symbol using both antenna unit #A 109_A and antenna unit #B 109_B" is more beneficial.

As case 3, "transmitting a control information symbol using both antenna unit #A 109_A and antenna unit #B 109_B illustrated in FIG. 1. However, phase change is not implemented by phase changers 209A, 209B illustrated in FIG. 19" is conceivable.

When transmission according to "case 3" is performed, since the modulated signal transmitted from antenna unit #A 109_A and the modulated signal transmitted from antenna unit #B 109_B are the same or exhibit a specific phase shift, depending on the radio wave propagation environment, the reception device illustrated in FIG. 8 may receive an inferior reception signal, and both modulated signal may be subjected to the same multipath effect. Accordingly in the reception device illustrated in FIG. 8, data reception quality decreases.

In order to remedy this phenomenon, in FIG. 19, phase changers 209A, 209B are inserted. Since this changes the phase along the time or frequency axis, in the reception device illustrated in FIG. 8, it is possible to reduce the probability of reception of an inferior reception signal. Moreover, since there is a high probability that there will be a difference in the multipath effect that the modulated signal transmitted from antenna unit #A 109_A is subjected to with respect to the multipath effect that the modulated signal transmitted from antenna unit #B 109_B is subjected to, there is a high probability that diversity gain will result, and accordingly that data reception quality in the reception device illustrated in FIG. 8 will improve.

For these reasons, in FIG. 19, phase changers 209A, 209B are provided and phase change is implemented.

Other symbols 403 and other symbols 503 include, in addition to control information symbols, for example, symbols for signal detection, symbols for performing frequency and time synchronization, and symbols for performing channel estimation (a symbol for performing propagation path fluctuation estimation), for demodulating and decoding control information symbols. Moreover, "the frames of FIG. 4 and FIG. 5" or "the frames of FIG. 13 and FIG. 14" include pilot symbols 401, 501, and by using these, it is possible to perform demodulation and decoding with high precision via control information symbols.

Moreover, "the frames of FIG. 4 and FIG. 5" or "the frames of FIG. 13 and FIG. 14" transmit a plurality of streams at the same time and using the same frequency (frequency band) via data symbols 402 and data symbols 502, that is to say perform MIMO transmission. In order to demodulate these data symbols, symbols for signal detection, symbols for frequency and time synchronization, and symbols for channel estimation, which are included in other symbols 403 and other symbols 503, are used.

Here, "symbols for signal detection, symbols for frequency and time synchronization, and symbols for channel estimation, which are included in other symbols 403 and other symbols 503" are applied with a phase change by phase changers 209A, 209B, as described above.

Under these circumstances, when this processing is not performed on data symbols 402 and data symbols 502, in the reception device, when data symbols 402 and data symbols 502 are demodulated and decoded, there is a need to perform the demodulation and decoding in which the processing for the phase change by phase changers 209A, 209B was performed, and there is a probability that this processing will be complicated. This is because "symbols for signal detection, symbols for frequency and time synchronization, and symbols for channel estimation, which are included in other symbols 403 and other symbols 503" are applied with a phase change by phase changers 209A, 209B.

However, as illustrated in FIG. 19, in phase changers 209A, 209B, when a phase change is applied to data symbols 402 and data symbols 502, in the reception device, there is the advantage that data symbols 402 and data symbols 502 can simply be demodulated and decoded using the channel estimation signal (propagation path fluctuation signal) estimated by using "symbols for signal detection, symbols for frequency and time synchronization, and symbols for channel estimation, which are included in other symbols 403 and other symbols 503".

Additionally as illustrated in FIG. 19, in phase changers 209A, 209B, when a phase change is applied to data symbols 402 and data symbols 502, in multipath environments, it is possible to reduce the influence of sharp drops in electric field intensity along the frequency axis. Accordingly, it is possible to obtain the advantageous effect of an improvement in data reception quality of data symbols 402 and data symbols 502.

In this way, the point that "symbols that are targets for implementation of a phase change by phase changer 205B" and "symbols that are targets for implementation of a phase change by phase changers 209A, 209B" are different is a characteristic point.

As described above, by applying a phase change using phase changer 205B illustrated in FIG. 19, it is possible to achieve the advantageous effect of an improvement in data reception quality of data symbols 402 and data symbols 502 in the reception device in, for example, LOS environments, and by applying a phase change using phase changers 209A, 209B illustrated in FIG. 19, for example, it is possible to achieve the advantageous effect of an improvement in data reception quality in the reception device of the control information symbols included in "the frames of FIG. 4 and FIG. 5" or "the frames of FIG. 13 and FIG. 14" and the advantageous effect that operations of demodulation and decoding of data symbols 402 and data symbols 502 become simple.

Note that the advantageous effect of an improvement in data reception quality in the reception device of data symbols 402 and data symbols 502 in, for example, LOS environments, is achieved as a result of the phase change implemented by phase changer 205B illustrated in FIG. 19 and furthermore, the reception quality of data symbols 402 and data symbols 502 is improved by applying a phase change to data symbols 402 and data symbols 502 using phase changers 209A, 209B illustrated in FIG. 19.

Note that Q in Equation (38) may be an integer of −2 or less. In such a case, the value for the phase change cycle is the absolute value of Q. This feature is applicable to Embodiment 1 as well.

Note that R in Equation (49) may be an integer of −2 or less. In such a case, the value for the phase change cycle is the absolute value of R.

Moreover, taking into consideration the descriptions provided in Supplemental Information 1, the cyclic delay amount set in phase changer 209A and the cyclic delay amount set in phase changer 209B may be different values.

Embodiment 4

In this embodiment, an implementation method will be described that is different from the configuration illustrated in FIG. 2 and described in Embodiment 1.

FIG. 1 illustrates one example of a configuration of a transmission device according to this embodiment, such as a base station, access point, or broadcast station. As FIG. 1 is described in detail in Embodiment 1, description will be omitted from this embodiment.

Signal processor 106 receives inputs of mapped signals 105_1 and 105_2, signal group 110, and control signal 100, performs signal processing based on control signal 100, and outputs processed signals 106_A and 106_B. Here, processed signal 106_A is expressed as u1(i), and processed signal 106_B is expressed as u2(i). i is a symbol number, and, for example, is an integer that is greater than or equal to 0. Note that details regarding the signal processing will be described with reference to FIG. 20 later.

Figure 20:
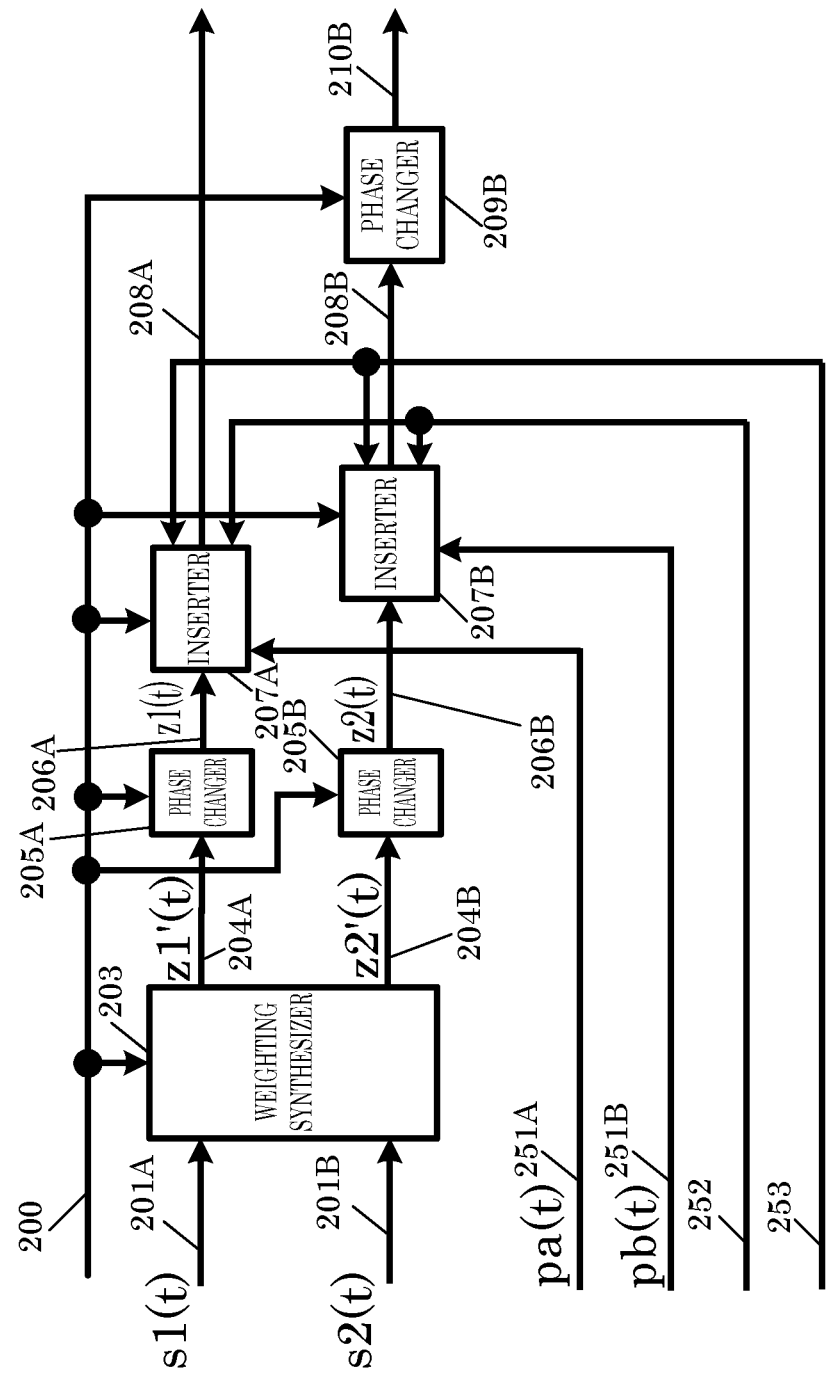
FIG. 20 illustrates one example of a configuration of the signal processor illustrated in FIG. 1.

FIG. 20 illustrates one example of a configuration of signal processor 106 illustrated in FIG. 1. Weighting synthesizer (precoder) 203 receives inputs of mapped signal 201A (mapped signal 105_1 in FIG. 1), mapped signal 201B (mapped signal 105_2 in FIG. 1), and control signal 200 (control signal 100 in FIG. 1), performs weighting synthesis (precoding) based on control signal 200, and outputs weighted signal 204A and weighted signal 204B.

Here, mapped signal 201A is expressed as s1(t), mapped signal 201B is expressed as s2(t), weighted signal 204A is expressed as z1'(t), and weighted signal 204B is expressed as z2'(t). Note that one example of t is time. s1(t), s2(t), z1'(t), and z2'(t) are defined as complex numbers, and as such, may be actual numbers.

Here, these are given as functions of time, but may be functions of a "frequency (carrier number)", and may be functions of "time and frequency". These may also be a function of a "symbol number". Note that this also applies to Embodiment 1.

Weighting synthesizer (precoder) 203 performs the following calculation.

[MATH. 50]

$$\begin{pmatrix} z1'(i) \\ z2'(i) \end{pmatrix} = \begin{pmatrix} a & b \\ c & d \end{pmatrix} \begin{pmatrix} s1(i) \\ s2(i) \end{pmatrix} \qquad \text{Equation (50)}$$

Phase changer 205A receives inputs of weighting synthesized signal 204A and control signal 200, applies a phase change to weighting synthesized signal 204A based on control signal 200, and outputs phase-changed signal 206A. Note that phase-changed signal 206A is expressed as z1(t). z1(t) is defined as a complex number and may be an actual number.

Next, specific operations performed by phase changer 205A will be described. In phase changer 205A, for example, a phase change of w(i) is applied to z1'(i). Accordingly, z1(i) can be expressed as z1(i)=w(i)×z1'(i). Note that i is a symbol number and is an integer that is greater than or equal to 0.

For example, the phase change value is set as follows.

[MATH. 51]

$$w(i) = e^{j\frac{2 \times \pi \times i}{M}} \qquad \text{Equation (51)}$$

M is an integer that is greater than or equal to 2, and represents the number of phase change cycles. When M is set to an odd number greater than or equal to 3, data reception quality may increase. However, Equation (51) is merely a non-limiting example. Here, phase change value $w(i)=e^{j \times \lambda(i)}$.

Phase changer 205B receives inputs of weighting synthesized signal 204B and control signal 200, applies a phase change to weighting synthesized signal 204B based on control signal 200, and outputs phase-changed signal 206B. Note that phase-changed signal 206B is expressed as z2(t). z2(t) is defined as a complex number and may be an actual number.

Next, specific operations performed by phase changer 205B will be described. In phase changer 205B, for example, a phase change of y(i) is applied to z2'(i). Accordingly, z2(i) can be expressed as z2(i)=y(i)×z2'(i). Note that i is a symbol number and is an integer that is greater than or equal to 0.

For example, the phase change value is set as indicated in Equation (2). Note that N is an integer that is greater than or equal to 2, and represents the number of phase change cycles. N≠M is satisfied. When N is set to an odd number greater than or equal to 3, data reception quality may increase. However, Equation (2) is merely a non-limiting example. Here, phase change value $y(i)=e^{j\times\delta(i)}$.

Here, z1(i) and z2(i) are expressed with the following equation.

[MATH. 52]

$$\begin{pmatrix} z1(i) \\ z2(i) \end{pmatrix} = \begin{pmatrix} w(i) & 0 \\ 0 & y(i) \end{pmatrix} \begin{pmatrix} a & b \\ c & d \end{pmatrix} \begin{pmatrix} s1(i) \\ s2(i) \end{pmatrix}$$
$$= \begin{pmatrix} e^{j\times\lambda(i)} & 0 \\ 0 & e^{j\times\delta(i)} \end{pmatrix} \begin{pmatrix} a & b \\ c & d \end{pmatrix} \begin{pmatrix} s1(i) \\ s2(i) \end{pmatrix}$$

Equation (52)

Note that S(i) and λ(i) are actual numbers. z1(i) and z2(i) are transmitted from the transmission device at the same time and using the same frequency (same frequency band). In Equation (52), the phase change value is not limited to the value used in Equations (2) and (52); for example, a method in which the phase is changed cyclically or regularly is conceivable.

As described in Embodiment 1, conceivable examples of the (precoding) matrix inserted in Equation (50) and Equation (52) are illustrated in Equation (5) through Equation (36). However, the precoding matrix is not limited to these examples. The same applies to Embodiment 1.

Inserter 207A receives inputs of weighting synthesized signal 204A, pilot symbol signal pa(t)251A, preamble signal 252, control information symbol signal 253, and control signal 200, and based on information on the frame configuration included in control signal 200, outputs baseband signal 208A based on the frame configuration. Note that t indicates time.

Similarly, inserter 207B receives inputs of phase-changed signal 206B, pilot symbol signal pb(t)251B, preamble signal 252, control information symbol signal 253, and control signal 200, and based on information on the frame configuration included in control signal 200, outputs baseband signal 208B based on the frame configuration.

Phase changer 209B receives inputs of baseband signal 208B and control signal 200, applies a phase change to baseband signal 208B based on control signal 200, and outputs phase-changed signal 210B. Baseband signal 208B is a function of symbol number i, and is expressed as x'(i). Then, phase-changed signal x(i)210B can be expressed as $x(i)=e^{j\times\varepsilon(i)}\times x'(i)$. Here, i is an integer that is greater than or equal to 0, and j is an imaginary number unit.

Note that the operation performed by phase changer 209B may be CDD/CSD disclosed in NPTL 2 and 3, as described in Embodiment 1. Phase changer 209B then applies a phase change to a symbol present along the frequency axis. In other words, phase changer 209B applies a phase change to, for example, a data symbol, a pilot symbol, and/or a control information symbol.

FIG. 3 illustrates one example of a configuration of radio units 107_A and 107_B illustrated in FIG. 1. FIG. 3 is described in Embodiment 1. Accordingly description will be omitted from this embodiment.

FIG. 4 illustrates a frame configuration of transmission signal 108_A illustrated in FIG. 1. FIG. 4 is described in Embodiment 1. Accordingly, description will be omitted from this embodiment.

FIG. 5 illustrates a frame configuration of transmission signal 108_B illustrated in FIG. 1. FIG. 5 is described in Embodiment 1. Accordingly, description will be omitted from this embodiment.

When a symbol is present in carrier A at time $B in FIG. 4 and a symbol is present in carrier A at time $B in FIG. 5, the symbol in carrier A at time $B in FIG. 4 and the symbol in carrier A at time $B in FIG. 5 are transmitted at the same time and same frequency. Note that the frame configuration is not limited to the configurations illustrated in FIG. 4 and FIG. 5; FIG. 4 and FIG. 5 are mere examples of frame configurations.

The other symbols in FIG. 4 and FIG. 5 are symbols corresponding to "preamble signal 252 and control information symbol signal 253 in FIG. 2". Accordingly when an other symbol 503 in FIG. 5 at the same time and same frequency (same carrier) as an other symbol 403 in FIG. 4 transmits control information, it transmits the same data (the same control information).

Note that this is under the assumption that the frame of FIG. 4 and the frame of FIG. 5 are received at the same time by the reception device, but even when the frame of FIG. 4 or the frame of FIG. 5 has been received, the reception device can obtain the data transmitted by the transmission device.

FIG. 6 illustrates one example of components relating to control information generation for generating control information symbol signal 253 illustrated in FIG. 2. FIG. 6 is described in Embodiment 1. Accordingly description will be omitted from this embodiment.

FIG. 7 illustrates one example of a configuration of antenna unit #A 109_A and antenna unit #B 109_B illustrated in FIG. 1. In this example, antenna unit #A 109_A and antenna unit #B 109_B include a plurality of antennas. FIG. 7 is described in Embodiment 1. Accordingly description will be omitted from this embodiment.

FIG. 8 illustrates one example of a configuration of a reception device that receives a modulated signal upon the transmission device illustrated in FIG. 1 transmitting, for example, a transmission signal having the frame configuration illustrated in FIG. 4 or FIG. 5. FIG. 8 is described in Embodiment 1. Accordingly description will be omitted from this embodiment.

FIG. 10 illustrates one example of a configuration of antenna unit #X 801X and antenna unit #Y 801Y illustrated in FIG. 8. In this example, antenna unit #X 801X and antenna unit #Y 801Y include a plurality of antennas. FIG. 10 is described in Embodiment 1. Accordingly description will be omitted from this embodiment.

Next, signal processor 106 in the transmission device illustrated in FIG. 1 is inserted as phase changers 205A, 205B and phase changer 209A, as illustrated in FIG. 20. The characteristics and advantageous effects of this configuration will be described.

As described with reference to FIG. 4 and FIG. 5, phase changers 205A, 205B apply precoding (weighted synthesis) to mapped signal s1(i) 201A obtained via mapping using the first sequence and mapped signal s2(i) 201B obtained via mapping using the second sequence, and apply a phase change to the obtained weighting synthesized signals 204A and 204B. Phase-changed signal 206A and phase-changed signal 206B are then transmitted at the same frequency and at the same time. Accordingly in FIG. 4 and FIG. 5, a phase change is applied to data symbol 402 in FIG. 4 and data symbol 502 in FIG. 5. Note that i is a symbol number and is an integer that is greater than or equal to 0.

For example, FIG. 11 illustrates an extraction of carrier 1 through carrier 5 and time $4 through time $6 from the frame illustrated in FIG. 4. Note that in FIG. 11, similar to FIG. 4, pilot symbol 401, data symbols 402, and other symbols 403 are shown.

As described above, among the symbols illustrated in FIG. 11, phase changer 205A applies a phase change to the data symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6).

Accordingly the phase change values for the data symbols illustrated in FIG. 11 can be expressed as "$e^{j \times \lambda 15(i)}$" for (carrier 1, time $5), "$e^{j \times \lambda 25(i)}$" for (carrier 2, time $5), "$e^{j \times \lambda 35(i)}$" for (carrier 3, time $5), "$e^{j \times \lambda 45(i)}$" for (carrier 4, time $5), "$e^{j \times \lambda 55(i)}$" (carrier 5, time $5), "$e^{j \times \lambda 16(i)}$" for (carrier 1, time $6), "$e^{j \times \lambda 26(i)}$" for (carrier 2, time $6), "$e^{j \times \lambda 46(i)}$" for (carrier 4, time $6), and "$e^{j \times \lambda 56(i)}$" for (carrier 5, time $6).

Among the symbols illustrated in FIG. 11, the other symbols located at (carrier 1, time $4), (carrier 2, time $4), (carrier 3, time $4), (carrier 4, time $4), and (carrier 5, time $4), and the pilot symbol located at (carrier 3, time $6) are not subject to phase change by phase changer 205A.

This point is a characteristic of phase changer 205A. Note that, as illustrated in FIG. 4, data carriers are arranged at "the same carriers and the same times" as the symbols subject to phase change in FIG. 11, which are the data symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6).

In other words, in FIG. 4, the symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6) are data symbols.

In other words, data symbols that perform MIMO transmission or transmit a plurality of streams are subject to phase change by phase changer 205A.

One example of the phase change that phase changer 205A applies to the data symbols is the method given in Equation (50) in which phase change is applied to the data symbols regularly such as at each cycle N. However, the method of applying the phase change to the data symbols is not limited to this example.

For example, FIG. 11 illustrates an extraction of carrier 1 through carrier 5 and time $4 through time $6 from the frame illustrated in FIG. 5. Note that In FIG. 11, similar to FIG. 5, pilot symbol 501, data symbols 502, and other symbols 503 are shown.

As described above, among the symbols illustrated in FIG. 11, phase changer 205B applies a phase change to the data symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6).

Accordingly the phase change values for the data symbols illustrated in FIG. 11 can be expressed as "$e^{j \times \delta 15(i)}$" for (carrier 1, time $5), "$e^{j \times \delta 25(i)}$" for (carrier 2, time $5), "$e^{j \times \delta 35(i)}$" for (carrier 3, time $5), "$e^{j \times \delta 45(i)}$" for (carrier 4, time $5), "$e^{j \times \delta 55(i)}$" (carrier 5, time $5), "$e^{j \times \delta 16(i)}$" for (carrier 1, time $6), "$e^{j \times \delta 26(i)}$" for (carrier 2, time $6), "$e^{j \times \delta 46(i)}$" for (carrier 4, time $6), and "$e^{j \times \delta 56(i)}$" for (carrier 5, time $6).

Among the symbols illustrated in FIG. 11, the other symbols located at (carrier 1, time $4), (carrier 2, time $4), (carrier 3, time $4), (carrier 4, time $4), and (carrier 5, time $4), and the pilot symbol located at (carrier 3, time $6) are not subject to phase change by phase changer 205B.

This point is a characteristic of phase changer 205B. Note that, as illustrated in FIG. 4, data carriers are arranged at "the same carriers and the same times" as the symbols subject to phase change in FIG. 11, which are the data symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6).

In other words, in FIG. 4, the symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6) are data symbols.

In other words, data symbols that perform MIMO transmission or transmit a plurality of streams are subject to phase change by phase changer 205B.

One example of the phase change that phase changer 205B applies to the data symbols is the method given in Equation (2) in which phase change is applied to the data symbols regularly such as at each cycle N. However, the method of applying the phase change to the data symbols is not limited to this example.

With this, when the environment is one in which the direct waves are dominant, such as in an LOS environment, it is possible to achieve improved data reception quality in the reception device with respect to the data symbols that perform MIMO transmission or transmit a plurality of streams. Next, the advantageous effects of this will be described.

For example, the modulation scheme used by mapper 104 in FIG. 1 is QPSK. Mapped signal 201A in FIG. 18 is a QPSK signal, and mapped signal 201B is a QPSK signal. In other words, two QPSK streams are transmitted.

Accordingly for example, using channel estimated signals 806_1 and 806_2, 16 candidate signal points are obtained by signal processor 811 illustrated in FIG. 8. 2-bit transmission is possible with QPSK. Accordingly since there are two streams, 4-bit transmission is achieved. Thus, there are 24=16 candidate signal points.

Note that 16 other candidate signal points are obtained from using channel estimated signals 808_1 and 808_2 as well, but since description thereof is the same as described above, the following description will focus on the 16 candidate signal points obtained by using channel estimated signals 806_1 and 806_2.

FIG. 12 illustrates an example of the state resulting from such a case. In FIG. 12A and FIG. 12B, in-phase I is represented on the horizontal axis and orthogonal Q is represented on the vertical axis. 16 candidate signal points are present in the illustrated in-phase I-orthogonal Q planes. Among the 16 candidate signal points, one is a signal point that is transmitted by the transmission device. This is why these are referred to as "16 candidate signal points".

When the environment is one in which the direct waves are dominant, such as in an LOS environment, a first conceivable case is "when phase changers 205A, 205B are omitted from the configuration illustrated in FIG. 20, in other words, when phase change is not applied by phase changers 205A, 205B in FIG. 20".

In the first case, since phase change is not applied, there is a possibility that the state illustrated in FIG. 12A will be realized. When the state falls into the state illustrated in FIG. 12A, as illustrated by "signal points 1201 and 1202", "signal points 1203, 1204, 1205, and 1206", and "signal points 1207, 1208", the signal points become dense, that is to say the distances between some signal points shorten. Accordingly in the reception device illustrated in FIG. 8, data reception quality may decrease.

In order to remedy this phenomenon, in FIG. 20, phase changers 205A, 205B are inserted. When phase changers 205A, 205B are inserted, due to symbol number i, there is a mix of symbol numbers whose signal points are dense, such as in FIG. 12A, and symbol numbers whose "distance between signal points is long", such as in FIG. 12B. With respect to this state, since error correction code is introduced, high error correction performance is achieved, and in the reception device illustrated in FIG. 8, high data reception quality is achieved.

Note that in FIG. 20, a phase change is not applied by phase changers 205A, 205B in FIG. 20 to "pilot symbols, preamble" for demodulating (wave detection of) data symbols, such as pilot symbols and a preamble, and for channel estimation. With this, among data symbols, "due to symbol number i, there is a mix of symbol numbers whose signal points are dense, such as in FIG. 12A, and symbol numbers whose "distance between signal points is long", such as in FIG. 12B" can be realized.

However, even if a phase change is applied by phase changers 205A, 205B in FIG. 20 to "pilot symbols, preamble" for demodulating (wave detection of) data symbols, such as pilot symbols and a preamble, and for channel estimation, the following is possible: "among data symbols, "due to symbol number i, there is a mix of symbol numbers whose signal points are dense, such as in FIG. 12A, and symbol numbers whose "distance between signal points is long", such as in FIG. 12B" can be realized.

In such a case, a phase change must be applied to pilot symbols and/or a preamble under some condition. For example, one conceivable method is to implement a rule which is separate from the rule for applying a phase change to a data symbol, and "applying a phase change to a pilot symbol and/or a preamble". Another example is a method of regularly applying a phase change to a data symbol in a cycle N, and regularly applying a phase change to a pilot symbol and/or a preamble in a cycle M. N and M are integers that are greater than or equal to 2.

As described above, phase changer 209B receives inputs of baseband signal 208B and control signal 200, applies a phase change to baseband signal 208B based on control signal 200, and outputs phase-changed signal 210B. Baseband signal 208B is a function of symbol number i, and is expressed as x'(i). Then, phase-changed signal 210B (x(i)) can be expressed as $x(i)=e^{j\times\varepsilon(i)}\times x'(i)$. Here, i is an integer that is greater than or equal to 0, and j is an imaginary number unit.

Note that the operation performed by phase changer 209B may be CDD/CSD disclosed in NPTL 2 and 3. Phase changer 209B then applies a phase change to a symbol present along the frequency axis. Phase changer 209B applies a phase change to, for example, a data symbol, a pilot symbol, and/or a control information symbol. Accordingly in such a case, symbols subject to symbol number i include data symbols, pilot symbols, control information symbols, and preambles (other symbols).

In the case of FIG. 20, since phase changer 209B applies a phase change to baseband signal 208B, a phase change is applied to each symbol in FIG. 5.

Accordingly in the frame illustrated in FIG. 5, phase changer 209B illustrated in FIG. 20 applies a phase change to all symbols (other symbols 503) for all carriers at time $1.

Similarly, phase changer 209B illustrated in FIG. 20 applies a phase change to the following symbols: "all symbols (other symbols 503) for all carriers at time $2", "all symbols (other symbols 503) for all carriers at time $3", "all symbols (other symbols 503) for all carriers at time $4", "all symbols (pilot symbols 501 or data symbols 502) for all carriers at time $5", "all symbols (pilot symbols 501 or data symbols 502) for all carriers at time $6", "all symbols (pilot symbols 501 or data symbols 502) for all carriers at time $7", "all symbols (pilot symbols 501 or data symbols 502) for all carriers at time $8", "all symbols (pilot symbols 501 or data symbols 502) for all carriers at time $9", "all symbols (pilot symbols 501 or data symbols 502) for all carriers at time $10", "all symbols (pilot symbols 501 or data symbols 502) for all carriers at time $11". Recitation for other times and carriers is omitted.

FIG. 13 illustrates a frame configuration different from the frame configuration illustrated in FIG. 4 of transmission signal 108_A illustrated in FIG. 1. FIG. 13 is described in Embodiment 1. Accordingly description will be omitted from this embodiment.

FIG. 14 illustrates a frame configuration different from the frame configuration illustrated in FIG. 5 of transmission signal 108_B illustrated in FIG. 1. FIG. 14 is described in Embodiment 1. Accordingly description will be omitted from this embodiment.

When a symbol is present in carrier A at time $B in FIG. 13 and a symbol is present in carrier A at time $B in FIG. 14, the symbol in carrier A at time $B in FIG. 13 and the symbol in carrier A at time $B in FIG. 14 are transmitted at the same time and same frequency. Note that the frame configurations illustrated in FIG. 13 and FIG. 14 are merely examples.

The other symbols in FIG. 13 and FIG. 14 are symbols corresponding to "preamble signal 252 and control information symbol signal 253 in FIG. 20". Accordingly when an other symbol 403 in FIG. 13 at the same time and same frequency (same carrier) as an other symbol 503 in FIG. 14 transmits control information, it transmits the same data (the same control information).

Note that this is under the assumption that the frame of FIG. 13 and the frame of FIG. 14 are received at the same time by the reception device, but even when the frame of FIG. 13 or the frame of FIG. 14 has been received, the reception device can obtain the data transmitted by the transmission device.

Phase changer 209B receives inputs of baseband signal 208B and control signal 200, applies a phase change to baseband signal 208B based on control signal 200, and outputs phase-changed signal 210B. Baseband signal 208B is a function of symbol number i, and is expressed as x'(i).

Then, phase-changed signal 210B (x(i)) can be expressed as $x(i)=e^{j\times\varepsilon(i)}\times x'(i)$. Here, i is an integer that is greater than or equal to 0, and j is an imaginary number unit. Note that the operation performed by phase changer 209B may be CDD/CSD disclosed in NPTL 2 and 3.

Phase changer 209B then applies a phase change to a symbol present along the frequency axis. Phase changer 209B applies a phase change to, for example, a data symbol, a pilot symbol, and/or a control information symbol. Here, a null symbol may be considered as a target for application of a phase change. Accordingly symbols subject to symbol number i include, for example, data symbols, pilot symbols, control information symbols, preambles (other symbols), and null symbols.

However, since the in-phase component I is zero (0) and the orthogonal component Q is zero (0), even if a phase change is applied to a null symbol, the signals before and after the phase change are the same. Accordingly it is possible to construe a null symbol as not a target for a phase change. In the case of FIG. 20, since phase changer 209B applies a phase change to baseband signal 208B, a phase change is applied to each symbol in FIG. 14.

Accordingly in the frame illustrated in FIG. 14, phase changer 209B illustrated in FIG. 20 applies a phase change to all symbols (other symbols 503) for all carriers at time $1. However, the handling of the phase change with respect to null symbol 1301 is as previously described.

Similarly phase changer 209B illustrated in FIG. 20 applies a phase change to the following symbols: "all symbols (other symbols 503) for all carriers at time $2", "all symbols (other symbols 503) for all carriers at time $3", "all symbols (other symbols 503) for all carriers at time $4", "all symbols (pilot symbols 501 or data symbols 502) for all carriers at time $5", "all symbols (pilot symbols 501 or data symbols 502) for all carriers at time $6", "all symbols (pilot symbols 501 or data symbols 502) for all carriers at time $7", "all symbols (pilot symbols 501 or data symbols 502) for all carriers at time $8", "all symbols (pilot symbols 501 or data symbols 502) for all carriers at time $9", "all symbols (pilot symbols 501 or data symbols 502) for all carriers at time $10", "all symbols (pilot symbols 501 or data symbols 502) for all carriers at time $11". However, the handling of the phase change with respect to null symbol 1301 is as previously described. Recitation for other times and carriers is omitted.

The phase change value of phase changer 209B is expressed as $\Omega(i)$. Baseband signal 208B is x'(i) and phase-changed signal 210B is x(i). Accordingly x(i)=$\Omega(i) \times$x'(i) holds true.

For example, the phase change value is set as in Equation (38). Q is an integer that is greater than or equal to 2, and represents the number of phase change cycles. j is an imaginary number unit. However, Equation (38) is merely a non-limiting example.

For example, $\Omega(i)$ may be set so as to implement a phase change that yields a cycle Q.

Moreover, for example, in FIG. 5 and FIG. 14, the same phase change value is applied to the same carriers, and the phase change value may be set on a per carrier basis. For example, the following may be implemented.

Regardless of time, the phase change value may be as in Equation (39) for carrier 1 in FIG. 5 and FIG. 14.

Regardless of time, the phase change value may be as in Equation (40) for carrier 2 in FIG. 5 and FIG. 14.

Regardless of time, the phase change value may be as in Equation (41) for carrier 3 in FIG. 5 and FIG. 14.

Regardless of time, the phase change value may be as in Equation (42) for carrier 4 in FIG. 5 and FIG. 14. Recitation for other times and carriers is omitted.

This concludes the operational example of phase changer 209B illustrated in FIG. 20.

Next, the advantageous effects obtained by phase changer 209B illustrated in FIG. 20 will be described.

The other symbols 403, 503 in "the frames of FIG. 4 and FIG. 5" or "the frames of FIG. 13 and FIG. 14" may include a control information symbol. As previously described, when an other symbol 503 in FIG. 5 at the same time and same frequency (in the same carrier) as an other symbol 403 transmits control information, it transmits the same data (same control information).

As case 2, "transmitting a control information symbol using either antenna unit #A 109_A or antenna unit #B 109_B illustrated in FIG. 1" is conceivable.

When transmission according to "case 2" is performed, since only one antenna is used to transmit the control information symbol, compared to when "transmitting a control information symbol using both antenna unit #A 109_A and antenna unit #B 109_B" is performed, spatial diversity gain is less. Accordingly in "case 2", data reception quality decreases even when received by the reception device illustrated in FIG. 8. Accordingly from the perspective of improving data reception quality "transmitting a control information symbol using both antenna unit #A 109_A and antenna unit #B 109_B" is more beneficial.

As case 3, "transmitting a control information symbol using both antenna unit #A 109A and antenna unit #B 109B illustrated in FIG. 1. However, phase change is not implemented by phase changer 209B illustrated in FIG. 20" is conceivable.

When transmission according to "case 3" is performed, since the modulated signal transmitted from antenna unit #A 109_A and the modulated signal transmitted from antenna unit #B 109_B are the same or exhibit a specific phase shift, depending on the radio wave propagation environment, the reception device illustrated in FIG. 8 may receive an inferior reception signal, and both modulated signal may be subjected to the same multipath effect. Accordingly in the reception device illustrated in FIG. 8, data reception quality decreases.

In order to remedy this phenomenon, in FIG. 20, phase changer 209B is inserted. Since this changes the phase along the time or frequency axis, in the reception device illustrated in FIG. 8, it is possible to reduce the probability of reception of an inferior reception signal. Moreover, since there is a high probability that there will be a difference in the multipath effect that the modulated signal transmitted from antenna unit #A 109_A is subjected to with respect to the multipath effect that the modulated signal transmitted from antenna unit #B 109_B is subjected to, there is a high probability that diversity gain will result, and accordingly that data reception quality in the reception device illustrated in FIG. 8 will improve.

For these reasons, in FIG. 20, phase changer 209B is provided and phase change is implemented.

Other symbols 403 and other symbols 503 include, in addition to control information symbols, for example, symbols for signal detection, symbols for performing frequency and time synchronization, and symbols for performing channel estimation (a symbol for performing propagation path fluctuation estimation), for demodulating and decoding control information symbols. Moreover, "the frames of FIG. 4 and FIG. 5" or "the frames of FIG. 13 and FIG. 14" include pilot symbols 401, 501, and by using these, it is possible to perform demodulation and decoding with high precision via control information symbols.

Moreover, "the frames of FIG. 4 and FIG. 5" or "the frames of FIG. 13 and FIG. 14" transmit a plurality of streams or perform MIMO transmission at the same time and using the same frequency (frequency band) via data symbols 402 and data symbols 502.

In order to demodulate these data symbols, symbols for signal detection, symbols for frequency and time synchronization, and symbols for channel estimation, which are included in other symbols 403 and other symbols 503, are used.

Here, "symbols for signal detection, symbols for frequency and time synchronization, and symbols for channel estimation, which are included in other symbols 403 and other symbols 503" are applied with a phase change by phase changer 209B, as described above.

Under these circumstances, when this processing is not performed "on data symbols 402 and data symbols 502" or "on data symbols 502 in the example above", in the reception device, when data symbols 402 and data symbols 502 are demodulated and decoded, there is a need to perform the demodulation and decoding in which the processing for the phase change by phase changer 209B was performed, and there is a probability that this processing will be complicated.

This is because "symbols for signal detection, symbols for frequency and time synchronization, and symbols for channel estimation, which are included in other symbols 403 and other symbols 503" are applied with a phase change by phase changer 209B.

However, as illustrated in FIG. 20, in phase changer 209B, when a phase change is applied "to data symbols 402 and data symbols 502" or "to data symbols 502 in the example above", in the reception device, there is the advantage that data symbols 402 and data symbols 502 can simply be demodulated and decoded using the channel estimation signal (propagation path fluctuation signal) estimated by using "symbols for signal detection, symbols for frequency and time synchronization, and symbols for channel estimation, which are included in other symbols 403 and other symbols 503".

Additionally as illustrated in FIG. 20, in phase changer 209B, when a phase change is applied "to data symbols 402 and data symbols 502" or "to data symbols 502 in the example above", in multipath environments, it is possible to reduce the influence of sharp drops in electric field intensity along the frequency axis. Accordingly it is possible to obtain the advantageous effect of an improvement in data reception quality of data symbols 402 and data symbols 502.

In this way, the point that "symbols that are targets for implementation of a phase change by phase changers 205A, 205B" and "symbols that are targets for implementation of a phase change by phase changer 209B" are different is a characteristic point.

As described above, by applying a phase change using phase changers 205A, 205B illustrated in FIG. 20, it is possible to achieve the advantageous effect of an improvement in data reception quality of data symbols 402 and data symbols 502 in the reception device in, for example, LOS environments, and by applying a phase change using phase changer 209B illustrated in FIG. 20, for example, it is possible to achieve the advantageous effect of an improvement in data reception quality in the reception device of the control information symbols included in "the frames of FIG. 4 and FIG. 5" or "the frames of FIG. 13 and FIG. 14" and the advantageous effect that operations of demodulation and decoding of data symbols 402 and data symbols 502 become simple.

Note that the advantageous effect of an improvement in data reception quality in the reception device of data symbols 402 and data symbols 502 in, for example, LOS environments, is achieved as a result of the phase change implemented by phase changers 205A, 205B illustrated in FIG. 20, and furthermore, the reception quality of data symbols 402 and data symbols 502 is improved by applying a phase change to data symbols 402 and data symbols 502 using phase changer 209B illustrated in FIG. 20.

Note that Q in Equation (38) may be an integer of −2 or less. In such a case, the value for the phase change cycle is the absolute value of Q. This feature is applicable to Embodiment 1 as well.

Embodiment 5

In this embodiment, an implementation method will be described that is different from the configuration illustrated in FIG. 2 and described in Embodiment 1.

FIG. 1 illustrates one example of a configuration of a transmission device according to this embodiment, such as a base station, access point, or broadcast station. As FIG. 1 is described in detail in Embodiment 1, description will be omitted from this embodiment.

Signal processor 106 receives inputs of mapped signals 105_1 and 105_2, signal group 110, and control signal 100, performs signal processing based on control signal 100, and outputs processed signals 106_A and 106_B. Here, processed signal 106_A is expressed as u1(i), and processed signal 106_B is expressed as u2(i). i is a symbol number, and, for example, is an integer that is greater than or equal to 0. Note that details regarding the signal processing will be described with reference to FIG. 21 later.

Figure 21:
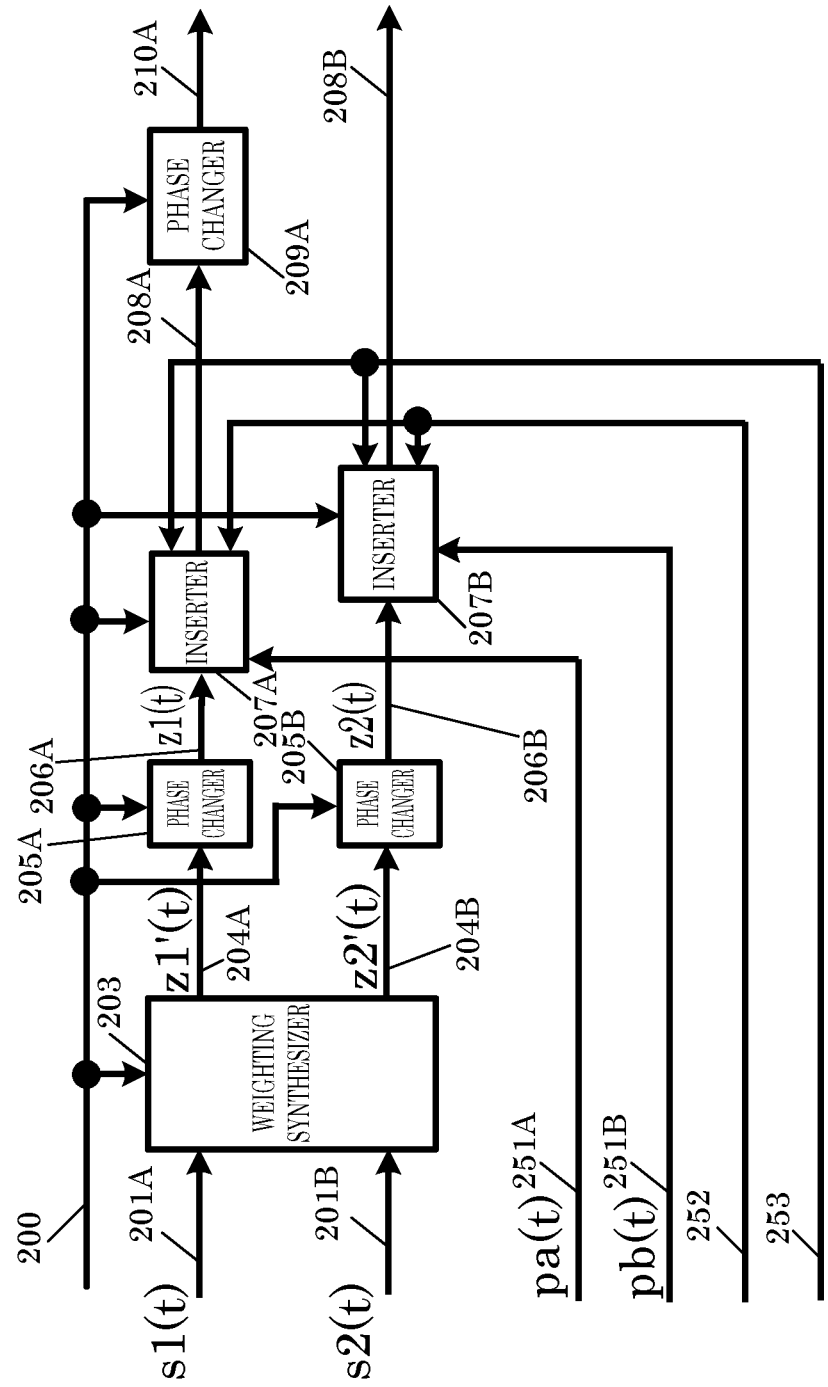
FIG. 21 illustrates one example of a configuration of the signal processor illustrated in FIG. 1.

FIG. 21 illustrates one example of a configuration of signal processor 106 illustrated in FIG. 1. Weighting synthesizer (precoder) 203 receives inputs of mapped signal 201A (mapped signal 105_1 in FIG. 1), mapped signal 201B (mapped signal 105_2 in FIG. 1), and control signal 200 (control signal 100 in FIG. 1), performs weighting synthesis (precoding) based on control signal 200, and outputs weighted signal 204A and weighted signal 204B.

Here, mapped signal 201A is expressed as s1(t), mapped signal 201B is expressed as s2(t), weighted signal 204A is expressed as z1'(t), and weighted signal 204B is expressed as z2'(t). Note that one example of t is time. s1(t), s2(t), z1'(t), and z2'(t) are defined as complex numbers, and as such, may be actual numbers.

Here, these are given as functions of time, but may be functions of a "frequency (carrier number)", and may be functions of "time and frequency". These may also be a function of a "symbol number". Note that this also applies to Embodiment 1.

Weighting synthesizer (precoder) 203 performs the calculations indicated in Equation (49).

Phase changer 205A receives inputs of weighting synthesized signal 204A and control signal 200, applies a phase change to weighting synthesized signal 204A based on control signal 200, and outputs phase-changed signal 206A. Note that phase-changed signal 206A is expressed as z1(t). z1(t) is defined as a complex number and may be an actual number.

Next, specific operations performed by phase changer 205A will be described. In phase changer 205A, for example, a phase change of w(i) is applied to z1'(i). Accordingly, z1(i) can be expressed as z1(i)=w(i)×z1'(i). Note that i is a symbol number and is an integer that is greater than or equal to 0.

For example, the phase change value is set as indicated in Equation (50).

M is an integer that is greater than or equal to 2, and represents the number of phase change cycles. When M is set to an odd number greater than or equal to 3, data reception quality may increase. However, Equation (50) is merely a non-limiting example. Here, phase change value $w(i)=e^{j \times \lambda(i)}$.

Phase changer 205B receives inputs of weighting synthesized signal 204B and control signal 200, applies a phase change to weighting synthesized signal 204B based on control signal 200, and outputs phase-changed signal 206B.

Note that phase-changed signal 206B is expressed as z2(t). z2(t) is defined as a complex number and may be an actual number.

Next, specific operations performed by phase changer 205B will be described. In phase changer 205B, for example, a phase change of y(i) is applied to z2'(i). Accordingly, z2(i) can be expressed as z2(i)=y(i)×z2'(i). Note that i is a symbol number and is an integer that is greater than or equal to 0.

For example, the phase change value is set as indicated in Equation (2). Note that N is an integer that is greater than or equal to 2, and represents the number of phase change cycles. N≠M is satisfied. When N is set to an odd number greater than or equal to 3, data reception quality may increase. However, Equation (2) is merely a non-limiting example. Here, phase change value $y(i)=e^{j \times \delta(i)}$.

Here, z1(i) and z2(i) can be expressed with Equation (51).

Note that δ(i) and λ(i) are actual numbers. z1(i) and z2(i) are transmitted from the transmission device at the same time and using the same frequency (same frequency band). In Equation (51), the phase change value is not limited to the value used in Equations (2) and (51); for example, a method in which the phase is changed cyclically or regularly is conceivable.

As described in Embodiment 1, conceivable examples of the (precoding) matrix inserted in Equation (49) and Equation (51) are illustrated in Equation (5) through Equation (36). However, the precoding matrix is not limited to these examples. The same applies to Embodiment 1.

Inserter 207A receives inputs of weighting synthesized signal 204A, pilot symbol signal pa(t)251A, preamble signal 252, control information symbol signal 253, and control signal 200, and based on information on the frame configuration included in control signal 200, outputs baseband signal 208A based on the frame configuration. Note that t indicates time.

Similarly, inserter 207B receives inputs of phase-changed signal 206B, pilot symbol signal pb(t)251B, preamble signal 252, control information symbol signal 253, and control signal 200, and based on information on the frame configuration included in control signal 200, outputs baseband signal 208B based on the frame configuration.

Phase changer 209B receives inputs of baseband signal 208B and control signal 200, applies a phase change to baseband signal 208B based on control signal 200, and outputs phase-changed signal 210B. Baseband signal 208B is a function of symbol number i, and is expressed as x'(i). Then, phase-changed signal x(i)210B can be expressed as $x(i)=e^{j \times \varepsilon(i)} \times x'(i)$. Here, i is an integer that is greater than or equal to 0, and j is an imaginary number unit.

Note that the operation performed by phase changer 209B may be CDD/CSD disclosed in NPTL 2 and 3, as described in Embodiment 1. Phase changer 209B then applies a phase change to a symbol present along the frequency axis. Phase changer 209B applies a phase change to, for example, a data symbol, a pilot symbol, and/or a control information symbol.

FIG. 3 illustrates one example of a configuration of radio units 107_A and 107_B illustrated in FIG. 1. FIG. 4 illustrates a frame configuration of transmission signal 108_A illustrated in FIG. 1. FIG. 5 illustrates a frame configuration of transmission signal 108_B illustrated in FIG. 1. Description of these is given in Embodiment 1. Accordingly description will be omitted from this embodiment.

When a symbol is present in carrier A at time $B in FIG. 4 and a symbol is present in carrier A at time $B in FIG. 5, the symbol in carrier A at time $B in FIG. 4 and the symbol in carrier A at time $B in FIG. 5 are transmitted at the same time and same frequency Note that the frame configuration is not limited to the configurations illustrated in FIG. 4 and FIG. 5; FIG. 4 and FIG. 5 are mere examples of frame configurations.

The other symbols in FIG. 4 and FIG. 5 are symbols corresponding to "preamble signal 252 and control information symbol signal 253 in FIG. 2". Accordingly when an other symbol 503 in FIG. 5 at the same time and same frequency (same carrier) as an other symbol 403 in FIG. 4 transmits control information, it transmits the same data (the same control information).

Note that this is under the assumption that the frame of FIG. 4 and the frame of FIG. 5 are received at the same time by the reception device, but even when the frame of FIG. 4 or the frame of FIG. 5 has been received, the reception device can obtain the data transmitted by the transmission device.

FIG. 6 illustrates one example of components relating to control information generation for generating control information symbol signal 253 illustrated in FIG. 2. FIG. 6 is described in Embodiment 1. Accordingly description will be omitted from this embodiment.

FIG. 7 illustrates one example of a configuration of antenna unit #A 109_A and antenna unit #B 109_B illustrated in FIG. 1. In this example, antenna unit #A 109_A and antenna unit #B 109_B include a plurality of antennas. FIG. 7 is described in Embodiment 1. Accordingly description will be omitted from this embodiment.

FIG. 8 illustrates one example of a configuration of a reception device that receives a modulated signal upon the transmission device illustrated in FIG. 1 transmitting, for example, a transmission signal having the frame configuration illustrated in FIG. 4 or FIG. 5. FIG. 8 is described in Embodiment 1. Accordingly description will be omitted from this embodiment.

FIG. 10 illustrates one example of a configuration of antenna unit #X 801X and antenna unit #Y 801Y illustrated in FIG. 8. In this example, antenna unit #X 801X and antenna unit #Y 801Y include a plurality of antennas. FIG. 10 is described in Embodiment 1. Accordingly description will be omitted from this embodiment.

Next, signal processor 106 in the transmission device illustrated in FIG. 1 is inserted as phase changers 205A, 205B and phase changer 209B, as illustrated in FIG. 21. The characteristics and advantageous effects of this configuration will be described.

As described with reference to FIG. 4 and FIG. 5, phase changers 205A, 205B apply precoding (weighted synthesis) to mapped signal s1(i) 201A obtained via mapping using the first sequence and mapped signal s2(i) (201B) obtained via mapping using the second sequence, and apply a phase change to the obtained weighting synthesized signals 204A and 204B. Note that i is a symbol number and is an integer that is greater than or equal to 0.

Phase-changed signal 206A and phase-changed signal 206B are then transmitted at the same frequency and at the same time. Accordingly in FIG. 4 and FIG. 5, a phase change is applied to data symbol 402 in FIG. 4 and data symbol 502 in FIG. 5.

For example, FIG. 11 illustrates an extraction of carrier 1 through carrier 5 and time $4 through time $6 from the frame illustrated in FIG. 4. Note that in FIG. 11, similar to FIG. 4, pilot symbol 401, data symbols 402, and other symbols 403 are shown.

As described above, among the symbols illustrated in FIG. 11, phase changer 205A applies a phase change to the data symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6).

Accordingly the phase change values for the data symbols illustrated in FIG. 11 can be expressed as "$e^{j\times\lambda 15(i)}$" for (carrier 1, time $5), "$e^{j\times\lambda 25(i)}$" for (carrier 2, time $5), "$e^{j\times\lambda 35(i)}$" for (carrier 3, time $5), "$e^{j\times\lambda 45(i)}$" for (carrier 4, time $5), "$e^{j\times\lambda 55(i)}$" (carrier 5, time $5), "$e^{j\times\lambda 16(i)}$" for (carrier 1, time $6), "$e^{j\times\lambda 26(i)}$" for (carrier 2, time $6), "$e^{j\times\lambda 46(i)}$" for (carrier 4, time $6), and "$e^{j\times\lambda 56(i)}$" for (carrier 5, time $6).

Among the symbols illustrated in FIG. 11, the other symbols located at (carrier 1, time $4), (carrier 2, time $4), (carrier 3, time $4), (carrier 4, time $4), and (carrier 5, time $4), and the pilot symbol located at (carrier 3, time $6) are not subject to phase change by phase changer 205A.

This point is a characteristic of phase changer 205A. Note that, as illustrated in FIG. 4, data carriers are arranged at "the same carriers and the same times" as the symbols subject to phase change in FIG. 11, which are the data symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6).

In other words, in FIG. 4, the symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6) are data symbols.

In other words, data symbols that perform MIMO transmission or transmit a plurality of streams are subject to phase change by phase changer 205A.

One example of the phase change that phase changer 205A applies to the data symbols is the method given in Equation (50) in which phase change is applied to the data symbols regularly such as at each cycle N. However, the method of applying the phase change to the data symbols is not limited to this example.

For example, FIG. 11 illustrates an extraction of carrier 1 through carrier 5 and time $4 through time $6 from the frame illustrated in FIG. 5. Note that in FIG. 11, similar to FIG. 5, pilot symbol 501, data symbols 502, and other symbols 503 are shown.

As described above, among the symbols illustrated in FIG. 11, phase changer 205B applies a phase change to the data symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6).

Accordingly the phase change values for the data symbols illustrated in FIG. 11 can be expressed as "$e^{j\times\delta 15(i)}$" for (carrier 1, time $5), "$e^{j\times\delta 25(i)}$" for (carrier 2, time $5), "$e^{j\times\delta 35(i)}$" for (carrier 3, time $5), "$e^{j\times\delta 45(i)}$" for (carrier 4, time $5), "$e^{j\times\delta 55(i)}$" (carrier 5, time $5), "$e^{j\times\delta 16(i)}$" for (carrier 1, time $6), "$e^{j\times\delta 26(i)}$" for (carrier 2, time $6), "$e^{j\times\delta 46(i)}$" for (carrier 4, time $6), and "$e^{j\times\delta 56(i)}$" for (carrier 5, time $6).

Among the symbols illustrated in FIG. 11, the other symbols located at (carrier 1, time $4), (carrier 2, time $4), (carrier 3, time $4), (carrier 4, time $4), and (carrier 5, time $4), and the pilot symbol located at (carrier 3, time $6) are not subject to phase change by phase changer 205B.

Note that, as illustrated in FIG. 4, data carriers are arranged at "the same carriers and the same times" as the symbols subject to phase change in FIG. 11, which are the data symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6).

In other words, in FIG. 4, the symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6) are data symbols.

In other words, data symbols that perform MIMO transmission or transmit a plurality of streams are subject to phase change by phase changer 205B.

One example of the phase change that phase changer 205B applies to the data symbols is the method given in Equation (2) in which phase change is applied to the data symbols regularly such as at each cycle N. However, the method of applying the phase change to the data symbols is not limited to this example.

With this, when the environment is one in which the direct waves are dominant, such as in an LOS environment, it is possible to achieve improved data reception quality in the reception device with respect to the data symbols that perform MIMO transmission or transmit a plurality of streams. Next, the advantageous effects of this will be described.

For example, the modulation scheme used by mapper 104 in FIG. 1 is QPSK. Mapped signal 201A in FIG. 18 is a QPSK signal, and mapped signal 201B is a QPSK signal. In other words, two QPSK streams are transmitted.

Accordingly for example, using channel estimated signals 806_1 and 806_2, 16 candidate signal points are obtained by signal processor 811 illustrated in FIG. 8. 2-bit transmission is possible with QPSK. Accordingly since there are two streams, 4-bit transmission is achieved. Thus, there are 24=16 candidate signal points.

Note that 16 other candidate signal points are obtained from using channel estimated signals 808_1 and 808_2 as well, but since description thereof is the same as described above, the following description will focus on the 16 candidate signal points obtained by using channel estimated signals 806_1 and 806_2.

FIG. 12 illustrates an example of the state resulting from such a case. In FIG. 12A and FIG. 12B, in-phase I is represented on the horizontal axis and orthogonal Q is represented on the vertical axis. 16 candidate signal points are present in the illustrated in-phase I-orthogonal Q planes. Among the 16 candidate signal points, one is a signal point that is transmitted by the transmission device. This is why these are referred to as "16 candidate signal points".

When the environment is one in which the direct waves are dominant, such as in an LOS environment, a first conceivable case is "when phase changers 205A, 205B are omitted from the configuration illustrated in FIG. 21, in other words, when phase change is not applied by phase changers 205A, 205B in FIG. 21".

In the first case, since phase change is not applied, there is a possibility that the state illustrated in FIG. 12A will be realized. When the state falls into the state illustrated in FIG. 12A, as illustrated by "signal points 1201 and 1202", "signal points 1203, 1204, 1205, and 1206", and "signal points 1207, 1208", the signal points become dense, that is to say the distances between some signal points shorten. Accordingly in the reception device illustrated in FIG. 8, data reception quality may decrease.

In order to remedy this phenomenon, in FIG. 21, phase changers 205A, 205B are inserted. When phase changers 205A, 205B are inserted, due to symbol number i, there is a mix of symbol numbers whose signal points are dense, such as in FIG. 12A, and symbol numbers whose "distance between signal points is long", such as in FIG. 12B. With respect to this state, since error correction code is introduced, high error correction performance is achieved, and in the reception device illustrated in FIG. 8, high data reception quality is achieved.

Note that in FIG. 21, a phase change is not applied by phase changers 205A, 205B in FIG. 21 to "pilot symbols, preamble" for demodulating (wave detection of) data symbols, such as pilot symbols and a preamble, and for channel estimation. With this, among data symbols, "due to symbol number i, there is a mix of symbol numbers whose signal points are dense, such as in FIG. 12A, and symbol numbers whose "distance between signal points is long", such as in FIG. 12B" can be realized.

However, even if a phase change is applied by phase changers 205A, 205B in FIG. 21 to "pilot symbols, preamble" for demodulating (wave detection of) data symbols, such as pilot symbols and a preamble, and for channel estimation, the following is possible: "among data symbols, "due to symbol number i, there is a mix of symbol numbers whose signal points are dense, such as in FIG. 12A, and symbol numbers whose "distance between signal points is long", such as in FIG. 12B" can be realized.

In such a case, a phase change must be applied to pilot symbols and/or a preamble under some condition. For example, one conceivable method is to implement a rule which is separate from the rule for applying a phase change to a data symbol, and "applying a phase change to a pilot symbol and/or a preamble". Another example is a method of regularly applying a phase change to a data symbol in a cycle N, and regularly applying a phase change to a pilot symbol and/or a preamble in a cycle M. N and M are integers that are greater than or equal to 2.

As described above, phase changer 209A receives inputs of baseband signal 208A and control signal 200, applies a phase change to baseband signal 208A based on control signal 200, and outputs phase-changed signal 210A. Baseband signal 208A is a function of symbol number i, and is expressed as x'(i). Then, phase-changed signal 210A (x(i)) can be expressed as $x(i)=e^{j\times \varepsilon(i)} \times x'(i)$. Here, i is an integer that is greater than or equal to 0, and j is an imaginary number unit.

Note that the operation performed by phase changer 209A may be CDD/CSD disclosed in NPTL 2 and 3. Phase changer 209A then applies a phase change to a symbol present along the frequency axis. In other words, phase changer 209A applies a phase change to, for example, a data symbol, a pilot symbol, and/or a control information symbol. Accordingly in such a case, symbols subject to symbol number i include data symbols, pilot symbols, control information symbols, and preambles (other symbols).

In the case of FIG. 21, since phase changer 209A applies a phase change to baseband signal 208A, a phase change is applied to each symbol in FIG. 4.

Accordingly in the frame illustrated in FIG. 4, phase changer 209A illustrated in FIG. 21 applies a phase change to all symbols (other symbols 403) for all carriers at time $1.

Similarly, phase changer 209A illustrated in FIG. 21 applies a phase change to the following symbols: "all symbols (other symbols 403) for all carriers at time $2", "all symbols (other symbols 403) for all carriers at time $3", "all symbols (other symbols 403) for all carriers at time $4", "all symbols (pilot symbols 401 or data symbols 402) for all carriers at time $5", "all symbols (pilot symbols 401 or data symbols 402) for all carriers at time $6", "all symbols (pilot symbols 401 or data symbols 402) for all carriers at time $7", "all symbols (pilot symbols 401 or data symbols 402) for all carriers at time $8", "all symbols (pilot symbols 401 or data symbols 402) for all carriers at time $9", "all symbols (pilot symbols 401 or data symbols 402) for all carriers at time $10", "all symbols (pilot symbols 401 or data symbols 402) for all carriers at time $11". Recitation for other times and carriers is omitted.

FIG. 13 illustrates a frame configuration different from the frame configuration illustrated in FIG. 4 of transmission signal 108_A illustrated in FIG. 1. FIG. 13 is described in Embodiment 1. Accordingly description will be omitted from this embodiment.

FIG. 14 illustrates a frame configuration different from the frame configuration illustrated in FIG. 5 of transmission signal 108_B illustrated in FIG. 1. FIG. 14 is described in Embodiment 1. Accordingly description will be omitted from this embodiment.

When a symbol is present in carrier A at time $B in FIG. 13 and a symbol is present in carrier A at time $B in FIG. 14, the symbol in carrier A at time $B in FIG. 13 and the symbol in carrier A at time $B in FIG. 14 are transmitted at the same time and same frequency Note that the frame configurations illustrated in FIG. 13 and FIG. 14 are merely examples.

The other symbols in FIG. 13 and FIG. 14 are symbols corresponding to "preamble signal 252 and control information symbol signal 253 in FIG. 21". Accordingly when an other symbol 403 in FIG. 13 at the same time and same frequency (same carrier) as an other symbol 503 in FIG. 14 transmits control information, it transmits the same data (the same control information).

Note that this is under the assumption that the frame of FIG. 13 and the frame of FIG. 14 are received at the same time by the reception device, but even when the frame of FIG. 13 or the frame of FIG. 14 has been received, the reception device can obtain the data transmitted by the transmission device.

Phase changer 209A receives inputs of baseband signal 208A and control signal 200, applies a phase change to baseband signal 208A based on control signal 200, and outputs phase-changed signal 210A. Baseband signal 208A is a function of symbol number i, and is expressed as x'(i). Then, phase-changed signal x(i)210A can be expressed as $x(i)=e^{j\times \varepsilon(i)} \times x'(i)$. Here, i is an integer that is greater than or equal to 0, and j is an imaginary number unit.

Note that the operation performed by phase changer 209A may be CDD/CSD disclosed in NPTL 2 and 3. Phase changer 209A then applies a phase change to a symbol present along the frequency axis. In other words, phase changer 209A applies a phase change to, for example, a data symbol, a pilot symbol, and/or a control information symbol. Here, a null symbol may be considered as a target for application of a phase change.

Accordingly symbols subject to symbol number i include, for example, data symbols, pilot symbols, control information symbols, preambles (other symbols), and null symbols.

However, since the in-phase component I is zero (0) and the orthogonal component Q is zero (0), even if a phase change is applied to a null symbol, the signals before and after the phase change are the same. Accordingly, it is possible to construe a null symbol as not a target for a phase change. In the case of FIG. 21, since phase changer 209A applies a phase change to baseband signal 208A, a phase change is applied to each symbol in FIG. 13.

Accordingly in the frame illustrated in FIG. 13, phase changer 209A illustrated in FIG. 21 applies a phase change to all symbols (other symbols 403) for all carriers at time $1.

However, the handling of the phase change with respect to null symbol 1301 is as previously described.

Similarly, phase changer 209A illustrated in FIG. 21 applies a phase change to the following symbols: "all symbols (other symbols 403) for all carriers at time $2", "all symbols (other symbols 403) for all carriers at time $3", "all symbols (other symbols 403) for all carriers at time $4", "all symbols (pilot symbols 401 or data symbols 402) for all carriers at time $5", "all symbols (pilot symbols 401 or data symbols 402) for all carriers at time $6", "all symbols (pilot symbols 401 or data symbols 402) for all carriers at time $7", "all symbols (pilot symbols 401 or data symbols 402) for all carriers at time $8", "all symbols (pilot symbols 401 or data symbols 402) for all carriers at time $9", "all symbols (pilot symbols 401 or data symbols 402) for all carriers at time $10", "all symbols (pilot symbols 401 or data symbols 402) for all carriers at time $11". However, the handling of the phase change with respect to null symbol 1301 for all carriers at all times is as previously described. Recitation for other times and carriers is omitted.

The phase change value of phase changer 209A is expressed as $\Omega(i)$. Baseband signal 208A is x'(i) and phase-changed signal 210A is x(i). Accordingly x(i)=$\Omega(i)\times$x'(i) holds true.

For example, the phase change value is set as in Equation (38). Q is an integer that is greater than or equal to 2, and represents the number of phase change cycles. j is an imaginary number unit. However, Equation (38) is merely a non-limiting example.

For example, $\Omega(i)$ may be set so as to implement a phase change that yields a cycle Q.

Moreover, for example, in FIG. 4 and FIG. 13, the same phase change value is applied to the same carriers, and the phase change value may be set on a per carrier basis. For example, the following may be implemented.

Regardless of time, the phase change value may be as in Equation (39) for carrier 1 in FIG. 4 and FIG. 13.

Regardless of time, the phase change value may be as in Equation (40) for carrier 2 in FIG. 4 and FIG. 13.

Regardless of time, the phase change value may be as in Equation (41) for carrier 3 in FIG. 4 and FIG. 13.

Regardless of time, the phase change value may be as in Equation (42) for carrier 4 in FIG. 4 and FIG. 13. Recitation for other carriers is omitted.

This concludes the operational example of phase changer 209A illustrated in FIG. 21.

Next, the advantageous effects obtained by phase changer 209A illustrated in FIG. 21 will be described.

The other symbols 403, 503 in "the frames of FIG. 4 and FIG. 5" or "the frames of FIG. 13 and FIG. 14" may include a control information symbol. As previously described, when an other symbol 503 in FIG. 5 at the same time and same frequency (in the same carrier) as an other symbol 403 transmits control information, it transmits the same data (same control information).

As case 2, "transmitting a control information symbol using either antenna unit #A 109_A or antenna unit #B 109_B illustrated in FIG. 1" is conceivable.

When transmission according to "case 2" is performed, since only one antenna is used to transmit the control information symbol, compared to when "transmitting a control information symbol using both antenna unit #A 109_A and antenna unit #B 109_B" is performed, spatial diversity gain is less. Accordingly in "case 2", data reception quality decreases even when received by the reception device illustrated in FIG. 8. Accordingly from the perspective of improving data reception quality "transmitting a control information symbol using both antenna unit #A 109_A and antenna unit #B 109_B" is more beneficial.

As case 3, "transmitting a control information symbol using both antenna unit #A 109_A and antenna unit #B 109_B illustrated in FIG. 1. However, phase change is not implemented by phase changer 209A illustrated in FIG. 21" is conceivable.

When transmission according to "case 3" is performed, since the modulated signal transmitted from antenna unit #A 109_A and the modulated signal transmitted from antenna unit #B 109_B are the same or exhibit a specific phase shift, depending on the radio wave propagation environment, the reception device illustrated in FIG. 8 may receive an inferior reception signal, and both modulated signal may be subjected to the same multipath effect. Accordingly in the reception device illustrated in FIG. 8, data reception quality decreases.

In order to remedy this phenomenon, in FIG. 21, phase changer 209A is inserted. Since this changes the phase along the time or frequency axis, in the reception device illustrated in FIG. 8, it is possible to reduce the probability of reception of an inferior reception signal. Moreover, since there is a high probability that there will be a difference in the multipath effect that the modulated signal transmitted from antenna unit #A 109_A is subjected to with respect to the multipath effect that the modulated signal transmitted from antenna unit #B 109_B is subjected to, there is a high probability that diversity gain will result, and accordingly that data reception quality in the reception device illustrated in FIG. 8 will improve.

For these reasons, in FIG. 21, phase changer 209A is provided and phase change is implemented.

Other symbols 403 and other symbols 503 include, in addition to control information symbols, for example, symbols for signal detection, symbols for performing frequency and time synchronization, and symbols for performing channel estimation (a symbol for performing propagation path fluctuation estimation), for demodulating and decoding control information symbols. Moreover, "the frames of FIG. 4 and FIG. 5" or "the frames of FIG. 13 and FIG. 14" include pilot symbols 401, 501, and by using these, it is possible to perform demodulation and decoding with high precision via control information symbols.

Moreover, "the frames of FIG. 4 and FIG. 5" or "the frames of FIG. 13 and FIG. 14" transmit a plurality of streams or perform MIMO transmission at the same time and using the same frequency (frequency band) via data symbols 402 and data symbols 502. In order to demodulate these data symbols, symbols for signal detection, symbols for frequency and time synchronization, and symbols for channel estimation, which are included in other symbols 403 and other symbols 503, are used.

Here, "symbols for signal detection, symbols for frequency and time synchronization, and symbols for channel estimation, which are included in other symbols 403 and other symbols 503" are applied with a phase change by phase changer 209A, as described above.

Under these circumstances, when this processing is not performed "on data symbols 402 and data symbols 502" or "on data symbols 402 in the example above", in the reception device, when data symbols 402 and data symbols 502 are demodulated and decoded, there is a need to perform the demodulation and decoding in which the processing for the phase change by phase changer 209A was performed, and there is a probability that this processing will be complicated.

This is because "symbols for signal detection, symbols for frequency and time synchronization, and symbols for channel estimation, which are included in other symbols 403 and other symbols 503" are applied with a phase change by phase changer 209A.

However, as illustrated in FIG. 21, in phase changer 209A, when a phase change is applied to data symbols 402 and data symbols 502 (to data symbols 402 in the example above), in the reception device, there is the advantage that data symbols 402 and data symbols 502 can simply be demodulated and decoded using the channel estimation signal (propagation path fluctuation signal) estimated by using "symbols for signal detection, symbols for frequency and time synchronization, and symbols for channel estimation, which are included in other symbols 403 and other symbols 503".

Additionally as illustrated in FIG. 21, in phase changer 209A, when a phase change is applied to data symbols 402 and data symbols 502 (and data symbols 402 in the example above), in multipath environments, it is possible to reduce the influence of sharp drops in electric field intensity along the frequency axis. Accordingly it is possible to obtain the advantageous effect of an improvement in data reception quality of data symbols 402 and data symbols 502.

In this way the point that "symbols that are targets for implementation of a phase change by phase changers 205A, 205B" and "symbols that are targets for implementation of a phase change by phase changer 209A" are different is a characteristic point.

As described above, by applying a phase change using phase changers 205A, 205B illustrated in FIG. 21, it is possible to achieve the advantageous effect of an improvement in data reception quality of data symbols 402 and data symbols 502 in the reception device in, for example, LOS environments, and by applying a phase change using phase changer 209A illustrated in FIG. 21, for example, it is possible to achieve the advantageous effect of an improvement in data reception quality in the reception device of the control information symbols included in "the frames of FIG. 4 and FIG. 5" or "the frames of FIG. 13 and FIG. 14" and the advantageous effect that operations of demodulation and decoding of data symbols 402 and data symbols 502 become simple.

Note that the advantageous effect of an improvement in data reception quality in the reception device of data symbols 402 and data symbols 502 in, for example, LOS environments, is achieved as a result of the phase change implemented by phase changers 205A, 205B illustrated in FIG. 21, and furthermore, the reception quality of data symbols 402 and data symbols 502 is improved by applying a phase change to data symbols 402 and data symbols 502 using phase changer 209A illustrated in FIG. 21.

Note that Q in Equation (38) may be an integer of −2 or less. In such a case, the value for the phase change cycle is the absolute value of Q. This feature is applicable to Embodiment 1 as well.

Embodiment 6

In this embodiment, an implementation method will be described that is different from the configuration illustrated in FIG. 2 and described in Embodiment 1.

FIG. 1 illustrates one example of a configuration of a transmission device according to this embodiment, such as a base station, access point, or broadcast station. As FIG. 1 is described in detail in Embodiment 1, description will be omitted from this embodiment.

Signal processor 106 receives inputs of mapped signals 105_1 and 105_2, signal group 110, and control signal 100, performs signal processing based on control signal 100, and outputs processed signals 106_A and 106_B. Here, processed signal 106_A is expressed as u1(i), and processed signal 106_B is expressed as u2(i). i is a symbol number, and, for example, is an integer that is greater than or equal to 0. Note that details regarding the signal processing will be described with reference to FIG. 22 later.

Figure 22:
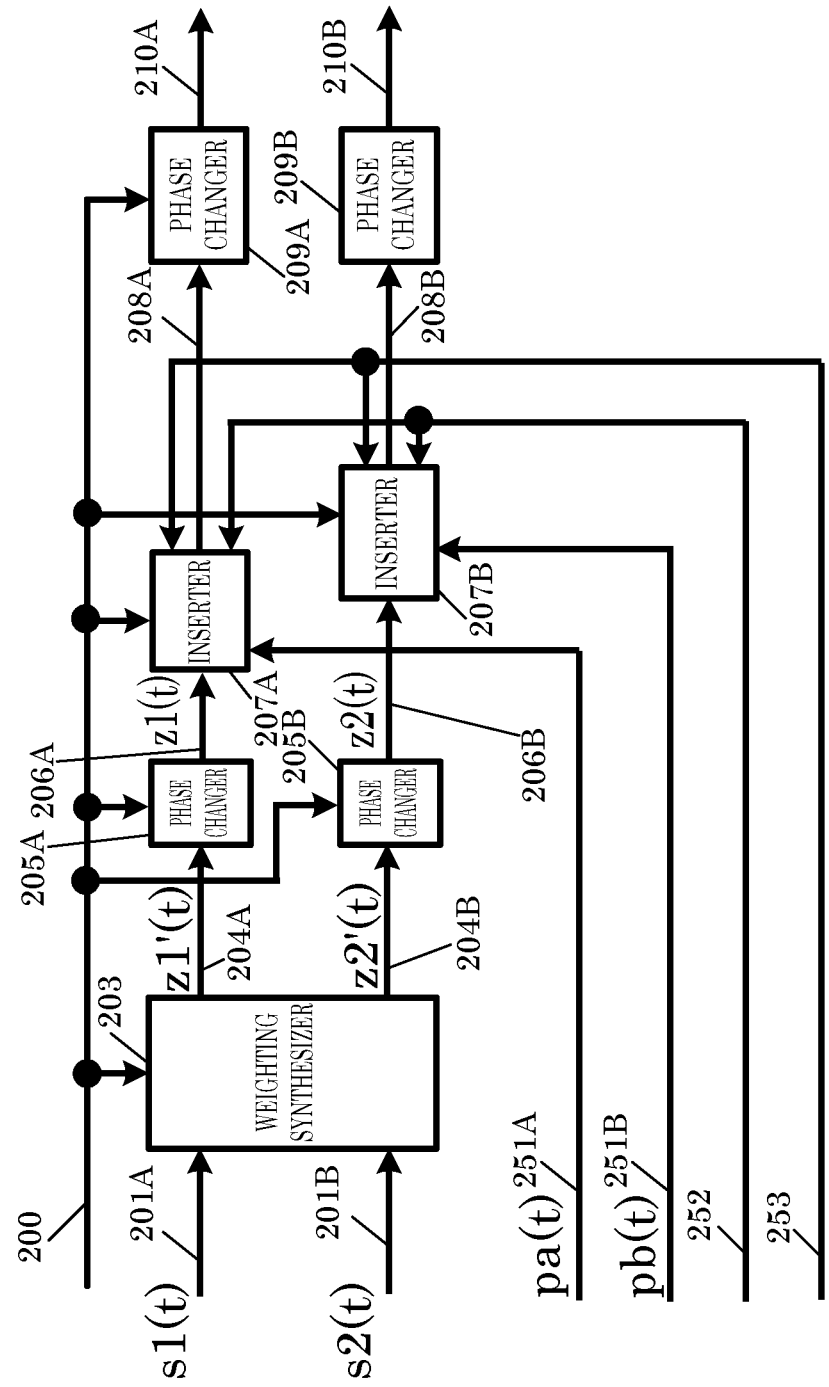
FIG. 22 illustrates one example of a configuration of the signal processor illustrated in FIG. 1.

FIG. 22 illustrates one example of a configuration of signal processor 106 illustrated in FIG. 1. Weighting synthesizer (precoder) 203 receives inputs of mapped signal 201A (mapped signal 105_1 in FIG. 1), mapped signal 201B (mapped signal 105_2 in FIG. 1), and control signal 200 (control signal 100 in FIG. 1), performs weighting synthesis (precoding) based on control signal 200, and outputs weighted signal 204A and weighted signal 204B.

Here, mapped signal 201A is expressed as s1(t), mapped signal 201B is expressed as s2(t), weighted signal 204A is expressed as z1'(t), and weighted signal 204B is expressed as z2'(t). Note that one example of t is time. s1(t), s2(t), z1'(t), and z2'(t) are defined as complex numbers, and as such, may be actual numbers.

Here, these are given as functions of time, but may be functions of a "frequency (carrier number)", and may be functions of "time and frequency". These may also be a function of a "symbol number". Note that this also applies to Embodiment 1.

Weighting synthesizer (precoder) 203 performs the calculations indicated in Equation (49).

Phase changer 205A receives inputs of weighting synthesized signal 204A and control signal 200, applies a phase change to weighting synthesized signal 204A based on control signal 200, and outputs phase-changed signal 206A. Note that phase-changed signal 206A is expressed as z1(t). z1(t) is defined as a complex number and may be an actual number.

Next, specific operations performed by phase changer 205A will be described. In phase changer 205A, for example, a phase change of w(i) is applied to z1'(i). Accordingly, z1(i) can be expressed as z1(i)=w(i)×z1'(i). Note that i is a symbol number and is an integer that is greater than or equal to 0.

For example, the phase change value is set as indicated in Equation (50).

M is an integer that is greater than or equal to 2, and represents the number of phase change cycles. When M is set to an odd number greater than or equal to 3, data reception quality may increase. However, Equation (50) is merely a non-limiting example. Here, phase change value $w(i)=e^{x}(W$.

Phase changer 205B receives inputs of weighting synthesized signal 204B and control signal 200, applies a phase change to weighting synthesized signal 204B based on control signal 200, and outputs phase-changed signal 206B. Note that phase-changed signal 206B is expressed as z2(t). z2(t) is defined as a complex number and may be an actual number.

Next, specific operations performed by phase changer 205B will be described. In phase changer 205B, for example, a phase change of y(i) is applied to z2'(i). Accordingly, z2(i) can be expressed as z2(i)=y(i)×z2'(i). Note that i is a symbol number and is an integer that is greater than or equal to 0.

For example, the phase change value is set as indicated in Equation (2). Note that N is an integer that is greater than or equal to 2, and represents the number of phase change cycles. N≠M is satisfied. When N is set to an odd number greater than or equal to 3, data reception quality may increase. However, Equation (2) is merely a non-limiting example. Here, phase change value y(i)=$e^{j \times \delta(i)}$.

Here, z1(i) and z2(i) can be expressed with Equation (51).

Note that δ(i) and λ(i) are actual numbers. z1(i) and z2(i) are transmitted from the transmission device at the same time and using the same frequency (same frequency band). In Equation (51), the phase change value is not limited to the value used in Equations (2) and (51); for example, a method in which the phase is changed cyclically or regularly is conceivable.

As described in Embodiment 1, conceivable examples of the (precoding) matrix inserted in Equation (49) and Equation (51) are illustrated in Equation (5) through Equation (36). However, the precoding matrix is not limited to these examples. This also applies to Embodiment 1.

Inserter 207A receives inputs of weighting synthesized signal 204A, pilot symbol signal pa(t)251A, preamble signal 252, control information symbol signal 253, and control signal 200, and based on information on the frame configuration included in control signal 200, outputs baseband signal 208A based on the frame configuration. t is time.

Similarly, inserter 207B receives inputs of phase-changed signal 206B, pilot symbol signal pb(t)251B, preamble signal 252, control information symbol signal 253, and control signal 200, and based on information on the frame configuration included in control signal 200, outputs baseband signal 208B based on the frame configuration.

Phase changer 209B receives inputs of baseband signal 208B and control signal 200, applies a phase change to baseband signal 208B based on control signal 200, and outputs phase-changed signal 210B. Baseband signal 208B is a function of symbol number i (i is an integer that is greater than or equal to 0), and is expressed as x'(i). Then, phase-changed signal 210B (x(i)) can be expressed as x(i)=$e^{j \times \varepsilon(i)} \times$ x'(i). j is an imaginary number unit.

Note that the operation performed by phase changer 209B may be CDD/CSD disclosed in NPTL 2 and 3, as described in Embodiment 1. Phase changer 209B then applies a phase change to a symbol present along the frequency axis. Phase changer 209B applies a phase change to, for example, a data symbol, a pilot symbol, and/or a control information symbol.

FIG. 3 illustrates one example of a configuration of radio units 107_A and 107_B illustrated in FIG. 1. FIG. 3 is described in Embodiment 1. Accordingly description will be omitted from this embodiment.

FIG. 4 illustrates a frame configuration of transmission signal 108_A illustrated in FIG. 1. FIG. 4 is described in Embodiment 1. Accordingly description will be omitted from this embodiment.

FIG. 5 illustrates a frame configuration of transmission signal 108_B illustrated in FIG. 1. FIG. 5 is described in Embodiment 1. Accordingly description will be omitted from this embodiment.

When a symbol is present in carrier A at time $B in FIG. 4 and a symbol is present in carrier A at time $B in FIG. 5, the symbol in carrier A at time $B in FIG. 4 and the symbol in carrier A at time $B in FIG. 5 are transmitted at the same time and same frequency Note that the frame configuration is not limited to the configurations illustrated in FIG. 4 and FIG. 5; FIG. 4 and FIG. 5 are mere examples of frame configurations.

The other symbols in FIG. 4 and FIG. 5 are symbols corresponding to "preamble signal 252 and control information symbol signal 253 in FIG. 2". Accordingly when an other symbol 503 in FIG. 5 at the same time and same frequency (same carrier) as an other symbol 403 in FIG. 4 transmits control information, it transmits the same data (the same control information).

Note that this is under the assumption that the frame of FIG. 4 and the frame of FIG. 5 are received at the same time by the reception device, but even when the frame of FIG. 4 or the frame of FIG. 5 has been received, the reception device can obtain the data transmitted by the transmission device.

FIG. 6 illustrates one example of components relating to control information generation for generating control information symbol signal 253 illustrated in FIG. 2. FIG. 6 is described in Embodiment 1. Accordingly description will be omitted from this embodiment.

FIG. 7 illustrates one example of a configuration of antenna unit #A 109_A and antenna unit #B 109_B illustrated in FIG. 1. In this example, antenna unit #A 109_A and antenna unit #B 109_B include a plurality of antennas. FIG. 7 is described in Embodiment 1. Accordingly description will be omitted from this embodiment.

FIG. 8 illustrates one example of a configuration of a reception device that receives a modulated signal upon the transmission device illustrated in FIG. 1 transmitting, for example, a transmission signal having the frame configuration illustrated in FIG. 4 or FIG. 5. FIG. 8 is described in Embodiment 1. Accordingly description will be omitted from this embodiment.

FIG. 10 illustrates one example of a configuration of antenna unit #X 801X and antenna unit #Y 801Y illustrated in FIG. 8. In this example, antenna unit #X 801X and antenna unit #Y 801Y include a plurality of antennas. FIG. 10 is described in Embodiment 1. Accordingly description will be omitted from this embodiment.

Next, signal processor 106 in the transmission device illustrated in FIG. 1 is inserted as phase changers 205A, 205B and phase changer 209B, as illustrated in FIG. 22. The characteristics and advantageous effects of this configuration will be described.

As described with reference to FIG. 4 and FIG. 5, phase changers 205A, 205B apply precoding (weighted synthesis) to mapped signal s1(i) 201A obtained via mapping using the first sequence and mapped signal s2(i) 201B obtained via mapping using the second sequence, and apply a phase change to the obtained weighting synthesized signals 204A and 204B. Note that i is a symbol number and is an integer that is greater than or equal to 0.

Phase-changed signal 206A and phase-changed signal 206B are then transmitted at the same frequency and at the same time. Accordingly in FIG. 4 and FIG. 5, a phase change is applied to data symbol 402 in FIG. 4 and data symbol 502 in FIG. 5.

For example, FIG. 11 illustrates an extraction of carrier 1 through carrier 5 and time $4 through time $6 from the frame illustrated in FIG. 4. Note that in FIG. 11, similar to FIG. 4, pilot symbol 401, data symbols 402, and other symbols 403 are shown.

As described above, among the symbols illustrated in FIG. 11, phase changer 205A applies a phase change to the data symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6).

Accordingly the phase change values for the data symbols illustrated in FIG. 11 can be expressed as "$e^{j \times \lambda.15(i)}$" for (carrier 1, time $5), "$e^{j \times \lambda.25(i)}$" for (carrier 2, time $5), "$e^{j \times \lambda.35(i)}$" for (carrier 3, time $5), "$e^{j \times \lambda.45(i)}$" for (carrier 4, time $5), "$e^{j\times\lambda 55(i)}$" (carrier 5, time $5), "$e^{j\times\lambda 16(i)}$" for (carrier 1, time $6), "$e^{j\times\lambda 26(i)}$" for (carrier 2, time $6), "$e^{j\times\lambda 46(i)}$" for (carrier 4, time $6), and "$e^{j\times\lambda 56(i)}$" for (carrier 5, time $6).

Among the symbols illustrated in FIG. 11, the other symbols located at (carrier 1, time $4), (carrier 2, time $4), (carrier 3, time $4), (carrier 4, time $4), and (carrier 5, time $4), and the pilot symbol located at (carrier 3, time $6) are not subject to phase change by phase changer 205A.

This point is a characteristic of phase changer 205A. Note that, as illustrated in FIG. 4, data carriers are arranged at "the same carriers and the same times" as the symbols subject to phase change in FIG. 11, which are the data symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6).

In other words, in FIG. 4, the symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6) are data symbols.

In other words, data symbols that perform MIMO transmission or transmit a plurality of streams are subject to phase change by phase changer 205A.

One example of the phase change that phase changer 205A applies to the data symbols is the method given in Equation (50) in which phase change is applied to the data symbols regularly such as at each cycle N. However, the method of applying the phase change to the data symbols is not limited to this example.

For example, FIG. 11 illustrates an extraction of carrier 1 through carrier 5 and time $4 through time $6 from the frame illustrated in FIG. 5. Note that in FIG. 11, similar to FIG. 5, pilot symbol 501, data symbols 502, and other symbols 503 are shown.

As described above, among the symbols illustrated in FIG. 11, phase changer 205B applies a phase change to the data symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6).

Accordingly the phase change values for the data symbols illustrated in FIG. 11 can be expressed as "$e^{j\times\delta 15(i)}$" for (carrier 1, time $5), "$e^{j\times\delta 25(i)}$" for (carrier 2, time $5), "$e^{j\times\delta 35(i)}$" for (carrier 3, time $5), "$e^{j\times\delta 45(i)}$" for (carrier 4, time $5), "$e^{j\times\delta 55(i)}$" (carrier 5, time $5), "$e^{j\times\delta 16(i)}$" for (carrier 1, time $6), "$e^{j\times\delta 26(i)}$" for (carrier 2, time $6), "$e^{j\times\delta 46(i)}$" for (carrier 4, time $6), and "$e^{j\times\delta 56(i)}$" for (carrier 5, time $6).

Among the symbols illustrated in FIG. 11, the other symbols located at (carrier 1, time $4), (carrier 2, time $4), (carrier 3, time $4), (carrier 4, time $4), and (carrier 5, time $4), and the pilot symbol located at (carrier 3, time $6) are not subject to phase change by phase changer 205B.

This point is a characteristic of phase changer 205B. Note that, as illustrated in FIG. 4, data carriers are arranged at "the same carriers and the same times" as the symbols subject to phase change in FIG. 11, which are the data symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6).

In other words, in FIG. 4, the symbols located at (carrier 1, time $5), (carrier 2, time $5), (carrier 3, time $5), (carrier 4, time $5), (carrier 5, time $5), (carrier 1, time $6), (carrier 2, time $6), (carrier 4, time $6), and (carrier 5, time $6) are data symbols.

In other words, data symbols that perform MIMO transmission or transmit a plurality of streams are subject to phase change by phase changer 205B.

One example of the phase change that phase changer 205B applies to the data symbols is the method given in Equation (2) in which phase change is applied to the data symbols regularly such as at each cycle N. However, the method of applying the phase change to the data symbols is not limited to this example.

With this, when the environment is one in which the direct waves are dominant, such as in an LOS environment, it is possible to achieve improved data reception quality in the reception device with respect to the data symbols that perform MIMO transmission or transmit a plurality of streams. Next, the advantageous effects of this will be described.

For example, the modulation scheme used by mapper 104 in FIG. 1 is QPSK. Mapped signal 201A in FIG. 18 is a QPSK signal, and mapped signal 201B is a QPSK signal. In other words, two QPSK streams are transmitted.

Accordingly for example, using channel estimated signals 806_1 and 806_2, 16 candidate signal points are obtained by signal processor 811 illustrated in FIG. 8. 2-bit transmission is possible with QPSK. Accordingly since there are two streams, 4-bit transmission is achieved. Thus, there are $2^4$=16 candidate signal points.

Note that 16 other candidate signal points are obtained from using channel estimated signals 808_1 and 808_2 as well, but since description thereof is the same as described above, the following description will focus on the 16 candidate signal points obtained by using channel estimated signals 806_1 and 806_2.

FIG. 12 illustrates an example of the state resulting from such a case. In FIG. 12A and FIG. 12B, in-phase I is represented on the horizontal axis and orthogonal Q is represented on the vertical axis. 16 candidate signal points are present in the illustrated in-phase I-orthogonal Q planes. Among the 16 candidate signal points, one is a signal point that is transmitted by the transmission device. This is why these are referred to as "16 candidate signal points".

When the environment is one in which the direct waves are dominant, such as in an LOS environment, a first conceivable case is "when phase changers 205A, 205B are omitted from the configuration illustrated in FIG. 22, in other words, when phase change is not applied by phase changers 205A, 205B in FIG. 22".

In the first case, since phase change is not applied, there is a possibility that the state illustrated in FIG. 12A will be realized. When the state falls into the state illustrated in FIG. 12A, as illustrated by "signal points 1201 and 1202", "signal points 1203, 1204, 1205, and 1206", and "signal points 1207, 1208", the signal points become dense, that is to say the distances between some signal points shorten. Accordingly in the reception device illustrated in FIG. 8, data reception quality may decrease.

In order to remedy this phenomenon, in FIG. 22, phase changers 205A, 205B are inserted. When phase changers 205A, 205B are inserted, due to symbol number i, there is a mix of symbol numbers whose signal points are dense, such as in FIG. 12A, and symbol numbers whose "distance between signal points is long", such as in FIG. 12B. With respect to this state, since error correction code is introduced, high error correction performance is achieved, and in the reception device illustrated in FIG. 8, high data reception quality is achieved.

Note that in FIG. 22, a phase change is not applied by phase changers 205A, 205B in FIG. 22 to "pilot symbols, preamble" for demodulating (wave detection of) data symbols, such as pilot symbols and a preamble, and for channel estimation. With this, among data symbols, "due to symbol number i, there is a mix of symbol numbers whose signal points are dense, such as in FIG. 12A, and symbol numbers whose "distance between signal points is long", such as in FIG. 12B" can be realized.

However, even if a phase change is applied by phase changers 205A, 205B in FIG. 22 to "pilot symbols, preamble" for demodulating (wave detection of) data symbols, such as pilot symbols and a preamble, and for channel estimation, the following is possible: "among data symbols, "due to symbol number i, there is a mix of symbol numbers whose signal points are dense, such as in FIG. 12A, and symbol numbers whose "distance between signal points is long", such as in FIG. 12B" can be realized.

In such a case, a phase change must be applied to pilot symbols and/or a preamble under some condition. For example, one conceivable method is to implement a rule which is separate from the rule for applying a phase change to a data symbol, and "applying a phase change to a pilot symbol and/or a preamble". Another example is a method of regularly applying a phase change to a data symbol in a cycle N, and regularly applying a phase change to a pilot symbol and/or a preamble in a cycle M. N and M are integers that are greater than or equal to 2.

As described above, phase changer 209A receives inputs of baseband signal 208A and control signal 200, applies a phase change to baseband signal 208A based on control signal 200, and outputs phase-changed signal 210A. Baseband signal 208A is a function of symbol number i, and is expressed as x'(i). Then, phase-changed signal x(i)210A can be expressed as $x(i)=e^{j\times\varepsilon(i)}\times x'(i)$. Here, i is an integer that is greater than or equal to 0, and j is an imaginary number unit.

Note that the operation performed by phase changer 209A may be CDD/CSD disclosed in NPTL 2 and 3. Phase changer 209A then applies a phase change to a symbol present along the frequency axis. In other words, phase changer 209A applies a phase change to, for example, a data symbol, a pilot symbol, and/or a control information symbol.

Accordingly in such a case, symbols subject to symbol number i include data symbols, pilot symbols, control information symbols, and preambles (other symbols). In the case of FIG. 22, since phase changer 209A applies a phase change to baseband signal 208A, a phase change is applied to each symbol in FIG. 4.

Accordingly in the frame illustrated in FIG. 4, phase changer 209A illustrated in FIG. 22 applies a phase change to all symbols (other symbols 403) for all carriers at time $1.

Similarly, phase changer 209A illustrated in FIG. 22 applies a phase change to the following symbols: "all symbols (other symbols 403) for all carriers at time $2", "all symbols (other symbols 403) for all carriers at time $3", "all symbols (other symbols 403) for all carriers at time $4", "all symbols (pilot symbols 401 or data symbols 402) for all carriers at time $5", "all symbols (pilot symbols 401 or data symbols 402) for all carriers at time $6", "all symbols (pilot symbols 401 or data symbols 402) for all carriers at time $7", "all symbols (pilot symbols 401 or data symbols 402) for all carriers at time $8", "all symbols (pilot symbols 401 or data symbols 402) for all carriers at time $9", "all symbols (pilot symbols 401 or data symbols 402) for all carriers at time $10", "all symbols (pilot symbols 401 or data symbols 402) for all carriers at time $11". Recitation for all other times and carriers is omitted.

As described above, phase changer 209B receives inputs of baseband signal 208B and control signal 200, applies a phase change to baseband signal 208B based on control signal 200, and outputs phase-changed signal 210B. Baseband signal 208B is a function of symbol number i, and is expressed as y'(i). Then, phase-changed signal y(i)210B can be expressed as $y(i)=e^{j\times\eta(i)}\times y'(i)$. Here, i is an integer that is greater than or equal to 0, and j is an imaginary number unit.

Note that the operation performed by phase changer 209B may be CDD/CSD disclosed in NPTL 2 and 3. Phase changer 209B then applies a phase change to a symbol present along the frequency axis. Phase changer 209B applies a phase change to, for example, a data symbol, a pilot symbol, and/or a control information symbol.

Accordingly in such a case, symbols subject to symbol number i include data symbols, pilot symbols, control information symbols, and preambles (other symbols). In the case of FIG. 22, since phase changer 209B applies a phase change to baseband signal 208B, a phase change is applied to each symbol in FIG. 5.

Accordingly in the frame illustrated in FIG. 5, phase changer 209B illustrated in FIG. 22 applies a phase change to all symbols (other symbols 503) for all carriers at time $1.

Similarly, phase changer 209B illustrated in FIG. 22 applies a phase change to the following symbols: "all symbols (other symbols 503) for all carriers at time $2", "all symbols (other symbols 503) for all carriers at time $3", "all symbols (other symbols 503) for all carriers at time $4", "all symbols (pilot symbols 501 or data symbols 502) for all carriers at time $5", "all symbols (pilot symbols 501 or data symbols 502) for all carriers at time $6", "all symbols (pilot symbols 501 or data symbols 502) for all carriers at time $7", "all symbols (pilot symbols 501 or data symbols 502) for all carriers at time $8", "all symbols (pilot symbols 501 or data symbols 502) for all carriers at time $9", "all symbols (pilot symbols 501 or data symbols 502) for all carriers at time $10", "all symbols (pilot symbols 501 or data symbols 502) for all carriers at time $11". Recitation for other times and carriers is omitted.

FIG. 13 illustrates a frame configuration different from the frame configuration illustrated in FIG. 4 of transmission signal 108_A illustrated in FIG. 1. FIG. 13 is described in Embodiment 1. Accordingly description will be omitted from this embodiment.

FIG. 14 illustrates a frame configuration different from the frame configuration illustrated in FIG. 5 of transmission signal 108_B illustrated in FIG. 1. FIG. 14 is described in Embodiment 1. Accordingly description will be omitted from this embodiment.

When a symbol is present in carrier A at time $B in FIG. 13 and a symbol is present in carrier A at time $B in FIG. 14, the symbol in carrier A at time $B in FIG. 13 and the symbol in carrier A at time $B in FIG. 14 are transmitted at the same time and same frequency. Note that the frame configurations illustrated in FIG. 13 and FIG. 14 are merely examples.

The other symbols in FIG. 13 and FIG. 14 are symbols corresponding to "preamble signal 252 and control information symbol signal 253 in FIG. 22". Accordingly when an other symbol 403 in FIG. 13 at the same time and same frequency (same carrier) as an other symbol 503 in FIG. 14 transmits control information, it transmits the same data (the same control information).

Note that this is under the assumption that the frame of FIG. 13 and the frame of FIG. 14 are received at the same time by the reception device, but even when the frame of FIG. 13 or the frame of FIG. 14 has been received, the reception device can obtain the data transmitted by the transmission device.

Phase changer 209A receives inputs of baseband signal 208A and control signal 200, applies a phase change to baseband signal 208A based on control signal 200, and outputs phase-changed signal 210A. Baseband signal 208A is a function of symbol number i, and is expressed as x'(i). Phase-changed signal x(i) 210A is expressed as $x(i)=e^{j\times\varepsilon(i)}\times x'(i)$. Here, i is an integer that is greater than or equal to 0, and j is an imaginary number unit.

Note that the operation performed by phase changer 209A may be CDD/CSD disclosed in NPTL 2 and 3. Phase changer 209A then applies a phase change to a symbol present along the frequency axis. In other words, phase changer 209A applies a phase change to, for example, a data symbol, a pilot symbol, and/or a control information symbol.

Here, a null symbol may be considered as a target for application of a phase change. Accordingly symbols subject to symbol number i include, for example, data symbols, pilot symbols, control information symbols, preambles (other symbols), and null symbols.

However, since the in-phase component I is zero (0) and the orthogonal component Q is zero (0), even if a phase change is applied to a null symbol, the signals before and after the phase change are the same.

Accordingly it is possible to construe a null symbol as not a target for a phase change. In the case of FIG. 22, since phase changer 209A applies a phase change to baseband signal 208A, a phase change is applied to each symbol in FIG. 13.

Accordingly in the frame illustrated in FIG. 13, phase changer 209A illustrated in FIG. 22 applies a phase change to all symbols (other symbols 403) for all carriers at time $1. However, the handling of the phase change with respect to null symbol 1301 is as previously described.

Similarly, phase changer 209A illustrated in FIG. 22 applies a phase change to the following symbols: "all symbols (other symbols 403) for all carriers at time $2", "all symbols (other symbols 403) for all carriers at time $3", "all symbols (other symbols 403) for all carriers at time $4", "all symbols (pilot symbols 401 or data symbols 402) for all carriers at time $5", "all symbols (pilot symbols 401 or data symbols 402) for all carriers at time $6", "all symbols (pilot symbols 401 or data symbols 402) for all carriers at time $7", "all symbols (pilot symbols 401 or data symbols 402) for all carriers at time $8", "all symbols (pilot symbols 401 or data symbols 402) for all carriers at time $9", "all symbols (pilot symbols 401 or data symbols 402) for all carriers at time $10", "all symbols (pilot symbols 401 or data symbols 402) for all carriers at time $11". However, the handling of the phase change with respect to null symbol 1301 for all times and carriers is as previously described. Recitation for other times and carriers is omitted.

The phase change value of phase changer 209A is expressed as $\Omega(i)$. Baseband signal 208A is x'(i) and phase-changed signal 210A is x(i). Accordingly $x(i)=\Omega(i)\times x'(i)$ holds true.

For example, the phase change value is set as in Equation (38). Q is an integer that is greater than or equal to 2, and represents the number of phase change cycles. j is an imaginary number unit. However, Equation (38) is merely a non-limiting example.

For example, $\Omega(i)$ may be set so as to implement a phase change that yields a cycle Q.

Moreover, for example, in FIG. 4 and FIG. 13, the same phase change value is applied to the same carriers, and the phase change value may be set on a per carrier basis. For example, the following may be implemented.

Regardless of time, the phase change value may be as in Equation (39) for carrier 1 in FIG. 4 and FIG. 13.

Regardless of time, the phase change value may be as in Equation (40) for carrier 2 in FIG. 4 and FIG. 13.

Regardless of time, the phase change value may be as in Equation (41) for carrier 3 in FIG. 4 and FIG. 13.

Regardless of time, the phase change value may be as in Equation (42) for carrier 4 in FIG. 4 and FIG. 13. Recitation for other carriers is omitted.

This concludes the operational example of phase changer 209A illustrated in FIG. 22.

Phase changer 209B receives inputs of baseband signal 208B and control signal 200, applies a phase change to baseband signal 208B based on control signal 200, and outputs phase-changed signal 210B. Baseband signal 208B is a function of symbol number i, and is expressed as y'(i). Then, phase-changed signal x(i)210B can be expressed as $y(i)=e^{j\times n(i)}\times y'(i)$. Here, i is an integer that is greater than or equal to 0, and j is an imaginary number unit.

Note that the operation performed by phase changer 209B may be CDD/CSD disclosed in NPTL 2 and 3. Phase changer 209B then applies a phase change to a symbol present along the frequency axis. Phase changer 209B applies a phase change to, for example, a data symbol, a pilot symbol, and/or a control information symbol.

Here, a null symbol may be considered as a target for application of a phase change. Accordingly symbols subject to symbol number i include, for example, data symbols, pilot symbols, control information symbols, preambles (other symbols), and null symbols.

However, since the in-phase component I is zero (0) and the orthogonal component Q is zero (0), even if a phase change is applied to a null symbol, the signals before and after the phase change are the same. Accordingly, it is possible to construe a null symbol as not a target for a phase change. In the case of FIG. 22, since phase changer 209B applies a phase change to baseband signal 208B, a phase change is applied to each symbol in FIG. 14.

Accordingly in the frame illustrated in FIG. 14, phase changer 209B illustrated in FIG. 22 applies a phase change to all symbols (other symbols 503) for all carriers at time $1. However, the handling of the phase change with respect to null symbol 1301 is as previously described.

Similarly phase changer 209B illustrated in FIG. 22 applies a phase change to the following symbols: "all symbols (other symbols 503) for all carriers at time $2", "all symbols (other symbols 503) for all carriers at time $3", "all symbols (other symbols 503) for all carriers at time $4", "all symbols (pilot symbols 501 or data symbols 502) for all carriers at time $5", "all symbols (pilot symbols 501 or data symbols 502) for all carriers at time $6", "all symbols (pilot symbols 501 or data symbols 502) for all carriers at time $7", "all symbols (pilot symbols 501 or data symbols 502) for all carriers at time $8", "all symbols (pilot symbols 501 or data symbols 502) for all carriers at time $9", "all symbols (pilot symbols 501 or data symbols 502) for all carriers at time $10", "all symbols (pilot symbols 501 or data symbols 502) for all carriers at time $11". However, the handling of the phase change with respect to null symbol 1301 for all carriers at all times is as previously described. Recitation for other times and carriers is omitted.

The phase change value of phase changer 209B is expressed as Δ(i). Baseband signal 208B is y'(i) and phase-changed signal 210B is y(i). Accordingly y(i)=Δ(i)×y'(i) holds true.

For example, the phase change value is set as in Equation (49). R is an integer that is greater than or equal to 2, and represents the number of phase change cycles. Note that the values for Q and R in Equation (38) may be different values.

For example, Δ(i) may be set so as to implement a phase change that yields a cycle R.

Moreover, for example, in FIG. 5 and FIG. 14, the same phase change value is applied to the same carriers, and the phase change value may be set on a per carrier basis. For example, the following may be implemented.

Regardless of time, the phase change value may be as in Equation (39) for carrier 1 in FIG. 5 and FIG. 14.

Regardless of time, the phase change value may be as in Equation (40) for carrier 2 in FIG. 5 and FIG. 14.

Regardless of time, the phase change value may be as in Equation (41) for carrier 3 in FIG. 5 and FIG. 14.

Regardless of time, the phase change value may be as in Equation (42) for carrier 4 in FIG. 5 and FIG. 14. Recitation for other carriers is omitted.

This concludes the operational example of phase changer 209B illustrated in FIG. 20.

Next, the advantageous effects obtained by phase changers 209A, 209B illustrated in FIG. 22 will be described.

The other symbols 403, 503 in "the frames of FIG. 4 and FIG. 5" or "the frames of FIG. 13 and FIG. 14" may include a control information symbol. As previously described, when an other symbol 503 in FIG. 5 at the same time and same frequency (in the same carrier) as an other symbol 403 transmits control information, it transmits the same data (same control information).

As case 2, "transmitting a control information symbol using either antenna unit #A 109_A or antenna unit #B 109_B illustrated in FIG. 1" is conceivable.

When transmission according to "case 2" is performed, since only one antenna is used to transmit the control information symbol, compared to when "transmitting a control information symbol using both antenna unit #A 109_A and antenna unit #B 109_B" is performed, spatial diversity gain is less. Accordingly in "case 2", data reception quality decreases even when received by the reception device illustrated in FIG. 8. Accordingly from the perspective of improving data reception quality "transmitting a control information symbol using both antenna unit #A 109_A and antenna unit #B 109_B" is more beneficial.

As case 3, "transmitting a control information symbol using both antenna unit #A 109_A and antenna unit #B 109_B illustrated in FIG. 1. However, phase change is not implemented by phase changers 209A, 209B illustrated in FIG. 22" is conceivable.

When transmission according to "case 3" is performed, since the modulated signal transmitted from antenna unit #A 109_A and the modulated signal transmitted from antenna unit #B 109_B are the same or exhibit a specific phase shift, depending on the radio wave propagation environment, the reception device illustrated in FIG. 8 may receive an inferior reception signal, and both modulated signal may be subjected to the same multipath effect. Accordingly in the reception device illustrated in FIG. 8, data reception quality decreases.

In order to remedy this phenomenon, in FIG. 22, phase changers 209A, 209B are inserted. Since this changes the phase along the time or frequency axis, in the reception device illustrated in FIG. 8, it is possible to reduce the probability of reception of an inferior reception signal. Moreover, since there is a high probability that there will be a difference in the multipath effect that the modulated signal transmitted from antenna unit #A 109_A is subjected to with respect to the multipath effect that the modulated signal transmitted from antenna unit #B 109_B is subjected to, there is a high probability that diversity gain will result, and accordingly that data reception quality in the reception device illustrated in FIG. 8 will improve.

For these reasons, in FIG. 22, phase changers 209A, 209B are provided and phase change is implemented.

Other symbols 403 and other symbols 503 include, in addition to control information symbols, for example, symbols for signal detection, symbols for performing frequency and time synchronization, and symbols for performing channel estimation (a symbol for performing propagation path fluctuation estimation), for demodulating and decoding control information symbols. Moreover, "the frames of FIG. 4 and FIG. 5" or "the frames of FIG. 13 and FIG. 14" include pilot symbols 401, 501, and by using these, it is possible to perform demodulation and decoding with high precision via control information symbols.

Moreover, "the frames of FIG. 4 and FIG. 5" or "the frames of FIG. 13 and FIG. 14" transmit a plurality of streams or perform MIMO transmission at the same time and using the same frequency (frequency band) via data symbols 402 and data symbols 502. In order to demodulate these data symbols, symbols for signal detection, symbols for frequency and time synchronization, and symbols for channel estimation, which are included in other symbols 403 and other symbols 503, are used.

Here, "symbols for signal detection, symbols for frequency and time synchronization, and symbols for channel estimation, which are included in other symbols 403 and other symbols 503" are applied with a phase change by phase changers 209A, 209B, as described above.

Under these circumstances, when this processing is not performed on data symbols 402 and data symbols 502 (on data symbols 402 in the example above), in the reception device, when data symbols 402 and data symbols 502 are demodulated and decoded, there is a need to perform the demodulation and decoding in which the processing for the phase change by phase changer 209A was performed, and there is a probability that this processing will be complicated.

This is because "symbols for signal detection, symbols for frequency and time synchronization, and symbols for channel estimation, which are included in other symbols 403 and other symbols 503" are applied with a phase change by phase changers 209A, 209B.

However, as illustrated in FIG. 22, in phase changers 209A, 209B, when a phase change is applied to data symbols 402 and data symbols 502, in the reception device, there is the advantage that data symbols 402 and data symbols 502 can simply be demodulated and decoded using the channel estimation signal (propagation path fluctuation signal) estimated by using "symbols for signal detection, symbols for frequency and time synchronization, and symbols for channel estimation, which are included in other symbols 403 and other symbols 503".

Additionally as illustrated in FIG. 22, in phase changers 209A, 209B, when a phase change is applied to data symbols 402 and data symbols 502, in multipath environments, it is possible to reduce the influence of sharp drops in electric field intensity along the frequency axis. Accordingly it is possible to obtain the advantageous effect of an improvement in data reception quality of data symbols 402 and data symbols 502.

In this way the point that "symbols that are targets for implementation of a phase change by phase changers 205A, 205B" and "symbols that are targets for implementation of a phase change by phase changers 209A, 209B" are different is a characteristic point.

As described above, by applying a phase change using phase changer 205B illustrated in FIG. 22, it is possible to achieve the advantageous effect of an improvement in data reception quality of data symbols 402 and data symbols 502 in the reception device in, for example, LOS environments, and by applying a phase change using phase changers 209A, 209B illustrated in FIG. 22, for example, it is possible to achieve the advantageous effect of an improvement in data reception quality in the reception device of the control information symbols included in "the frames of FIG. 4 and FIG. 5" or "the frames of FIG. 13 and FIG. 14" and the advantageous effect that operations of demodulation and decoding of data symbols 402 and data symbols 502 become simple.

Note that the advantageous effect of an improvement in data reception quality in the reception device of data symbols 402 and data symbols 502 in, for example, LOS environments, is achieved as a result of the phase change implemented by phase changers 205A, 205B illustrated in FIG. 22 and furthermore, the reception quality of data symbols 402 and data symbols 502 is improved by applying a phase change to data symbols 402 and data symbols 502 using phase changers 209A, 209B illustrated in FIG. 22.

Note that Q in Equation (38) may be an integer of −2 or less. In such a case, the value for the phase change cycle is the absolute value of Q. This feature is applicable to Embodiment 1 as well.

Note that R in Equation (49) may be an integer of −2 or less. In such a case, the value for the phase change cycle is the absolute value of R.

Moreover, taking into consideration the descriptions provided in Supplemental Information 1, the cyclic delay amount set in phase changer 209A and the cyclic delay amount set in phase changer 209B may be different values.

Embodiment 7

In this embodiment, an example of a communications system that employs the transmission method and reception method described in Embodiments 1 to 6 will be described.

Figure 23:
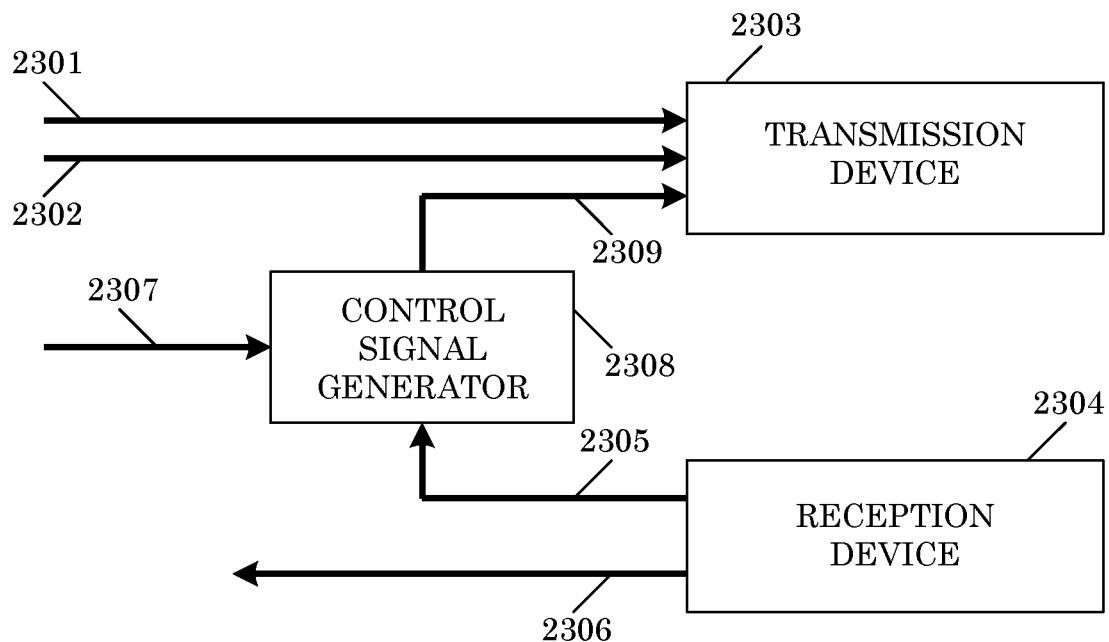
FIG. 23 illustrates one example of a configuration of a base station.

FIG. 23 illustrates one example of a configuration of a base station, access point, or the like according to this embodiment.

Transmission device 2303 receives inputs of data 2301, signal group 2302, and control signal 2309, generates a modulated signal corresponding to data 2301 and signal group 2302, and transmits the modulated signal from an antenna.

One example of a configuration of transmission device 2303 is as is shown in FIG. 1, where data 2301 corresponds to data 101 in FIG. 1, signal group 2302 corresponds to signal group 110 in FIG. 1, and control signal 2309 corresponds to control signal 100 in FIG. 1.

Reception device 2304 receives a modulated signal transmitted by the communication partner such as a terminal, performs signal processing, demodulation, and decoding on the modulated signal, and outputs control information signal 2305 from the communication partner and reception data 2306.

One example of a configuration of reception device 2304 is as shown in FIG. 8, where reception data 2306 corresponds to reception data 812 in FIG. 8, and control information signal 2305 from the communication partner corresponds to control signal 810 in FIG. 8.

Control signal generator 2308 receives inputs of control information signal 2305 from the communication partner and settings signal 2307, and generates and outputs control signal 2309 based on these inputs.

Figure 24:
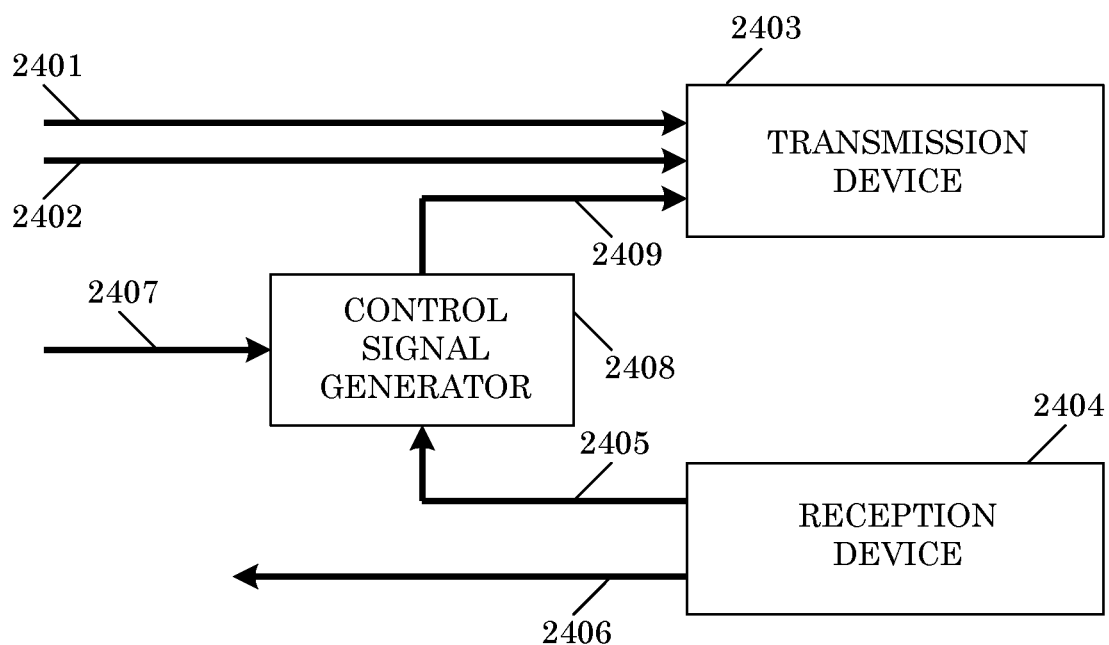
FIG. 24 illustrates one example of a configuration of a terminal.

FIG. 24 illustrates one example of a configuration of a terminal, which is the communication partner of the base station illustrated in FIG. 23.

Transmission device 2403 receives inputs of data 2401, signal group 2402, and control signal 2409, generates a modulated signal corresponding to data 2401 and signal group 2402, and transmits the modulated signal from an antenna.

One example of a configuration of transmission device 2403 is as is shown in FIG. 1, where data 2401 corresponds to data 101 in FIG. 1, signal group 2402 corresponds to signal group 110 in FIG. 1, and control signal 2409 corresponds to control signal 100 in FIG. 1.

Reception device 2404 receives a modulated signal transmitted by the communication partner such as a base station, performs signal processing, demodulation, and decoding on the modulated signal, and outputs control information signal 2405 from the communication partner and reception data 2406.

One example of a configuration of reception device 2404 is as shown in FIG. 8, where reception data 2406 corresponds to reception data 812 in FIG. 8, and control information signal 2405 from the communication partner corresponds to control signal 810 in FIG. 8.

Control signal generator 2408 receives inputs of control information signal 2305 from the communication partner and settings signal 2407, and generates and outputs control signal 2409 based on this information.

Figure 25:
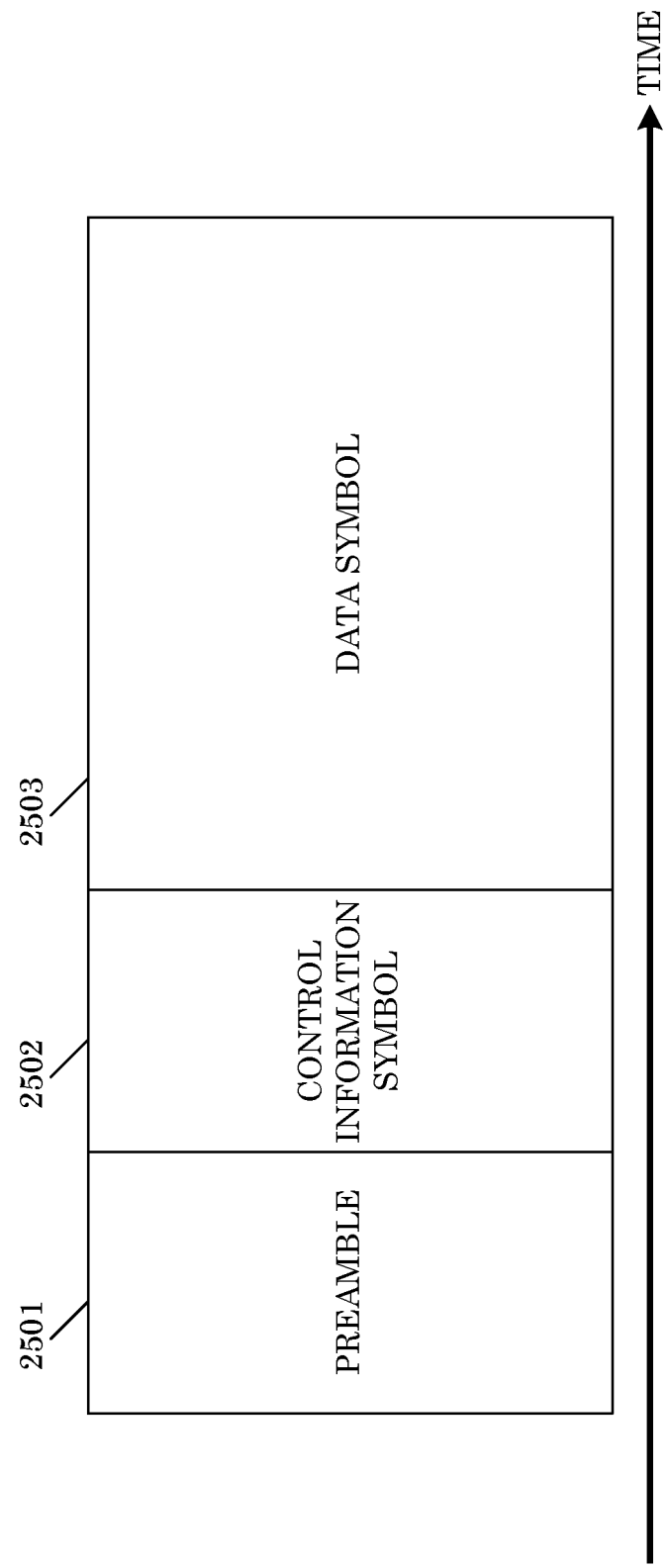
FIG. 25 illustrates one example of a frame configuration of a modulated signal.

FIG. 25 illustrates one example of a frame configuration of a modulated signal transmitted by the terminal illustrated in FIG. 24. Time is represented on the horizontal axis. Preamble 2501 is a symbol, such as a PSK symbol, for the communication partner (for example, a base station) to perform signal detection, frequency synchronization, time synchronization, frequency offset estimation, and/or channel estimation. Preamble 2501 may include a training symbol for directionality control. Note that, here, the terminology "preamble" is used, but different terminology may be used.

FIG. 25 illustrates control information symbol 2502 and data symbol 2503 including data to be transmitted to the communication partner.

Control information symbol 2502 includes, for example: information on an error correction encoding method used to generate data symbol 2503, such as information on the code length (block length) and/or encode rate; modulation scheme information, and control information for notifying the communication partner.

Note that FIG. 25 is merely one non-limiting example of a frame configuration. Moreover other symbols, such as a pilot symbol and/or reference symbol, may be included in the symbols illustrated in FIG. 25. In FIG. 25, frequency is represented on the vertical axis and symbols are present along the frequency axis (carrier direction).

As examples of a frame configuration transmitted by the base station illustrated in FIG. 23 have been described with reference to FIG. 4, FIG. 5, FIG. 13, and FIG. 14, further description is herein omitted. Note that other symbols 403, 503 may include a training symbol for performing directionality control. Accordingly in this embodiment, the base station covers a case in which a plurality of modulated signals are transmitted using a plurality of antennas.

Next, operations performed by a base station in a communications system such as described above will be described in detail.

Transmission device 2303 in the base station illustrated in FIG. 23 has the configuration illustrated in FIG. 1. Signal processor 106 illustrated in FIG. 1 has the configuration illustrated in any one of FIG. 2, FIG. 18, FIG. 19, FIG. 20, FIG. 21, FIG. 22, FIG. 28, FIG. 29, FIG. 30, FIG. 31, FIG. 32, and FIG. 33. Note that FIG. 28, FIG. 29, FIG. 30, FIG. 31, FIG. 32, and FIG. 33 will be described later. Here, operation performed by phase changers 205A, 205B may be switched depending on the communications environment or the settings. Control information relating to operations performed by phase changers 205A, 205B is transmitted by the base station as a part of the control information transmitted via control information symbols, namely other symbols 403, 503 in the frame configurations illustrated in FIG. 4, FIG. 5, FIG. 13, and FIG. 14.

Here, control information relating to operations performed by phase changers 205A, 205B is expressed as u0, u1. The relationship between [u0 u1] and phase changers 205A, 205B is illustrated in Table 1. Note that u0, u1 are transmitted by the base station as some of the control information symbols, namely other symbols 403, 503. The terminal obtains [u0 u1] included in control information symbols, namely other symbol 403, 503, becomes aware of operations performed by phase changers 205A, 205B from [u0 u1], and demodulates and decodes data symbols.

TABLE 1

| u0 u1 | phase changer operations |
|---|---|
| 00 | no phase change |
| 01 | change phase change value on a per-symbol basis (cyclically/regularly) |
| 10 | implement phase change using specified phase change value (set) |
| 11 | Reserve |

Interpretation of Table 1 is as follows.

When the settings in the base station are configured such that phase changers 205A, 205B do not implement a phase change, u0 is set to 0 (u0=0) and u1 is set to 0 (u1=0). Accordingly phase changer 205A outputs signal 206A without implementing a phase change on the input signal (204A).

Similarly phase changer 205B outputs signal 206B without implementing a phase change on input signal 204B.

When the settings in the base station are configured such that phase changers 205A, 205B implement a phase change cyclically/regularly on a per-symbol basis, u0 is set to 0 (u0=0) and u1 is set to 1 (u1=1). Note that since the method used by phase changers 205A, 205B to implement a phase change cyclically/regularly on a per-symbol basis is described in detail in Embodiments 1 through 6, detailed description thereof is omitted. When signal processor 106 illustrated in FIG. 1 is configured as illustrated in any one of FIG. 20, FIG. 21, and FIG. 22, u0 is also set to 0 (u0=0) and u1 is also set to 1 (u1=1) when the settings in the base station are configured such that phase changer 205A implements a phase change cyclically/regularly on a per-symbol basis and phase changer 205B does not implement a phase change cyclically/regularly on a per-symbol basis, and when the settings in the base station are configured such that phase changer 205A does not implement a phase change cyclically/regularly on a per-symbol basis and phase changer 205B implements a phase change cyclically/regularly on a per-symbol basis.

When the settings in the base station are configured such that phase changers 205A, 205B implement phase change using a specific phase change value, u0 is set to 1 (u0=1) and u1 is set to 0 (u1=0). Next, implementation of a phase change using a specific phase change value will be described.

For example, in phase changer 205A, a phase change is implemented using a specific phase change value. Here, the input signal (204A) is expressed as z1(i). i is a symbol number. Accordingly, when a phase change is implemented using a specific phase change value, output signal 206A is expressed as $e^{j\alpha} \times z1(i)$. $\alpha$ is the specific phase change value, and is an actual number. Here, the amplitude may be changed. In such a case, output signal 206A is expressed as $A \times e^{j\alpha} \times z1(i)$. Note that A is an actual number.

Similarly in phase changer 206A, a phase change is implemented using a specific phase change value. Here, input signal 204B is expressed as z2(t). i is a symbol number. Accordingly when a phase change is implemented using a specific phase change value, output signal 206B is expressed as $e^{j\beta} \times z2(i)$. a is the specific phase change value, and is an actual number. Here, the amplitude may be changed. In such a case, output signal 206B is expressed as $B \times e^{j\beta} \times z2(i)$. Note that B is an actual number.

Note that when signal processor 106 illustrated in FIG. 1 is configured as illustrated in any one of FIG. 20, FIG. 21, FIG. 22, FIG. 31, FIG. 32, and FIG. 33, u0 is also set to 1 (u0=1) and u1 is also set to 0 (u1=0) when the settings in the base station are configured such that phase changer 205A implements a phase change using a specific phase change value and phase changer 205B does not implement a phase change using a specific phase change value, and when the settings in the base station are configured such that phase changer 205A does not implement a phase change using a specific phase change value and phase changer 205B implements a phase change using a specific phase change value.

Next, an example of a method for setting a specific phase change value will be described. Hereinafter, a first method and a second method will be described.

First Method:

The base station transmits a training symbol. The terminal, which is the communication partner, uses the training symbol to transmit information on the specific phase change value (set) to the base station. The base station implements a phase change based on the information on the specific phase change value (set) obtained from the terminal.

Another alternative example is as follows. The base station transmits a training symbol. The terminal, which is the communication partner, transmits, to the base station, information relating to the reception result of the training symbol (e.g., information relating to a channel estimation value). Based on the information relating to the reception result of the training symbol from the terminal, the base station calculates a suitable value for the specific phase change value (set) and implements a phase change.

Note that it is necessary for the base station to notify the terminal of the information relating to the specific phase change value (set) set in the settings, and in this case, the control information symbols, namely other symbols 403, 503 illustrated in FIG. 4, FIG. 5, FIG. 13, and FIG. 14 transmit information relating to the specific phase change value (set) set in the settings by the base station.

Figure 26:
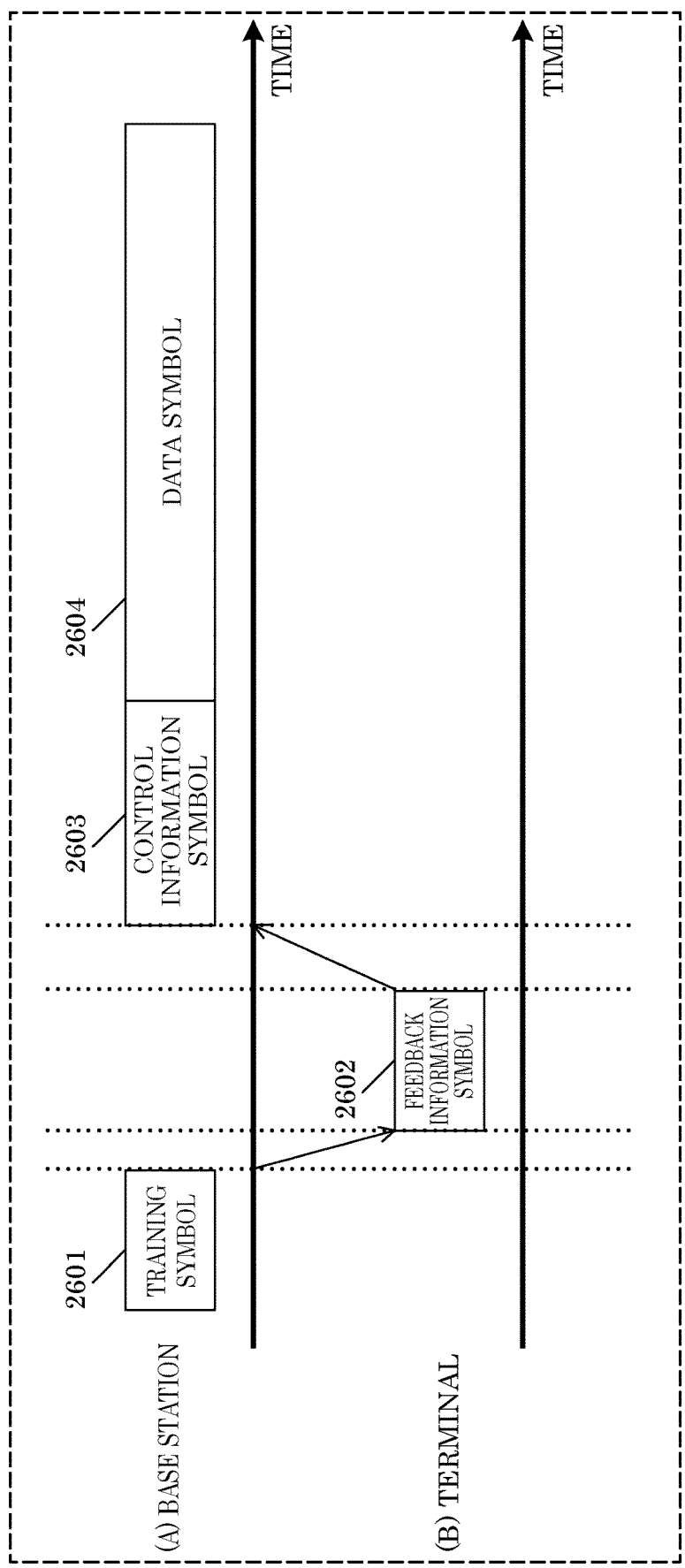
FIG. 26 illustrates one example of transmission between a base station and a terminal.

Next, an implementation example of the first method will be described with reference to FIG. 26. In FIG. 26, (A)

illustrates symbols transmitted by the base station arranged on the time axis, which is the horizontal axis. In FIG. 26, (B) illustrates symbols transmitted by the terminal arranged on the time axis, which is the horizontal axis.

Hereinafter, FIG. 26 will be described in detail. First, the terminal requests communication with the base station.

Then, the base station transmits at least training symbol 2601 for estimating the specific phase change value (set) to be used by the base station for the transmission of data symbol 2604. Note that the terminal may perform other estimation using training symbol 2601, and training symbol 2601 may use PSK modulation, for example. The training symbol is then transmitted from a plurality of antennas, just like the pilot symbol described in Embodiments 1 through 6.

The terminal receives training symbol 2601 transmitted by the base station, calculates, using training symbol 2601, a suitable specific phase change value (set) for phase changer 205A and/or phase changer 205B included in the base station to use upon implementing a phase change, and transmits feedback information symbol 2602 including the calculated value.

The base station receives feedback information symbol 2602 transmitted by the terminal, and demodulates and decodes the symbol to obtain information on the suitable specific phase change value (set). Based on this information, the phase change value (set) used in the implementation of the phase change by phase changer 205A and/or phase changer 205B in the base station is set.

The base station then transmits control information symbol 2603 and data symbol 2604. Here, at least data symbol 2604 is implemented with a phase change using the set phase change value (set).

Note that regarding data symbol 2604, the base station transmits a plurality of modulated signals from a plurality of antennas, just as described in Embodiments 1 through 6. However, unlike Embodiments 1 through 6, phase changer 205A and/or phase changer 205B implement a phase change using the specific phase change value (set) described above.

The frame configurations of the base station and terminal illustrated in FIG. 26 are mere non-limiting examples; other symbols may be included. Training symbol 2601, feedback information symbol 2602, control information symbol 2603, and data symbol 2604 may each include another symbol such as a pilot symbol. Moreover, control information symbol 2603 includes information relating to the specific phase change value (set) used upon transmitting data symbol 2604, and the terminal becomes capable of demodulating and decoding data symbol 2604 as a result of obtaining this information.

Similar to as described in Embodiments 1 through 6, for example, when the base station transmits a modulated signal having a frame configuration such as illustrated in FIG. 4, FIG. 5, FIG. 13, or FIG. 14, the subject of the phase change implemented using the specific phase change value (set) by phase changer 205A and/or phase changer 205B, as described above, is a data symbol (402, 502). The symbol that is subject to phase change implemented by phase changer 209A and/or phase changer 209B is, just as described in Embodiments 1 through 6, "pilot symbol 401, 501", "other symbol 403, 503".

However, in phase changer 205A and/or phase changer 205B, if a phase change is applied to "pilot symbol 401, 501", "other symbol 403, 503" as well, demodulating and decoding is possible.

A note regarding the recitation "specific phase change value (set)" follows. In the examples illustrated in FIG. 2, FIG. 18, FIG. 19, FIG. 31, FIG. 32, FIG. 33, phase changer 205A is omitted, and phase changer 205B is included. Accordingly, in such a case, there is a need to prepare a specific phase change value to be used by phase changer 205B. On the other hand, in the examples illustrated in FIG. 20, FIG. 21, FIG. 22, FIG. 31, FIG. 32, and FIG. 33, phase changer 205A and phase changer 205B are included. In such a case, there is a need to prepare a specific phase change value #A to be used by phase changer 205A and a specific phase change value #B to be used by phase changer 205B. Accordingly, the terminology "specific phase change value (set)" is used.

Second Method:

The base station starts transmission of a frame to the terminal. In this case, for example, the base station sets the specific phase change value (set) based on a random value, implements a phase change using the specific phase change value, and transmits the modulated signal.

Thereafter, the terminal transmits, to the base station, information indicating that the frame or packet could not be obtained, and the base station receives this information.

In this case, for example, the base station sets the specific phase change value (set) based on a random value, and transmits the modulated signal. Here, at least a data symbol including the frame (packet) data that the terminal could not obtain is transmitted via a modulated signal implemented with a phase change based on the newly set specific phase change value (set). In other words, when the base station performs transmission two (or more) times as a result of, for example, retransmitting the first frame (packet) data, the specific phase change value (set) used for the first transmission and the specific phase change value (set) used for the second transmission may be different. This makes it possible to achieve the advantageous effect that the frame or packet is highly likely to be obtained by the terminal upon the second transmission when retransmission is performed.

Thereafter, when the base station receives, from the terminal, information indicating that a frame or packet could not be obtained, the base station changes the specific change value (set) based on, for example, a random number.

Note that it is necessary for the base station to notify the terminal of the information relating to the specific phase change value (set) set in the settings, and in this case, the control information symbols, namely other symbols 403, 503 illustrated in FIG. 4, FIG. 5, FIG. 13, and FIG. 14 transmit information relating to the specific phase change value (set) set in the settings by the base station.

Note that in the above description of the second method, the specific phase change value (set) is set by the base station based on a random value, but the method for setting the specific phase change value (set) is not limited to this example. So long as the specific phase change value (set) is set to a new value upon setting the specific phase change value (set), any method may be used to set the specific phase change value (set). For example, the specific phase change value (set) is set based on some rule. The specific phase change value (set) may be set randomly. The specific phase change value (set) may be set based on information obtained from the communication partner. The specific phase change value (set) may be set in any of these ways. However, the method is not limited to these examples.

Figure 27:
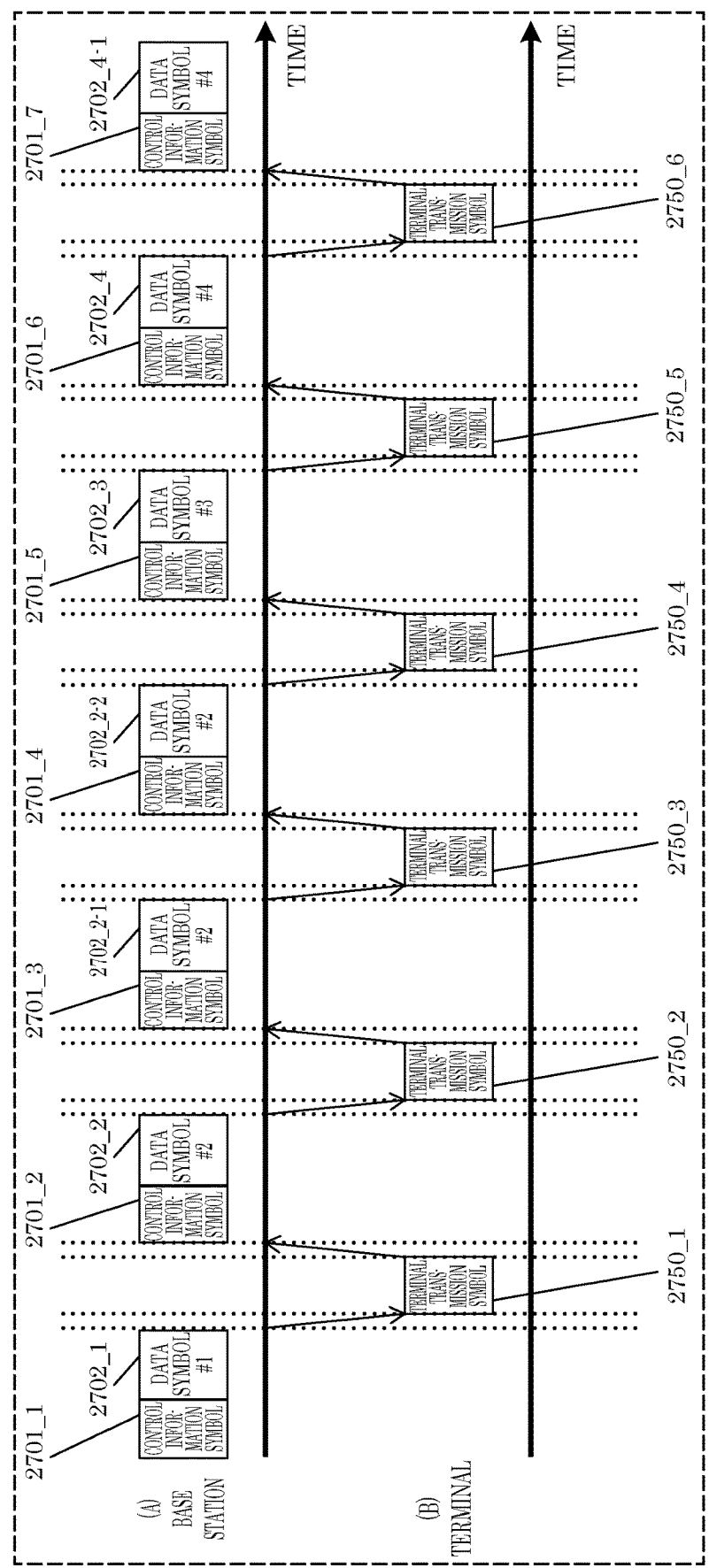
FIG. 27 illustrates one example of transmission between a base station and a terminal.

Next, an implementation example of the second method will be described with reference to FIG. 27. In FIG. 27, (A) illustrates symbols transmitted by the base station arranged on the time axis, which is the horizontal axis. In FIG. 27, (B)

illustrates symbols transmitted by the terminal arranged on the time axis, which is the horizontal axis.

Hereinafter, FIG. 27 will be described in detail.

Note that in order to describe FIG. 27, descriptions of FIG. 28, FIG. 29, FIG. 30, FIG. 31, FIG. 32, and FIG. 33 will also be described.

Examples of the configuration of signal processor 106 illustrated in FIG. 1 are given in FIG. 2, FIG. 18, FIG. 19, FIG. 20, FIG. 21, and FIG. 22, and variations on those configurations are illustrated in FIG. 28, FIG. 29, FIG. 30, FIG. 31, FIG. 32, and FIG. 33.

Figure 28:
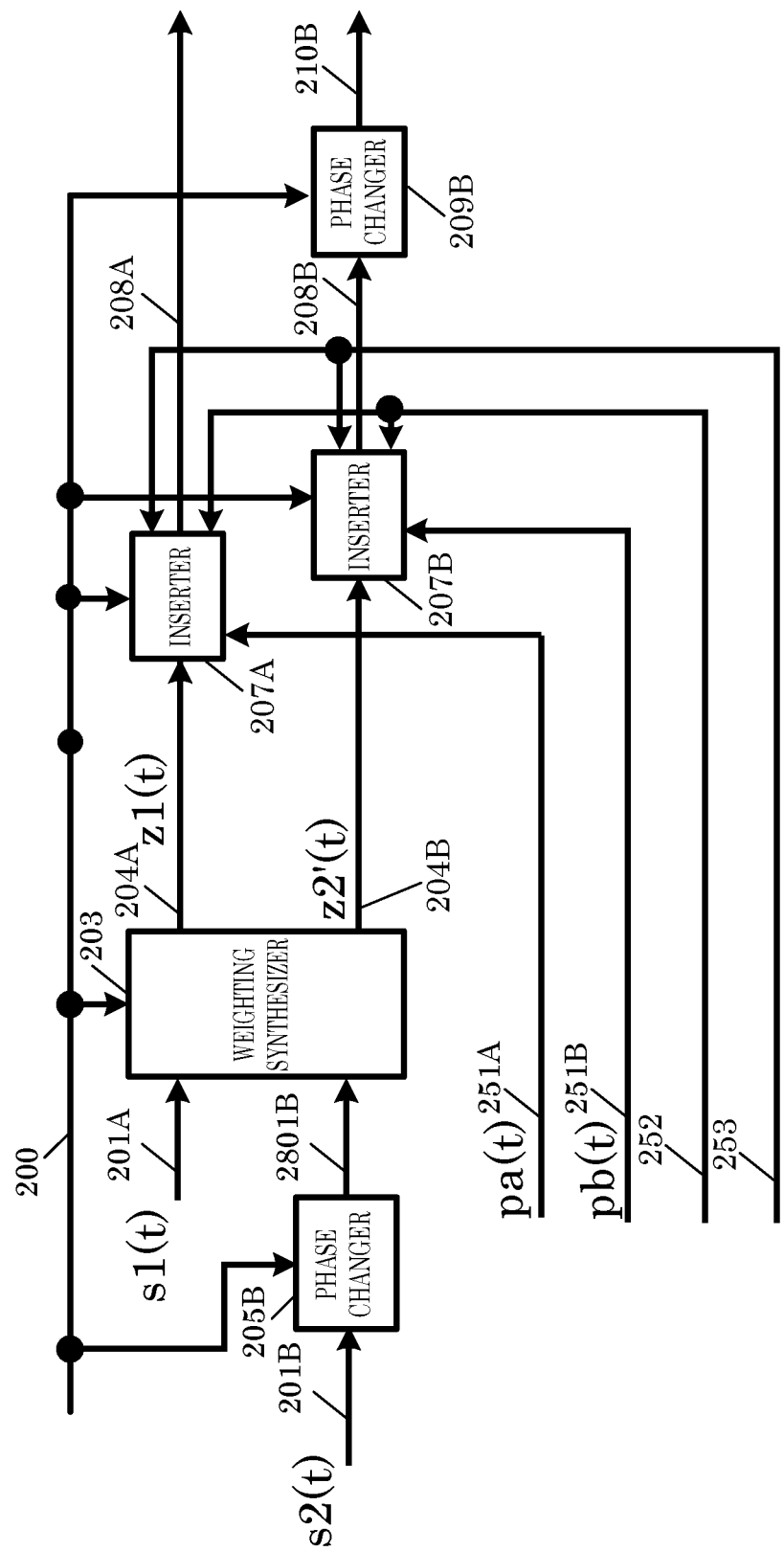
FIG. 28 illustrates one example of a configuration of the signal processor illustrated in FIG. 1.

FIG. 28 is an example in which the configuration in FIG. 2 is modified by moving phase changer 205B in front of weighting synthesizer 203. Next, operations in FIG. 28 different from those with respect to FIG. 2 will be described.

Phase changer 205B receives inputs of mapped signal s2(t)201B and control signal 200, and based on control signal 200, applies a phase change to mapped signal 201B, and outputs phase-changed signal 2801B.

In phase changer 205B, for example, a phase change of y(i) is applied to s2(i). Accordingly when phase-changed signal 2801B is expressed as s2'(i), s2'(i)=y(i)×s2(i). Note that i is a symbol number and is an integer that is greater than or equal to 0. Note that the application method for phase change value y(i) is as described in Embodiment 1.

Weighting synthesizer 203 receives inputs of mapped signal s1(i)201A, phase-changed signal s2'(i)2801B, and control signal 200, performs weighting synthesis (precoding) based on control signal 200, and outputs weighting synthesized signal 204A and weighting synthesized signal 204B. More specifically, weighting synthesizer 203 multiplies a precoding matrix with the vectors of mapped signal s1(i)201A and phase-changed signal s2'(i)2801B to obtain weighting synthesized signal 204A and weighting synthesized signal 204B. Note that the configuration example for the precoding matrix is as described in Embodiment 1. Subsequent description is the same as made with reference to FIG. 2, and as such, is omitted.

Figure 29:
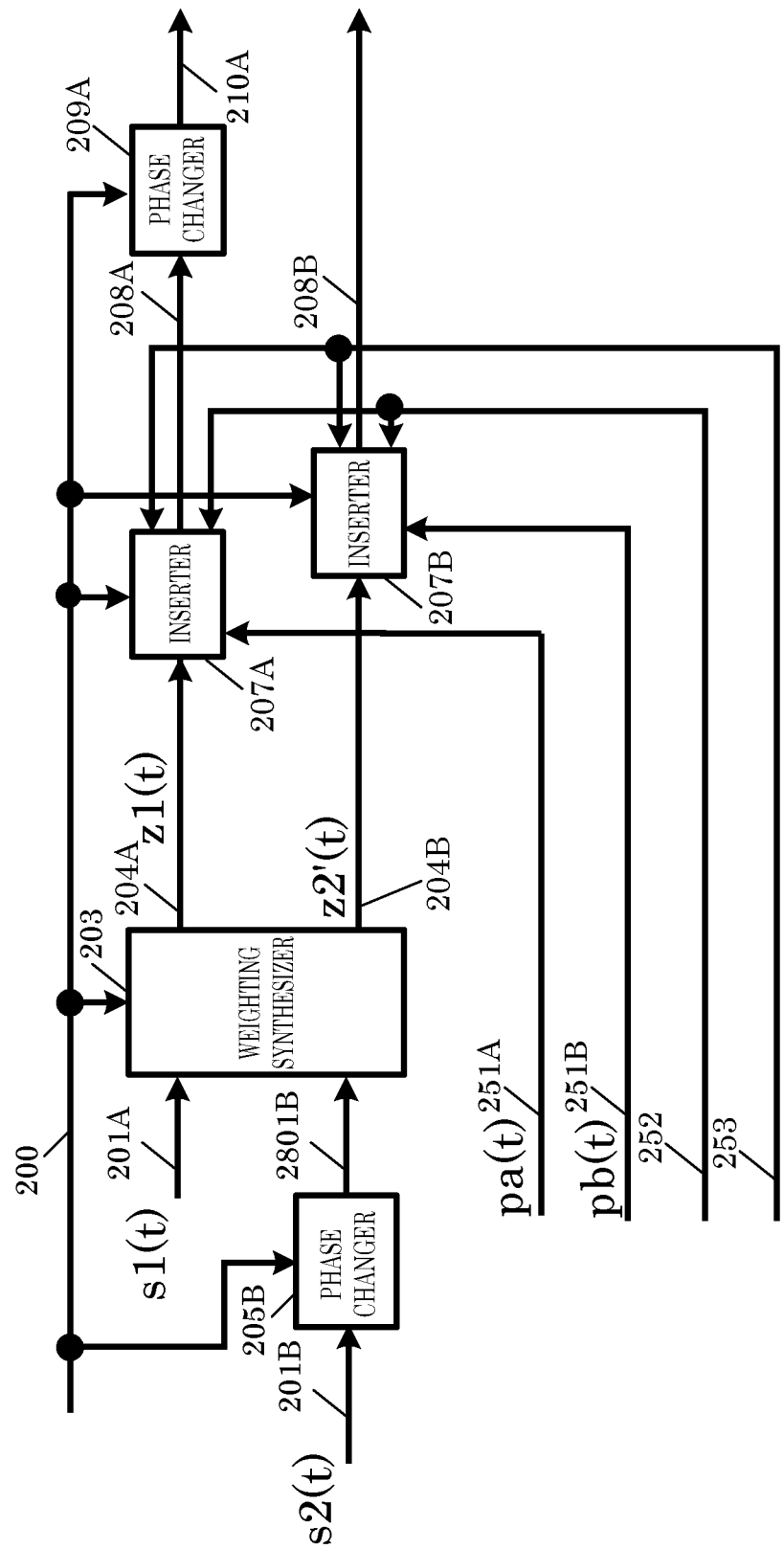
FIG. 29 illustrates one example of a configuration of the signal processor illustrated in FIG. 1.

FIG. 29 is an example in which the configuration in FIG. 18 is modified by moving phase changer 205B in front of weighting synthesizer 203. In this case, the operations performed by phase changer 205B and weighting synthesizer 203 are the same as described with reference to FIG. 28, and as such, description will be omitted. Moreover, operations down the line of weighting synthesizer 203 are also the same as made with reference to FIG. 18, and as such, description thereof is omitted.

Figure 30:
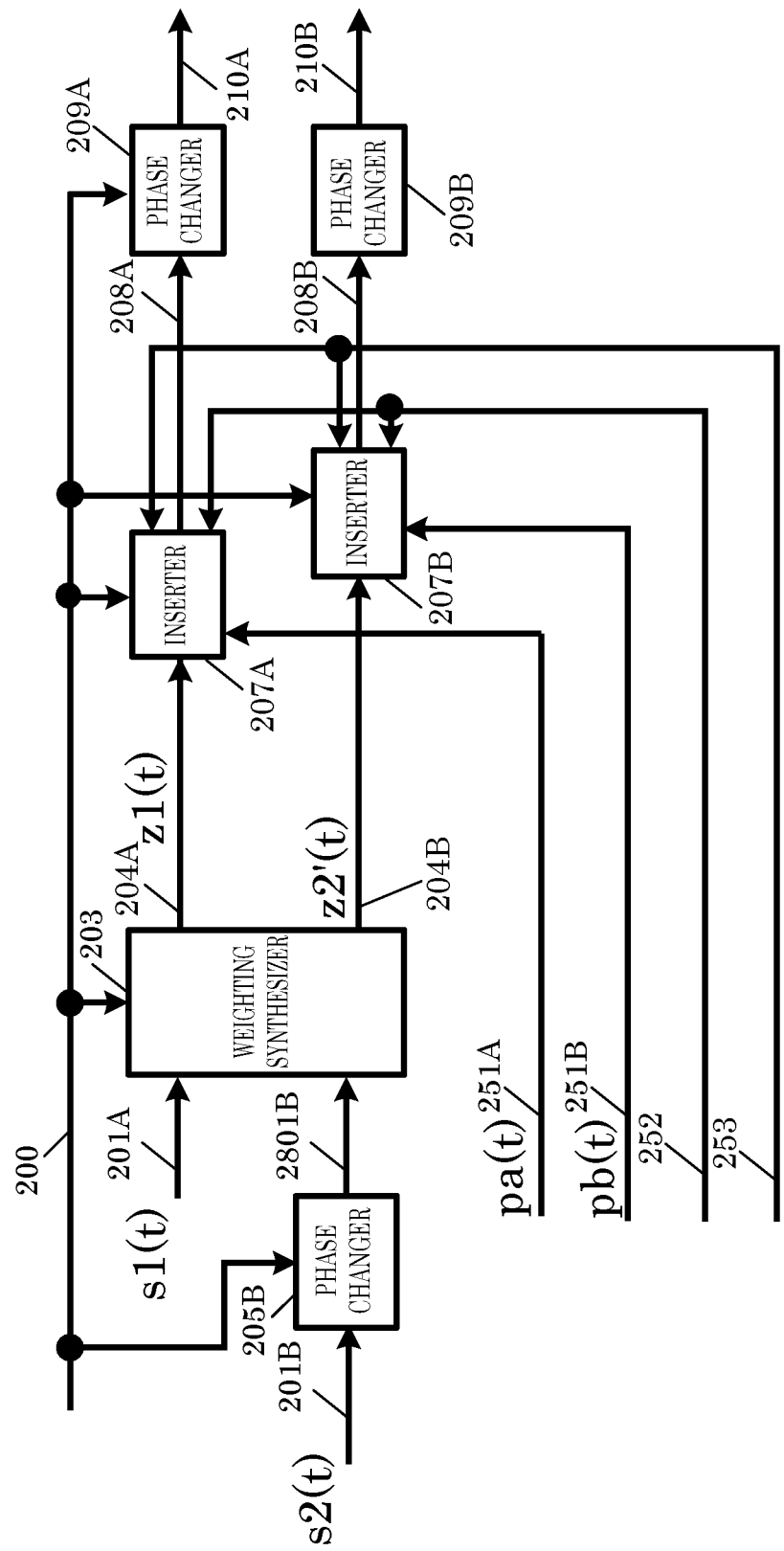
FIG. 30 illustrates one example of a configuration of the signal processor illustrated in FIG. 1.

FIG. 30 is an example in which the configuration in FIG. 19 is modified by moving phase changer 205B in front of weighting synthesizer 203. In this case, the operations performed by phase changer 205B and weighting synthesizer 203 are the same as described with reference to FIG. 28, and as such, description will be omitted. Moreover, operations down the line of weighting synthesizer 203 are also the same as made with reference to FIG. 19, and as such, description thereof is omitted.

Figure 31:
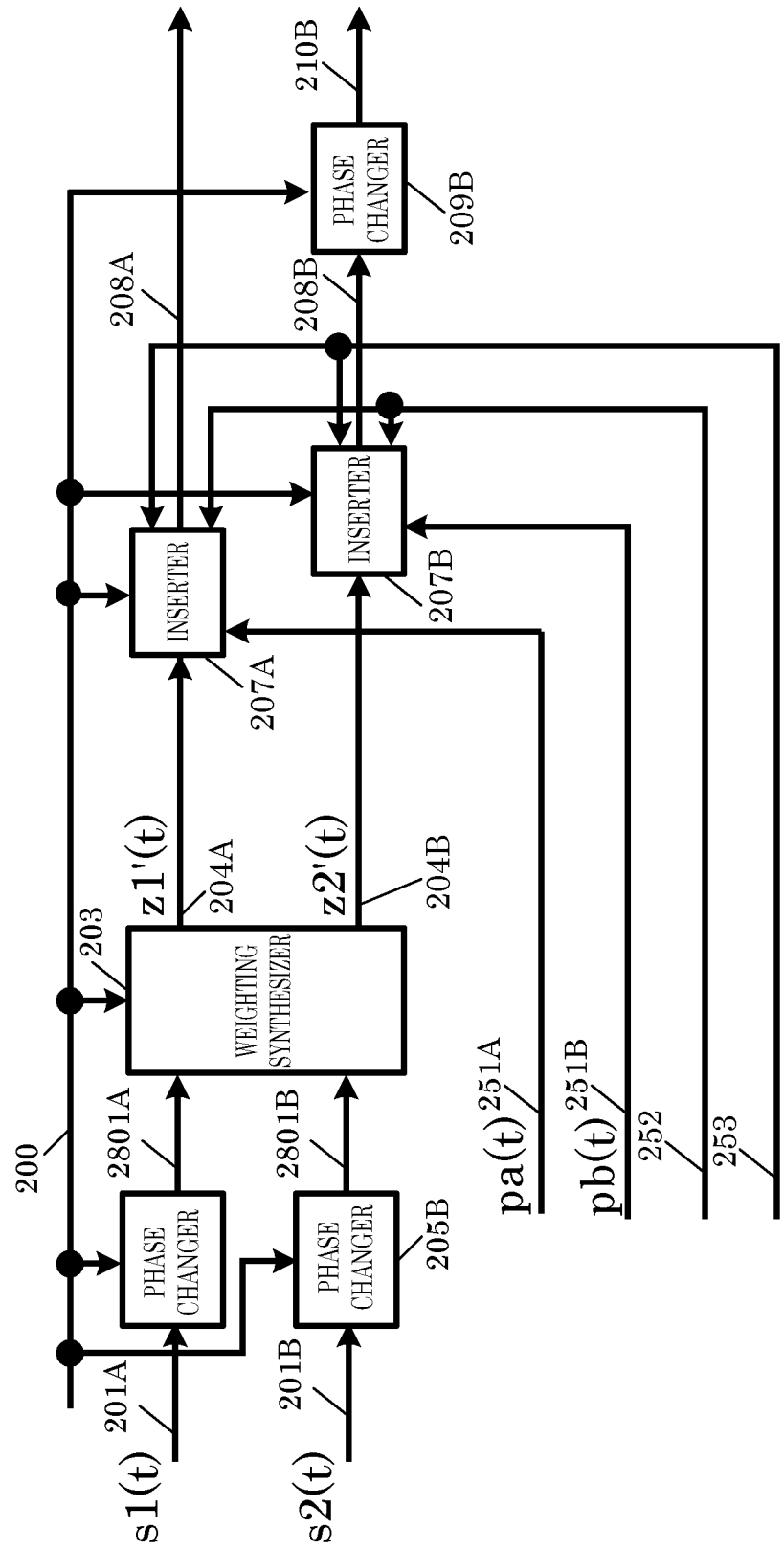
FIG. 31 illustrates one example of a configuration of the signal processor illustrated in FIG. 1.

FIG. 31 is an example in which the configuration in FIG. 20 is modified by moving phase changer 205A in front of weighting synthesizer 203 and moving phase changer 205B in front of weighting synthesizer 203.

Phase changer 205A receives inputs of mapped signal s1(t)201A and control signal 200, and based on control signal 200, applies a phase change to mapped signal 201A, and outputs phase-changed signal 2801A.

In phase changer 205A, for example, a phase change of w(i) is applied to mapped signal s1(i). Accordingly phase-changed signal s1'(i)2901A can be expressed as s1'(i)=w(i)× s1(i). Note that i is a symbol number and is an integer that is greater than or equal to 0. Note that the application method for phase change value w(i) is as described in Embodiment 1.

In phase changer 205B, for example, a phase change of y(i) is applied to s2(i). Accordingly, phase-changed signal s2'(i)2801B can be expressed as s2'(i)=y(i)×s2(i). Note that i is a symbol number and is an integer that is greater than or equal to 0. Note that the application method for phase change value y(i) is as described in Embodiment 1.

Weighting synthesizer 203 receives inputs of mapped signal s1'(i)2801A, phase-changed signal s2'(i)2801B, and control signal 200, performs weighting synthesis (precoding) based on control signal 200, and outputs weighting synthesized signal 204A and weighting synthesized signal 204B. More specifically weighting synthesizer 203 multiplies a precoding matrix with the vectors of mapped signal s1'(i)2801A and phase-changed signal s2'(i)2801B to obtain weighting synthesized signal 204A and weighting synthesized signal 204B. Note that the configuration example for the precoding matrix is as described in Embodiment 1. Subsequent description is the same as made with reference to FIG. 20, and as such, is omitted.

Figure 32:
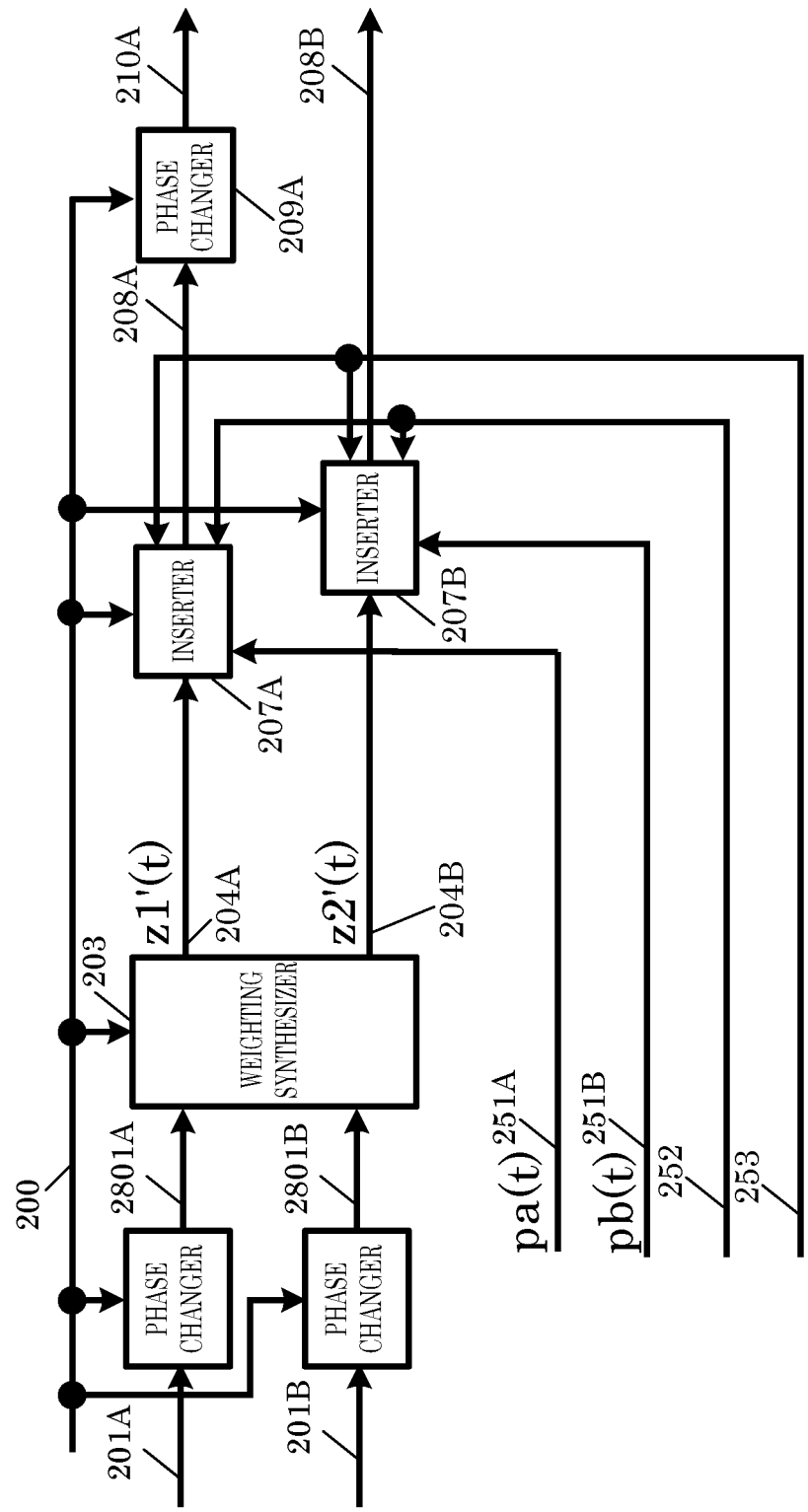
FIG. 32 illustrates one example of a configuration of the signal processor illustrated in FIG. 1.

FIG. 32 is an example in which the configuration in FIG. 21 is modified by moving phase changer 205A in front of weighting synthesizer 203 and moving phase changer 205B in front of weighting synthesizer 203. In this case, the operations performed by phase changer 205A, phase changer 205B, and weighting synthesizer 203 are the same as described with reference to FIG. 31, and as such, description will be omitted. Moreover, operations down the line of weighting synthesizer 203 are also the same as made with reference to FIG. 21, and as such, description thereof is omitted.

Figure 33:
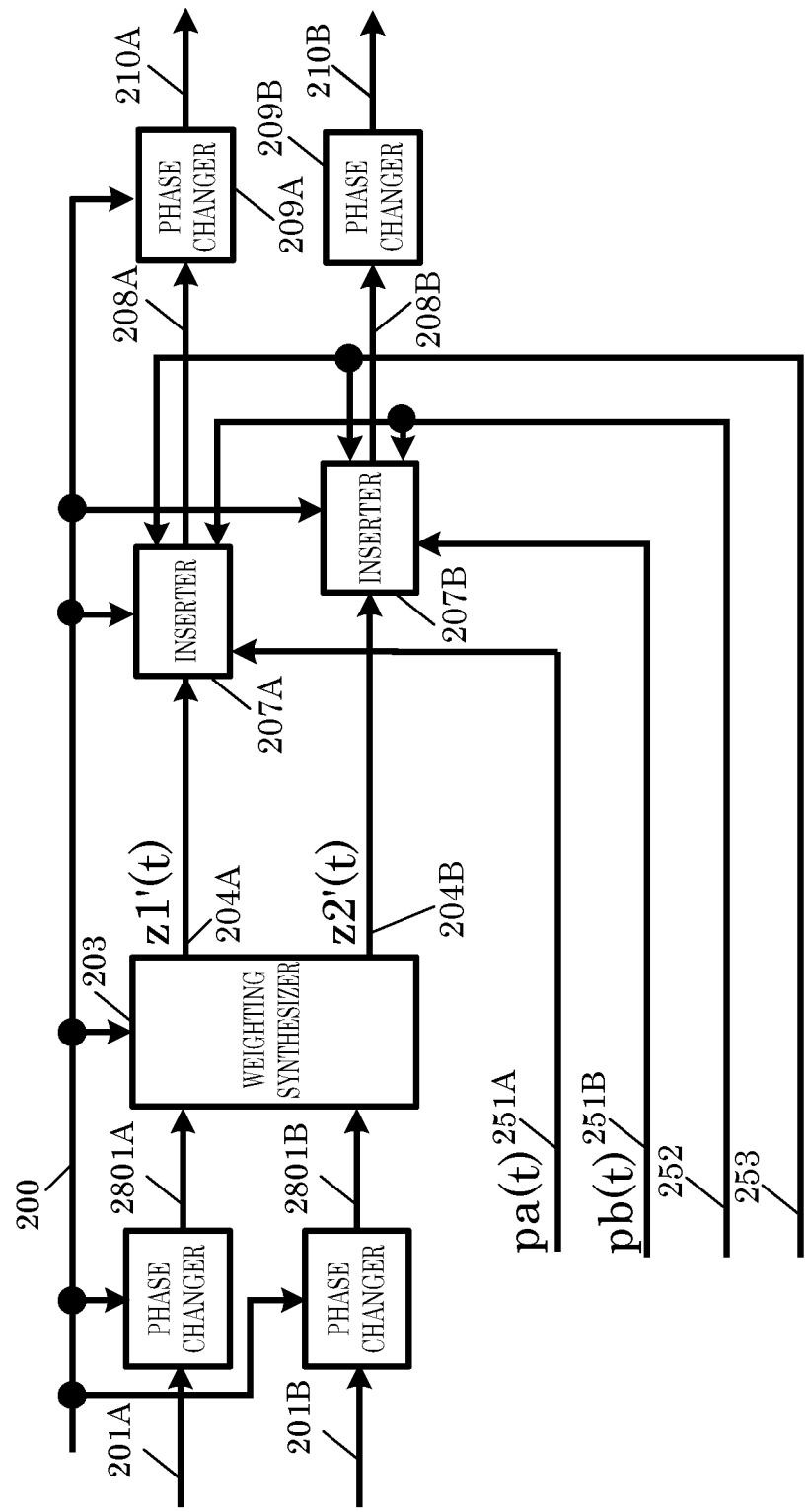
FIG. 33 illustrates one example of a configuration of the signal processor illustrated in FIG. 1.

FIG. 33 is an example in which the configuration in FIG. 22 is modified by moving phase changer 205A in front of weighting synthesizer 203 and moving phase changer 205B in front of weighting synthesizer 203. In this case, the operations performed by phase changer 205A, phase changer 205B, and weighting synthesizer 203 are the same as described with reference to FIG. 31, and as such, description will be omitted. Moreover, operations down the line of weighting synthesizer 203 are also the same as made with reference to FIG. 22, and as such, description thereof is omitted.

In FIG. 27, the terminal requests communication with the base station.

In this case, the base station determines the phase change value to be implemented by phase changer 205A and/or phase changer 205B to be a first specific phase change value (set) by using a random number, for example. Then, the base station implements a phase change via phase changer 205A and/or phase changer 205B based on the determined first specific phase change value (set). Here, control information symbol 2701_1 includes information on the first specific phase change value (set).

A note regarding the terminology "first specific phase change value (set)" follows. In the examples illustrated in FIG. 2, FIG. 18, FIG. 19, FIG. 28, FIG. 29, and FIG. 30, phase changer 205A is omitted, and phase changer 205B is included. Accordingly in such a case, there is a need to prepare a first specific phase change value to be used by phase changer 205B. On the other hand, in the examples illustrated in FIG. 20, FIG. 21, FIG. 22, FIG. 31, FIG. 32, and FIG. 33, phase changer 205A and phase changer 205B are included. In such a case, there is a need to prepare a first specific phase change value #A to be used by phase changer 205A and a first specific phase change value #B to be used by phase changer 205B. Accordingly the terminology "first specific phase change value (set)" is used.

The base station then transmits control information symbol 2701_1 and data symbol #1 2702_1. Here, at least data symbol #1 2702_1 is implemented with a phase change using the determined first specific phase change value (set).

The terminal receives control information symbol 2701_1 and data symbol #1 2702_1 transmitted by the base station, and demodulates and decodes data symbol #1 2702_1 based at least on information on the first specific phase change value (set) included in control information symbol 2701_1. As a result, the terminal determines that the data included in data symbol #1 2702_1 is obtained without error. The terminal then transmits, to the base station, terminal transmission symbol 2750_1 including at least information indicating that the data included in data symbol #1 2702_1 was obtained without error.

The base station receives terminal transmission symbol 2750_1 transmitted by the terminal, and based at least on the information that is included in terminal transmission symbol 2750_1 and indicates that the data included in data symbol #1 2702_1 was obtained without error, determines the phase change (set) to be implemented by phase changer 205A and/or phase changer 205B to be the first specific phase change value (set), just as in the case where data symbol #1 2702_1 is transmitted.

Since the base station obtained the data included in data symbol #1 2702_1 without error, the terminal can determine that it is highly probable that data can be obtained without error when the next data symbol is transmitted and the first specific phase change value (set) is used. This makes it possible to achieve an advantageous effect that it is highly probable that the terminal can achieve a high data reception quality.

Then, the base station implements a phase change via phase changer 205A and/or phase changer 205B based on the determined first specific phase change value (set). Here, control information symbol 2701_2 includes information on the first specific phase change value (set).

The base station then transmits control information symbol 2701_2 and data symbol #2 2702_2. Here, at least data symbol #2 2702_2 is implemented with a phase change using the determined first specific phase change value (set).

The terminal receives control information symbol 2701_2 and data symbol #2 2702_2 transmitted by the base station, and demodulates and decodes data symbol #2 2702_2 based at least on information on the first specific phase change value (set) included in control information symbol 2701_2. As a result, the terminal determines that the data included in data symbol #2 2702_2 is not successfully obtained. The terminal then transmits, to the base station, terminal transmission symbol 2750_2 including at least information indicating that the data included in data symbol #2 2702_2 was not successfully obtained.

The base station receives terminal transmission symbol 2750_2 transmitted by the terminal, and based at least on the information that is included in terminal transmission symbol 2750_2 and indicates that the data included in data symbol #2 2702_2 was not successfully obtained, determines the phase change (set) to be implemented by phase changer 205A and/or phase changer 205B to be changed from the first specific phase change value (set).

Since the base station did not obtain the data included in data symbol #2 2702_2 successfully the terminal can determine that it is highly probable that data can be obtained without error when the next data symbol is transmitted and the phase change value is changed from the first specific phase change value (set). This makes it possible to achieve an advantageous effect that it is highly probable that the terminal can achieve a high data reception quality.

Accordingly the base station determines the phase change value (set) to be implemented by phase changer 205A and/or phase changer 205B to be changed from the first specific phase change value (set) to a second specific phase change value (set), by using a random number, for example. Then, the base station implements a phase change via phase changer 205A and/or phase changer 205B based on the determined second specific phase change value (set). Here, control information symbol 2701_3 includes information on the second specific phase change value (set).

A note regarding the terminology "second specific phase change value (set)" follows. In the examples illustrated in FIG. 2, FIG. 18, FIG. 19, FIG. 28, FIG. 29, and FIG. 30, phase changer 205A is omitted, and phase changer 205B is included. Accordingly in such a case, there is a need to prepare a second specific phase change value to be used by phase changer 205B. On the other hand, in the examples illustrated in FIG. 20, FIG. 21, FIG. 22, FIG. 31, FIG. 32, and FIG. 33, phase changer 205A and phase changer 205B are included. In such a case, there is a need to prepare a second specific phase change value #A to be used by phase changer 205A and a second specific phase change value #B to be used by phase changer 205B. Accordingly the terminology "second specific phase change value (set)" is used.

The base station then transmits control information symbol 2701_3 and data symbol #2 2702_2-1. Here, at least data symbol #2 2702_2-1 is implemented with a phase change using the determined second specific phase change value (set).

Note that regarding "data symbol #2 2702_2 present immediately behind control information symbol 2701_2" and "data symbol #2 2702_2-1 present immediately behind control information symbol 2701_3", the modulation scheme of "data symbol #2 2702_2 present immediately behind control information symbol 2701_2" and the modulation scheme of "data symbol #2 2702_2-1 present immediately behind control information symbol 2701_3" may be the same or different.

Moreover, since "data symbol #2 2702_2-1 present immediately behind control information symbol 2701_3" is a symbol for retransmission, all or some data included in "data symbol #2 2702_2 present immediately behind control information symbol 2701_2" is included in "data symbol #2 2702_2-1 present immediately behind control information symbol 27013".

The terminal receives control information symbol 2701_3 and data symbol #2 2702_2 transmitted by the base station, and demodulates and decodes data symbol #2 2702_2-1 based at least on information on the second specific phase change value (set) included in control information symbol 2701_3. As a result, the terminal determines that the data included in data symbol #2 2702_2-1 is not successfully obtained. The terminal then transmits, to the base station, terminal transmission symbol 2750_3 including at least information indicating that the data included in data symbol #2 2702_2-1 was not successfully obtained.

The base station receives terminal transmission symbol 2750_3 transmitted by the terminal, and based at least on the information that is included in terminal transmission symbol 2750_3 and indicates that the data included in data symbol #2 2702_2-1 was not successfully obtained, determines the phase change (set) to be implemented by phase changer A and phase changer B to be changed from the second specific phase change value (set).

Since the base station did not obtain the data included in data symbol #2 2702_2-1 successfully the terminal can determine that it is highly probable that data can be obtained without error when the next data symbol is transmitted and the phase change value is changed from the second specific phase change value (set). This makes it possible to achieve an advantageous effect that it is highly probable that the terminal can achieve a high data reception quality.

Accordingly the base station determines the phase change value (set) to be implemented by phase changer 205A and/or phase changer 205B to be changed from the second specific phase change value (set) to a third specific phase change value (set), by using a random number, for example. Here, control information symbol 2701_4 includes information on the third specific phase change value (set).

A note regarding the terminology "third specific phase change value (set)" follows. In the examples illustrated in FIG. 2, FIG. 18, FIG. 19, FIG. 28, FIG. 29, and FIG. 30, phase changer 205A is omitted, and phase changer 205B is included. Accordingly in such a case, there is a need to prepare a third specific phase change value to be used by phase changer 205B.

On the other hand, in the examples illustrated in FIG. 20, FIG. 21, FIG. 22, FIG. 31, FIG. 32, and FIG. 33, phase changer 205A and phase changer 205B are included. In such a case, there is a need to prepare a third specific phase change value #A to be used by phase changer 205A and a third specific phase change value #B to be used by phase changer 205B. Accordingly the terminology "third specific phase change value (set)" is used.

The base station then transmits control information symbol 2701_4 and data symbol #2 2702_2-2. Here, at least data symbol #2 2702_2 is implemented with a phase change using the determined third specific phase change value (set).

Note that regarding "data symbol #2 2702_2-1 present immediately behind control information symbol 2701_3" and "data symbol #2 2702_2-2 present immediately behind control information symbol 2701_4", the modulation scheme of "data symbol #2 2702_2-1 present immediately behind control information symbol 2701_3" and the modulation scheme of "data symbol #2 2702_2-2 present immediately behind control information symbol 2701_4" may be the same or different.

Moreover, since "data symbol #2 2702_2-2 present immediately behind control information symbol 2701_4" is a symbol for retransmission, all or some data included in "data symbol #2 2702_2-1 present immediately behind control information symbol 2701_3" is included in "data symbol #2 2702_2-2 present immediately behind control information symbol 27014".

The terminal receives control information symbol 2701_4 and data symbol #2 2702_2-2 transmitted by the base station, and demodulates and decodes data symbol #2 2702_2-2 based at least on information on the third specific phase change value (set) included in control information symbol 2701_4. As a result, the terminal determines that the data included in data symbol #2 2702_2-2 is obtained without error. The terminal then transmits, to the base station, terminal transmission symbol 2750_4 including at least information indicating that the data included in data symbol #2 2702_2-2 was obtained without error.

The base station receives terminal transmission symbol 2750_4 transmitted by the terminal, and based at least on the information that is included in terminal transmission symbol 2750_4 and indicates that the data included in data symbol #2 2702-2 was obtained without error, determines the phase change (set) to be implemented by phase changer 205A and/or phase changer 205B to be the third specific phase change value (set), just as in the case where data symbol #2 2702_2-2 is transmitted.

Since the base station obtained the data included in data symbol #2 2702_2-2 without error, the terminal can determine that it is highly probable that data can be obtained without error when the next data symbol is transmitted and the third specific phase change value (set) is used. This makes it possible to achieve an advantageous effect that it is highly probable that the terminal can achieve a high data reception quality.

Then, the base station implements a phase change via phase changer 205A and/or phase changer 205B based on the determined third specific phase change value (set). Here, control information symbol 2701_5 includes information on the third specific phase change value (set).

The base station then transmits control information symbol 2701_5 and data symbol #3 2702_3. Here, at least data symbol #3 2702_3 is implemented with a phase change using the determined third specific phase change value (set).

The terminal receives control information symbol 2701_5 and data symbol #3 2702_3 transmitted by the base station, and demodulates and decodes data symbol #3 2702_3 based at least on information on the third specific phase change value (set) included in control information symbol 2701_5.

As a result, the terminal determines that the data included in data symbol #3 2702_3 is obtained without error. The terminal then transmits, to the base station, terminal transmission symbol 2750_5 including at least information indicating that the data included in data symbol #3 2702_3 was obtained without error.

The base station receives terminal transmission symbol 2750_5 transmitted by the terminal, and based at least on the information that is included in terminal transmission symbol 2750_5 and indicates that the data included in data symbol #3 2702_3 was obtained without error, determines the phase change (set) to be implemented by phase changer 205A and/or phase changer 205B to be the third specific phase change value (set), just as in the case where data symbol #3 2702_3 is transmitted.

Since the base station obtained the data included in data symbol #3 2702_3 without error, the terminal can determine that it is highly probable that data can be obtained without error when the next data symbol is transmitted and the third specific phase change value (set) is used. This makes it possible to achieve an advantageous effect that it is highly probable that the terminal can achieve a high data reception quality.

Then, the base station implements a phase change via phase changer 205A and/or phase changer 205B based on the determined third specific phase change value (set). Here, control information symbol 2701_6 includes information on the third specific phase change value (set).

The base station then transmits control information symbol 2701_6 and data symbol #4 2702_4. Here, at least data symbol #4 2702_4 is implemented with a phase change using the determined third specific phase change value (set).

The terminal receives control information symbol 2701_6 and data symbol #4 2702_4 transmitted by the base station, and demodulates and decodes data symbol #4 2702_4 based at least on information on the third specific phase change value (set) included in control information symbol 2701_6.

As a result, the terminal determines that the data included in data symbol #4 2702_4 is not successfully obtained. The terminal then transmits, to the base station, terminal transmission symbol 2750_6 including at least information indicating that the data included in data symbol #4 2702_4 was not successfully obtained.

The base station receives terminal transmission symbol 2750_6 transmitted by the terminal, and based at least on the information that is included in terminal transmission symbol 2750_6 and indicates that the data included in data symbol #4 2702_4 was not successfully obtained, determines the phase change (set) to be implemented by phase changer 205A and/or phase changer 205B to be changed from the third specific phase change value (set).

Since the base station did not obtain the data included in data symbol #4 2702_4 successfully the terminal can determine that it is highly probable that data can be obtained without error when the next data symbol is transmitted and the phase change value is changed from the third specific phase change value (set). This makes it possible to achieve an advantageous effect that it is highly probable that the terminal can achieve a high data reception quality.

Accordingly the base station determines the phase change value (set) to be implemented by phase changer 205A and/or phase changer 205B to be changed from the third specific phase change value (set) to a fourth specific phase change value (set), by using a random number, for example. Then, the base station implements a phase change via phase changer 205A and/or phase changer 205B based on the determined fourth specific phase change value (set). Here, control information symbol 2701_7 includes information on the fourth specific phase change value (set).

A note regarding the terminology "fourth specific phase change value (set)" follows. In the examples illustrated in FIG. 2, FIG. 18, FIG. 19, FIG. 28, FIG. 29, and FIG. 30, phase changer 205A is omitted, and phase changer 205B is included. Accordingly in such a case, there is a need to prepare a fourth specific phase change value to be used by phase changer 205B. On the other hand, in the examples illustrated in FIG. 20, FIG. 21, FIG. 22, FIG. 31, FIG. 32, and FIG. 33, phase changer 205A and phase changer 205B are included. In such a case, there is a need to prepare a fourth specific phase change value #A to be used by phase changer 205A and a fourth specific phase change value #B to be used by phase changer 205B. Accordingly the terminology "fourth specific phase change value (set)" is used.

Note that regarding "data symbol #4 27024 present immediately behind control information symbol 2701_6" and "data symbol #4 2702_4-1 present immediately behind control information symbol 2701_7", the modulation scheme of "data symbol #4 27024 present immediately behind control information symbol 2701_6" and the modulation scheme of "data symbol #4 2702_4-1 present immediately behind control information symbol 2701_7" may be the same or different.

Moreover, since "data symbol #4 2702_4-1 present immediately behind control information symbol 2701_7" is a symbol for retransmission, all or some data included in "data symbol #4 27024 present immediately behind control information symbol 2701_6" is included in "data symbol #4 2702_4-1 present immediately behind control information symbol 2701_7".

The terminal receives control information symbol 2701_7 and data symbol #4 2702_4-1 transmitted by the base station, and demodulates and decodes data symbol #4 2702_4-1 based at least on information on the fourth specific phase change value (set) included in control information symbol 2701_7.

Note that regarding data symbol #1 27021, data symbol #2 2702_2, data symbol #3 2702_3, and data symbol #4 2702_4, the base station transmits a plurality of modulated signals from a plurality of antennas, just as described in Embodiments 1 through 6. However, unlike Embodiments 1 through 6, phase changer 205A and/or phase changer 205B implement a phase change using the specific phase change value described above.

The frame configurations of the base station and terminal illustrated in FIG. 27 are mere non-limiting examples; other symbols may be included. Moreover, control information symbol 27011, 27012, 27013, 27014, 2701_5, 2701_6, data symbol #1 27021, data symbol #2 2702_2, data symbol #3 2702_3, and data symbol #4 27024 may each include other symbols, such as a pilot symbol.

Moreover, control information symbol 27011, 2701_2, 27013, 2701_4, 2701_5, and 2701_6 include information relating to the specific phase change value (set) used upon transmitting data symbol #1 2702_1, data symbol #2 2702_2, data symbol #3 27023, and data symbol #4 2702_4, and the terminal becomes capable of demodulating and decoding data symbol #1 2702_1, data symbol #2 2702_2, data symbol #3 2702_3, and data symbol #4 2702_4 as a result of obtaining this information.

Note that in the above description, the base station determines the value for the specific phase change value (set), i.e., the set for the specific phase change value, by using a "random number", but the determination of the value for the specific phase change value (set) is not limited to this method. The base station may regularly change the value for the specific phase change value (set), i.e., the set for the specific phase change value.

Any method may be used to determine the value for the specific phase change value (set). When the specific phase change value (set) needs to be changed, the specific phase change value (set) before and after the change may be different.

Similar to as described in Embodiments 1 through 6, for example, when the base station transmits a modulated signal having a frame configuration such as illustrated in FIG. 4, FIG. 5, FIG. 13, or FIG. 14, the subject of the phase change implemented using the specific phase change value (set) by phase changer 205A and/or phase changer 205B, as described above, are data symbols 402, 502. The symbol that is subject to phase change implemented by phase changer 209A and/or phase changer 209B is, just as described in Embodiments 1 through 6, "pilot symbol 401, 501", "other symbol 403, 503".

However, in phase changer 205A and/or phase changer 205B, if a phase change is applied to "pilot symbol 401, 501", "other symbol 403, 503" as well, demodulating and decoding is possible.

Even if this transmission method is implemented independently the method of implementation of a phase change using a specific phase change value described above can achieve an advantageous effect in that high data reception quality can be achieved with the terminal.

Moreover, examples of the configuration of signal processor 106 illustrated in FIG. 1 and included in the transmission device of the base station are given in FIG. 2, FIG. 18, FIG. 19, FIG. 20, FIG. 21, FIG. 22, FIG. 23, FIG. 28, FIG. 29, FIG. 30, FIG. 31, FIG. 32, and FIG. 33, but phase change need not be implemented in phase changer 209A and phase changer 209B.

In other words, in FIG. 2, FIG. 18, FIG. 19, FIG. 20, FIG. 21, FIG. 22, FIG. 23, FIG. 28, FIG. 29, FIG. 30, FIG. 31, FIG. 32, and FIG. 33, phase changer 209A and phase changer 209B may be removed. In such cases, signal 208A corresponds to signal 106_A in FIG. 1, and signal 208B corresponds to signal 106_B in FIG. 1.

When [u0 u1], which is described above and used to control operations performed by phase changers 205A, 205B included in the base station, is set to [01] (i.e., u0=0, u1=1), that is to say, when phase changers 205A, 205B implement a phase change cyclically/regularly on a per-symbol basis, control information for setting the phase change in detail is set to u2, u3. The relationship between [u2 u3] and the phase change implemented by phase changers 205A, 205B in detail is illustrated in Table 2.

Note that u2, u3 are, for example, transmitted by the base station as some of the control information symbols, namely other symbols 403, 503. The terminal obtains [u2 u3] included in control information symbols, namely other symbols 403, 503, becomes aware of operations performed by phase changers 205A, 205B from [u2 u3], and demodulates and decodes data symbols. Also, the control information for "detailed phase change" is 2-bit information, but the number of bits may be other than 2 bits.

TABLE 2

| u2 u3 | phase change method when [u0 u1] = [01] |
|---|---|
| 00 | method 01_1 |
| 01 | method 01_2 |
| 10 | method 01_3 |
| 11 | method 01_4 |

A first example of an interpretation of Table 2 is as follows.

When [u0 u1]=[01] (i.e., u0=0, u1=1), and [u2 u3]=[00] (i.e., u2=0, u3=0), the base station causes phase changer 205A, phase changer 205B to implement a phase change cyclically/regularly on a per-symbol basis in accordance with method 01_1.

Method 01_1:

Phase changer 205A sets the coefficient used in the multiplication for the phase change to y1(i). i indicates a symbol number and is an integer that is greater than or equal to 0. Here, y1(i) is expressed as follows.

[MATH. 53]

$$y1(i) = e^{j\frac{2\times\pi\times i}{9}}$$ Equation (53)

Phase changer 205B does not implement a phase change.

When [u0 u1]=[01] (i.e., u0=0, u1=1), and [u2 u3]=[01] (i.e., u2=0, u3=1), the base station causes phase changer 205A, phase changer 205B to implement a phase change cyclically/regularly on a per-symbol basis in accordance with method 01_2.

Method 01_2:

Phase changer 205A does not implement a phase change. Phase changer 205B sets the coefficient used in the multiplication for the phase change to y2(i). i indicates a symbol number and is an integer that is greater than or equal to 0. Here, y2(i) is expressed as follows.

[MATH. 54]

$$y2(i) = e^{j\frac{2\times\pi\times i}{9}}$$ Equation (54)

When [u0 u1]=[01] (i.e., u0=0, u1=1), and [u2 u3]=[10] (i.e., u2=1, u3=0), the base station causes phase changer 205A, phase changer 205B to implement a phase change cyclically/regularly on a per-symbol basis in accordance with method 01_3.

Method 013:

Phase changer 205A sets the coefficient used in the multiplication for the phase change to y1(i). i indicates a symbol number and is an integer that is greater than or equal to 0. Here, y1(i) is expressed as follows.

[MATH. 55]

$$y1(i) = e^{j\frac{2\times\pi\times i}{9}}$$ Equation (55)

Phase changer 205B sets the coefficient used in the multiplication for the phase change to y2(i). i indicates a symbol number and is an integer that is greater than or equal to 0. Here, y2(i) is expressed as follows.

[MATH. 56]

$$y2(i) = e^{-j\frac{2\times\pi\times i}{7}}$$ Equation (56)

When [u0 u1]=[01] (i.e., u0=0, u1=1), and [u2 u3]=[11] (i.e., u2=1, u3=1), the base station causes phase changer 205A, phase changer 205B to implement a phase change cyclically/regularly on a per-symbol basis in accordance with method 01_4.

Method 014:

Phase changer 205A sets the coefficient used in the multiplication for the phase change to y1(i). i indicates a symbol number and is an integer that is greater than or equal to 0. Here, y1(i) is expressed as follows.

[MATH. 57]

$$y1(i) = e^{-j\frac{2\times\pi\times i}{7}}$$ Equation (57)

Phase changer 205B sets the coefficient used in the multiplication for the phase change to y2(i). i indicates a symbol number and is an integer that is greater than or equal to 0. Here, y2(i) is expressed as follows.

[MATH. 58]

$$y2(i) = e^{j\frac{2\times\pi\times i}{9}}$$ Equation (58)

A second example of an interpretation of Table 2 is as follows.

When [u0 u1]=[01] (i.e., u0=0, u1=1), and [u2 u3]=[00] (i.e., u2=0, u3=0), the base station causes phase changer 205A, phase changer 205B to implement a phase change cyclically/regularly on a per-symbol basis in accordance with method 01_1.

Method 01_1:

Phase changer 205A sets the coefficient used in the multiplication for the phase change to y1(i). i indicates a symbol number and is an integer that is greater than or equal to 0. Here, y1(i) is expressed as follows.

[MATH. 59]

$$y1(i) = e^{j\frac{2\times\pi\times i}{3}} \qquad \text{Equation (59)}$$

Phase changer 205B does not implement a phase change.

When [u0 u1]=[01] (i.e., u0=0, u1=1), and [u2 u3]=[01] (i.e., u2=0, u3=1), the base station causes phase changer 205A, phase changer 205B to implement a phase change cyclically/regularly on a per-symbol basis in accordance with method 01_2.

Method 01_2:

Phase changer 205A sets the coefficient used in the multiplication for the phase change to y1(i). i indicates a symbol number and is an integer that is greater than or equal to 0. Here, y1(i) is expressed as follows.

[MATH. 60]

$$y1(i) = e^{j\frac{2\times\pi\times i}{5}} \qquad \text{Equation (60)}$$

Phase changer 205B does not implement a phase change.

When [u0 u1]=[01] (i.e., u0=0, u1=1), and [u2 u3]=[10] (i.e., u2=1, u3=0), the base station causes phase changer 205A, phase changer 205B to implement a phase change cyclically/regularly on a per-symbol basis in accordance with method 01_3.

Method 01_3:

Phase changer 205A sets the coefficient used in the multiplication for the phase change to y1(i). i indicates a symbol number and is an integer that is greater than or equal to 0. Here, y1(i) is expressed as follows.

[MATH. 61]

$$y1(i) = e^{j\frac{2\times\pi\times i}{7}} \qquad \text{Equation (61)}$$

Phase changer 205B does not implement a phase change.

When [u0 u1]=[01] (i.e., u0=0, u1=1), and [u2 u3]=[11] (i.e., u2=1, u3=1), the base station causes phase changer 205A, phase changer 205B to implement a phase change cyclically/regularly on a per-symbol basis in accordance with method 01_4.

Method 014:

Phase changer 205A sets the coefficient used in the multiplication for the phase change to y1(i). i indicates a symbol number and is an integer that is greater than or equal to 0. Here, y1(i) is expressed as follows.

[MATH. 62]

$$y1(i) = e^{j\frac{2\times\pi\times i}{9}} \qquad \text{Equation (62)}$$

Phase changer 205B does not implement a phase change.

A third example of an interpretation of Table 2 is as follows.

When [u0 u1]=[01] (i.e., u0=0, u1=1), and [u2 u3]=[00] (i.e., u2=0, u3=0), the base station causes phase changer 205A, phase changer 205B to implement a phase change cyclically/regularly on a per-symbol basis in accordance with method 01_1.

Method 011:

Phase changer 205A does not implement a phase change. Phase changer 205B sets the coefficient used in the multiplication for the phase change to y2(i). i indicates a symbol number and is an integer that is greater than or equal to 0. Here, y2(i) is expressed as follows.

[MATH. 63]

$$y2(i) = e^{j\frac{2\times\pi\times i}{3}} \qquad \text{Equation (63)}$$

When [u0 u1]=[01] (i.e., u0=0, u1=1), and [u2 u3]=[01] (i.e., u2=0, u3=1), the base station causes phase changer 205A, phase changer 205B to implement a phase change cyclically/regularly on a per-symbol basis in accordance with method 01_2.

Method 01_2:

Phase changer 205A does not implement a phase change. Phase changer 205B sets the coefficient used in the multiplication for the phase change to y2(i). i indicates a symbol number and is an integer that is greater than or equal to 0. Here, y2(i) is expressed as follows.

[MATH. 64]

$$y2(i) = e^{j\frac{2\times\pi\times i}{5}} \qquad \text{Equation (64)}$$

When [u0 u1]=[01] (i.e., u0=0, u1=1), and [u2 u3]=[10] (i.e., u2=1, u3=0), the base station causes phase changer 205A, phase changer 205B to implement a phase change cyclically/regularly on a per-symbol basis in accordance with method 01_3.

Method 013:

Phase changer 205A does not implement a phase change. Phase changer 205B sets the coefficient used in the multiplication for the phase change to y2(i). i indicates a symbol number and is an integer that is greater than or equal to 0. Here, y2(i) is expressed as follows.

[MATH. 65]

$$y2(i) = e^{j\frac{2\times\pi\times i}{7}} \qquad \text{Equation (65)}$$

When [u0 u1]=[01] (i.e., u0=0, u1=1), and [u2 u3]=[11] (i.e., u2=1, u3=1), the base station causes phase changer 205A, phase changer 205B to implement a phase change cyclically/regularly on a per-symbol basis in accordance with method 01_4.

Method 014:

Phase changer 205A does not implement a phase change. Phase changer 205B sets the coefficient used in the multiplication for the phase change to y2(i). i indicates a symbol number and is an integer that is greater than or equal to 0. Here, y2(i) is expressed as follows.

[MATH. 66]

$$y2(i) = e^{j\frac{2\times\pi\times i}{9}} \quad \text{Equation (66)}$$

A fourth example of an interpretation of Table 2 is as follows.

When [u0 u1]=[01] (i.e., u0=0, u1=1), and [u2 u3]=[00] (i.e., u2=0, u3=0), the base station causes phase changer 205A, phase changer 205B to implement a phase change cyclically/regularly on a per-symbol basis in accordance with method 01_1.

Method 01_1:

Phase changer 205A sets the coefficient used in the multiplication for the phase change to y1(i). i indicates a symbol number and is an integer that is greater than or equal to 0. Here, y1(i) is expressed as follows.

[MATH. 67]

$$y1(i) = e^{j\frac{2\times\pi\times i}{5}} \quad \text{Equation (67)}$$

Phase changer 205B sets the coefficient used in the multiplication for the phase change to y2(i). i indicates a symbol number and is an integer that is greater than or equal to 0. Here, y2(i) is expressed as follows.

[MATH. 68]

$$y2(i) = e^{-j\frac{2\times\pi\times i}{3}} \quad \text{Equation (68)}$$

When [u0 u1]=[01] (i.e., u0=0, u1=1), and [u2 u3]=[01] (i.e., u2=0, u3=1), the base station causes phase changer 205A, phase changer 205B to implement a phase change cyclically/regularly on a per-symbol basis in accordance with method 01_2.

Method 01_2:

Phase changer 205A sets the coefficient used in the multiplication for the phase change to y1(i). i indicates a symbol number and is an integer that is greater than or equal to 0. Here, y1(i) is expressed as follows.

[MATH. 69]

$$y1(i) = e^{j\frac{2\times\pi\times i}{7}} \quad \text{Equation (69)}$$

Phase changer 205B sets the coefficient used in the multiplication for the phase change to y2(i). i indicates a symbol number and is an integer that is greater than or equal to 0. Here, y2(i) is expressed as follows.

[MATH. 70]

$$y2(i) = e^{-j\frac{2\times\pi\times i}{3}} \quad \text{Equation (70)}$$

When [u0 u1]=[01] (i.e., u0=0, u1=1), and [u2 u3]=[10] (i.e., u2=1, u3=0), the base station causes phase changer 205A, phase changer 205B to implement a phase change cyclically/regularly on a per-symbol basis in accordance with method 01_3.

Method 01_3:

Phase changer 205A sets the coefficient used in the multiplication for the phase change to y1(i). i indicates a symbol number and is an integer that is greater than or equal to 0. Here, y1(i) is expressed as follows.

[MATH. 71]

$$y1(i) = e^{j\frac{2\times\pi\times i}{7}} \quad \text{Equation (71)}$$

Phase changer 205B sets the coefficient used in the multiplication for the phase change to y2(i). i indicates a symbol number and is an integer that is greater than or equal to 0. Here, y2(i) is expressed as follows.

[MATH. 72]

$$y2(i) = e^{-j\frac{2\times\pi\times i}{5}} \quad \text{Equation (72)}$$

When [u0 u1]=[01] (i.e., u0=0, u1=1), and [u2 u3]=[11] (i.e., u2=1, u3=1), the base station causes phase changer 205A, phase changer 205B to implement a phase change cyclically/regularly on a per-symbol basis in accordance with method 01_4.

Method 01_4:

Phase changer 205A sets the coefficient used in the multiplication for the phase change to y1(i). i indicates a symbol number and is an integer that is greater than or equal to 0. Here, y1(i) is expressed as follows.

[MATH. 73]

$$y1(i) = e^{j\frac{2\times\pi\times i}{9}} \quad \text{Equation (73)}$$

Phase changer 205B sets the coefficient used in the multiplication for the phase change to y2(i). i indicates a symbol number and is an integer that is greater than or equal to 0. Here, y2(i) is expressed as follows.

[MATH. 74]

$$y2(i) = e^{-j\frac{2\times\pi\times i}{5}} \quad \text{Equation (74)}$$

Although first through fourth examples are given above, the detailed phase change method employed by phase changer 205A, phase changer 205B is not limited to these examples.

<1> In phase changer 205A, a phase change is implemented cyclically/regularly on a per-symbol basis.

<2> In phase changer 205B, a phase change is implemented cyclically/regularly on a per-symbol basis.

<3> In phase changer 205A and phase changer 205B, a phase change is implemented cyclically/regularly on a per-symbol basis.

So long as a method according to one or more of <1>, <2>, and <3> is set in detail according to [u2 u3], it may be implemented in the same manner as described above.

When [u0 u1], which is described above and used to control operations performed by phase changers 205A, 205B included in the base station, is set to [10] (i.e., u0=1, u1=0), that is to say, when phase changers 205A, 205B implement a phase change using a specific phase change value (set), control information for setting the phase change in detail is set to u4, u5. The relationship between [u4 u5] and the phase change implemented by phase changers 205A, 205B in detail is illustrated in Table 3.

Note that u4, u5 are transmitted by base station as some of control information symbols, namely other symbols 403, 503. The terminal obtains [u4 u5] included in control information symbols, namely other symbols 403, 503, becomes aware of operations performed by phase changers 205A, 205B from [u4 u5], and demodulates and decodes data symbols. Also, the control information for "detailed phase change" is 2-bit information, but the number of bits may be other than 2 bits.

TABLE 3

| u4 u5 | phase change method when [u0 u1] = [10] |
| --- | --- |
| 00 | method 10_1 |
| 01 | method 10_2 |
| 10 | method 10_3 |
| 11 | method 10_4 |

A first example of an interpretation of Table 3 is as follows.

When [u0 u1]=[10] (i.e., u0=1, u1=0), and [u4 u5]=[00] (i.e., u4=0, u5=0), the base station causes phase changer 205A, phase changer 205B to implement a phase change using a specific phase change value (set) in accordance with method 10_1.

Method 10_1:

Phase changer 205A sets the coefficient used in the multiplication for the phase change to y1(i). i indicates a symbol number and is an integer that is greater than or equal to 0. Here, y1(i) is expressed as follows. This acts as a fixed phase value independent of symbol number.

[MATH. 75]

$$y1(i) = e^{j\frac{\pi}{4}}$$ Equation (75)

Phase changer 205B does not implement a phase change.

When [u0 u1]=[10] (i.e., u0=1, u1=0), and [u4 u5]=[01] (i.e., u4=0, u5=1), the base station causes phase changer 205A, phase changer 205B to implement a phase change using a specific phase change value (set) in accordance with method 10_2.

Method 10_2:

Phase changer 205A does not implement a phase change. Phase changer 205B sets the coefficient used in the multiplication for the phase change to y2(i). i indicates a symbol number and is an integer that is greater than or equal to 0. Here, y2(i) is expressed as follows. This acts as a fixed phase value independent of symbol number.

[MATH. 76]

$$y2(i) = e^{j\frac{\pi}{3}}$$ Equation (76)

When [u0 u1]=[10] (i.e., u0=1, u1=0), and [u4 u5]=[10] (i.e., u4=1, u5=0), the base station causes phase changer 205A, phase changer 205B to implement a phase change using a specific phase change value (set) in accordance with method 10_3.

Method 10_3:

Phase changer 205A sets the coefficient used in the multiplication for the phase change to y1(i). i indicates a symbol number and is an integer that is greater than or equal to 0. Here, y1(i) is expressed as follows. This acts as a fixed phase value independent of symbol number.

[MATH. 77]

$$y1(i) = e^{j\frac{\pi}{4}}$$ Equation (77)

Phase changer 205B sets the coefficient used in the multiplication for the phase change to y2(i). i indicates a symbol number and is an integer that is greater than or equal to 0. Here, y2(i) is expressed as follows. This acts as a fixed phase value independent of symbol number.

[MATH. 78]

$$y2(i) = e^{-j\frac{\pi}{8}}$$ Equation (78)

When [u0 u1]=[10] (i.e., u0=1, u1=0), and [u4 u5]=[11] (i.e., u4=1, u5=1), the base station causes phase changer 205A, phase changer 205B to implement a phase change using a specific phase change value (set) in accordance with method 10_4.

Method 10_4:

Phase changer 205A sets the coefficient used in the multiplication for the phase change to y1(i). i indicates a symbol number and is an integer that is greater than or equal to 0. Here, y1(i) is expressed as follows. This acts as a fixed phase value independent of symbol number.

[MATH. 79]

$$y1(i) = e^{-j\frac{2\times\pi}{7}}$$ Equation (79)

Phase changer 205B sets the coefficient used in the multiplication for the phase change to y2(i). i indicates a symbol number and is an integer that is greater than or equal to 0. Here, y2(i) is expressed as follows. This acts as a fixed phase value independent of symbol number.

[MATH. 80]

$$y2(i) = e^{j\frac{2\times\pi}{9}}$$ Equation (80)

A second example of an interpretation of Table 3 is as follows.

When [u0 u1]=[10] (i.e., u0=1, u1=0), and [u4 u5]=[00] (i.e., u4=0, u5=0), the base station causes phase changer 205A, phase changer 205B to implement a phase change using a specific phase change value (set) in accordance with method 10_1.

Method 10_1:

Phase changer 205A sets the coefficient used in the multiplication for the phase change to y1(i). i indicates a symbol number and is an integer that is greater than or equal to 0. Here, y1(i) is expressed as follows. This acts as a fixed phase value independent of symbol number.

[MATH. 81]

$$y1(i) = e^{j0}$$  Equation (81)

In the case of Equation (81), phase changer 205A does not implement a phase. Phase changer 205B does not implement a phase change.

When [u0 u1]=[10] (i.e., u0=1, u1=0), and [u4 u5]=[01] (i.e., u4=0, u5=1), the base station causes phase changer 205A, phase changer 205B to implement a phase change using a specific phase change value (set) in accordance with method 10_2.

Method 10_2:

Phase changer 205A sets the coefficient used in the multiplication for the phase change to y1(i). i indicates a symbol number and is an integer that is greater than or equal to 0. Here, y1(i) is expressed as follows. This acts as a fixed phase value independent of symbol number.

[MATH. 82]

$$y1(i) = e^{j\frac{\pi}{8}}$$  Equation (82)

Phase changer 205B does not implement a phase change.

When [u0 u1]=[10] (i.e., u0=1, u1=0), and [u4 u5]=[10] (i.e., u4=1, u5=0), the base station causes phase changer 205A, phase changer 205B to implement a phase change using a specific phase change value (set) in accordance with method 10_3.

Method 10_3:

Phase changer 205A sets the coefficient used in the multiplication for the phase change to y1(i). i indicates a symbol number and is an integer that is greater than or equal to 0. Here, y1(i) is expressed as follows. This acts as a fixed phase value independent of symbol number.

[MATH. 83]

$$y1(i) = e^{j\frac{\pi}{4}}$$  Equation (83)

Phase changer 205B does not implement a phase change.

When [u0 u1]=[10] (i.e., u0=1, u1=0), and [u4 u5]=[11] (i.e., u4=1, u5=1), the base station causes phase changer 205A, phase changer 205B to implement a phase change using a specific phase change value (set) in accordance with method 10_4.

Method 10_4:

Phase changer 205A sets the coefficient used in the multiplication for the phase change to y1(i). i indicates a symbol number and is an integer that is greater than or equal to 0. Here, y1(i) is expressed as follows. This acts as a fixed phase value independent of symbol number.

[MATH. 84]

$$y1(i) = e^{j\frac{3\times\pi}{8}}$$  Equation (84)

Phase changer 205B does not implement a phase change. A third example of an interpretation of Table 3 is as follows.

When [u0 u1]=[10] (i.e., u0=1, u1=0), and [u4 u5]=[00] (i.e., u4=0, u5=0), the base station causes phase changer 205A, phase changer 205B to implement a phase change using a specific phase change value (set) in accordance with method 10_1.

Method 10_1:

Phase changer 205B sets the coefficient used in the multiplication for the phase change to y2(i). i indicates a symbol number and is an integer that is greater than or equal to 0. Here, y2(i) is expressed as follows. This acts as a fixed phase value independent of symbol number.

[MATH. 85]

$$y2(i) = e^{j0}$$  Equation (85)

In the case of Equation (85), phase changer 205B does not implement a phase. Phase changer 205A does not implement a phase change.

When [u0 u1]=[10] (i.e., u0=1, u1=0), and [u4 u5]=[01] (i.e., u4=0, u5=1), the base station causes phase changer 205A, phase changer 205B to implement a phase change using a specific phase change value (set) in accordance with method 10_2.

Method 10_2:

Phase changer 205B sets the coefficient used in the multiplication for the phase change to y2(i). i indicates a symbol number and is an integer that is greater than or equal to 0. Here, y2(i) is expressed as follows. This acts as a fixed phase value independent of symbol number.

[MATH. 86]

$$y2(i) = e^{j\frac{\pi}{8}}$$  Equation (86)

Phase changer 205A does not implement a phase change.

When [u0 u1]=[10] (i.e., u0=1, u1=0), and [u4 u5]=[10] (i.e., u4=1, u5=0), the base station causes phase changer 205A, phase changer 205B to implement a phase change using a specific phase change value (set) in accordance with method 10_3.

Method 10_3:

Phase changer 205B sets the coefficient used in the multiplication for the phase change to y2(i). i indicates a symbol number and is an integer that is greater than or equal to 0. Here, y2(i) is expressed as follows. This acts as a fixed phase value independent of symbol number.

[MATH. 87]

$$y2(i) = e^{j\frac{\pi}{4}}$$  Equation (87)

Phase changer 205A does not implement a phase change.

When [u0 u1]=[10] (i.e., u0=1, u1=0), and [u4 u5]=[11] (i.e., u4=1, u5=1), the base station causes phase changer 205A, phase changer 205B to implement a phase change using a specific phase change value (set) in accordance with method 10_4.

Method 10_4:

Phase changer 205B sets the coefficient used in the multiplication for the phase change to y2(i). i indicates a symbol number and is an integer that is greater than or equal to 0. Here, y2(i) is expressed as follows. This acts as a fixed phase value independent of symbol number.

[MATH. 88]

$$y2(i) = e^{j\frac{3\times\pi}{8}}$$ Equation (88)

Phase changer 205A does not implement a phase change. A fourth example of an interpretation of Table 3 is as follows.

When [u0 u1]=[10] (i.e., u0=1, u1=0), and [u4 u5]=[00] (i.e., u4=0, u5=0), the base station causes phase changer 205A, phase changer 205B to implement a phase change using a specific phase change value (set) in accordance with method 10_1.

Method 10_1:

Phase changer 205A sets the coefficient used in the multiplication for the phase change to y1(i). i indicates a symbol number and is an integer that is greater than or equal to 0. Here, y1(i) is expressed as follows. This acts as a fixed phase value independent of symbol number.

[MATH. 89]

$$y1(i) = e^{j\frac{\pi}{8}}$$ Equation (89)

Phase changer 205B sets the coefficient used in the multiplication for the phase change to y2(i). i indicates a symbol number and is an integer that is greater than or equal to 0. Here, y2(i) is expressed as follows. This acts as a fixed phase value independent of symbol number.

[MATH. 90]

$$y2(i) = e^{j0}$$ Equation (90)

In the case of Equation (90), phase changer 205B does not implement a phase.

When [u0 u1]=[10] (i.e., u0=1, u1=0), and [u4 u5]=[01] (i.e., u4=0, u5=1), the base station causes phase changer 205A, phase changer 205B to implement a phase change using a specific phase change value (set) in accordance with method 10_2.

Method 10_2:

Phase changer 205A sets the coefficient used in the multiplication for the phase change to y1(i). i indicates a symbol number and is an integer that is greater than or equal to 0. Here, y1(i) is expressed as follows. This acts as a fixed phase value independent of symbol number.

[MATH. 91]

$$y1(i) = e^{j\frac{\pi}{8}}$$ Equation (91)

Phase changer 205B sets the coefficient used in the multiplication for the phase change to y2(i). i indicates a symbol number and is an integer that is greater than or equal to 0. Here, y2(i) is expressed as follows. This acts as a fixed phase value independent of symbol number.

[MATH. 92]

$$y2(i) = e^{-j\frac{\pi}{8}}$$ Equation (92)

When [u0 u1]=[10] (i.e., u0=1, u1=0), and [u4 u5]=[10] (i.e., u4=1, u5=0), the base station causes phase changer 205A, phase changer 205B to implement a phase change using a specific phase change value (set) in accordance with method 10_3.

Method 10_3:

Phase changer 205A sets the coefficient used in the multiplication for the phase change to y1(i). i indicates a symbol number and is an integer that is greater than or equal to 0. Here, y1(i) is expressed as follows. This acts as a fixed phase value independent of symbol number.

[MATH. 93]

$$y1(i) = e^{j\frac{\pi}{4}}$$ Equation (93)

Phase changer 205B sets the coefficient used in the multiplication for the phase change to y2(i). i indicates a symbol number and is an integer that is greater than or equal to 0. Here, y2(i) is expressed as follows. This acts as a fixed phase value independent of symbol number.

[MATH. 94]

$$y2(i) = e^{-j\frac{\pi}{8}}$$ Equation (94)

When [u0 u1]=[10] (i.e., u0=1, u1=0), and [u4 u5]=[11] (i.e., u4=1, u5=1), the base station causes phase changer 205A, phase changer 205B to implement a phase change using a specific phase change value (set) in accordance with method 10_4.

Method 10_4:

Phase changer 205A sets the coefficient used in the multiplication for the phase change to y1(i). i indicates a symbol number and is an integer that is greater than or equal to 0. Here, y1(i) is expressed as follows. This acts as a fixed phase value independent of symbol number.

[MATH. 95]

$$y1(i) = e^{j0}$$ Equation (95)

In the case of Equation (95), phase changer 205A does not implement a phase. Phase changer 205B sets the coefficient used in the multiplication for the phase change to y2(i). i indicates a symbol number and is an integer that is greater than or equal to 0. Here, y2(i) is expressed as follows. This acts as a fixed phase value independent of symbol number.

[MATH. 96]

$$y2(i) = e^{-j\frac{\pi}{4}}$$ Equation (96)

Although first through fourth examples are given above, the detailed phase change method employed by phase changer 205A, phase changer 205B is not limited to these examples.

<4> In phase changer 205A, phase change is implemented using a specific phase change value.

<5> In phase changer 205B, phase change is implemented using a specific phase change value.

<6> In phase changer 205A and phase changer 205B, phase change is implemented using a specific phase change value.

So long as a method according to one or more of <4>, <5>, and <6> is set in detail according to [u4 u5], it may be implemented in the same manner as described above.

Moreover, in phase changers 205A, 205B included in the base station, a combination of the method of implementing a phase change cyclically/regularly on a per-symbol basis and the method of implementing a phase change using a specific phase change value may be used. A mode in which phase changers 205A, 205B use a combination of the method of implementing a phase change cyclically/regularly on a per-symbol basis and the method of implementing a phase change using a specific phase change value is indicated as "reserve" in Table 1, and is allotted as [u0 u1]=[11] (i.e., u0=1, u1=1).

When [u0 u1], which is described above and used to control operations performed by phase changers 205A, 205B included in the base station, is set to [11] (i.e., u0=1, u1=1), that is to say, when phase changers 205A, 205B implement a phase change using a combination the method of implementing a phase change cyclically/regularly on a per-symbol basis and the method of implementing a phase change using a specific phase change value, control information for setting the phase change in detail is set to u6, u7. The relationship between [u6 u7] and the phase change implemented by phase changers 205A, 205B in detail is illustrated in Table 4.

Note that u6, u7 are, for example, transmitted by the base station as some of the control information symbols, namely other symbols 403, 503. The terminal obtains [u6 u7] included in control information symbols, namely other symbols 403, 503, becomes aware of operations performed by phase changers 205A, 205B from [u6 u7], and demodulates and decodes data symbols. Also, the control information for "detailed phase change" is 2-bit information, but the number of bits may be other than 2 bits.

TABLE 4

| u6 u7 | phase change method when [u0 u1] = [10] |
|---|---|
| 00 | method 11_1 |
| 01 | method 11_2 |
| 10 | method 11_3 |
| 11 | method 11_4 |

A first example of an interpretation of Table 4 is as follows.

When [u0 u1]=[11] (i.e., u0=1, u1=1), and [u6 u7]=[00] (i.e., u6=0, u7=0), the base station causes phase changer 205A, phase changer 205B to implement a phase change using a combination the method of implementing a phase change cyclically/regularly on a per-symbol basis and the method of implementing a phase change using a specific phase change value in accordance with method 11_1.

Method 11_1:

Phase changer 205A sets the coefficient used in the multiplication for the phase change to y1(i). i indicates a symbol number and is an integer that is greater than or equal to 0. Here, y1(i) is expressed as follows.

[MATH. 97]

$$y1(i) = e^{j\frac{2\times\pi\times i}{9}}$$ Equation (97)

Phase changer 205B sets the coefficient used in the multiplication for the phase change to y2(i). i indicates a symbol number and is an integer that is greater than or equal to 0. Here, y2(i) is expressed as follows.

[MATH. 98]

$$y2(i) = e^{j0}$$ Equation (98)

When [u0 u1]=[11] (i.e., u0=1, u1=1), and [u6 u7]=[01] (i.e., u6=0, u7=1), the base station causes phase changer 205A, phase changer 205B to implement a phase change using a combination the method of implementing a phase change cyclically/regularly on a per-symbol basis and the method of implementing a phase change using a specific phase change value in accordance with method 11_2.

Method 11_2:

Phase changer 205A sets the coefficient used in the multiplication for the phase change to y1(i). i indicates a symbol number and is an integer that is greater than or equal to 0. Here, y1(i) is expressed as follows.

[MATH. 99]

$$y1(i) = e^{j\frac{2\times\pi\times i}{9}}$$ Equation (99)

Phase changer 205B sets the coefficient used in the multiplication for the phase change to y2(i). i indicates a symbol number and is an integer that is greater than or equal to 0. Here, y2(i) is expressed as follows.

[MATH. 100]

$$y2(i) = e^{j\frac{\pi}{4}}$$ Equation (100)

When [u0 u1]=[11] (i.e., u0=1, u1=1), and [u6 u7]=[10] (i.e., u6=1, u7=0), the base station causes phase changer 205A, phase changer 205B to implement a phase change using a combination the method of implementing a phase change cyclically/regularly on a per-symbol basis and the method of implementing a phase change using a specific phase change value in accordance with method 11_3.

Method 11_3:

Phase changer 205A sets the coefficient used in the multiplication for the phase change to y1(i). i indicates a symbol number and is an integer that is greater than or equal to 0. Here, y1(i) is expressed as follows.

[MATH. 101]

$$y1(i) = e^{j0}$$ Equation (101)

Phase changer 205B sets the coefficient used in the multiplication for the phase change to y2(i). i indicates a symbol number and is an integer that is greater than or equal to 0. Here, y2(i) is expressed as follows.

[MATH. 102]

$$y2(i) = e^{j\frac{2 \times \pi \times i}{9}} \qquad \text{Equation (102)}$$

When [u0 u1]=[11] (i.e., u0=1, u1=1), and [u6 u7]=[11] (i.e., u6=1, u7=1), the base station causes phase changer 205A, phase changer 205B to implement a phase change using a combination the method of implementing a phase change cyclically/regularly on a per-symbol basis and the method of implementing a phase change using a specific phase change value in accordance with method 11_4.

Method 11_4:

Phase changer 205A sets the coefficient used in the multiplication for the phase change to y1(i). i indicates a symbol number and is an integer that is greater than or equal to 0. Here, y1(i) is expressed as follows.

[MATH. 103]

$$y1(i) = e^{j\frac{\pi}{4}} \qquad \text{Equation (103)}$$

Phase changer 205B sets the coefficient used in the multiplication for the phase change to y2(i). i indicates a symbol number and is an integer that is greater than or equal to 0. Here, y2(i) is expressed as follows.

[MATH. 104]

$$y2(i) = e^{j\frac{2 \times \pi \times i}{9}} \qquad \text{Equation (104)}$$

A second example of an interpretation of Table 4 is as follows.

When [u0 u1]=[11] (i.e., u0=1, u1=1), and [u6 u7]=[00] (i.e., u6=0, u7=0), the base station causes phase changer 205A, phase changer 205B to implement a phase change using a combination the method of implementing a phase change cyclically/regularly on a per-symbol basis and the method of implementing a phase change using a specific phase change value in accordance with method 11_1.

Method 11_1:

Phase changer 205A sets the coefficient used in the multiplication for the phase change to y1(i). i indicates a symbol number and is an integer that is greater than or equal to 0. Here, y1(i) is expressed as follows.

[MATH. 105]

$$y1(i) = e^{j\frac{2 \times \pi \times i}{9}} \qquad \text{Equation (105)}$$

Phase changer 205B sets the coefficient used in the multiplication for the phase change to y2(i). i indicates a symbol number and is an integer that is greater than or equal to 0. Here, y2(i) is expressed as follows.

[MATH. 106]

$$y2(i) = e^{j0} \qquad \text{Equation (106)}$$

When [u0 u1]=[11] (i.e., u0=1, u1=1), and [u6 u7]=[01] (i.e., u6=0, u7=1), the base station causes phase changer 205A, phase changer 205B to implement a phase change using a combination the method of implementing a phase change cyclically/regularly on a per-symbol basis and the method of implementing a phase change using a specific phase change value in accordance with method 11_2.

Method 11_2:

Phase changer 205A sets the coefficient used in the multiplication for the phase change to y1(i). i indicates a symbol number and is an integer that is greater than or equal to 0. Here, y1(i) is expressed as follows.

[MATH. 107]

$$y1(i) = e^{j\frac{2 \times \pi \times i}{9}} \qquad \text{Equation (107)}$$

Phase changer 205B sets the coefficient used in the multiplication for the phase change to y2(i). i indicates a symbol number and is an integer that is greater than or equal to 0. Here, y2(i) is expressed as follows.

[MATH. 108]

$$y2(i) = e^{j\frac{\pi}{8}} \qquad \text{Equation (108)}$$

When [u0 u1]=[11] (i.e., u0=1, u1=1), and [u6 u7]=[10] (i.e., u6=1, u7=0), the base station causes phase changer 205A, phase changer 205B to implement a phase change using a combination the method of implementing a phase change cyclically/regularly on a per-symbol basis and the method of implementing a phase change using a specific phase change value in accordance with method 11_3.

Method 11_3:

Phase changer 205A sets the coefficient used in the multiplication for the phase change to y1(i). i indicates a symbol number and is an integer that is greater than or equal to 0. Here, y1(i) is expressed as follows.

[MATH. 109]

$$y1(i) = e^{j\frac{2 \times \pi \times i}{9}} \qquad \text{Equation (109)}$$

Phase changer 205B sets the coefficient used in the multiplication for the phase change to y2(i). i indicates a symbol number and is an integer that is greater than or equal to 0. Here, y2(i) is expressed as follows.

[MATH. 110]

$$y2(i) = e^{j\frac{\pi}{4}} \qquad \text{Equation (110)}$$

When [u0 u1]=[11] (i.e., u0=1, u1=1), and [u6 u7]=[11] (i.e., u6=1, u7=1), the base station causes phase changer 205A, phase changer 205B to implement a phase change using a combination the method of implementing a phase change cyclically/regularly on a per-symbol basis and the method of implementing a phase change using a specific phase change value in accordance with method 11_4.

Method 11_4:

Phase changer 205A sets the coefficient used in the multiplication for the phase change to y1(i). i indicates a symbol number and is an integer that is greater than or equal to 0. Here, y1(i) is expressed as follows.

[MATH. 111]

$$y1(i) = e^{j\frac{2\times\pi\times i}{9}} \qquad \text{Equation (111)}$$

Phase changer 205B sets the coefficient used in the multiplication for the phase change to y2(i). i indicates a symbol number and is an integer that is greater than or equal to 0. Here, y2(i) is expressed as follows.

[MATH. 112]

$$y2(i) = e^{j\frac{3\times\pi}{8}} \qquad \text{Equation (112)}$$

A third example of an interpretation of Table 4 is as follows.

When [u0 u1]=[11] (i.e., u0=1, u1=1), and [u6 u7]=[00] (i.e., u6=0, u7=0), the base station causes phase changer 205A, phase changer 205B to implement a phase change using a combination the method of implementing a phase change cyclically/regularly on a per-symbol basis and the method of implementing a phase change using a specific phase change value in accordance with method 11_1.

Method 11_1:

Phase changer 205A sets the coefficient used in the multiplication for the phase change to y1(i). i indicates a symbol number and is an integer that is greater than or equal to 0. Here, y1(i) is expressed as follows.

[MATH. 113]

$$y1(i) = e^{j\frac{2\times\pi\times i}{3}} \qquad \text{Equation (113)}$$

Phase changer 205B sets the coefficient used in the multiplication for the phase change to y2(i). i indicates a symbol number and is an integer that is greater than or equal to 0. Here, y2(i) is expressed as follows.

[MATH. 114]

$$y2(i) = e^{j\frac{\pi}{4}} \qquad \text{Equation (114)}$$

When [u0 u1]=[11] (i.e., u0=1, u1=1), and [u6 u7]=[01] (i.e., u6=0, u7=1), the base station causes phase changer 205A, phase changer 205B to implement a phase change using a combination the method of implementing a phase change cyclically/regularly on a per-symbol basis and the method of implementing a phase change using a specific phase change value in accordance with method 11_2.

Method 11_2:

Phase changer 205A sets the coefficient used in the multiplication for the phase change to y1(i). i indicates a symbol number and is an integer that is greater than or equal to 0. Here, y1(i) is expressed as follows.

[MATH. 115]

$$y1(i) = e^{j\frac{2\times\pi\times i}{5}} \qquad \text{Equation (115)}$$

Phase changer 205B sets the coefficient used in the multiplication for the phase change to y2(i). i indicates a symbol number and is an integer that is greater than or equal to 0. Here, y2(i) is expressed as follows.

[MATH. 116]

$$y2(i) = e^{j\frac{\pi}{4}} \qquad \text{Equation (116)}$$

When [u0 u1]=[11] (i.e., u0=1, u1=1), and [u6 u7]=[10] (i.e., u6=1, u7=0), the base station causes phase changer 205A, phase changer 205B to implement a phase change using a combination the method of implementing a phase change cyclically/regularly on a per-symbol basis and the method of implementing a phase change using a specific phase change value in accordance with method 11_3.

Method 11_3:

Phase changer 205A sets the coefficient used in the multiplication for the phase change to y1(i). i indicates a symbol number and is an integer that is greater than or equal to 0. Here, y1(i) is expressed as follows.

[MATH. 117]

$$y1(i) = e^{j\frac{2\times\pi\times i}{7}} \qquad \text{Equation (117)}$$

Phase changer 205B sets the coefficient used in the multiplication for the phase change to y2(i). i indicates a symbol number and is an integer that is greater than or equal to 0. Here, y2(i) is expressed as follows.

[MATH. 118]

$$y2(i) = e^{j\frac{\pi}{4}} \qquad \text{Equation (118)}$$

When [u0 u1]=[11] (i.e., u0=1, u1=1), and [u6 u7]=[11] (i.e., u6=1, u7=1), the base station causes phase changer 205A, phase changer 205B to implement a phase change using a combination the method of implementing a phase change cyclically/regularly on a per-symbol basis and the method of implementing a phase change using a specific phase change value in accordance with method 11_4.

Method 11_4:

Phase changer 205A sets the coefficient used in the multiplication for the phase change to y1(i). i indicates a symbol number and is an integer that is greater than or equal to 0. Here, y1(i) is expressed as follows.

[MATH. 119]

$$y1(i) = e^{j\frac{2\times\pi\times i}{9}} \qquad \text{Equation (119)}$$

Phase changer 205B sets the coefficient used in the multiplication for the phase change to y2(i). i indicates a symbol number and is an integer that is greater than or equal to 0. Here, y2(i) is expressed as follows.

[MATH. 120]

$$y2(i) = e^{j\frac{\pi}{4}} \quad \text{Equation (120)}$$

A fourth example of an interpretation of Table 4 is as follows.

When [u0 u1]=[11] (i.e., u0=1, u1=1), and [u6 u7]=[00] (i.e., u6=0, u7=0), the base station causes phase changer 205A, phase changer 205B to implement a phase change using a combination the method of implementing a phase change cyclically/regularly on a per-symbol basis and the method of implementing a phase change using a specific phase change value in accordance with method 11_1.

Method 111:

Phase changer 205A sets the coefficient used in the multiplication for the phase change to y1(i). i indicates a symbol number and is an integer that is greater than or equal to 0. Here, y1(i) is expressed as follows.

[MATH. 121]

$$y1(i) = e^{j0} \quad \text{Equation (121)}$$

Phase changer 205B sets the coefficient used in the multiplication for the phase change to y2(i). i indicates a symbol number and is an integer that is greater than or equal to 0. Here, y2(i) is expressed as follows.

[MATH. 122]

$$y2(i) = e^{j\frac{2\times\pi\times i}{9}} \quad \text{Equation (122)}$$

When [u0 u1]=[11] (i.e., u0=1, u1=1), and [u6 u7]=[01] (i.e., u6=0, u7=1), the base station causes phase changer 205A, phase changer 205B to implement a phase change using a combination the method of implementing a phase change cyclically/regularly on a per-symbol basis and the method of implementing a phase change using a specific phase change value in accordance with method 11_2.

Method 11_2:

Phase changer 205A sets the coefficient used in the multiplication for the phase change to y1(i). i indicates a symbol number and is an integer that is greater than or equal to 0. Here, y1(i) is expressed as follows.

[MATH. 123]

$$y1(i) = e^{j\frac{\pi}{8}} \quad \text{Equation (123)}$$

Phase changer 205B sets the coefficient used in the multiplication for the phase change to y2(i). i indicates a symbol number and is an integer that is greater than or equal to 0. Here, y2(i) is expressed as follows.

[MATH. 124]

$$y2(i) = e^{j\frac{2\times\pi\times i}{9}} \quad \text{Equation (124)}$$

When [u0 u1]=[11] (i.e., u0=1, u1=1), and [u6 u7]=[10] (i.e., u6=1, u7=0), the base station causes phase changer 205A, phase changer 205B to implement a phase change using a combination the method of implementing a phase change cyclically/regularly on a per-symbol basis and the method of implementing a phase change using a specific phase change value in accordance with method 11_3.

Method 11_3:

Phase changer 205A sets the coefficient used in the multiplication for the phase change to y1(i). i indicates a symbol number and is an integer that is greater than or equal to 0. Here, y1(i) is expressed as follows.

[MATH. 125]

$$y1(i) = e^{j\frac{\pi}{4}} \quad \text{Equation (125)}$$

Phase changer 205B sets the coefficient used in the multiplication for the phase change to y2(i). i indicates a symbol number and is an integer that is greater than or equal to 0. Here, y2(i) is expressed as follows.

[MATH. 126]

$$y2(i) = e^{j\frac{2\times\pi\times i}{9}} \quad \text{Equation (126)}$$

When [u0 u1]=[11] (i.e., u0=1, u1=1), and [u6 u7]=[11] (i.e., u6=1, u7=1), the base station causes phase changer 205A, phase changer 205B to implement a phase change using a combination the method of implementing a phase change cyclically/regularly on a per-symbol basis and the method of implementing a phase change using a specific phase change value in accordance with method 11_4.

Method 11_4:

Phase changer 205A sets the coefficient used in the multiplication for the phase change to y1(i). i indicates a symbol number and is an integer that is greater than or equal to 0. Here, y1(i) is expressed as follows.

[MATH. 127]

$$y1(i) = e^{j\frac{3\times\pi}{8}} \quad \text{Equation (127)}$$

Phase changer 205B sets the coefficient used in the multiplication for the phase change to y2(i). i indicates a symbol number and is an integer that is greater than or equal to 0. Here, y2(i) is expressed as follows.

[MATH. 128]

$$y2(i) = e^{j\frac{2\times\pi\times i}{9}} \quad \text{Equation (128)}$$

A fifth example of an interpretation of Table 4 is as follows.

When [u0 u1]=[11] (i.e., u0=1, u1=1), and [u6 u7]=[00] (i.e., u6=0, u7=0), the base station causes phase changer 205A, phase changer 205B to implement a phase change using a combination the method of implementing a phase change cyclically/regularly on a per-symbol basis and the method of implementing a phase change using a specific phase change value in accordance with method 11_1.

Method 11_1:

Phase changer 205A sets the coefficient used in the multiplication for the phase change to y1(i). i indicates a symbol number and is an integer that is greater than or equal to 0. Here, y1(i) is expressed as follows.

[MATH. 129]

$$y1(i) = e^{j\frac{\pi}{4}}$$ Equation (129)

Phase changer 205B sets the coefficient used in the multiplication for the phase change to y2(i). i indicates a symbol number and is an integer that is greater than or equal to 0. Here, y2(i) is expressed as follows.

[MATH. 130]

$$y2(i) = e^{j\frac{2\times\pi\times i}{3}}$$ Equation (130)

When [u0 u1]=[11] (i.e., u0=1, u1=1), and [u6 u7]=[01] (i.e., u6=0, u7=1), the base station causes phase changer 205A, phase changer 205B to implement a phase change using a combination the method of implementing a phase change cyclically/regularly on a per-symbol basis and the method of implementing a phase change using a specific phase change value in accordance with method 11_2.

Method 11_2:

Phase changer 205A sets the coefficient used in the multiplication for the phase change to y1(i). i indicates a symbol number and is an integer that is greater than or equal to 0. Here, y1(i) is expressed as follows.

[MATH. 131]

$$y1(i) = e^{j\frac{\pi}{4}}$$ Equation (131)

Phase changer 205B sets the coefficient used in the multiplication for the phase change to y2(i). i indicates a symbol number and is an integer that is greater than or equal to 0. Here, y2(i) is expressed as follows.

[MATH. 132]

$$y2(i) = e^{j\frac{2\times\pi\times i}{5}}$$ Equation (132)

When [u0 u1]=[11] (i.e., u0=1, u1=1), and [u6 u7]=[10] (i.e., u6=1, u7=0), the base station causes phase changer 205A, phase changer 205B to implement a phase change using a combination the method of implementing a phase change cyclically/regularly on a per-symbol basis and the method of implementing a phase change using a specific phase change value in accordance with method 11_3.

Method 11_3:

Phase changer 205A sets the coefficient used in the multiplication for the phase change to y1(i). i indicates a symbol number and is an integer that is greater than or equal to 0. Here, y1(i) is expressed as follows.

[MATH. 133]

$$y1(i) = e^{j\frac{\pi}{4}}$$ Equation (133)

Phase changer 205B sets the coefficient used in the multiplication for the phase change to y2(i). i indicates a symbol number and is an integer that is greater than or equal to 0. Here, y2(i) is expressed as follows.

[MATH. 134]

$$y2(i) = e^{j\frac{2\times\pi\times i}{7}}$$ Equation (134)

When [u0 u1]=[11] (i.e., u0=1, u1=1), and [u6 u7]=[11] (i.e., u6=1, u7=1), the base station causes phase changer 205A, phase changer 205B to implement a phase change using a combination the method of implementing a phase change cyclically/regularly on a per-symbol basis and the method of implementing a phase change using a specific phase change value in accordance with method 11_4.

Method 11_4:

Phase changer 205A sets the coefficient used in the multiplication for the phase change to y1(i). i indicates a symbol number and is an integer that is greater than or equal to 0. Here, y1(i) is expressed as follows.

[MATH. 135]

$$y1(i) = e^{j\frac{\pi}{4}}$$ Equation (135)

Phase changer 205B sets the coefficient used in the multiplication for the phase change to y2(i). i indicates a symbol number and is an integer that is greater than or equal to 0. Here, y2(i) is expressed as follows.

[MATH. 136]

$$y2(i) = e^{j\frac{2\times\pi\times i}{9}}$$ Equation (136)

Although first through fifth examples are given above, the detailed phase change method employed by phase changer 205A, phase changer 205B is not limited to these examples.

<7> In phase changer 205A, phase change is implemented cyclically/regularly on a per-symbol basis, and in phase changer 205B, phase change is implemented using a specific phase change value (set).

<8> In phase changer 205B, phase change is implemented using a specific phase change value (set), and in phase changer 205B, phase change is implemented cyclically/regularly on a per-symbol basis.

<3> In phase changer 205A and phase changer 205B, a phase change is implemented cyclically/regularly on a per-symbol basis.

So long as a method according to one or more of <7> and <8> is set in detail according to [u2 u3], it may be implemented in the same manner as described above.

In weighting synthesizer 203 included in the base station, the matrix used for the weighting synthesis may be changed. Control information for setting the weighting synthesis matrix shall be referred to as u8, u9. The relationship between [u8 u9] and the weighting synthesis matrix to be used in detail by weighting synthesizer 203 is given in Table 5.

Note that u8, u9 are, for example, transmitted by the base station as some of the control information symbols, namely other symbols 403, 503. The terminal obtains [u8 u9] included in control information symbols, namely other symbols 403, 503, becomes aware of operations performed by weighting synthesizer 203 from [u8 u9], and demodulates and decodes data symbols. Also, the control information for identifying "detailed weighting matrix" is 2-bit information, but the number of bits may be other than 2 bits.

TABLE 5

| u8 u9 | phase change method when [u0 u1] = [10] |
|---|---|
| 00 | precoding using matrix 1 |
| 01 | precoding using matrix 2 |
| 10 | precoding using matrix 3 |
| 11 | determine precoding method based on information from communication partner |

When [u8 u9]=[00] (i.e., u8=0, u9=0), in weighting synthesizer 203 in the base station, precoding that uses matrix 1 is performed.

When [u8 u9]=[01] (i.e., u8=0, u9=1), in weighting synthesizer 203 in the base station, precoding that uses matrix 2 is performed.

When [u8 u9]=[10] (i.e., u8=1, u9=0), in weighting synthesizer 203 in the base station, precoding that uses matrix 3 is performed.

When [u8 u9]=[11] (i.e., u8=1, u9=1), the base station obtains, from the communication partner, for example, feedback information, and based on the feedback information, in weighting synthesizer 203 of the base station, calculates a precoding matrix to be used, and performs precoding using the calculated precoding matrix.

As described above, weighting synthesizer 203 in the base station switches between precoding matrices. The terminal, which is the communication partner of the base station, obtains u8, u9 included in the control information symbol, and based on u8, u9, can demodulate and decode the data symbols. With this, since a suitable precoding matrix can be set based on the communications situation such as the state of the radio wave propagation environment, the terminal can achieve an advantageous effect of achieving a high data reception quality.

Although identification methods such as those for phase changers 205A, 205B in the base station indicated in Table 1 have been described, settings such as those in Table 6 may be used instead of those in Table 1.

Transmission device 2303 in the base station illustrated in FIG. 23 has the configuration illustrated in FIG. 1. Signal processor 106 illustrated in FIG. 1 has the configuration illustrated in any one of FIG. 2, FIG. 18, FIG. 19, FIG. 20, FIG. 21, FIG. 22, FIG. 28, FIG. 29, FIG. 30, FIG. 31, FIG. 32, and FIG. 33.

Here, operation performed by phase changers 205A, 205B may be switched depending on the communications environment or the settings. Control information relating to operations performed by phase changers 205A, 205B is transmitted by the base station as a part of the control information transmitted via control information symbols, namely other symbols 403, 503 in the frame configurations illustrated in FIG. 4, FIG. 5, FIG. 13, and FIG. 14.

Here, control information relating to operations performed by phase changers 205A, 205B is expressed as u10. The relationship between [u10] and phase changers 205A, 205B is illustrated in Table 6.

TABLE 6

| u10 | change phase change value on a per-symbol basis (cyclically/regularly) |
|---|---|
| 0 | OFF |
| 1 | ON |

Note that u10 is transmitted by the base station as some of the control information symbols, namely other symbols 403, 503. The terminal obtains [u10] included in control information symbols, namely other symbols 403, 503, becomes aware of operations performed by phase changers 205A, 205B from [u10], and demodulates and decodes data symbols.

Interpretation of Table 6 is as follows.

When the settings in the base station are configured such that phase changers 205A, 205B do not implement a phase change, u10 is set to 0 (u10=0). Accordingly phase changer 205A outputs signal 206A without implementing a phase change on input signal 204A. Similarly phase changer 205B outputs a signal (206B) without implementing a phase change on the input signal (204B).

When the settings in the base station are configured such that phase changers 205A, 205B implement a phase change cyclically/regularly on a per-symbol basis, u10 is set to 1 (u10=1). Note that since the method used by phase changers 205A, 205B to implement a phase change cyclically/regularly on a per-symbol basis is described in detail in Embodiments 1 through 6, detailed description thereof is omitted. When signal processor 106 in FIG. 1 is configured as illustrated in any one of FIG. 20, FIG. 21, and FIG. 22, u10 is also set to 1 (u10=1) when the settings in the base station are configured such that phase changer 205A implements a phase change cyclically/regularly on a per-symbol basis and phase changer 205B does not implement a phase change cyclically/regularly on a per-symbol basis, and when the settings in the base station are configured such that phase changer 205A does not implement a phase change cyclically/regularly on a per-symbol basis and phase changer 205B implements a phase change cyclically/regularly on a per-symbol basis.

With this, the terminal can achieve an advantageous effect of achieving a high data reception quality by turning the operation of the phase change performed by phase changers 205A, 205B on and off based on the communications situation such as the state of the radio wave propagation environment.

Transmission device 2303 in the base station illustrated in FIG. 23 has the configuration illustrated in FIG. 1. Signal processor 106 illustrated in FIG. 1 has the configuration illustrated in any one of FIG. 2, FIG. 18, FIG. 19, FIG. 20, FIG. 21, FIG. 22, FIG. 28, FIG. 29, FIG. 30, FIG. 31, FIG. 32, and FIG. 33. Here, operations performed by phase changers 209A, 209B may be switched depending on the communications environment or the settings. Control information relating to operations performed by phase changers 209A, 209B is transmitted by the base station as a part of the control information transmitted via control information symbols, namely other symbols 403, 503 in the frame configurations illustrated in FIG. 4, FIG. 5, FIG. 13, and FIG. 14.

Here, control information relating to operations performed by phase changers 209A, 209B is expressed as u11. The relationship between [u11] and phase changers 209A, 209B is illustrated in Table 7.

TABLE 7

| u11 | phase change (or cyclic delay diversity) |
|---|---|
| 0 | OFF |
| 1 | ON |

Note that u11 is transmitted by the base station as some of the control information symbols, namely other symbols 403, 503. The terminal obtains [u11] included in control information symbols, namely other symbols 403, 503, becomes aware of operations performed by phase changers 209A, 209B from [u11], and demodulates and decodes data symbols.

Interpretation of Table 7 is as follows.

When the settings in the base station are configured such that phase changers 209A, 209B do not implement a phase change, u11 is set to 0 (u11=0).

Accordingly phase changer 209A outputs a signal (210A) without implementing a phase change on the input signal (208A). Similarly phase changer 209B outputs a signal (210B) without implementing a phase change on the input signal (208B).

When the settings in the base station are configured such that phase changers 209A, 209B implement a phase change cyclically/regularly on a per-symbol basis or apply cyclic delay diversity u11 is set to 1 (u11=1).

Note that since the method used by phase changers 209A, 209B to implement a phase change cyclically/regularly on a per-symbol basis is described in detail in Embodiments 1 through 6, detailed description thereof is omitted. When signal processor 106 in FIG. 1 is configured as illustrated in any one of FIG. 19 and FIG. 22, u11 is also set to 1 (u11=1) when the settings in the base station are configured such that phase changer 209A implements a phase change cyclically/regularly on a per-symbol basis and phase changer 209B does not implement a phase change cyclically/regularly on a per-symbol basis, and when the settings in the base station are configured such that phase changer 209A does not implement a phase change cyclically/regularly on a per-symbol basis and phase changer 209B implements a phase change cyclically/regularly on a per-symbol basis.

With this, the terminal can achieve an advantageous effect of achieving a high data reception quality by turning the operation of the phase change performed by phase changers 209A, 209B on and off based on the communications situation such as the state of the radio wave propagation environment.

Next, an example of switching the operations performed by phase changers 205A, 205B shown in Table 1 will be given.

For example, the base station and the terminal may communicate as illustrated in FIG. 27. Note that communication based on FIG. 27 has been described above, and as such, description will be partially omitted.

First, the terminal requests communication with the base station.

The base station then selects "implement phase change using a specific phase change value (set)" in Table 1, whereby phase changer 205A and/or phase changer 205B perform signal processing equivalent to "implement phase change using a specific phase change value (set)", and transmit data symbol #1 2702_1.

The terminal receives control information symbol 2701_1 and data symbol #1 2702_1 transmitted by the base station, and demodulates and decodes data symbol #1 2702_1 based on the transmission method included in control information symbol 2701_1. As a result, the terminal determines that the data included in data symbol #1 2702_1 is obtained without error. The terminal then transmits, to the base station, terminal transmission symbol 2750_1 including at least information indicating that the data included in data symbol #1 2702_1 was obtained without error.

The base station receives terminal transmission symbol 2750_1 transmitted by the terminal, and based at least on the information that is included in terminal transmission symbol 2750_1 and indicates that the data included in data symbol #1 2702_1 was obtained without error, determines the phase change (set) to be implemented by phase changer 205A and/or phase changer 205B to be "implement a phase change at a specific phase change value (set)", just as in the case where data symbol #1 2702_1 is transmitted.

Since the base station obtained the data included in data symbol #1 2702_1 without error, the terminal can determine that it is highly probable that data can be obtained without error when the next data symbol is transmitted and phase change is implemented using the specific phase change value (set).

This makes it possible to achieve an advantageous effect that it is highly probable that the terminal can achieve a high data reception quality. Then, the base station implements a phase change via phase changer 205A and/or phase changer 205B based on the determined "implement a phase change at a specific phase change value (set)".

The base station then transmits control information symbol 2701_2 and data symbol #2 2702_2. Here, at least data symbol #2 2702_2 is implemented with a phase change using the determined "implement a phase change at a specific phase change value (set)".

The terminal receives control information symbol 2701_2 and data symbol #2 2702_2 transmitted by the base station, and demodulates and decodes data symbol #2 2702_2 based on information on the transmission method included in control information symbol 2701_2. As a result, the terminal determines that the data included in data symbol #2 2702_2 is not successfully obtained.

The terminal then transmits, to the base station, terminal transmission symbol 2750_2 including at least information indicating that the data included in data symbol #2 2702_2 was not successfully obtained.

The base station receives terminal transmission symbol 2750_2 transmitted by the terminal, and based at least on the information that is included in terminal transmission symbol 2750_2 and indicates that the data included in data symbol #2 2702_2 was not successfully obtained, determines the phase change (set) to be implemented by phase changer 205A and/or phase changer 205B to be changed to "cyclically/regularly change phase change value on a per-symbol basis".

Since the base station did not obtain the data included in data symbol #2 2702_2 successfully the terminal can determine that it is highly probable that data can be obtained without error when the next data symbol is transmitted and the phase change method is changed to "cyclically/regularly implement phase change on a per-symbol basis".

This makes it possible to achieve an advantageous effect that it is highly probable that the terminal can achieve a high data reception quality. Accordingly the base station implements a phase change via phase changer 205A and/or phase changer 205B based on "cyclically/regularly implement phase change on a per-symbol basis".

Here, the base station transmits control information symbol 2701_3 and data symbol #2 2702_2-1. At least data symbol #2 2702_2-1 is implemented with a phase change based on "cyclically/regularly implement phase change on a per-symbol basis".

The terminal receives control information symbol 2701_3 and data symbol #2 2702_2 transmitted by the base station, and demodulates and decodes data symbol #2 2702_2-1 based on information on the transmission method included in control information symbol 2701_3. As a result, the terminal determines that the data included in data symbol #2 2702_2-1 is not successfully obtained. The terminal then transmits, to the base station, terminal transmission symbol 2750_3 including at least information indicating that the data included in data symbol #2 2702_2-1 was not successfully obtained.

The base station receives terminal transmission symbol 2750_3 transmitted by the terminal, and based at least on the information that is included in terminal transmission symbol 2750_3 and indicates that the data included in data symbol #2 2702_2-1 was not successfully obtained, determines to set the phase change to be implemented by phase changer A and phase changer B to once again be "cyclically/regularly implement phase change on a per-symbol basis". Accordingly the base station implements a phase change via phase changer 205A and/or phase changer 205B based on "cyclically/regularly implement phase change on a per-symbol basis". Here, the base station transmits control information symbol 2701_4 and data symbol #2 2702_2-2. At least data symbol #2 2702_2-2 is implemented with a phase change based on "cyclically/regularly implement phase change on a per-symbol basis".

The terminal receives control information symbol 2701_4 and data symbol #2 2702_2-2 transmitted by the base station, and demodulates and decodes data symbol #2 2702_2-2 based at least on information on the transmission method included in control information symbol 2701_4. As a result, the terminal determines that the data included in data symbol #2 2702_2-2 is obtained without error. The terminal then transmits, to the base station, terminal transmission symbol 2750_4 including at least information indicating that the data included in data symbol #2 2702_2-2 was obtained without error.

The base station receives terminal transmission symbol 2750_4 transmitted by the terminal, and based at least on the information that is included in terminal transmission symbol 2750_4 and indicates that the data included in data symbol #2 2702-2 was obtained without error, determines the phase change (set) to be implemented by phase changer 205A and/or phase changer 205B to be "implement a phase change at a specific phase change value (set)". Then, the base station implements a phase change via phase changer 205A and/or phase changer 205B based on the determined "implement a phase change at a specific phase change value (set)".

The base station then transmits control information symbol 2701_5 and data symbol #3 2702_3. Here, at least data symbol #3 2702_3 is implemented with a phase change based on "implement a phase change at a specific phase change value (set)".

The terminal receives control information symbol 2701_5 and data symbol #3 2702_3 transmitted by the base station, and demodulates and decodes data symbol #3 2702_3 based on information on the transmission method included in control information symbol 2701_5. As a result, the terminal determines that the data included in data symbol #3 2702_3 is obtained without error. The terminal then transmits, to the base station, terminal transmission symbol 2750_5 including at least information indicating that the data included in data symbol #3 2702_3 was obtained without error.

The base station receives terminal transmission symbol 2750_5 transmitted by the terminal, and based at least on the information that is included in terminal transmission symbol 2750_5 and indicates that the data included in data symbol #3 2702_3 was obtained without error, determines the method to be implemented by phase changer 205A and/or phase changer 205B to be the method "implement a phase change at a specific phase change value (set)". The base station then transmits data symbol #4 2702_4 based on "implement a phase change at a specific phase change value (set)".

The terminal receives control information symbol 2701_6 and data symbol #4 2702_4 transmitted by the base station, and demodulates and decodes data symbol #4 2702_4 based on information on transmission method included in control information symbol 2701_6. As a result, the terminal determines that the data included in data symbol #4 2702_4 is not successfully obtained. The terminal then transmits, to the base station, terminal transmission symbol 2750_6 including at least information indicating that the data included in data symbol #4 2702_4 was not successfully obtained.

The base station receives terminal transmission symbol 2750_6 transmitted by the terminal, and based at least on the information that is included in terminal transmission symbol 2750_6 and indicates that the data included in data symbol #4 2702_4 was not successfully obtained, determines to change the phase change to be implemented by phase changer 205A and/or phase changer 205B to "cyclically/regularly implement phase change on a per-symbol basis". Accordingly the base station implements a phase change via phase changer 205A and/or phase changer 205B based on "cyclically/regularly implement phase change on a per-symbol basis". Here, the base station transmits control information symbol 2701_7 and data symbol #4 2702_4-1. At least data symbol #4 2702_4-1 is implemented with a phase change based on "cyclically/regularly implement phase change on a per-symbol basis".

The terminal receives control information symbol 2701_7 and data symbol #4 2702_4-1 transmitted by the base station, and demodulates and decodes data symbol #4 2702_4-1 based on information on the transmission method included in control information symbol 2701_7.

Note that regarding data symbol #1 27021, data symbol #2 2702_2, data symbol #3 2702_3, and data symbol #4 2702_4, the base station transmits a plurality of modulated signals from a plurality of antennas, just as described in Embodiments 1 through 6.

The frame configurations of the base station and terminal illustrated in FIG. 27 are mere non-limiting examples; other symbols may be included. Moreover, control information symbol 27011, 27012, 27013, 27014, 2701_5, 2701_6, data symbol #1 2702_1, data symbol #2 2702_2, data symbol #3 2702_3, and data symbol #4 27024 may each include other symbols, such as a pilot symbol. Moreover, control information symbol 27011, 27012, 2701_3, 2701_4, 2701_5, and 2701_6 include information relating to the specific phase change value (set) used upon transmitting data symbol #1 2702_1, data symbol #2 2702_2, data symbol #3 27023, and data symbol #4 2702_4, and the terminal becomes capable of demodulating and decoding data symbol #1 2702_1, data symbol #2 2702_2, data symbol #3 2702_3, and data symbol #4 2702_4 as a result of obtaining this information.

Note that the switching of the transmission method based on Table 1 described in this embodiment of the base station with reference to FIG. 27 is not limited to the above description. The above description is merely one example. The switching of the transmission method based on Table 1 may be performed more flexibly.

As described above, by switching the transmission method, switching the phase change method, and switching implementation of the phase change on or off in a more flexible manner in accordance with, for example, the communications network, the reception device of the communication partner can achieve an advantageous effect of an improvement in data reception quality.

Note that a method for switching the precoding matrix based on, for example, information from the communication partner, may be allotted to "reserve" in Table 1 according to this embodiment, which is associated with u0=1 and u1=1. In other words, when the base station selects the MIMO transmission method, the base station may be allowed to also select a method for selecting a precoding matrix based on information from the communication partner.

In this embodiment, the configuration of signal processor 106 illustrated in FIG. 1 was exemplified using FIG. 28, FIG. 29, FIG. 30, FIG. 31, FIG. 32, and FIG. 33, but for Embodiments 1 through 6 as well, signal processor 106 illustrated in FIG. 1 can be configured as illustrated in FIG. 28, FIG. 29, FIG. 30, FIG. 31, FIG. 32, and FIG. 33.

(Supplemental Information 3)

The method used to map each symbol in the mapper described in the present disclosure may be switched regularly/cyclically for example. For example, a modulation scheme that has 16 signal points in an in-phase I-orthogonal Q plane for transmitting 4 bits is implemented. Here, the arrangement of the 16 signal points for transmitting the four bits in the in-phase I-orthogonal Q plane may be changed on a per-symbol basis.

Moreover, in Embodiments 1 through 6, a case in which a multi-carrier scheme such as OFDM is implemented is described, but a single-carrier scheme may be implemented in the same manner.

Moreover, the embodiments according to the present disclosure may be implemented in the same manner even when a spread spectrum communication method is implemented.

(Supplemental Information 4)

In each embodiment disclosed in the present disclosure, an example of the configuration of the transmission device is given in FIG. 1, and examples of the configuration of signal processor 106 illustrated in FIG. 1 are given in FIG. 2, FIG. 18, FIG. 19, FIG. 20, FIG. 21, FIG. 22, FIG. 28, FIG. 29, FIG. 30, FIG. 31, FIG. 32, and FIG. 33. However, the configuration of transmission device is not limited to the configuration illustrated in FIG. 1, and the configuration of signal processor 106 is not limited to the examples illustrated in FIG. 2, FIG. 18, FIG. 19, FIG. 20, FIG. 21, FIG. 22, FIG. 28, FIG. 29, FIG. 30, FIG. 31, FIG. 32, and FIG. 33. In other words, the transmission device and signal processor 106 included in the transmission device may be configured in any manner so long as the transmission device can generate a signal equivalent to either of the processed signal 106_A or 106_B described in the above embodiments according to the present disclosure and transmit the signal using a plurality of antenna units.

Hereinafter, a different configuration example of the transmission device and signal processor 106 included in the transmission device that meet this requirement will be given.

One example of a different configuration is one in which mapper 104 illustrated in FIG. 1 generates, as mapped signal 105_1, 105_2, a signal equivalent to weighting synthesized signal 204A, 204B illustrated in any one of FIG. 2, FIG. 18, FIG. 19, FIG. 20, FIG. 21, and FIG. 22, based on encoded data 103 and control signal 100. signal processor 106 includes a configuration in which weighting synthesizer 203 is removed from a configuration illustrated in any one of FIG. 2, FIG. 18, FIG. 19, FIG. 20, FIG. 21, and FIG. 22. Mapped signal 105_1 is input into phase changer 205A or inserter 207A, and mapped signal 105_2 is input into phase changer 205B or inserter 207B.

Another example of a different configuration is one in which, when the weighting synthesis (precoding) processing is expressed as (precoding) matrix F illustrated in Equation (33) or Equation (34), weighting synthesizer 203 illustrated in FIG. 2 does not perform signal processing for weighting synthesis on mapped signal 201A, 201B, outputs mapped signal 201A as weighting synthesized signal 204A, and outputs mapped signal 201B as weighting synthesized signal 204B.

In such a case, weighting synthesizer 203 performs, based on control signal 200, control of switching between (i) performing signal processing corresponding to weighting synthesis to generate weighting synthesized signal 204A, 204B, and (ii) outputting mapped signal 201A as weighting synthesized signal 204A and outputting mapped signal 201B as weighting synthesized signal 204B without performing signal processing for weighting synthesis. Moreover, when the only weighting synthesis (precoding) processing that is performed is the processing expressed as (precoding) matrix F in Equation (33) or Equation (34), weighting synthesizer 203 may be omitted.

Thus, even if the specific configuration of the transmission device is changed in this manner, so long as the transmission device can generate a signal equivalent to either of the processed signal 106_A or 106_B described in the above embodiments according to the present disclosure and transmit the signal using a plurality of antenna units, the reception device, it is possible to achieve the advantageous effect that data reception quality in the reception device can be improved with respect to data symbols that perform MIMO transmission or transmit a plurality of streams when the environment is one in which the direct waves are dominant, such as in an LOS environment.

Note that in signal processor 106 illustrated in FIG. 1, a phase change may be provided both before and after weighting synthesizer 203. More specifically signal processor 106 includes, before weighting synthesizer 203, one or both of phase changer 205A_1 that generates phase-changed signal 2801A by applying a phase change to mapped signal 201A, and phase changer 205B_1 that generates phase-changed signal 2801B by applying a phase change to mapped signal 201B.

Signal processor 106 further includes, before inserter 207A, 207B, one or both of phase changer 205A_2 that generates phase-changed signal 206A by applying a phase change to weighting synthesized signal 204A, and phase changer 205B_2 that generates phase-changed signal 206B by applying a phase change to weighting synthesized signal 204B.

Here, when signal processor 106 includes phase changer 205A_1, one input of weighting synthesizer 203 is phase-changed signal 2801A, and when signal processor 106 does not include phase changer 205A_1, one input of weighting synthesizer 203 is mapped signal 201A.

When signal processor 106 includes phase changer 205B_1, the other input of weighting synthesizer 203 is phase-changed signal 2801B, and when signal processor 106 does not include phase changer 205B_1, the other input of weighting synthesizer 203 is mapped signal 201B. When signal processor 106 includes phase changer 205A_2, the input of inserter 207A is phase-changed signal 206A, and when signal processor 106 does not include phase changer 205A_2, the input of inserter 207A is weighting synthesized signal 204A.

When signal processor 106 includes phase changer 205B_2, the input of inserter 207B is phase-changed signal 206B, and when signal processor 106 does not include phase changer 205B_2, the input of inserter 207B is weighting synthesized signal 204B.

Moreover, the transmission device illustrated in FIG. 1 may include a second signal processor that implements different signal processing on processed signal 106_A, 106_B, i.e., the output of signal processor 106. Here, radio unit 107_A receives an input of signal A processed with second signal processing and performs predetermined processing on the input signal, and radio unit 107_B receives an input of signal B processed with second signal processing and performs predetermined processing on the input signal, where signal A and signal B processed with second signal processing are two signals output from a second signal processor.

Embodiment A1

Hereinafter, a case in which the base station (AP) and the terminal communicate with each other will be described. Here, the base station (AP) can transmit a plurality of modulated signals including a plurality of streams of data using a plurality of antennas.

For example, the base station (AP) includes the transmission device illustrated in FIG. 1 in order to transmit a plurality of modulated signals including a plurality of streams of data using a plurality of antennas. Moreover, the base station (AP) includes, as the configuration of signal processor 106 illustrated in FIG. 1, a configuration illustrated in any one of FIG. 2, FIG. 18, FIG. 19, FIG. 20, FIG. 21, FIG. 22, FIG. 28, FIG. 29, FIG. 30, FIG. 31, FIG. 32, and FIG. 33.

The following will describe a case in which the transmission device described above implements phase change on at least one modulated signal after precoding. In this embodiment, the base station (AP) is capable switching between implementing and not implementing a phase change, based on a control signal. Accordingly, the following holds true.
<When Phase Change is Implemented>
The base station (AP) implements a phase change on at least one modulated signal. The base station (AP) transmits a plurality of modulated signals using a plurality of antennas. Note that the transmission method of implementing a phase change on at least one modulated signal and transmitting a plurality of modulated signals using a plurality of antennas is as described in the plurality of embodiments according to the present disclosure.
<When Phase Change is Not Implemented>
The base station (AP) performs precoding (weighting synthesis) described in the present disclosure on a plurality of streams of modulated signals (baseband signals), and without implementing a phase change, transmits the generated plurality of modulated signals using a plurality of antennas. However, as described above, the precoder (weighting synthesizer) is not required to perform precoding, and a configuration in which precoding is never performed and a precoder (weighting synthesizer) is not included is also acceptable.

Note that the base station (AP) transmits control information for notifying the terminal, which is the communication partner, whether or not phase change is to be implemented, using a preamble, for example.

Figure 34:
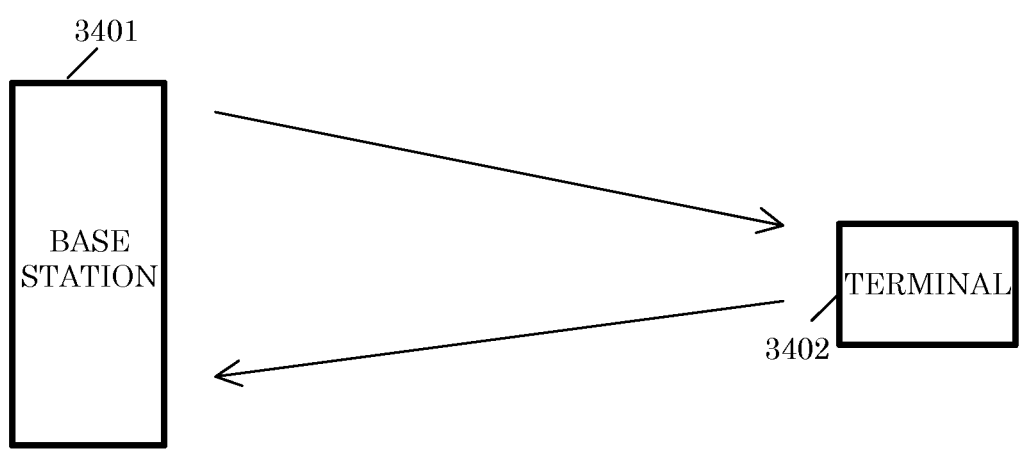
FIG. 34 illustrates one example of the system configuration in a state in which transmission is being performed between a base station and a terminal.

FIG. 34 illustrates one example of a system configuration in a state in which base station (AP) 3401 and terminal 3402 are communicating.

As illustrated in FIG. 34, base station (AP) 3401 transmits a modulated signal and terminal 3402, which is the communication partner, receives the modulated signal. Terminal 3402 then transmits a modulated signal, and base station 3401, which is the communication partner, receives the modulated signal.

Figure 35:
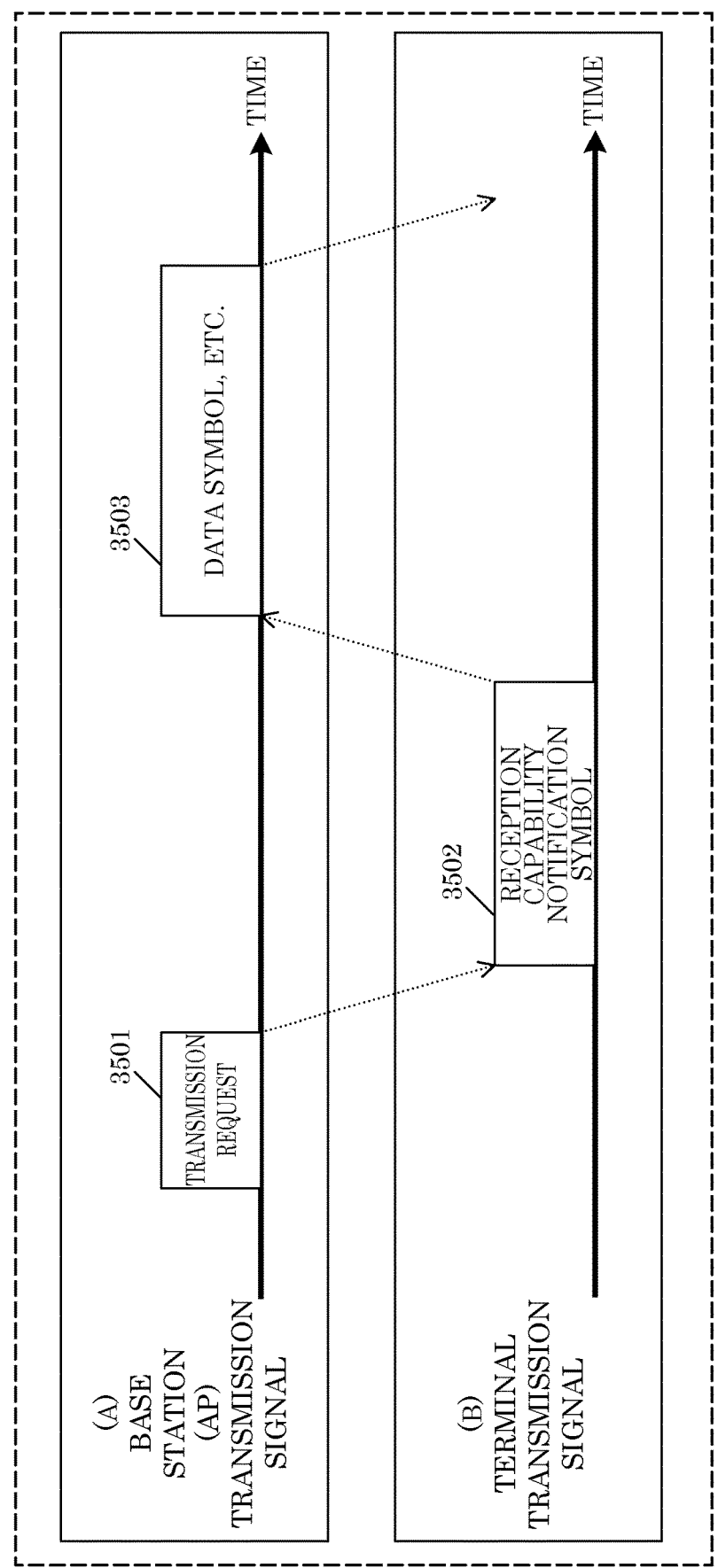
FIG. 35 illustrates one example of transmission between a base station and a terminal.

FIG. 35 illustrates one example of communication between base station (AP) 3401 and terminal 3402.

In FIG. 35, (A) illustrates the temporal state of a signal transmitted by base station (AP) 3401. Time is represented on the horizontal axis. In FIG. 35, (B) illustrates the temporal state of a signal transmitted by terminal 3402. Time is represented on the horizontal axis.

First, base station (AP) 3401 transmits transmission request 3501 including requested information indicating a request to transmit a modulated signal, for example.

Terminal 3402 receives transmission request 3501 transmitted by base station (AP) 3401, which is requested information indicating a request to transmit a modulated signal, and, for example, transmits reception capability notification symbol 3502 including information indicating the reception capability of terminal 3402 (or a receivable scheme).

Base station (AP) 3401 receives reception capability notification symbol 3502 transmitted by terminal 3402, and based on the information included in reception capability notification symbol 3502, determines an error correction encoding method, modulation scheme (or modulation scheme set), and a transmission method, and transmits modulated signal 3503 that includes, for example, data symbols, and is generated by mapping and implementing other signal processing (such as precoding, phase change) on information (data) to be transmitted within the error correction encoding and modulation scheme, based on the determined schemes and methods.

Note that, for example, data symbols 3503 may include a control information symbol. In such a case, when transmitting the data symbols using a transmission method of transmitting a plurality of modulated signals including a plurality of streams of data using a plurality of antennas, a control symbol may be transmitted that includes information for notifying the communication partner of whether a phase change was implemented on at least one modulated signal or not. This allows the communication partner to easily change demodulation methods.

Terminal 3402 obtains data upon receiving, for example, data symbols 3503 transmitted by base station 3401.

Figure 36:
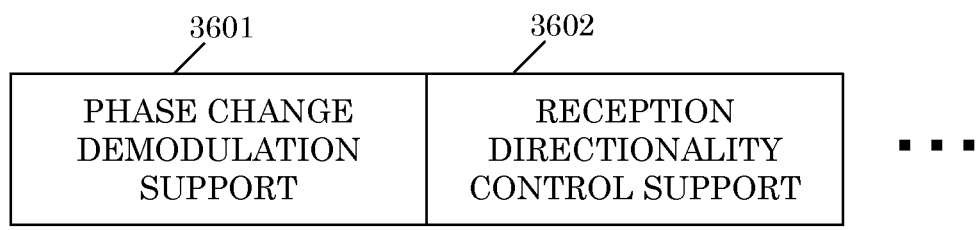
FIG. 36 illustrates one example of data including a reception capability notification symbol.

FIG. 36 illustrates an example of data included in reception capability notification symbol 3502 transmitted by the terminal illustrated in FIG. 35. FIG. 36 illustrates data 3601 indicating information relating to phase change demodulation support, and data 3602 indicating information relating to reception directionality control support.

Note that in data 3601 indicating information relating to phase change demodulation support, "supported" indicates, for example, the following state.

"Phase change demodulation is supported" means, when base station (AP) 3401 applies a phase change to at least one modulated signal and a plurality of modulated signals are transmitted using a plurality of antennas, terminal 3402 can receive and demodulate the modulated signals. In other words, demodulation taking into consideration phase change can be performed to obtain data. Note that the transmission method of implementing a phase change on at least one modulated signal and transmitting a plurality of modulated signals using a plurality of antennas is as described in the plurality of embodiments according to the present disclosure.

In data 3601 indicating information relating to phase change demodulation support, "not supported" indicates, for example, the following state.

"Phase change demodulation is not supported" means, when base station (AP) 3401 applies a phase change to at least one modulated signal and a plurality of modulated signals are transmitted using a plurality of antennas, even if terminal 3402 receives the modulated signals, demodulation of the modulated signals is arduous. In other words, demodulation taking into consideration phase change is arduous. Note that the transmission method of implementing a phase change on at least one modulated signal and transmitting a plurality of modulated signals using a plurality of antennas is as described in the plurality of embodiments according to the present disclosure.

For example, when terminal 3402 supports phase change, as described above, data 3601 indicating information relating to phase change demodulation support is set to "0", and terminal 3402 transmits reception capability notification symbol 3502. Moreover, when terminal 3402 does not support phase change, as described above, data 3601 indicating information relating to phase change demodulation support is set to "1", and terminal 3402 transmits reception capability notification symbol 3502.

Then, base station (AP) 3401 receives data 3601 transmitted by terminal 3402 indicating information relating to phase change demodulation support. When the reception indicates "supported" with phase change and base station (AP) 3401 determines to transmit a plurality of streams of modulated signals using a plurality of antennas, base station (AP) 3401 may transmit the modulated signals using either <method #1> or <method #2> described below. Alternatively base station (AP) 3401 transmits the modulated signals using <method #2>. Note that "reception indicates "supported"" means receipt of "0" as data 3601 indicating information relating to phase change demodulation support.
<Method #1>

Base station (AP) 3401 performs precoding (weighting synthesis) described in the present disclosure on a plurality of streams of modulated signals (baseband signals), and without implementing a phase change, transmits the generated plurality of modulated signals using a plurality of antennas. However, as described in the present disclosure, the precoder (weighting synthesizer) need not perform a precoding process.
<Method #2>

Base station (AP) 3401 implements a phase change on at least one modulated signal. The base station (AP) transmits a plurality of modulated signals using a plurality of antennas. Note that the transmission method of implementing a phase change on at least one modulated signal and transmitting a plurality of modulated signals using a plurality of antennas is as described in the plurality of embodiments according to the present disclosure.

Here, what is important is that <method #2> is included as a transmission method selectable by base station (AP) 3401. Accordingly base station (AP) 3401 may transmit modulated signals using a method other than <method #1> and <method #2>.

Base station (AP) 3401 receives data 3601 transmitted by terminal 3402 indicating information relating to phase change demodulation support. When the reception indicates "not supported" with phase change and base station (AP) 3401 determines to transmit a plurality of streams of modulated signals using a plurality of antennas, for example, base station (AP) 3401 may transmit the modulated signals using <method #1>. Note that "reception indicates "not supported"" means receipt of "1" as data 3601 indicating information relating to phase change demodulation support.

Here, <method #2> is not included as a transmission method selectable by base station (AP) 3401. Accordingly base station (AP) 3401 may transmit modulated signals using a transmission method that is different from <method #1> and is not <method #2>.

Note that reception capability notification symbol 3502 may include data indicating information other than data 3601 indicating information relating to phase change demodulation support. For example, the reception device of terminal 3402 may include data 3602 indicating information relating to reception directionality control support. Accordingly the configuration of reception capability notification symbol 3502 is not limited to the configuration illustrated in FIG. 36.

For example, when base station (AP) 3401 includes a function of transmitting a modulated signal using a method other than <method #1> and <method #2>, the reception device in terminal 3402 may include data indicating information relating to support of that method other than <method #1> and <method #2>.

For example, when terminal 3402 can perform reception directionality control, "0" is set as data 3602 indicating information relating to reception directionality control support. When terminal 3402 cannot perform reception directionality control, "1" is set as data 3602 indicating information relating to reception directionality control support.

Terminal 3402 transmits information on data 3602 relating to reception directionality control support. base station (AP) 3401 receives this information, and when it is determined that terminal 3402 supports reception directionality control, base station (AP) 3401 and terminal 3402 transmits, for example, a training symbol, reference symbol, and/or control information symbol for reception directionality control for terminal 3402.

Figure 37:
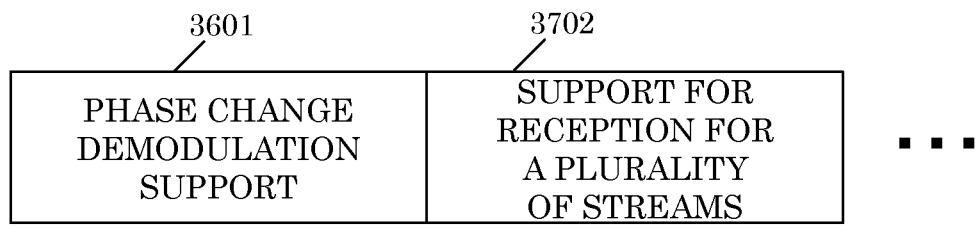
FIG. 37 illustrates one example of data including a reception capability notification symbol.

FIG. 37 illustrates an example of data included in reception capability notification symbol 3502 transmitted by the terminal illustrated in FIG. 35, different from the example illustrated in FIG. 36. Note that components that perform the same operations as in FIG. 36 share like reference numerals. Accordingly since data 3601 indicating information relating to phase change demodulation support in FIG. 37 has already been described, repeated description will be omitted.

Next, data 3702 indicating information relating to support for reception for a plurality of streams in FIG. 37 will be described.

In data 3702 indicating information relating to support for reception for a plurality of streams, "supported" indicates, for example, the following state.

When base station (AP) 3401 that supports reception for a plurality of streams transmits a plurality of modulated signals from a plurality of antennas to transmit a plurality of streams, this means the terminal can receive and demodulate the plurality of modulated signals transmitted by the base station. However, for example, when base station (AP) 3401 transmits a plurality of modulated signals from a plurality of antennas, whether a phase change has been implemented or not is not distinguished. In other words, when base station (AP) 3401 defines a plurality of transmission methods for transmitting a plurality of modulated signals from a plurality of antennas to transmit a plurality of streams, the terminal may depend on at least one transmission method with which demodulation is possible.

In data 3702 indicating information relating to support for reception for a plurality of streams, "not supported" indicates, for example, the following state.

When base station (AP) 3401 does not support reception for a plurality of streams and a plurality of transmission methods are defined as transmission methods for transmitting, from a plurality of antennas, a plurality of modulated signals for transmitting a plurality of streams, terminal 3402 cannot demodulate the modulated signals even if transmitted by base station using any one of the transmission methods.

For example, when terminal 3402 supports reception for a plurality of streams, data 3702 relating to support for reception for a plurality of streams is set to "0". When the terminal (3402) does not support reception for a plurality of streams, data 3702 relating to support for reception for a plurality of streams is set to "1".

Accordingly when terminal 3402 has data 3702 relating to support for reception for a plurality of streams set to "0", data 3601 relating to phase change demodulation support is valid, and in such a case, base station (AP) 3401 determines the transmission method to use to transmit data based on data 3601 relating to phase change demodulation support and data 3702 relating to support for reception for a plurality of streams.

When terminal 3402 has data 3702 relating to support for reception for a plurality of streams set to "1", data 3601 indicating information relating to phase change demodulation support is null, and in such a case, base station (AP) 3401 determines the transmission method to use to transmit data based on data 3702 relating to support for reception for a plurality of streams.

With this, as a result of terminal 3402 transmitting reception capability notification symbol 3502 and base station (AP) 3401 determining a transmission method to use to transmit data based on this symbol, there is an advantageous point that data can be actually transmitted to the terminal (since it is possible to reduce instances in which data is transmitted using a transmission method via which demodulation cannot be performed by terminal 3402), and, accordingly an advantages effect that data transfer efficiency of base station (AP) 3401 can be improved.

Moreover, when data 3601 indicating information relating to phase change demodulation support is present as reception capability notification symbol 3502 and terminal 3402 that supports phase change demodulation and base station (AP) 3401 communicate, base station (AP) 3401 can accurate select the mode "transmit modulated signal using transmission method that implements a phase change", whereby an advantageous effect that terminal 3402 can obtain a high reception quality even in an environment in which direct waves are dominant can be achieved.

Moreover, when a terminal that does not support the phase change demodulation and base station (AP) 3401 communicate, base station (AP) 3401 can accurately select a transmission method via which reception is possible by terminal 3402, which makes it possible to achieve an advantageous effect that it is possible to improve data transfer efficiency.

Note that in FIG. 35, (A) illustrates a signal transmitted by base station (AP) 3401 and (B) illustrates a signal transmitted by terminal 3402, but these examples are not limiting. For example, (A) in FIG. 35 may illustrate a signal transmitted by terminal 3402 and (B) may illustrate a signal transmitted by base station (AP) 3401.

Moreover, in FIG. 35, (A) may illustrate a signal transmitted by terminal #1 and (B) may illustrate a signal transmitted by terminal #2. In other words, FIG. 35 may illustrate communication between terminals.

Moreover, in FIG. 35, (A) may illustrate a signal transmitted by base station (AP) #1 and (B) may illustrate a signal transmitted by base station (AP) #2. In other words, FIG. 35 may illustrate communication between base stations (APs).

Note that FIG. 35 is not limited to these examples; FIG. 35 illustrates communication between communications devices.

Moreover, the data symbol in the transmission of, for example, data symbol 3503 in (A) in FIG. 35 may be a multi-carrier scheme signal such as an OFDM signal, and may be a single-carrier scheme signal. Similarly reception capability notification symbol 3502 in FIG. 35 may be a multi-carrier scheme signal such as an OFDM signal, and may be a single-carrier scheme signal.

For example, when reception capability notification symbol 3502 in FIG. 35 is a single-carrier scheme symbol, in the case of FIG. 35, terminal 3402 can achieve an advantageous effect that power consumption can be reduced.

Embodiment A2

Next, a different example will be given.

Figure 38:
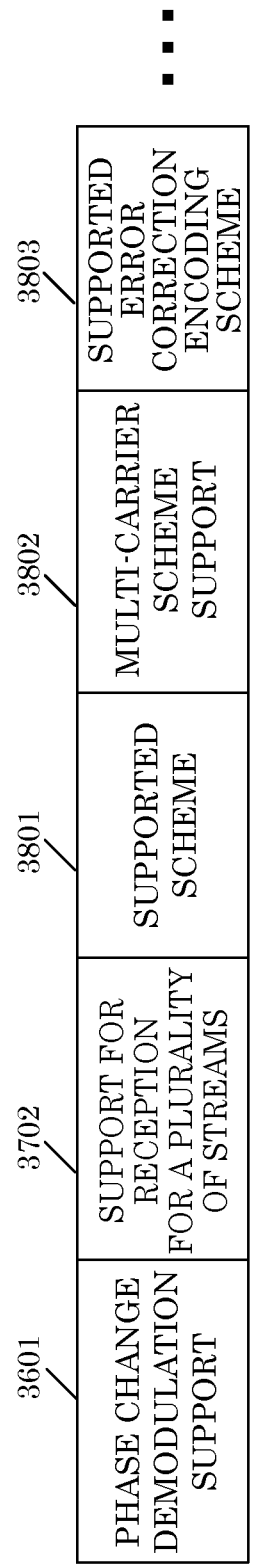
FIG. 38 illustrates one example of data including a reception capability notification symbol.

FIG. 38 illustrates an example of data included in reception capability notification symbol 3502 transmitted by the terminal illustrated in FIG. 35, different from the examples illustrated in FIG. 36 and FIG. 37. Note that components that perform the same operations as in FIG. 36 and FIG. 37 share like reference numerals. Moreover, duplicate description of components that perform the same operations as in FIG. 36 and FIG. 37 will be omitted.

First, data 3801 relating to "supported scheme" in FIG. 38 will be described. Transmission of a modulated signal from the base station (AP) to the terminal and transmission of a modulated signal from the terminal to the base station (AP) in FIG. 34 are transmission of a modulated signal under a specific frequency (frequency band) communications scheme. Communications scheme #A and communications scheme #B are examples of such a specific frequency (frequency band) communications scheme.

For example, data 3801 relating to "supported scheme" is 2-bit data. When the terminal supports communications scheme #A, data 3801 relating to "supported scheme" is set to "01". When data 3801 relating to "supported scheme" is set to "01", even if the base station (AP) transmits a "communications scheme #B" modulated signal, the terminal cannot demodulate and obtain the data.

When the terminal supports communications scheme #B, data 3801 relating to "supported scheme" is set to "10". When data 3801 relating to "supported scheme" is set to "10", even if the base station (AP) transmits a "communications scheme #A" modulated signal, the terminal cannot demodulate and obtain the data.

When the terminal supports both communications scheme #A and communications scheme #B, data 3801 relating to "supported scheme" is set to "11".

Note that communications scheme #A does not include support for a scheme that transmits a plurality of modulated signals including a plurality of streams using a plurality of antennas. In other words, there is no selection of "a scheme that transmits a plurality of modulated signals including a plurality of streams using a plurality of antennas" for communications scheme #A. Communications scheme #B does include support for a scheme that transmits a plurality of modulated signals including a plurality of streams using a plurality of antennas. Selection of "a transmission method that transmits a plurality of modulated signals including a plurality of streams using a plurality of antennas" for communications scheme #B is possible.

Next, data 3802 relating to multi-carrier scheme support in FIG. 38 will be described. "Single-carrier scheme" and "multi-carrier scheme such as OFDM" are selectable for communications scheme #A as a transmission method for a modulated signal. Moreover, "single-carrier scheme" and "multi-carrier scheme such as OFDM" are selectable for communications scheme #B as a transmission method for a modulated signal.

For example, data 3802 relating to multi-carrier scheme support is 2-bit data. When the terminal supports a single-carrier scheme, data 3802 relating to multi-carrier scheme support is set to "01". When data 3802 relating to multi-carrier scheme support is set to "01", even if the base station (AP) transmits a "multi-carrier scheme such as OFDM" modulated signal, the terminal cannot demodulate and obtain the data.

When the terminal supports a multi-carrier scheme such as OFDM, data 3802 relating to multi-carrier scheme support is set to "10". When data 3802 relating to multi-carrier scheme support is set to "10", even if the base station (AP) transmits a "single-carrier scheme" modulated signal, the terminal cannot demodulate and obtain the data.

When the terminal supports both a single-carrier scheme and a multi-carrier scheme such as OFDM, data 3802 relating to multi-carrier scheme support is set to "11".

Next, data 3803 relating to "supported error correction encoding scheme" in FIG. 38 will be described. For example, "error correction encoding scheme #C" is an error correction encoding method that supports one or more encode rates for a code length (block length) of c-bits, and "error correction encoding scheme #D" is an error correction encoding method that supports one or more encode rates for a code length (block length) of d-bits. c is an integer that is greater than or equal to 1, d is an integer that is greater than or equal to 1, and d is greater than c (d>c).

Note that the method that supports one or more encode rates may be a method that uses a different error correction code for each encode rate, and may be a method that supports one or more encode rates via puncturing. Moreover, a combination of these methods may be used for support with one or more encode rates.

Note that the only selectable choice for communications scheme #A is error correction encoding scheme #C, whereas error correction encoding scheme #C and error correction encoding scheme #D are selectable choices for communications scheme #B.

For example, data 3803 relating to "supported error correction encoding scheme" is 2-bit data. When the terminal supports error correction encoding scheme #C, data 3803 relating to "supported error correction encoding scheme" is set to "01". When data 3803 relating to "supported error correction encoding scheme" is set to "01", even if the base station (AP) uses error correction encoding scheme #D to generate and transmit a modulated signal, the terminal cannot demodulate and decode the modulated signal to obtain the data.

When the terminal supports error correction encoding scheme #D, data 3803 relating to "supported error correction encoding scheme" is set to "10". When data 3803 relating to "supported error correction encoding scheme" is set to "10", even if the base station (AP) uses error correction encoding scheme #C to generate and transmit a modulated signal, the terminal cannot demodulate and decode the modulated signal to obtain the data.

When the terminal supports both error correction encoding scheme #C and error correction encoding scheme #D, data 3803 relating to "supported error correction encoding scheme" is set to "11".

The base station (AP) receives, for example, reception capability notification symbol 3502 configured as illustrated in FIG. 38 and transmitted by the terminal, and base station (AP) determines a method for generating a modulated signal including a data symbol for the terminal based on information in reception capability notification symbol 3502, and transmits a modulated signal to the terminal.

Next, the characteristic points in such a case will be described.

Example 1

When the terminal performs transmission when data 3801 relating to "supported scheme" is set to "01" (communications scheme #A), the base station (AP) that receives this data determines that data 3803 relating to "supported error correction encoding scheme" is null, and when the base station (AP) generates the modulated signal for the terminal, since "error correction encoding scheme #D" cannot be selected in communications scheme #A, error correction encoding is performed using error correction encoding scheme #C.

Example 2

When the terminal performs transmission when data 3801 relating to "supported scheme" is set to "01" (communications scheme #A), the base station (AP) that receives this data determines that data 3601 relating to phase change demodulation support and data 3702 relating to support for reception for a plurality of streams are null, and when the base station (AP) generates the modulated signal for the terminal, since "a scheme that transmits a plurality of modulated signals including a plurality of streams using a plurality of antennas" is not supported in communications scheme #A, a single stream of a modulated signal is generated and transmitted.

In addition to the above examples, for example, consider a case in which the following constraints are in place.
[Constraint Condition 1]

In "communications scheme #B", with a single-carrier scheme, in "a scheme that transmits a plurality of modulated signals including a plurality of streams using a plurality of antennas", a scheme in which "among a plurality of modulated signals, a phase change is implemented on at least one modulated signal" is not supported, but another scheme may be supported. Additionally in a multi-carrier scheme such as an OFDM scheme, at least a scheme in which "among a plurality of modulated signals, a phase change is implemented on at least one modulated signal" is supported, but another scheme may be supported.

The following applies in such a case.

Example 3

When the terminal performs transmission under when "data 3802 relating to multi-carrier scheme support is set to "01" (single-carrier scheme)", the base station (AP) that receives this data determines that data 3601 relating to phase change demodulation support is null, and when the base station (AP) generates the modulated signal for the terminal, the base station (AP) does not use the scheme in which "among a plurality of modulated signals, a phase change is implemented on at least one modulated signal".

Note that FIG. 38 is one example of a "reception capability notification symbol" (3502) that is transmitted by the terminal. As described with reference to FIG. 38, when the terminal transmits information on a plurality of reception abilities (for example, 3601, 3702, 3801, 3802, and 3803 in FIG. 38), when the base station (AP) determines a method for generating the modulated signal for the terminal based on a "reception capability notification symbol" (3502), there are cases in which the base station (AP) is required to determine whether a portion of the information on the plurality of reception abilities is null or not. Taking this into consideration, when the terminal bundles and transfers the information on the plurality of reception abilities as a "reception capability notification symbol" (3502), the base station (AP) can achieve an advantageous effect in which the generation of the modulated signal for the terminal can be determined easily with low delay.

Embodiment A3

In this embodiment, an operational example in which a single-carrier scheme is implemented in an embodiment described in the present disclosure will be given.

Figure 39:
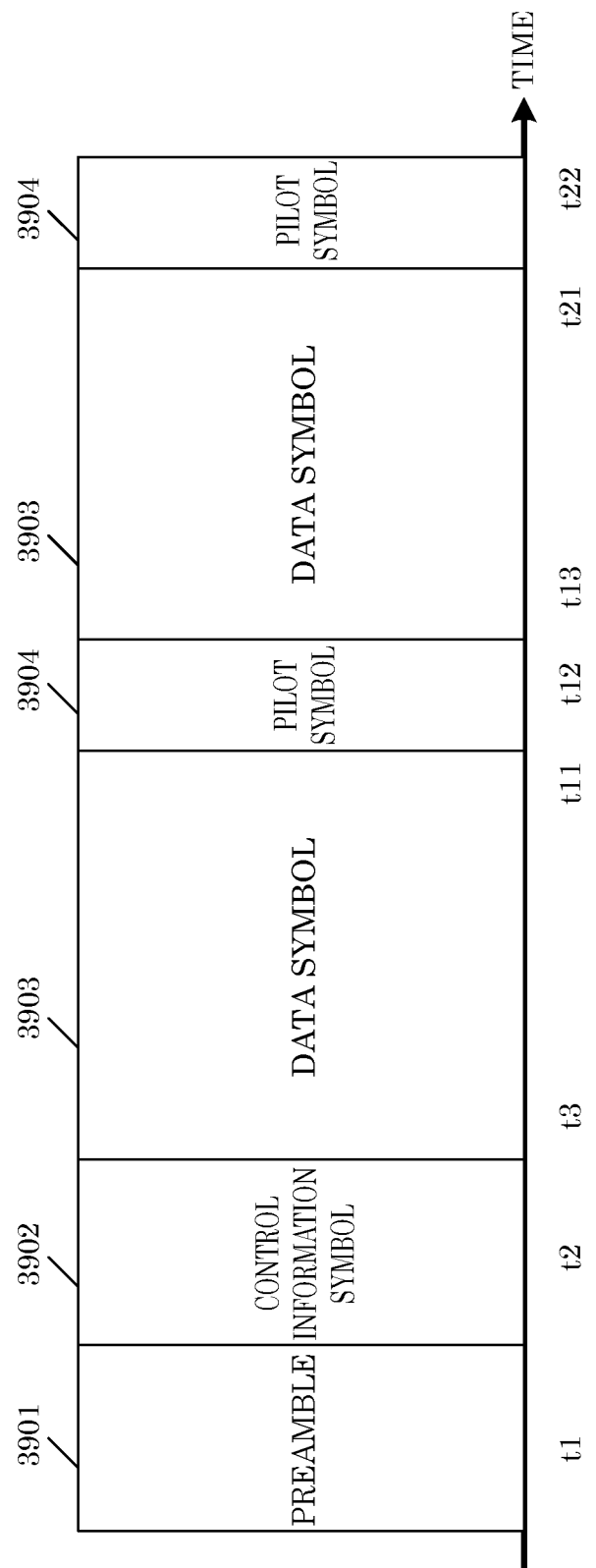
FIG. 39 illustrates one example of a frame configuration of a transmission signal.

FIG. 39 illustrates an example of a frame configuration of transmission signal 106_A illustrated in FIG. 1. In FIG. 39, time is represented on the horizontal axis. The frame configuration illustrated in FIG. 39 is an example of a frame configuration when a single-carrier scheme is used. Symbols are present along the time axis. In FIG. 39, symbols from time t1 to t22 are shown.

Preamble 3901 in FIG. 39 corresponds to preamble signal 252 in, for example, FIG. 2, FIG. 18, FIG. 19, FIG. 20, FIG. 21, FIG. 28, FIG. 29, FIG. 30, FIG. 31, FIG. 32, and FIG. 33. Here, the preamble may transmit data (data for control purposes), and may be configured as, for example, a symbol for signal detection, a symbol for frequency synchronization and temporal synchronization, a symbol for channel estimation, or a symbol for frame synchronization.

Control information symbol 3902 in FIG. 39 is a symbol that corresponds to control information symbol signal 253 in, for example, FIG. 2, FIG. 18, FIG. 19, FIG. 20, FIG. 21, FIG. 28, FIG. 29, FIG. 30, FIG. 31, FIG. 32, and FIG. 33, and is a symbol including control information for realizing demodulation and decoding of data symbols by the reception device that received the frame illustrated in FIG. 39.

Pilot symbol 3904 illustrated in FIG. 39 is a symbol corresponding to pilot signal pa(t)251A such as in FIG. 2, FIG. 18, FIG. 19, FIG. 20, FIG. 21, FIG. 28, FIG. 29, FIG. 30, FIG. 31, FIG. 32, FIG. 33. Pilot symbol 3904 is, for example, a PSK symbol, and is used by the reception device that receives the frame for, for example, channel estimation (propagation path variation estimation), frequency offset estimation, and phase variation estimation. For example, the transmission device illustrated in FIG. 1 and the reception device that receives the frame illustrated in FIG. 39 may share the pilot symbol transmission method.

3903 in FIG. 39 is a data symbol for transmitting data.

Note that mapped signal 201A (mapped signal 105_1 in FIG. 1) is referred to as "stream #1" and mapped signal 201B (mapped signal 105_2 in FIG. 1) is referred to as "stream #2".

Data symbol 3903 is a symbol corresponding to a data symbol included in baseband signal 208A generated by signal processing illustrated in, for example, FIG. 2, FIG. 18, FIG. 19, FIG. 20, FIG. 21, FIG. 28, FIG. 29, FIG. 30, FIG. 31, FIG. 32, and FIG. 33. Accordingly data symbol 3903 is either (i) a symbol including both the symbol "stream #1" and the symbol "stream #2", or (ii) either one of symbol "stream #1" and the symbol "stream #2". This is determined by the precoding matrix configuration used by weighting synthesizer 203. In other words, data symbol 3903 corresponds to weighting synthesized signal 204A (z1(i)).

Note that, although not illustrated in FIG. 39, the frame may include symbols other than a preamble, control information symbol, data symbol, and pilot symbol. Moreover, not each of preamble 3901, control information symbol 3902, and pilot symbol 3904 need be present in the frame.

For example, in FIG. 39, the transmission device transmits preamble 3901 at time t, transmits control information symbol 3902 at time t2, transmits data symbols 3903 from time t3 to time t11, transmits pilot symbol 3904 at time t12, transmits data symbols 3903 from time t13 to time t21, and transmits pilot symbol 3904 at time t22.

Figure 40:
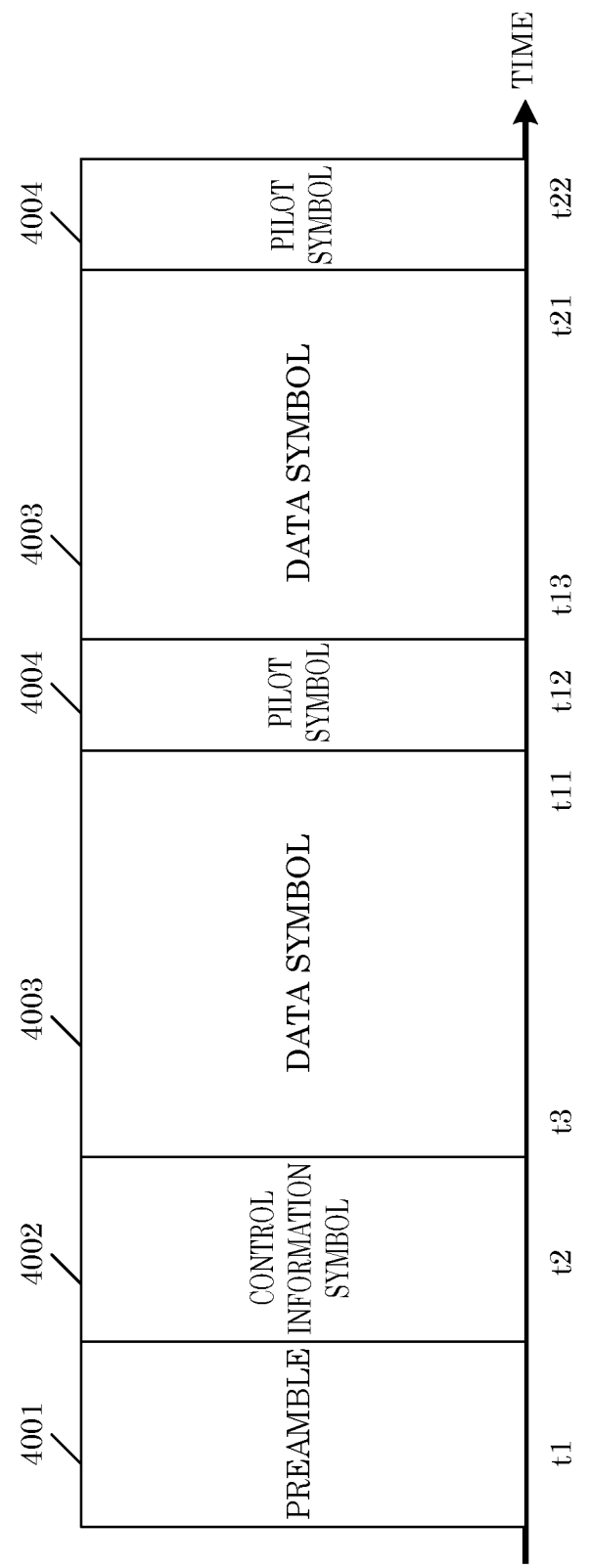
FIG. 40 illustrates one example of a frame configuration of a transmission signal.

FIG. 40 illustrates an example of a frame configuration of transmission signal 106_B illustrated in FIG. 1. In FIG. 40, time is represented on the horizontal axis. The frame configuration illustrated in FIG. 40 is an example of a frame configuration when a single-carrier scheme is used. Symbols are present along the time axis. In FIG. 40, symbols from time t1 to t22 are shown.

Preamble 4001 in FIG. 40 corresponds to preamble signal 252 in, for example, FIG. 2, FIG. 18, FIG. 19, FIG. 20, FIG. 21, FIG. 28, FIG. 29, FIG. 30, FIG. 31, FIG. 32, and FIG. 33. Here, the preamble may transmit data (data for control purposes), and may be configured as, for example, a symbol for signal detection, a symbol for frequency synchronization and temporal synchronization, a symbol for channel estimation, or a symbol for frame synchronization.

Control information symbol 1102 in FIG. 40 is a symbol that corresponds to control information symbol signal 253 in, for example, FIG. 2, FIG. 18, FIG. 19, FIG. 20, FIG. 21, FIG. 28, FIG. 29, FIG. 30, FIG. 31, FIG. 32, and FIG. 33, and is a symbol including control information for realizing demodulation and decoding of data symbols by the reception device that received the frame illustrated in FIG. 40.

Pilot symbol 4004 illustrated in FIG. 40 is a symbol corresponding to pilot signal pb(t)251B such as in FIG. 2, FIG. 18, FIG. 19, FIG. 20, FIG. 21, FIG. 28, FIG. 29, FIG.

30, FIG. 31, FIG. 32, FIG. 33. Pilot symbol 4004 is, for example, a PSK symbol, and is used by the reception device that receives the frame for, for example, channel estimation (propagation path variation estimation), frequency offset estimation, and phase variation estimation. For example, the transmission device illustrated in FIG. 1 and the reception device that receives the frame illustrated in FIG. 40 may share the pilot symbol transmission method.

4003 in FIG. 40 is a data symbol for transmitting data.

Note that mapped signal 201A (mapped signal 105_1 in FIG. 1) is referred to as "stream #1" and mapped signal 201B (mapped signal 105_2 in FIG. 1) is referred to as "stream #2".

Data symbol 4003 is a symbol corresponding to a data symbol included in baseband signal 208B generated by signal processing illustrated in, for example, FIG. 2, FIG. 18, FIG. 19, FIG. 20, FIG. 21, FIG. 28, FIG. 29, FIG. 30, FIG. 31, FIG. 32, and FIG. 33. Accordingly data symbol 4003 is either (i) a symbol including both the symbol "stream #1" and the symbol "stream #2", or (ii) either one of symbol "stream #1" and the symbol "stream #2". This is determined by the precoding matrix configuration used by weighting synthesizer 203. In other words, data symbol 4003 corresponds to phase-changed signal 206B (z2(i)).

Note that, although not illustrated in FIG. 40, the frame may include symbols other than a preamble, control information symbol, data symbol, and pilot symbol. Moreover, not each of preamble 4001, control information symbol 4002, and pilot symbol 4004 need be present in the frame.

For example, in FIG. 40, the transmission device transmits preamble 4001 at time t, transmits control information symbol 4002 at time t2, transmits data symbols 4003 from time t3 to time t11, transmits pilot symbol 4004 at time t12, transmits data symbols 4003 from time t13 to time t21, and transmits pilot symbol 4004 at time t22.

When a symbol is present at time tp in FIG. 39 and a symbol is present at time tp in FIG. 40 (where p is an integer that is greater than or equal to 1), the symbol at time tp in FIG. 39 and the symbol at time tp in FIG. 40 are transmitted at the same time and same frequency or at the same time and same frequency band. For example, the data symbol at time t3 in FIG. 39 and the data symbol at time t3 in FIG. 40 are transmitted at the same time and at the same frequency or at the same time and at the same frequency band. Note that the frame configuration is not limited to the configurations illustrated in FIG. 39 and FIG. 40; FIG. 39 and FIG. 40 are mere examples of frame configurations.

Moreover, a method in which the preamble and control information symbol in FIG. 39 and FIG. 40 transmit the same data (same control information) may be used.

Note that this is under the assumption that the frame of FIG. 39 and the frame of FIG. 40 are received at the same time by the reception device, but even when the frame of FIG. 39 or the frame of FIG. 40 has been received, the reception device can obtain the data transmitted by the transmission device.

Note that a combination of the single-carrier scheme transmission method, transmission device described in this embodiment and the embodiments described above may be implemented.

Embodiment A4

In this embodiment, using the example described in Embodiment A2, an operational example of the terminal will be given.

FIG. 24 illustrates one example of a configuration of a terminal. As this example has already been described, repeated description will be omitted.

Figure 41:
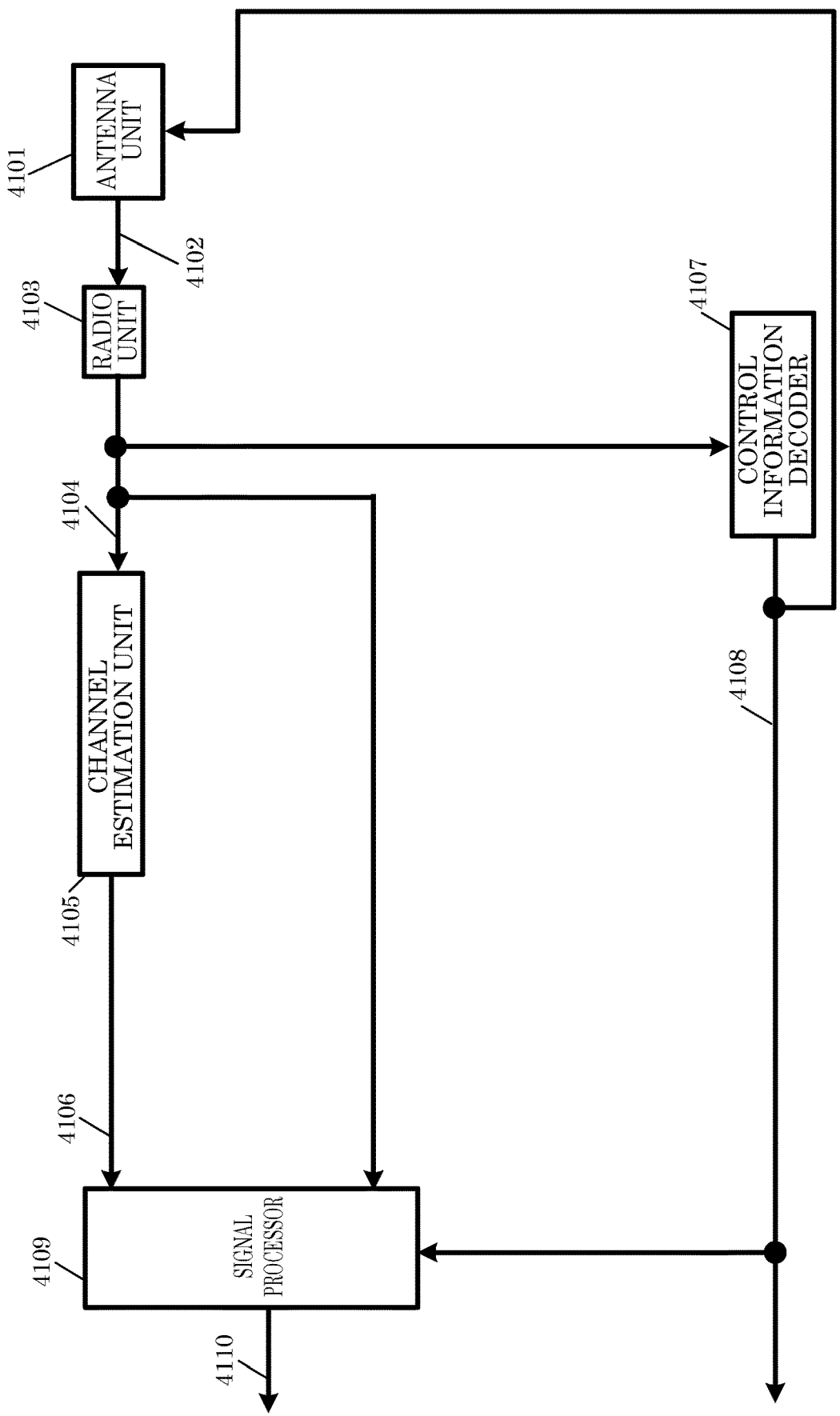
FIG. 41 illustrates one example of a configuration of a reception device.

FIG. 41 illustrates one example of a configuration of reception device 2404 in the terminal illustrated in FIG. 24. Radio unit 4103 receives an input of reception signal 4102 received by antenna unit 4101, performs processing such as frequency conversion, and outputs baseband signal 4104.

Control information decoder 4107 receives an input of baseband signal 4104, demodulates the control information symbol, and outputs control information 4108.

Channel estimator 4105 receives an input of baseband signal 4104, extracts preamble and pilot symbol, performs channel fluctuation estimation, and outputs channel estimation signal 4106.

Signal processor 4109 receives inputs of baseband signal 4104, channel estimation signal 4106, and control information 4108, demodulates and performs error correction decoding on a data symbol based on control information 4108, and outputs reception data 4110.

Figure 42:
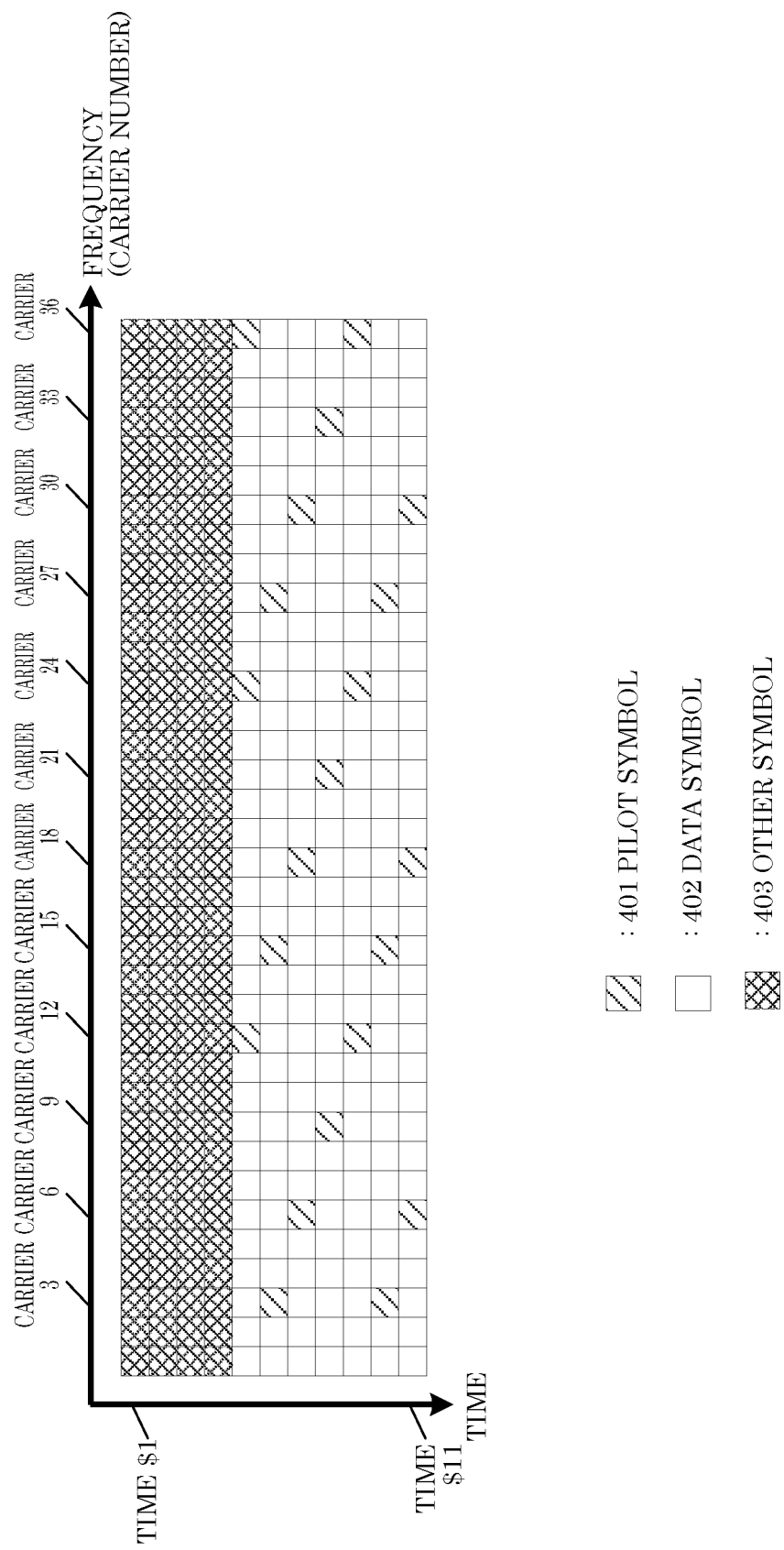
FIG. 42 illustrates one example of a frame configuration that uses a multi-carrier transmission scheme.

FIG. 42 illustrates an example of a frame configuration upon single modulated signal transmission by a base station or AP, which is the communication partner of the terminal, using a multi-carrier transmission scheme such as OFDM. In FIG. 42, components that operate the same as in FIG. 4 share like reference marks.

In FIG. 42, frequency is represented on the horizontal axis, and all carrier symbols are shown in FIG. 42. Moreover, in FIG. 42, time is represented on the vertical axis, and symbols for time $1 through time $11 are shown.

For example, the transmission device in the base station illustrated in FIG. 1 may transmit a single stream modulated signal having the frame configuration illustrated in FIG. 42.

Figure 43:
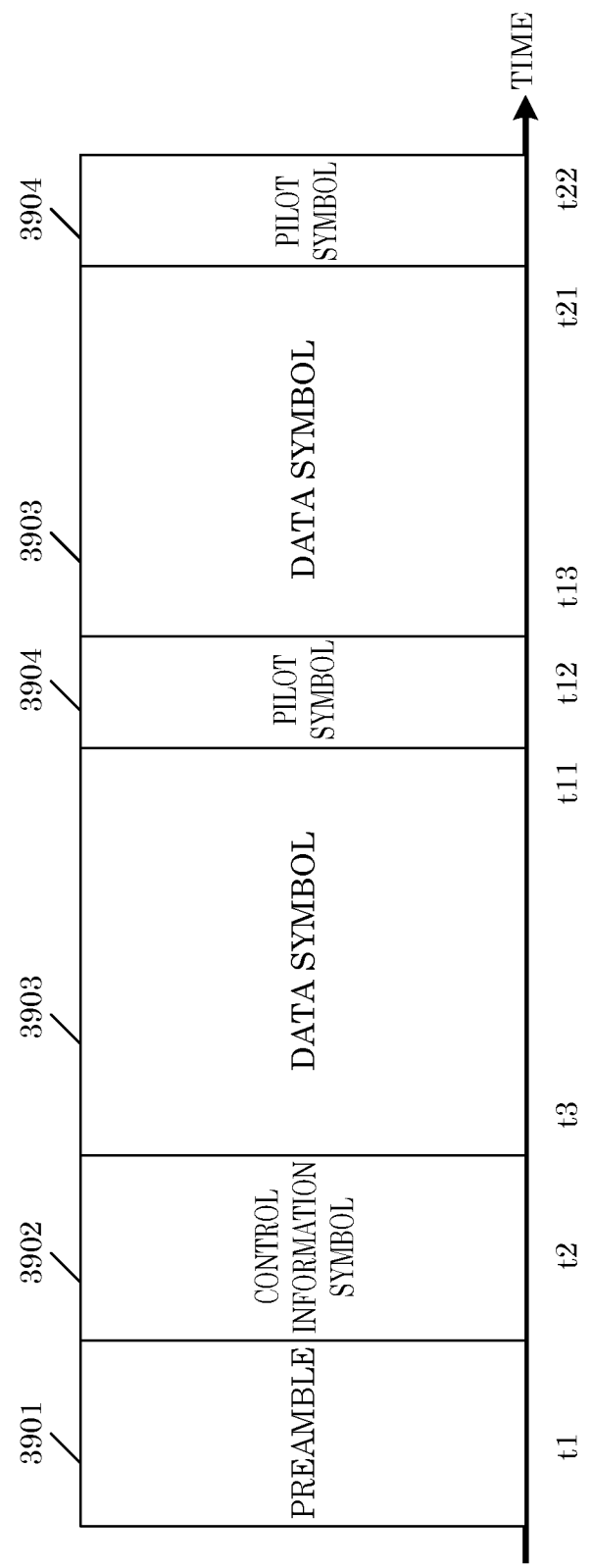
FIG. 43 illustrates one example of a frame configuration that uses a single-carrier transmission scheme.

FIG. 43 illustrates an example of a frame configuration upon single modulated signal transmission by a base station or AP, which is the communication partner of the terminal, using a single-carrier transmission scheme. In FIG. 43, components that operate the same as in FIG. 39 share like reference marks.

In FIG. 43, time is represented on the horizontal axis, and symbols from time t1 to time t22 are shown in FIG. 43.

For example, the transmission device in the base station illustrated in FIG. 1 may transmit a single stream modulated signal having the frame configuration illustrated in FIG. 43.

For example, the transmission device in the base station illustrated in FIG. 1 may transmit a plurality of streams of a plurality of modulated signals having the frame configuration illustrated in FIG. 4 and/or FIG. 5.

Furthermore, for example, the transmission device in the base station illustrated in FIG. 1 may transmit a plurality of streams of a plurality of modulated signals having the frame configuration illustrated in FIG. 39 and/or FIG. 40.

The reception device of the terminal has the configuration illustrated in FIG. 41. For example, the reception device of the terminal supports the following. For example, the reception device of the terminal supports reception of "communications scheme #A" described in Embodiment A2. Accordingly even if the communication partner transmits a plurality of streams of a plurality of modulated signals, the terminal does not support reception of such. Thus, when the communication partner transmits a plurality of streams of a plurality of modulated signals and phase change is implemented, the terminal does not support reception of such. The terminal supports only single-carrier schemes. The terminal supports decoding of "error correction encoding scheme #C" as an error correction encoding scheme.

Therefore, based on the rules described in Embodiment A2, a terminal having the configuration illustrated in FIG. 41 that supports the above generates reception capability notification symbol 3502 illustrated in FIG. 38 and transmits reception capability notification symbol 3502 in accordance with the sequence illustrated in FIG. 35.

Here, the terminal uses, for example, transmission device 2403 illustrated in FIG. 24 to generate reception capability notification symbol 3502 illustrated in FIG. 38 and transmission device 2403 illustrated in FIG. 24 transmits reception capability notification symbol 3502 illustrated in FIG. 38 in accordance with the sequence illustrated in FIG. 35.

Reception device 2304 in the base station or AP illustrated in FIG. 23 receives reception capability notification symbol 3502 transmitted by the terminal. Control signal generator 2308 in the base station illustrated in FIG. 23 then extracts data from reception capability notification symbol 3502, and the terminal knows that communications scheme #A is supported from supported scheme 3801.

Accordingly based on information 3601 relating to phase change demodulation support in FIG. 38 being null and communications scheme #A being supported, control signal generator 2308 in the base station determines to not transmit a phase-changed modulated signal, and outputs control signal 2309 including such information. This is because communications scheme #A does not support transmission or reception of a plurality of modulated signals for a plurality of streams.

Based on information 3702 relating to support for reception for a plurality of streams in FIG. 38 being null and communications method #A being supported, control signal generator 2308 in the base station determines to not transmit a phase-changed modulated signal, and outputs control signal 2309 including such information. This is because communications scheme #A does not support transmission or reception of a plurality of modulated signals for a plurality of streams.

Based on information 3803 relating to supported error correction encoding scheme in FIG. 38 being null and communications method #A being supported, control signal generator 2308 in the base station determines to use error correction encoding scheme #C, and outputs control signal 2309 including such information This is because communications scheme #A supports error correction encoding scheme #C.

For example, as illustrated in FIG. 41, since this is supported by communications method #A, the above-described operations are performed so that the base station or AP does not transmit a plurality of modulated signals for a plurality of streams, whereby the base station or AP can achieve an advantageous effect of an improvement in data transmission efficiency in the system including the base station or AP and terminal, due to the communications method #A modulated signal being accurately transmitted.

As a second example, the reception device of the terminal has the configuration illustrated in FIG. 41, and supports the following. For example, the reception device of the terminal supports reception of "communications scheme #B" described in Embodiment A2. Accordingly since the reception device has the configuration illustrated in FIG. 41, even if the communication partner transmits a plurality of streams of a plurality of modulated signals, the terminal does not support reception of such. Thus, when the communication partner transmits a plurality of streams of a plurality of modulated signals and phase change is implemented, the terminal does not support reception of such. The terminal supports a single-carrier scheme and a multi-carrier scheme such as OFDM. The terminal supports decoding of "error correction encoding scheme #C", "error correction encoding scheme #D" as an error correction encoding scheme.

Therefore, based on the rules described in Embodiment A2, a terminal having the configuration illustrated in FIG. 41 that supports the above transmits reception capability notification symbol 3502 illustrated in FIG. 38.

Reception device 2304 in the base station or AP illustrated in FIG. 23 receives reception capability notification symbol 3502 transmitted by the terminal. Control signal generator 2308 in the base station illustrated in FIG. 23 then extracts data from reception capability notification symbol 3502, and the terminal knows that communications scheme #B is supported from supported scheme 3801.

Moreover, based on information 3702 relating to support for reception for a plurality of streams illustrated in FIG. 38, control signal generator 2308 in the base station knows that the terminal, which is the communication partner, cannot demodulate the plurality of modulated signals for the plurality of streams.

Accordingly based on information 3601 relating to phase change demodulation support in FIG. 38 being null, control information signal generator 2308 in the base station determines to not transmit a phase-changed modulated signal, and outputs control signal 2309 including such information. This is because the terminal does not support "reception for a plurality of streams".

Based on information 3802 relating to multi-carrier scheme support in FIG. 38, control signal generator 2308 in the base station outputs control signal 2309 including information indicating that the terminal, which is the communication partner, supports a multi-carrier scheme and/or a single-carrier scheme.

Then, based on information 3803 relating to supported error correction encoding scheme in FIG. 38, control signal generator 2308 in the base station outputs control signal 2309 including information indicating that the terminal, which is the communication partner, supports error correction encoding scheme #C and/or error correction encoding scheme #D.

Accordingly the above-described operations are performed so that the base station or AP does not transmit a plurality of modulated signals for a plurality of streams, whereby the base station or AP can achieve an advantageous effect of an improvement in data transmission efficiency in the system including the base station or AP and terminal, due to the single stream modulated signal being accurately transmitted.

As a third example, the reception device of the terminal has the configuration illustrated in FIG. 41, and supports the following. The reception device of the terminal supports reception of "communications scheme #A" and "communications scheme #B" described in Embodiment A2. Accordingly even if the communication partner transmits a plurality of streams of a plurality of modulated signals using either one of "communications scheme #A" or "communications scheme #B", the terminal does not support reception of such. Thus, when the communication partner transmits a plurality of streams of a plurality of modulated signals and phase change is implemented, the terminal does not support reception of such. Single-carrier schemes are supported in either one of "communications scheme #A" or "communications scheme #B". Regarding error correction encoding schemes, the terminal supports decoding of "error correction encoding scheme #C" as "communications scheme #A", and "error correction encoding scheme #C" and "error correction encoding scheme #D" as "communications scheme #B".

Therefore, based on the rules described in Embodiment A2, a terminal having the configuration illustrated in FIG. 41 that supports the above generates reception capability notification symbol 3502 illustrated in FIG. 38 and transmits reception capability notification symbol 3502 in accordance with the sequence illustrated in FIG. 35.

Reception device 2304 in the base station or AP illustrated in FIG. 23 receives reception capability notification symbol 3502 transmitted by the terminal. Control signal generator 2308 in the base station illustrated in FIG. 23 then extracts data from reception capability notification symbol 3502, and the terminal knows that communications scheme #A and communications scheme #B are supported from supported scheme 3801.

Moreover, based on information 3702 relating to support for reception for a plurality of streams illustrated in FIG. 38, control signal generator 2308 in the base station knows that the terminal does not support reception for a plurality of streams.

Accordingly based on information 3601 relating to phase change demodulation support in FIG. 38 being null and communications scheme #A being supported, control signal generator 2308 in the base station determines to not transmit a phase-changed modulated signal, and outputs control signal 2309 including such information. This is because terminal A does not support transmission or reception of a plurality of modulated signals for a plurality of streams.

Control signal generator 2308 in the base station knows whether the terminal supports a single-carrier scheme and knows whether the terminal supports a multi-carrier scheme such as OFDM from information 3802 relating to multi-carrier scheme support in FIG. 38.

Then, based on information 3803 relating to supported error correction encoding scheme in FIG. 38, control signal generator 2308 in the base station knows that the terminal supports decoding of error correction encoding scheme #C and error correction encoding scheme #D.

Accordingly the above-described operations are performed so that the base station or AP does not transmit a plurality of modulated signals for a plurality of streams, whereby the base station or AP can achieve an advantageous effect of an improvement in data transmission efficiency in the system including the base station or AP and terminal, due to the single stream modulated signal being accurately transmitted.

As a fourth example, the reception device of the terminal has the configuration illustrated in FIG. 41, and, for example, supports the following. The reception device of the terminal supports reception of "communications scheme #A" and "communications scheme #B" described in Embodiment A2. Accordingly even if the communication partner transmits a plurality of streams of a plurality of modulated signals using either one of "communications scheme #A" or "communications scheme #B", the terminal does not support reception of such. Thus, when the communication partner transmits a plurality of streams of a plurality of modulated signals and phase change is implemented, the terminal does not support reception of such. The terminal supports a single-carrier scheme as "communications scheme #A", and supports both a single-carrier scheme and a multi-carrier scheme such as OFDM as "communications scheme #B". Regarding error correction encoding schemes, the terminal supports decoding of "error correction encoding scheme #C" as "communications scheme #A", and "error correction encoding scheme #C" and "error correction encoding scheme #D" as "communications scheme #B".

Therefore, based on the rules described in Embodiment A2, a terminal having the configuration illustrated in FIG. 41 that supports the above generates reception capability notification symbol 3502 illustrated in FIG. 38 and transmits reception capability notification symbol 3502 in accordance with the sequence illustrated in FIG. 35.

Reception device 2304 in the base station or AP illustrated in FIG. 23 receives reception capability notification symbol 3502 transmitted by the terminal. Control signal generator 2308 in the base station illustrated in FIG. 23 then extracts data from reception capability notification symbol 3502, and the terminal knows that communications scheme #A and communications scheme #B are supported from supported scheme 3801.

Moreover, based on information 3702 relating to support for reception for a plurality of streams illustrated in FIG. 38, control signal generator 2308 in the base station knows that the terminal does not support reception for a plurality of streams.

Accordingly based on information 3601 relating to phase change demodulation support in FIG. 38 being null and communications scheme #A being supported, control signal generator 2308 in the base station determines to not transmit a phase-changed modulated signal, and outputs control signal 2309 including such information. This is because terminal A does not support transmission or reception of a plurality of modulated signals for a plurality of streams.

Control signal generator 2308 in the base station knows whether the terminal supports a single-carrier scheme and knows whether the terminal supports a multi-carrier scheme such as OFDM from information 3802 relating to multi-carrier scheme support in FIG. 38.

Here, information 3802 relating to multi-carrier scheme support is required to have a configuration such as the following.

Information 3802 relating to multi-carrier scheme support is 4-bit information, and the 4 bits are expressed as g0, g1, g2, and g3.

When the terminal supports single-carrier demodulation for communications scheme #A, (g0, g1)=(0, 0) is transmitted, when the terminal supports multi-carrier scheme demodulation such as OFDM for communications scheme #A, (g0, g1)=(0, 1) is transmitted, and when the terminal supports single-carrier demodulation and multi-carrier scheme demodulation such as OFDM for communications scheme #A, (g0, g1)=(1, 1) is transmitted.

When the terminal supports single-carrier demodulation for communications scheme #B, (g2, g3)=(0, 0) is transmitted, when the terminal supports multi-carrier scheme demodulation such as OFDM for communications scheme #B, (g2, g3)=(0, 1) is transmitted, and when the terminal supports single-carrier demodulation and multi-carrier scheme demodulation such as OFDM for communications scheme #B, (g2, g3)=(1, 1) is transmitted.

Then, based on information 3803 relating to supported error correction encoding scheme in FIG. 38, control signal generator 2308 in the base station knows that the terminal supports decoding of error correction encoding scheme #C and error correction encoding scheme #D.

Accordingly the above-described operations are performed so that the base station or AP does not transmit a plurality of modulated signals for a plurality of streams, whereby the base station or AP can achieve an advantageous effect of an improvement in data transmission efficiency in the system including the base station or AP and terminal, due to the single stream modulated signal being accurately transmitted.

As a fifth example, the reception device of the terminal has the configuration illustrated in FIG. 8, and, for example, supports the following. For example, the reception device of the terminal supports reception of "communications scheme #A" and "communications scheme #B" described in Embodiment A2. Accordingly, in "communications scheme #B", even if the communication partner transmits a plurality of streams of a plurality of modulated signals, the terminal supports reception of such. Moreover, in "communications scheme #A" and "communications scheme #B", even if the communication partner transmits a single stream modulated signal, the terminal supports reception of such. Thus, when the communication partner transmits a plurality of streams of modulated signals and phase change is implemented, the terminal supports reception of such. The terminal supports single-carrier schemes. The terminal supports decoding of "error correction encoding scheme #C" as an error correction encoding scheme.

Therefore, based on the rules described in Embodiment A2, a terminal having the configuration illustrated in FIG. 8 that supports the above generates reception capability notification symbol 3502 illustrated in FIG. 38 and transmits reception capability notification symbol 3502 in accordance with the sequence illustrated in FIG. 35.

Here, the terminal uses, for example, transmission device 2403 illustrated in FIG. 24 to generate reception capability notification symbol 3502 illustrated in FIG. 38 and transmission device 2403 illustrated in FIG. 24 transmits reception capability notification symbol 3502 illustrated in FIG. 38 in accordance with the sequence illustrated in FIG. 35.

Reception device 2304 in the base station or AP illustrated in FIG. 23 receives reception capability notification symbol 3502 transmitted by the terminal. Control signal generator 2308 in the base station illustrated in FIG. 23 then extracts data from reception capability notification symbol 3502, and the terminal knows that communications scheme #A and communications scheme #B are supported from supported scheme 3801.

Accordingly based on information 3702 relating to support for reception for a plurality of streams in FIG. 38, control signal generator 2308 in the base station knows that in "communications scheme #B", even if the communication partner transmits a plurality of streams of a plurality of modulated signals, the terminal supports reception of such and in "communications scheme #A" and "communications scheme #B", even if the communication partner transmits a single stream modulated signal, the terminal supports reception of such.

Control signal generator 2308 in the base station then knows that the terminal supports phase change demodulation based on information 3601 relating to phase change demodulation support in FIG. 38.

Control signal generator 2308 in the base station knows that the terminal supports only single-carrier schemes based on information 3802 relating to multi-carrier scheme support in FIG. 38.

Then, based on information 3803 relating to supported error correction encoding scheme in FIG. 38, control signal generator 2308 in the base station knows that the terminal supports decoding of error correction encoding scheme #C.

Accordingly the base station or AP takes into consideration the communications method supported by the terminal and the communications environment, for example, and accurately generates and transmits a modulated signal receivable by the terminal to achieve an advantageous effect of an improvement in data transmission efficiency in the system including the base station or AP and terminal.

As a sixth example, the reception device of the terminal has the configuration illustrated in FIG. 8, and, for example, supports the following. For example, the reception device of the terminal supports reception of "communications scheme #A" and "communications scheme #B" described in Embodiment A2. Accordingly in "communications scheme #B", even if the communication partner transmits a plurality of streams of a plurality of modulated signals, the terminal supports reception of such. Moreover, in "communications scheme #A" and "communications scheme #B", even if the communication partner transmits a single stream modulated signal, the terminal supports reception of such. When the communication partner transmits a plurality of streams of modulated signals and phase change is implemented, the terminal does not support reception of such. The terminal supports single-carrier schemes. The terminal supports decoding of "error correction encoding scheme #C" and decoding of "error correction encoding scheme #D" as an error correction encoding scheme.

Therefore, based on the rules described in Embodiment A2, a terminal having the configuration illustrated in FIG. 8 that supports the above generates reception capability notification symbol 3502 illustrated in FIG. 38 and transmits reception capability notification symbol 3502 in accordance with the sequence illustrated in FIG. 35.

Here, the terminal uses, for example, transmission device 2403 illustrated in FIG. 24 to generate reception capability notification symbol 3502 illustrated in FIG. 38 and transmission device 2403 illustrated in FIG. 24 transmits reception capability notification symbol 3502 illustrated in FIG. 38 in accordance with the sequence illustrated in FIG. 35.

Reception device 2304 in the base station or AP illustrated in FIG. 23 receives reception capability notification symbol 3502 transmitted by the terminal. Control signal generator 2308 in the base station illustrated in FIG. 23 then extracts data from reception capability notification symbol 3502, and the terminal knows that communications scheme #A and communications scheme #B are supported from supported scheme 3801.

Accordingly based on information 3702 relating to support for reception for a plurality of streams in FIG. 38, control signal generator 2308 in the base station knows that in "communications scheme #B", even if the communication partner transmits a plurality of streams of a plurality of modulated signals, the terminal supports reception of such and in "communications scheme #A" and "communications scheme #B", even if the communication partner transmits a single stream modulated signal, the terminal supports reception of such.

Control signal generator 2308 in the base station then knows that the terminal supports phase change demodulation based on information 3601 relating to phase change demodulation support in FIG. 38. Accordingly the base station or AP transmits a modulated signal without implementing a phase change upon transmission of a plurality of streams of modulated signals to the terminal.

Control signal generator 2308 in the base station knows that the terminal supports single-carrier schemes based on information 3802 relating to multi-carrier scheme support in FIG. 38.

Then, based on information 3803 relating to supported error correction encoding scheme in FIG. 38, control signal generator 2308 in the base station knows that the terminal supports decoding of error correction encoding scheme #C and decoding of error correction encoding scheme #D.

Accordingly the base station or AP takes into consideration the communications method supported by the terminal and the communications environment, for example, and accurately generates and transmits a modulated signal receivable by the terminal to achieve an advantageous effect of an improvement in data transmission efficiency in the system including the base station or AP and terminal.

As a seventh example, the reception device of the terminal has the configuration illustrated in FIG. 8, and, for example, supports the following. For example, the reception device of the terminal supports reception of "communications scheme #A" and "communications scheme #B" described in Embodiment A2. Accordingly, in "communications scheme #B", even if the communication partner transmits a plurality of streams of a plurality of modulated signals, the terminal supports reception of such. Moreover, in "communications scheme #A" and "communications scheme #B", even if the communication partner transmits a single stream modulated signal, the terminal supports reception of such. The terminal supports a single-carrier scheme as "communications scheme #A", and supports both a single-carrier scheme and a multi-carrier scheme such as OFDM as "communications scheme #B". However, in the case of a communications scheme #B multi-carrier scheme such as OFDM, upon transmitting a plurality of streams of modulated signals, implementation of a phase change by the communication partner is possible. Thus, when the communication partner transmits a plurality of streams of modulated signals and phase change is implemented, the terminal supports reception of such. The terminal supports decoding of "error correction encoding scheme #C" and decoding of "error correction encoding scheme #D" as an error correction encoding scheme.

Therefore, based on the rules described in Embodiment A2 and this embodiment, a terminal having the configuration illustrated in FIG. 8 that supports the above generates reception capability notification symbol 3502 illustrated in FIG. 38 and, for example, transmits reception capability notification symbol 3502 in accordance with the sequence illustrated in FIG. 35.

Here, the terminal uses, for example, transmission device 2403 illustrated in FIG. 24 to generate reception capability notification symbol 3502 illustrated in FIG. 38 and transmission device 2403 illustrated in FIG. 24 transmits reception capability notification symbol 3502 illustrated in FIG. 38 in accordance with the sequence illustrated in FIG. 35.

Reception device 2304 in the base station or AP illustrated in FIG. 23 receives reception capability notification symbol 3502 transmitted by the terminal. Control signal generator 2308 in the base station illustrated in FIG. 23 then extracts data from reception capability notification symbol 3502, and the terminal knows that communications scheme #A and communications scheme #B are supported from supported scheme 3801.

Accordingly based on information 3702 relating to support for reception for a plurality of streams in FIG. 38, control signal generator 2308 in the base station knows that in "communications scheme #B", even if the communication partner transmits a plurality of streams of a plurality of modulated signals, the terminal supports reception of such and in "communications scheme #A" and "communications scheme #B", even if the communication partner transmits a single stream modulated signal, the terminal supports reception of such.

Control signal generator 2308 in the base station then knows that the terminal supports phase change demodulation based on information 3601 relating to phase change demodulation support in FIG. 38. Accordingly the base station or AP transmits a modulated signal without implementing a phase change upon transmission of a plurality of streams of modulated signals to the terminal. Note that as described above, when the terminal obtains information indicating "phase change demodulation is supported" from information 3601 relating to "phase change demodulation support", the terminal understands that the scheme is "communications scheme #B".

Control signal generator 2308 in the base station knows that the terminal supports single-carrier schemes as "communications scheme #A" and supports single-carrier schemes and multi-carrier schemes such as OFDM as "communications scheme #B" based on information 3802 relating to multi-carrier scheme support in FIG. 38.

Here, as described above, the terminal may be configured to notify the base station or AP of the status regarding single-carrier scheme support and multi-carrier schemes such as OFDM according to "communications scheme #A" and single-carrier scheme support and multi-carrier scheme such as OFDM support according to "communications scheme #B".

Then, based on information 3803 relating to supported error correction encoding scheme in FIG. 38, control signal generator 2308 in the base station knows that the terminal supports decoding of error correction encoding scheme #C and decoding of error correction encoding scheme #D.

Accordingly the base station or AP takes into consideration the communications method supported by the terminal and the communications environment, for example, and accurately generates and transmits a modulated signal receivable by the terminal to achieve an advantageous effect of an improvement in data transmission efficiency in the system including the base station or AP and terminal.

As an eighth example, the reception device of the terminal has the configuration illustrated in FIG. 8, and, for example, supports the following. For example, the reception device of the terminal supports reception of "communications scheme #A" and "communications scheme #B" described in Embodiment A2. Accordingly in "communications scheme #B", even if the communication partner transmits a plurality of streams of a plurality of modulated signals, the terminal supports reception of such. Moreover, in "communications scheme #A" and "communications scheme #B", even if the communication partner transmits a single stream modulated signal, the terminal supports reception of such. Accordingly in a single-carrier scheme of "communications scheme #B", even if the communication partner transmits a plurality of streams of a plurality of modulated signals, the terminal supports reception of such. However, in a multi-carrier scheme such as OFDM of "communications scheme #B", even if the communication partner transmits a plurality of streams of a plurality of modulated signals, the terminal does not support reception of such. Moreover, in the case of a single-carrier scheme of "communications scheme #A", when the communication partner transmits a single stream, the terminal supports reception of such, but does not support reception of a multi-carrier scheme such as OFDM. Thus, when the communication partner transmits a plurality of streams of modulated signals and phase change is implemented, the terminal supports reception of such. The terminal supports decoding of "error correction encoding scheme #C" and decoding of "error correction encoding scheme #D" as an error correction encoding scheme.

Therefore, based on the rules described in Embodiment A2, a terminal having the configuration illustrated in FIG. 8 that supports the above generates reception capability notification symbol 3502 illustrated in FIG. 38 and transmits reception capability notification symbol 3502 in accordance with the sequence illustrated in FIG. 35.

Here, the terminal uses, for example, transmission device 2403 illustrated in FIG. 24 to generate reception capability notification symbol 3502 illustrated in FIG. 38 and transmission device 2403 illustrated in FIG. 24 transmits reception capability notification symbol 3502 illustrated in FIG. 38 in accordance with the sequence illustrated in FIG. 35.

Reception device 2304 in the base station or AP illustrated in FIG. 23 receives reception capability notification symbol 3502 transmitted by the terminal. Control signal generator 2308 in the base station illustrated in FIG. 23 then extracts data from reception capability notification symbol 3502, and the terminal knows that communications scheme #A and communications scheme #B are supported from supported scheme 3801.

Moreover, based on information 3702 relating to support for reception for a plurality of streams in FIG. 38, control signal generator 2308 in the base station knows that even when the base station transmits a plurality of streams of a plurality of modulated signals, the terminal supports reception of such in the case of a single-carrier scheme of "communications scheme #B", and that even when the base station transmits a plurality of streams of a plurality of modulated signals, the terminal does not support reception of such in the case of a multi-carrier scheme such as OFDM of "communications scheme #B". Moreover, based on information 3702 relating to support for reception for a plurality of streams in FIG. 38, control signal generator 2308 in the base station knows that in "communications scheme #A" and "communications scheme #B", even if the base station transmits a single stream of a modulated signal, the terminal supports reception of such.

Here, information 3702 relating to support for reception for a plurality of streams is required to have a configuration such as the following.

Information 3702 relating to support for reception for a plurality of streams is 2-bit information, and the 2 bits are expressed as h0 and h1.

In the case of a single-carrier scheme of "communications scheme #B", when the communication partner transmits a plurality of streams of modulated signals and the terminal supports demodulation, h0=1 is transmitted, and when the terminal does not support demodulation, h0=0 is transmitted.

In the case of a multi-carrier scheme such as OFDM of "communications scheme #B", when the communication partner transmits a plurality of streams of modulated signals and the terminal supports demodulation, h1=1 is transmitted, and when the terminal does not support demodulation, h1=0 is transmitted.

Control signal generator 2308 in the base station then knows that the terminal supports phase change demodulation based on information 3601 relating to phase change demodulation support in FIG. 38.

Control signal generator 2308 in the base station knows that the terminal supports single-carrier schemes based on information 3802 relating to multi-carrier scheme support in FIG. 38.

Then, based on information 3803 relating to supported error correction encoding scheme in FIG. 38, control signal generator 2308 in the base station knows that the terminal supports decoding of error correction encoding scheme #C and error correction encoding scheme #D.

Accordingly the base station or AP takes into consideration the communications method supported by the terminal and the communications environment, for example, and accurately generates and transmits a modulated signal receivable by the terminal to achieve an advantageous effect of an improvement in data transmission efficiency in the system including the base station or AP and terminal.

As a ninth example, the reception device of the terminal has the configuration illustrated in FIG. 8, and, for example, supports the following. For example, the reception device of the terminal supports reception of "communications scheme #A" and "communications scheme #B" described in Embodiment A2. In "communications scheme #B", even if the communication partner transmits a plurality of streams of a plurality of modulated signals, the terminal supports reception of such. Moreover, in "communications scheme #A" and "communications scheme #B", even if the communication partner transmits a single stream modulated signal, the terminal supports reception of such. In "communications scheme #B", the base station or AP can transmit a plurality of modulated signals for a plurality of streams in the case of a single-carrier scheme and a multi-carrier scheme such as OFDM. However, in the case of a communications scheme #B multi-carrier scheme such as OFDM, upon transmitting a plurality of streams of modulated signals, implementation of a phase change by the communication partner is possible. Thus, when the communication partner transmits a plurality of streams of modulated signals and phase change is implemented, the terminal supports reception of such. The terminal supports decoding of "error correction encoding scheme #C" and decoding of "error correction encoding scheme #D" as an error correction scheme.

Therefore, based on the rules described in Embodiment A2, a terminal having the configuration illustrated in FIG. 8 that supports the above generates reception capability notification symbol 3502 illustrated in FIG. 38 and transmits reception capability notification symbol 3502 in accordance with the sequence illustrated in FIG. 35.

Here, the terminal uses, for example, transmission device 2403 illustrated in FIG. 24 to generate reception capability notification symbol 3502 illustrated in FIG. 38 and transmission device 2403 illustrated in FIG. 24 transmits reception capability notification symbol 3502 illustrated in FIG. 38 in accordance with the sequence illustrated in FIG. 35.

Reception device 2304 in the base station or AP illustrated in FIG. 23 receives reception capability notification symbol 3502 transmitted by the terminal. Control signal generator 2308 in the base station illustrated in FIG. 23 then extracts data from reception capability notification symbol 3502, and the terminal knows that communications scheme #A and communications scheme #B are supported from supported scheme 3801.

Based on information 3702 relating to support for reception for a plurality of streams in FIG. 38, control signal generator 2308 in the base station knows that in "communications scheme #B", even if the communication partner transmits a plurality of streams of a plurality of modulated signals, the terminal supports reception of such, and in "communications scheme #A" and "communications scheme #B", even if the communication partner transmits a single stream modulated signal, the terminal supports reception of such.

Moreover, based on information 3802 relating to multi-carrier scheme support in FIG. 38, control signal generator 2308 in the base station knows whether the terminal supports a single-carrier scheme, supports a multi-carrier scheme such as OFDM, or supports both a single-carrier scheme and a multi-carrier scheme such as OFDM.

When the terminal supports a single-carrier scheme, upon control signal generator 2308 in the base station knowing this, control signal generator 2308 in the base station, in the case of single-carrier scheme, does not support phase-change, and thus ignores information 3601 relating to phase change demodulation support in FIG. 38, and this is interpreted as not supporting demodulation.

When the terminal supports a multi-carrier scheme such as OFDM or supports both a multi-carrier scheme such as OFDM and a single-carrier scheme, based on information 3601 relating to phase change demodulation support in FIG. 38, control signal generator 2308 in the base station obtains information indicating that the terminal supports a multi-carrier scheme such as OFDM or information indicating that it is not.

Then, based on information 3803 relating to supported error correction encoding scheme in FIG. 38, control signal generator 2308 in the base station knows that the terminal supports decoding of error correction encoding scheme #C and decoding of error correction encoding scheme #D.

Accordingly the base station or AP takes into consideration the communications method supported by the terminal and the communications environment, for example, and accurately generates and transmits a modulated signal receivable by the terminal to achieve an advantageous effect of an improvement in data transmission efficiency in the system including the base station or AP and terminal.

As a tenth example, the reception device of the terminal has the configuration illustrated in FIG. 8, and, for example, supports the following. For example, the reception device of the terminal supports reception of "communications scheme #A" and "communications scheme #B" described in Embodiment A2. Accordingly in "communications scheme #B", even if the communication partner transmits a plurality of streams of a plurality of modulated signals, the terminal supports reception of such. Moreover, in "communications scheme #A" and "communications scheme #B", even if the communication partner transmits a single stream modulated signal, the terminal supports reception of such. In "communications scheme #B", the base station or AP can transmit a plurality of modulated signals for a plurality of streams in the case of a single-carrier scheme and a multi-carrier scheme such as OFDM. Then, in the case of a single-carrier scheme, when the communication partner transmits a plurality of streams of modulated signals, whether to implement a phase change or not can be set, and in the case of a multi-carrier scheme such as OFDM, when the communication partner transmits a plurality of streams of modulated signals, whether to implement a phase change or not can be set. The terminal supports decoding of "error correction encoding scheme #C" and decoding of "error correction encoding scheme #D" as an error correction scheme.

Therefore, based on the rules described in Embodiment A2, a terminal having the configuration illustrated in FIG. 8 that supports the above generates reception capability notification symbol 3502 illustrated in FIG. 38 and transmits reception capability notification symbol 3502 in accordance with the sequence illustrated in FIG. 35.

Here, the terminal uses, for example, transmission device 2403 illustrated in FIG. 24 to generate reception capability notification symbol 3502 illustrated in FIG. 38 and transmission device 2403 illustrated in FIG. 24 transmits reception capability notification symbol 3502 illustrated in FIG. 38 in accordance with the sequence illustrated in FIG. 35.

Reception device 2304 in the base station or AP illustrated in FIG. 23 receives reception capability notification symbol 3502 transmitted by the terminal. Control signal generator 2308 in the base station illustrated in FIG. 23 then extracts data from reception capability notification symbol 3502, and the terminal knows that communications scheme #A and communications scheme #B are supported from supported scheme 3801.

Based on information 3702 relating to support for reception for a plurality of streams in FIG. 38, control signal generator 2308 in the base station knows that in "communications scheme #B", even if the communication partner transmits a plurality of streams of a plurality of modulated signals, the terminal supports reception of such, and in "communications scheme #A" and "communications scheme #B", even if the communication partner transmits a single stream modulated signal, the terminal supports reception of such.

Moreover, based on information 3802 relating to multi-carrier scheme support in FIG. 38, control signal generator 2308 in the base station knows whether the terminal supports a single-carrier scheme, supports a multi-carrier scheme such as OFDM, or supports both a single-carrier scheme and a multi-carrier scheme such as OFDM.

Control signal generator 2308 in the base station then knows whether the terminal supports phase change, based on information 3601 relating to phase change demodulation support in FIG. 38.

Here, information 3802 relating to phase change demodulation support is required to have a configuration such as the following.

Information 3802 relating to phase change demodulation support is 2-bit information, and the 2 bits are expressed as k0 and k1.

In the case of a single-carrier scheme of "communications scheme #B", when the communication partner transmits a plurality of streams for a plurality of modulated signals and a phase change has been implemented, when the terminal supports demodulation, k0=1 is transmitted, and when the terminal does not support demodulation, k0=0 is transmitted.

In the case of a multi-carrier scheme such as OFDM of "communications scheme #B", when the communication partner transmits a plurality of streams for a plurality of modulated signals and a phase change has been implemented, when the terminal supports demodulation, k1=1 is transmitted, and when the terminal does not support demodulation, k1=0 is transmitted.

Then, based on information 3803 relating to supported error correction encoding scheme in FIG. 38, control signal generator 2308 in the base station knows that the terminal supports decoding of error correction encoding scheme #C and error correction encoding scheme #D.

Accordingly the base station or AP takes into consideration the communications method supported by the terminal and the communications environment, for example, and accurately generates and transmits a modulated signal receivable by the terminal to achieve an advantageous effect of an improvement in data transmission efficiency in the system including the base station or AP and terminal.

As described above, the base station or AP obtains, from the terminal, which is the communication partner of the base station or AP, information relating to a scheme in which demodulation is supported by the terminal, and based on that information, determines the number of modulated signals, the communications method of the modulated signals, and the signal processing method of the modulated signals, for example, and as a result, the base station or AP can accurately generate and transmit a modulated signal receivable by the terminal, which makes it possible to achieve an advantageous effect of an improvement in data transmission efficiency in the system including the base station or AP and terminal.

Here, for example, as illustrated in FIG. 38, by configuring a reception capability notification symbol of a plurality of items of information, the base station or AP can easily determine the validity of information included in the reception capability notification symbol, and as a result, it is possible to rapidly determine, for example, a modulated signal scheme and signal processing method to be used for transmission.

Then, based on information on the reception capability symbol transmitted by the terminals, the base station or AP can improve data transmission efficiency by transmitting modulated signals to each terminal using a suitable transmission method.

Note that the method of configuring the information on the reception capability notification symbol described in this embodiment is merely one non-limiting example. Moreover, the order in which and timing at which the terminal transmits the reception capability notification symbols to the base station or AP described in this embodiment are merely non-limiting examples.

Embodiment A5

In the present disclosure, one example of a configuration of a transmission device, such as a base station, access point, broadcast station, illustrated in FIG. 1 was described. In this embodiment, another example of a configuration of a transmission device, such as a base station, access point, broadcast station that is illustrated in FIG. 44 and different from FIG. 1 will be described.

Figure 44:
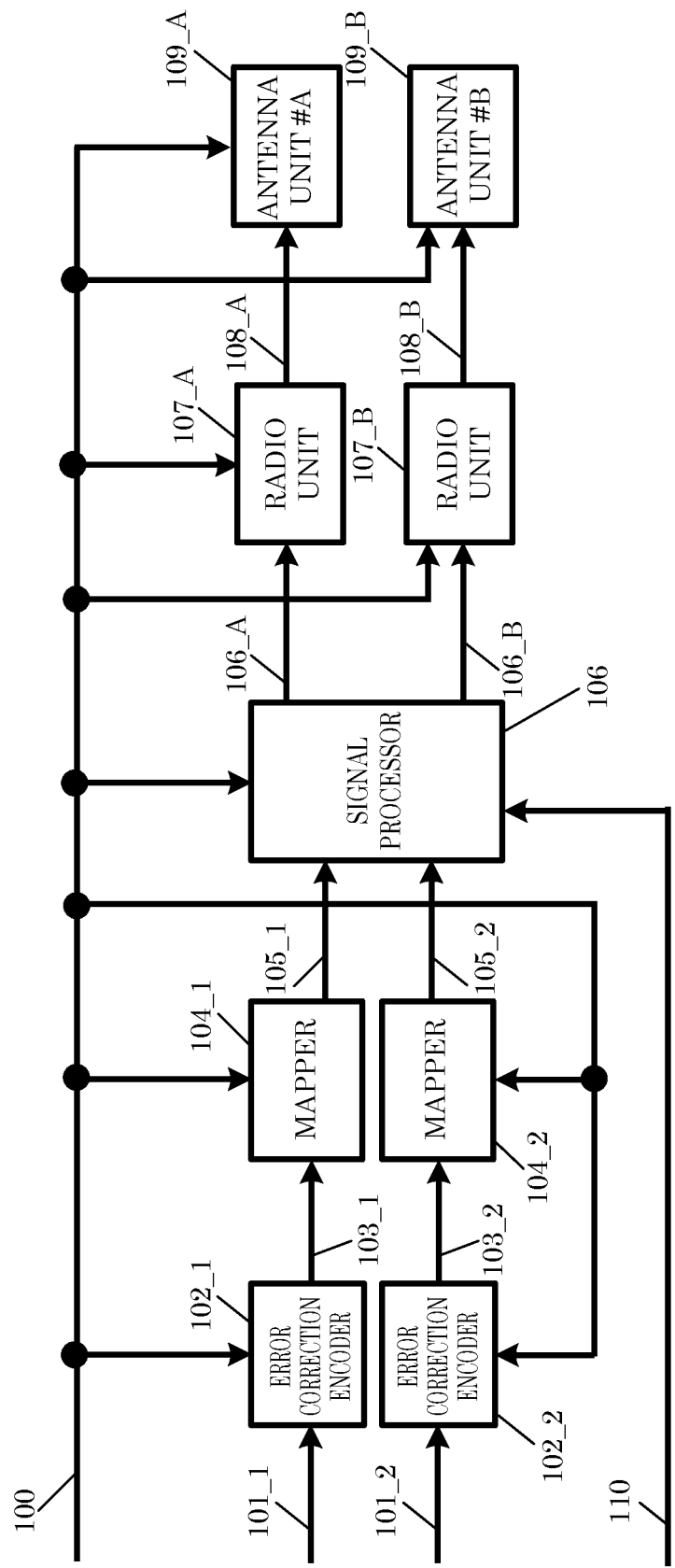
FIG. 44 illustrates one example of a configuration of a transmission device.

In FIG. 44, components that operate the same as in FIG. 1 share like reference marks. Accordingly repeated description will be omitted. In FIG. 44, the point of difference from FIG. 1 is the inclusion of a plurality of error correction encoders. In FIG. 44, the configuration includes two error correction encoders.

Note that the number of error correction encoders is not limited to one in the case of FIG. 1 or two in the case of FIG. 44. For example, three or more may be provided, and the mapper may use the data output by each of the error correction encoders to perform mapping.

In FIG. 44, error correction encoder 102_1 receives inputs of first data 101_1 and control signal 100, error correction encodes first data 101_1 based on information on the error correction encoding method included in control signal 100, and outputs encoded data 103_1.

Mapper 104_1 receives inputs of encoded data 103_1 and control signal 100, and based on information on the modulation scheme included in control signal 100, performs mapping on encoded data 103_1, and outputs mapped signal 105_1.

Error correction encoder 102_1 receives inputs of second data 101_2 and control signal 100, error correction encodes second data 101_2 based on information on the error correction encoding method included in control signal 100, and outputs encoded data 103_2.

Mapper 104_2 receives inputs of encoded data 103_2 and control signal 100, and based on information on the modulation scheme included in control signal 100, performs mapping on encoded data 103_2, and outputs mapped signal 105_2.

Then, even when operations described in this embodiment are performed with respect to the configuration of the transmission device illustrated in FIG. 44, implementation just like in FIG. 1 is possible and the same advantageous effects are also obtainable.

Note that, for example, the transmission device such as a base station, AP, or broadcast station may switch between transmitting a modulated signal with the configuration illustrated in FIG. 1 and transmitting a modulated signal with the configuration illustrated in FIG. 44.

Embodiment A6

Examples of configurations of signal processor 106 described with reference to, for example FIG. 1, are illustrated in FIG. 20, FIG. 21, and FIG. 22. Next, an example of operations performed by phase changers 205A, 205B illustrated in FIG. 20, FIG. 21, and FIG. 22 will be given.

As described in Embodiment 4, the phase change value of phase changer 205A is expressed as w(i), and the phase change value of phase changer 205B is expressed as y(i). Here, z1(i) and z2(i) are expressed as in Equation (52). The phase change cycle of phase changer 205A is N, and the phase change cycle of phase changer 205B is N. However, N is an integer that is greater than or equal to 3. In other words, the number of transmission streams or number of transmission modulated signals is an integer that is greater than 2. Here, phase change value w(i) and phase change value y(i) are applied as follows.

[MATH. 137]

$$w(i) = e^{j(\frac{\pi \times i}{N} + \Delta)} \quad \text{Equation (137)}$$

[Math. 138]

$$y(i) = e^{j(\frac{-\pi \times i}{N} + \Omega)} \quad \text{Equation (138)}$$

Note that Δ in Equation (137) and Ω in Equation (138) are actual numbers. In one extremely simple example, Δ and Ω are both zero. However, this example is not limiting. When set in this manner, the peak-to-average power ratio (PAPR) of signal z1(t) or signal z1(i), and the PAPR of signal z2(t) or z2(i) in FIG. 20, FIG. 21, and FIG. 22 is, in the case of a single-carrier scheme, are the same. Accordingly, the phase noise in radio unit 107_A and 108_B in, for example, FIG. 1, and the linear required criteria for the transmission power unit are the same, which is advantageous since low power consumption is easily achievable and a common radio unit configuration can be used. Note that there is a high probability that the same advantageous effects can be achieved when a multi-carrier scheme such as OFDM is used.

Phase changer w(i) and y(i) may be applied in the following manner.

[MATH. 139]

$$w(i) = e^{j(\frac{-\pi \times i}{N} + \Delta)} \quad \text{Equation (139)}$$

[MATH. 140]

$$y(i) = e^{j(\frac{\pi \times i}{N} + \Omega)} \quad \text{Equation (140)}$$

Even when applied as in Equation (139) and Equation (140), the same advantageous effects as above can be achieved.

Phase changer w(i) and y(i) may be applied in the following manner.

[MATH. 141]

$$w(i) = e^{j\left(\frac{k \times \pi \times i}{N} + \Delta\right)} \quad \text{Equation (141)}$$

[MATH. 142]

$$y(i) = e^{j\left(\frac{-k \times \pi \times i}{N} + \Omega\right)} \quad \text{Equation (142)}$$

Note that k is an integer excluding 0. For example, k may be 1, may be −1, may be 2, and may be −2. However, these examples are not limiting. Even when applied as in Equation (141) and Equation (142), the same advantageous effects as above can be achieved.

Embodiment A7

Examples of configurations of signal processor 106 described with reference to, for example FIG. 1, are illustrated in FIG. 31, FIG. 32, and FIG. 33. Next, an example of operations performed by phase changers 205A, 205B illustrated in FIG. 31, FIG. 32, and FIG. 33 will be given.

As described in Embodiment 7, in phase changer 205B, for example, a phase change of y(i) is applied to s2(i). Accordingly phase-changed signal s2'(i)2801B can be expressed as s2'(i)=y(i)×s2(i). Note that i is a symbol number (and is an integer that is greater than or equal to 0).

In phase changer 205A, for example, a phase change of w(i) is applied to s1(i). Accordingly phase-changed signal s1'(i)2901A can be expressed as s1'(i)=w(i)×s1(i). Note that i is a symbol number and is an integer that is greater than or equal to 0. The phase change cycle of phase changer 205A is N, and the phase change cycle of phase changer 205B is N. However, N is an integer that is greater than or equal to 3. In other words, the number of transmission streams or number of transmission modulated signals is an integer that is greater than 2. Here, phase change value w(i) and phase change value y(i) are applied as follows.

[MATH. 143]

$$w(i) = e^{j\left(\frac{\pi \times i}{N} + \Delta\right)} \quad \text{Equation (143)}$$

[MATH. 144]

$$y(i) = e^{j\left(\frac{-\pi \times i}{N} + \Omega\right)} \quad \text{Equation (144)}$$

Note that Δ in Equation (143) and Ω in Equation (144) are actual numbers. In one extremely simple example, Δ and Ω are both zero. However, this example is not limiting. When set in this manner, the PAPR of signal z1(t) or signal z1(i), and the PAPR of signal z2(t) or z2(i) in FIG. 31, FIG. 32, and FIG. 33 is, in the case of a single-carrier scheme, are the same. Accordingly the phase noise in radio unit 107_A and 108_B in, for example, FIG. 1, and the linear required criteria for the transmission power unit are the same, which is advantageous since low power consumption is easily achievable and a common radio unit configuration can be used. Note that there is a high probability that the same advantageous effects can be achieved when a multi-carrier scheme such as OFDM is used.

Phase changer w(i) and y(i) may be applied in the following manner.

[MATH. 145]

$$w(i) = e^{j\left(\frac{-\pi \times i}{N} + \Delta\right)} \quad \text{Equation (145)}$$

[MATH. 146]

$$y(i) = e^{j\left(\frac{\pi \times i}{N} + \Omega\right)} \quad \text{Equation (146)}$$

Even when applied as in Equation (145) and Equation (146), the same advantageous effects as above can be achieved.

Phase changer w(i) and y(i) may be applied in the following manner.

[MATH. 147]

$$w(i) = e^{j\left(\frac{k \times \pi \times i}{N} + \Delta\right)} \quad \text{Equation (147)}$$

[MATH. 148]

$$y(i) = e^{j\left(\frac{-k \times \pi \times i}{N} + \Omega\right)} \quad \text{Equation (148)}$$

Note that k is an integer excluding 0. For example, k may be 1, may be −1, may be 2, and may be −2. However, these examples are not limiting. Even when applied as in Equation (147) and Equation (148), the same advantageous effects as above can be achieved.

(Supplemental Information 5)

The embodiments of the present disclosure may be implemented for multi-carrier schemes such as OFDM and may be implemented for single-carrier schemes. Hereinafter, additional information will be given for cases in which a single-carrier scheme is applied.

For example, in Embodiment 1, from Equation (1) to Equation (36), using, for example, FIG. 2, or in other embodiments, using FIG. 18 to FIG. 22 and FIG. 28 to FIG. 33, signal z1(i) and signal z2(i) or signal z1'(i) and signal z2'(i) are generated, and signal z1(i) and signal z2(i) or signal z1'(i) and signal z2'(i) are transmitted from the transmission device at the same time and at the same frequency (same frequency band). Note that i is a symbol number.

Here, for example, in cases in which a multi-carrier scheme such as OFDM is used, as described in Embodiments 1 through 6, signal z1(i) and signal z2(i) or signal z1'(i) and signal z2'(i) are taken as functions of a frequency (carrier number), functions of time and frequency or functions of time, and, for example, are arranged as follows. Signal z1(i) and signal z2(i) or signal z1'(i) and signal z2'(i) are arranged along the frequency axis. Signal z1(i) and signal z2(i) or signal z1'(i) and signal z2'(i) are arranged along the time axis. Signal z1(i) and signal z2(i) or signal z1'(i) and signal z2'(i) are arranged along both the frequency and time axis.

Next, a specific example will be given.

Figure 45:
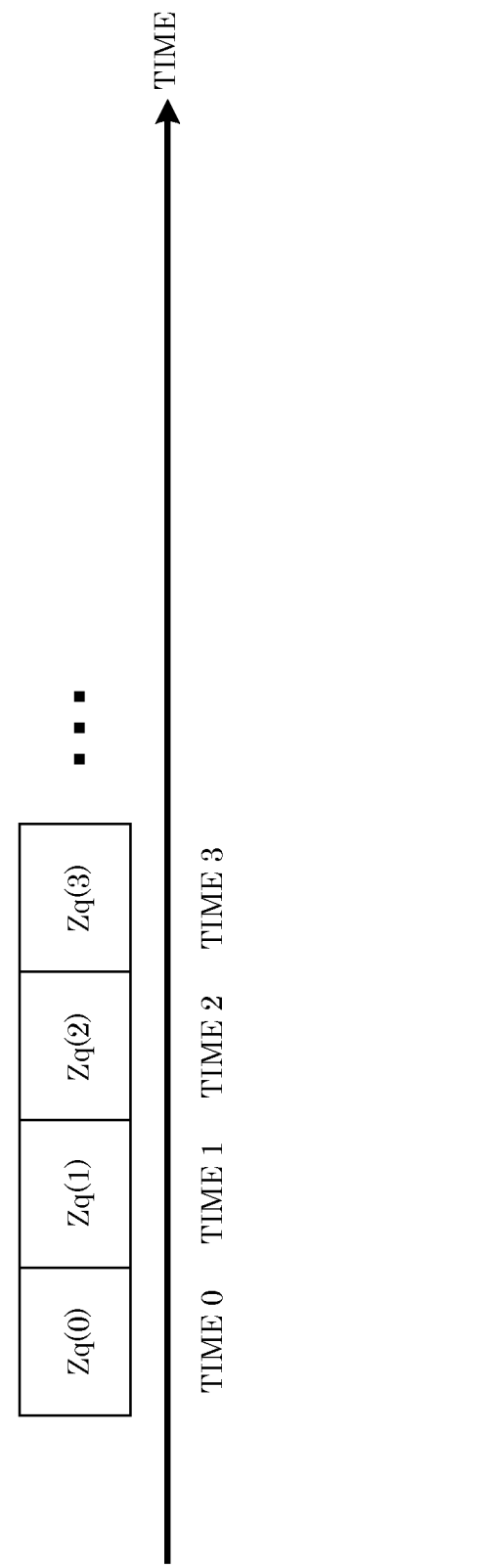
FIG. 45 illustrates one example of a symbol arrangement method with respect to the time axis.

FIG. 45 illustrates an example of a method of arranging symbols on the time axis for signal z1(i) and signal z2(i) or signal z1'(i) and signal z2'(i). In FIG. 45, for example, zq(0) is shown. Here, q is 1 or 2. Accordingly zq(0) in FIG. 45 indicates "in z1(i) and z2(i), z1(0) and z2(0) when symbol number i=0". Similarly zq(1) indicates "in z1(i) and z2(i), z1(1) and z2(1) when symbol number i=1". In other words, zq(X) indicates "in z1(i) and z2(i), z1(X) and z2(X) when symbol number i=X". Note that this also applies to FIG. 46, FIG. 47, FIG. 48, FIG. 49, and FIG. 50.

As illustrated in FIG. 45, symbol zq(0) whose symbol number i=0 is arranged at time 0, symbol zq(1) whose symbol number i=1 is arranged at time 1, symbol zq(2) whose symbol number i=2 is arranged at time 2, symbol zq(3) whose symbol number i=3 is arranged at time 3, and other symbols are arranged in a similar fashion. With this, symbols are arranged on the time axis for signal z1(i) and signal z2(i) or signal z1'(i) and signal z2'(i). However, FIG. 45 merely illustrates one example; the relationship between time and symbol number is not limited to this example.

Figure 46:
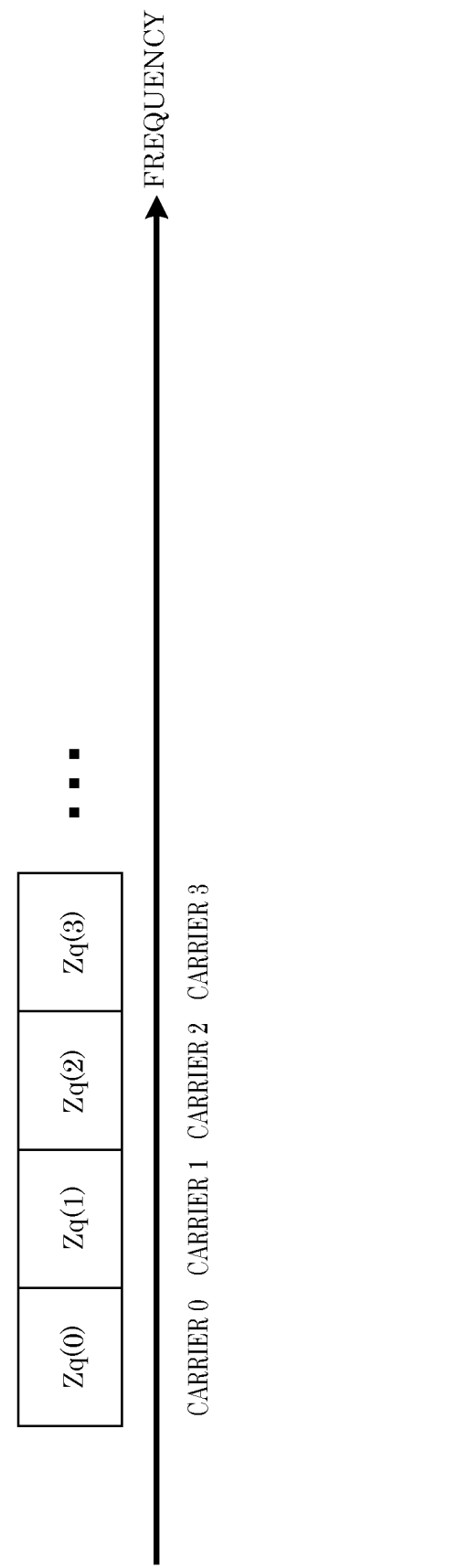
FIG. 46 illustrates one example of a symbol arrangement method with respect to the frequency axis.

FIG. 46 illustrates an example of a method of arranging symbols on the frequency axis for signal z1(i) and signal z2(i) or signal z1'(i) and signal z2'(i).

As illustrated in FIG. 46, symbol zq(0) whose symbol number i=0 is arranged at carrier 0, symbol zq(1) whose symbol number i=1 is arranged at carrier 1, symbol zq(2) whose symbol number i=2 is arranged at carrier 2, symbol zq(3) whose symbol number i=3 is arranged at carrier 3, and other symbols are arranged in a similar fashion. With this, symbols are arranged on the frequency axis for signal z1(i) and signal z2(i) or signal z1'(i) and signal z2'(i). However, FIG. 46 merely illustrates one example; the relationship between frequency and symbol number is not limited to this example.

Figure 47:
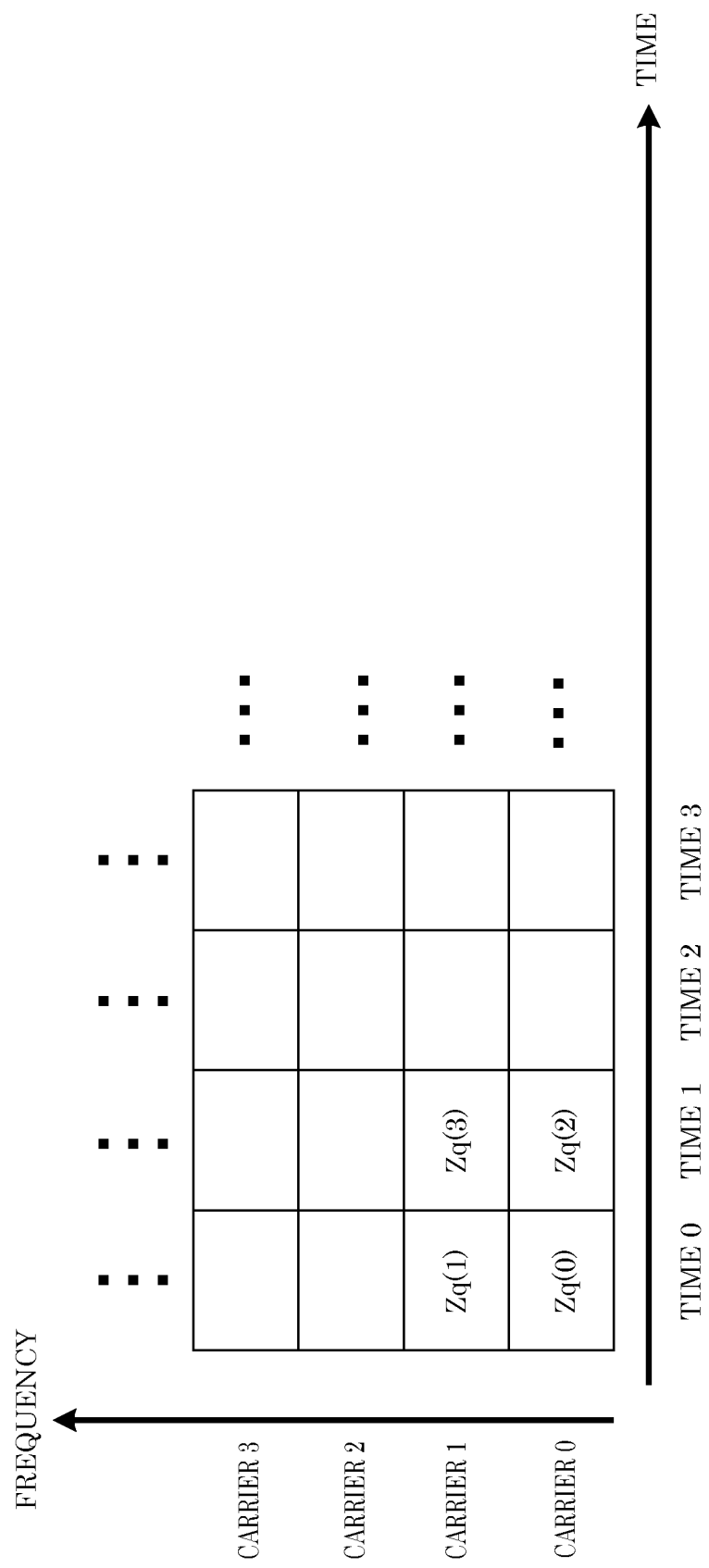
FIG. 47 illustrates one example of a symbol arrangement method with respect to the time and frequency axes.

FIG. 47 illustrates an example of a method of arranging symbols on the time and frequency axis for signal z1(i) and signal z2(i) or signal z1'(i) and signal z2'(i).

As illustrated in FIG. 47, symbol zq(0) whose symbol number i=0 is arranged at time 0 and carrier 0, symbol zq(1) whose symbol number i=1 is arranged at time 0 and carrier 1, symbol zq(2) whose symbol number i=2 is arranged at time 1 and carrier 0, symbol zq(3) whose symbol number i=3 is arranged at time 1 and carrier 1, and other symbols are arranged in a similar fashion. With this, symbols are arranged on the time and frequency axis for signal z1(i) and signal z2(i) or signal z1'(i) and signal z2'(i). However, FIG. 47 merely illustrates one example; the relationship between time and frequency and symbol number is not limited to this example.

Figure 48:
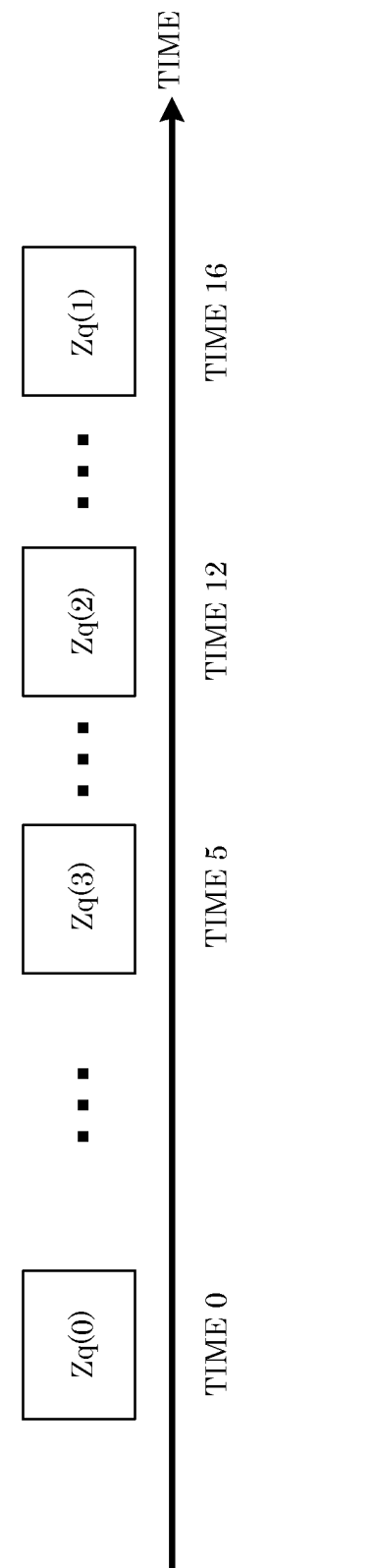
FIG. 48 illustrates one example of a symbol arrangement method with respect to the time axis.

FIG. 48 illustrates a second example of an arrangement symbols on the time axis for signal z1(i) and signal z2(i) or signal z1'(i) and signal z2'(i).

As illustrated in FIG. 48, symbol zq(0) whose symbol number i=0 is arranged at time 0, symbol zq(1) whose symbol number i=1 is arranged at time 16, symbol zq(2) whose symbol number i=2 is arranged at time 12, symbol zq(3) whose symbol number i=3 is arranged at time 5, and other symbols are arranged in a similar fashion. With this, symbols are arranged on the time axis for signal z1(i) and signal z2(i) or signal z1'(i) and signal z2'(i). However, FIG. 48 merely illustrates one example; the relationship between time and symbol number is not limited to this example.

Figure 49:
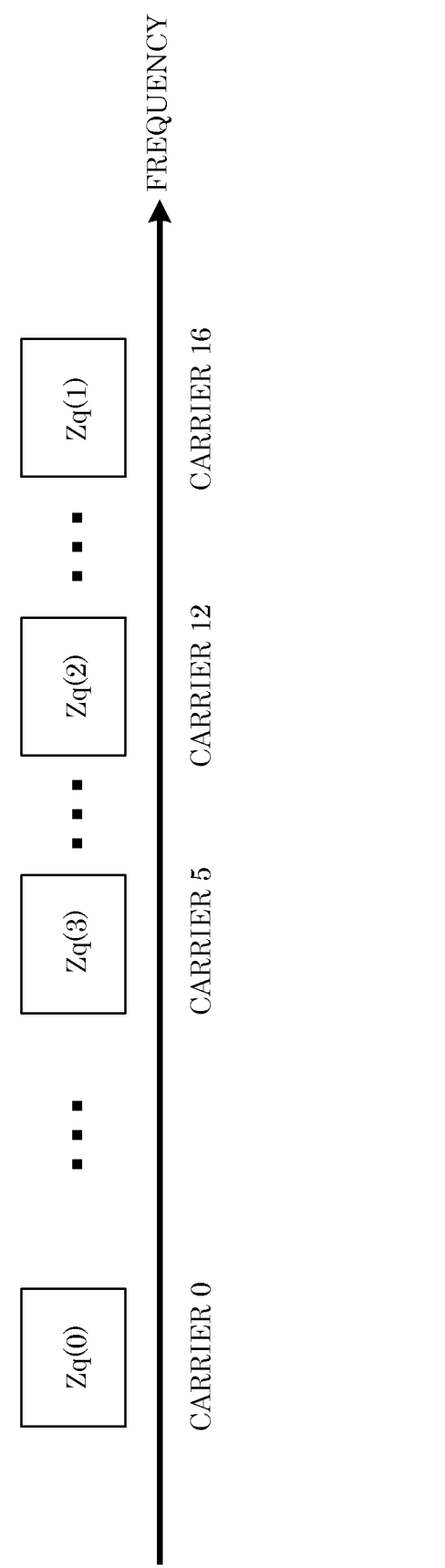
FIG. 49 illustrates one example of a symbol arrangement method with respect to the frequency axis.

FIG. 49 illustrates a second example of an arrangement symbols on the frequency axis for signal z1(i) and signal z2(i) or signal z1'(i) and signal z2'(i).

As illustrated in FIG. 49, symbol zq(0) whose symbol number i=0 is arranged at carrier 0, symbol zq(1) whose symbol number i=1 is arranged at carrier 16, symbol zq(2) whose symbol number i=2 is arranged at carrier 12, symbol zq(3) whose symbol number i=3 is arranged at carrier 5, and other symbols are arranged in a similar fashion. With this, symbols are arranged on the frequency axis for signal z1(i) and signal z2(i) or signal z1'(i) and signal z2'(i). However, FIG. 49 merely illustrates one example; the relationship between frequency and symbol number is not limited to this example.

Figure 50:
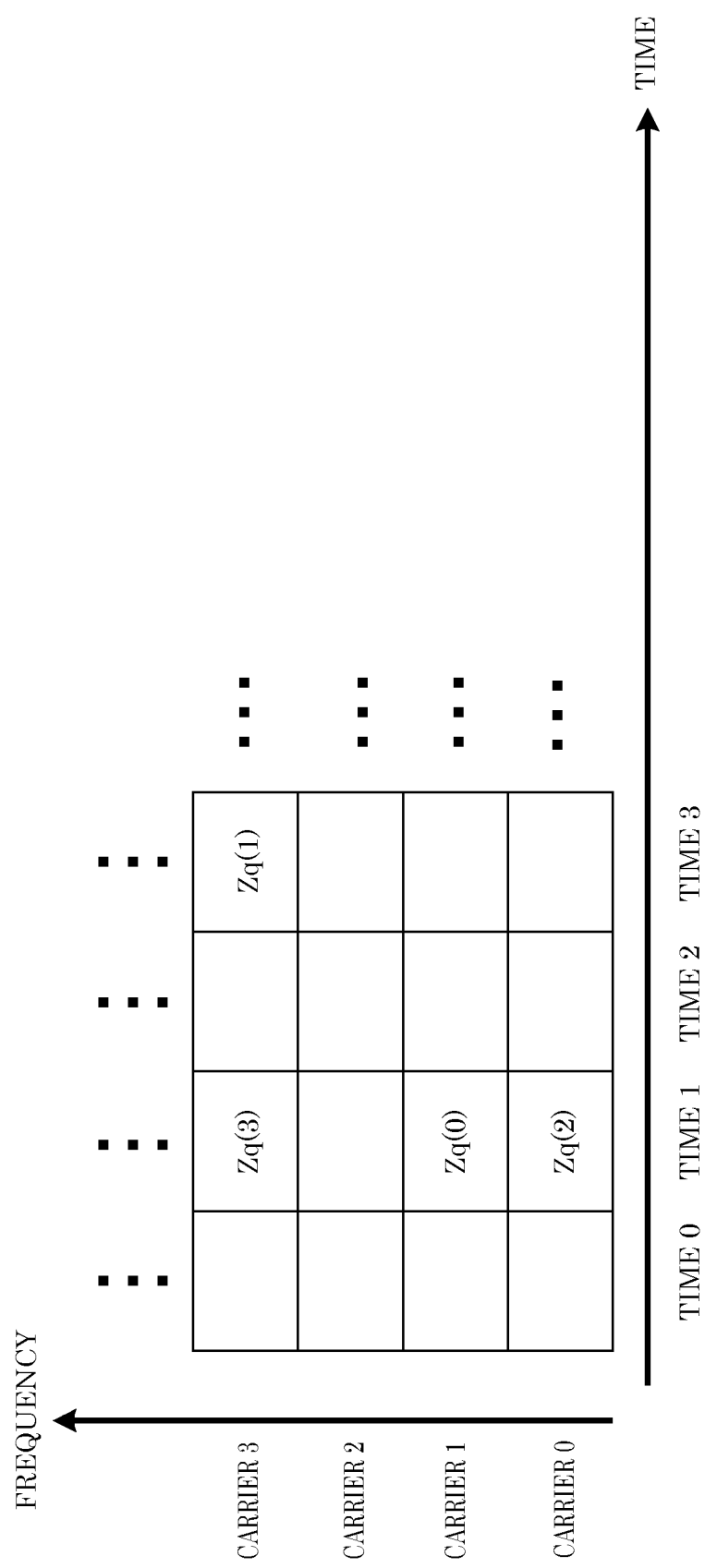
FIG. 50 illustrates one example of a symbol arrangement method with respect to the time and frequency axes.

FIG. 50 illustrates an example of an arrangement of symbols on the time and frequency axis for signal z1(i) and signal z2(i) or signal z1'(i) and signal z2'(i).

As illustrated in FIG. 50, symbol zq(0) whose symbol number i=0 is arranged at time 1 and carrier 1, symbol zq(1) whose symbol number i=1 is arranged at time 3 and carrier 3, symbol zq(2) whose symbol number i=2 is arranged at time 1 and carrier 0, symbol zq(3) whose symbol number i=3 is arranged at time 1 and carrier 3, and other symbols are arranged in a similar fashion. With this, symbols are arranged on the time and frequency axis for signal z1(i) and signal z2(i) or signal z1'(i) and signal z2'(i). However, FIG. 50 merely illustrates one example; the relationship between time and frequency and symbol number is not limited to this example.

Moreover, in cases where a single-carrier scheme is used, after signal z1(i) and signal z2(i) or signal z1'(i) and signal z2'(i) are generated, symbols are arranged along the time axis. Accordingly as described above, signal z1(i) and signal z2(i) or signal z1'(i) and signal z2'(i) are generated, symbols are arranged along the time axis, such as illustrated in FIG. 45 and FIG. 48. However, FIG. 45 and FIG. 48 merely illustrate examples; the relationship between time and symbol number is not limited to these examples.

Moreover, various frame configurations are described in the present disclosure. The modulated signals having a frame configuration described in the present disclosure is transmitted by a base station or AP using a multi-carrier scheme such as OFDM. Here, when a terminal communicating with the base station (AP) transmits a modulated signal, the modulated signal to be transmitted by the terminal is preferably a single-carrier scheme modulated signal. As a result of the base station or AP using the OFDM scheme, it is possible to concurrently transmit a data symbol group to a plurality of terminals. Moreover, as a result of the terminal using a single-carrier scheme, power consumption can be reduced.

Using part of a frequency band used by the modulated signal transmitted by the base station or AP, the terminal may implement a time division duplex (TDD) scheme for modulation scheme transmission.

In the present disclosure, phase changer 205A and/or phase changer 205B are described as implementing a phase change.

Here, when the phase change cycle of phase changer 205A is expressed as NA, and NA is an integer that is greater than or equal to 3, that is to say the number of transmission streams or the number of modulated signals is an integer greater than 2, there is a high probability that the reception device in the communication partner can achieve a beneficial data reception quality.

Similarly when the phase change cycle of phase changer 205B is expressed as NB, and NB is an integer that is greater than or equal to 3, that is to say the number of transmission streams or the number of modulated signals is an integer greater than 2, there is a high probability that the reception device in the communication partner can achieve a beneficial data reception quality.

As a matter of course, the present disclosure may be carried out by combining a plurality of the exemplary embodiments and other content described herein.

Embodiment A8

In this embodiment, an operational example of a communications device based on the operations described in, for example, Embodiment 7 and Supplemental Information 1, will be given.

First Example

Figure 51:
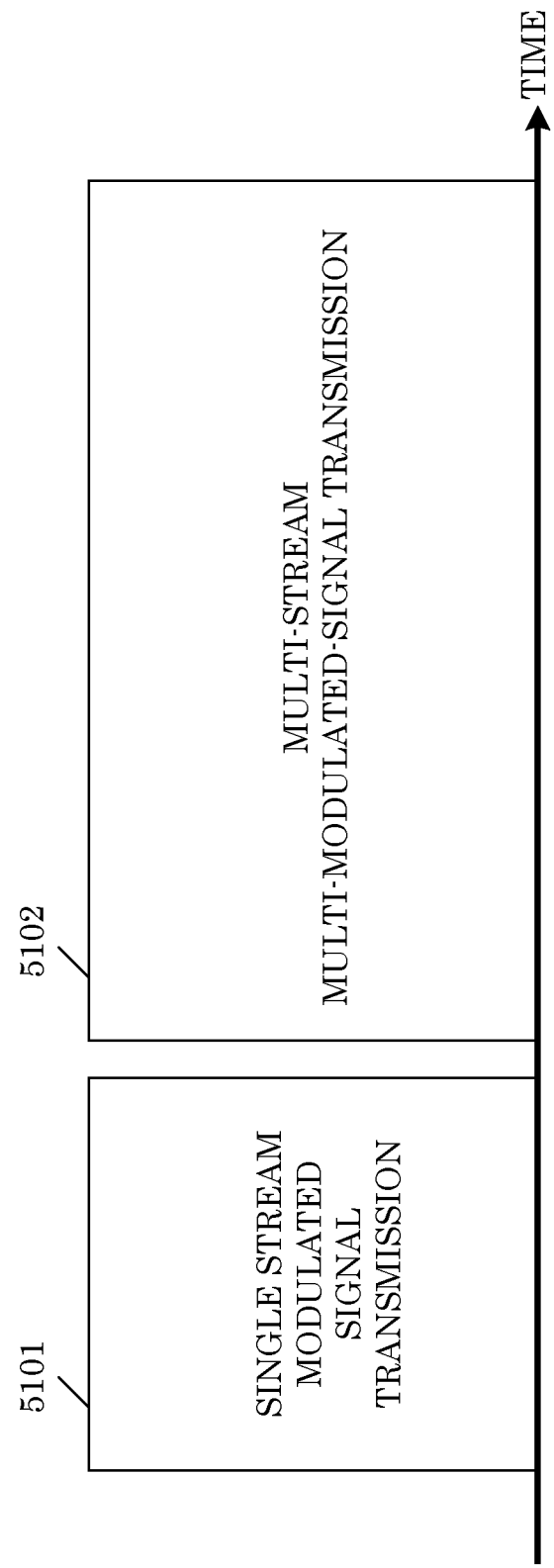
FIG. 51 illustrates one example of a frame configuration of a modulated signal.

FIG. 51 illustrates one example of a configuration of a modulated signal transmitted by a base station or AP according to this embodiment.

In FIG. 51, time is represented on the horizontal axis. As illustrated in FIG. 51, the transmission device in the base station or AP performs "single stream modulated signal transmission 5101" and subsequently performs "multi-stream multi-modulated-signal transmission 5102".

Figure 52:
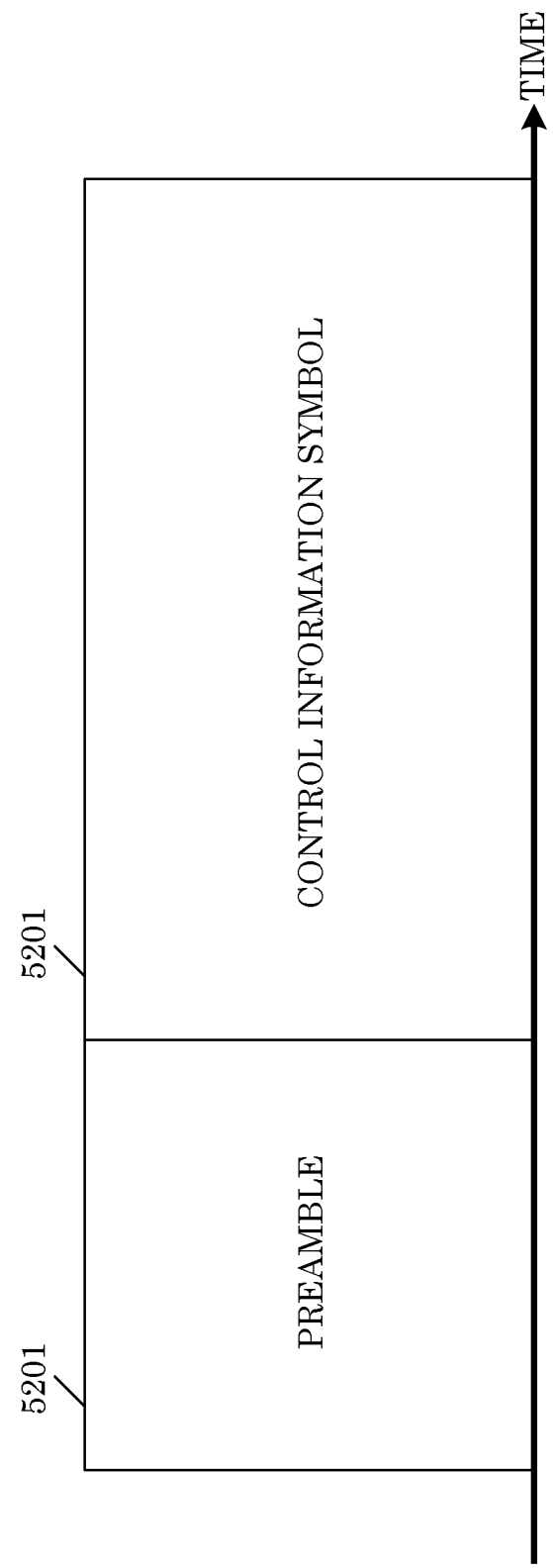
FIG. 52 illustrates one example of a frame configuration upon modulated signal transmission.

FIG. 52 illustrates one example of a frame configuration when single stream modulated signal transmission 5101 in FIG. 51 is performed.

In FIG. 52, time is represented on the horizontal axis. As illustrated in FIG. 52, the base station or AP transmits preamble 5201 and subsequently transmits control information symbol 5201.

Note that preamble 5201 conceivably includes a symbol for the terminal, which is the communication partner of the base station or AP, to perform signal detection, time synchronization, frequency synchronization, frequency offset estimation, channel estimation, and/or frame synchronization. For example, preamble 5201 is conceivably a PSK scheme symbol.

Control information symbol 5201 is a symbol including, for example, information relating to the communications method of the modulated signal transmitted by the base station and AP and/or information required by the terminal to demodulate a data symbol. However, the information included in control information symbol 5202 is not limited to this example; control information symbol 5202 may include data (a data symbol), and may include other control information.

Moreover, the configuration of the symbols included in the single stream modulated signal is not limited to the example illustrated in FIG. 52, and the symbols included in the single stream modulated signal are not limited to the example illustrated in FIG. 52.

Figure 53:
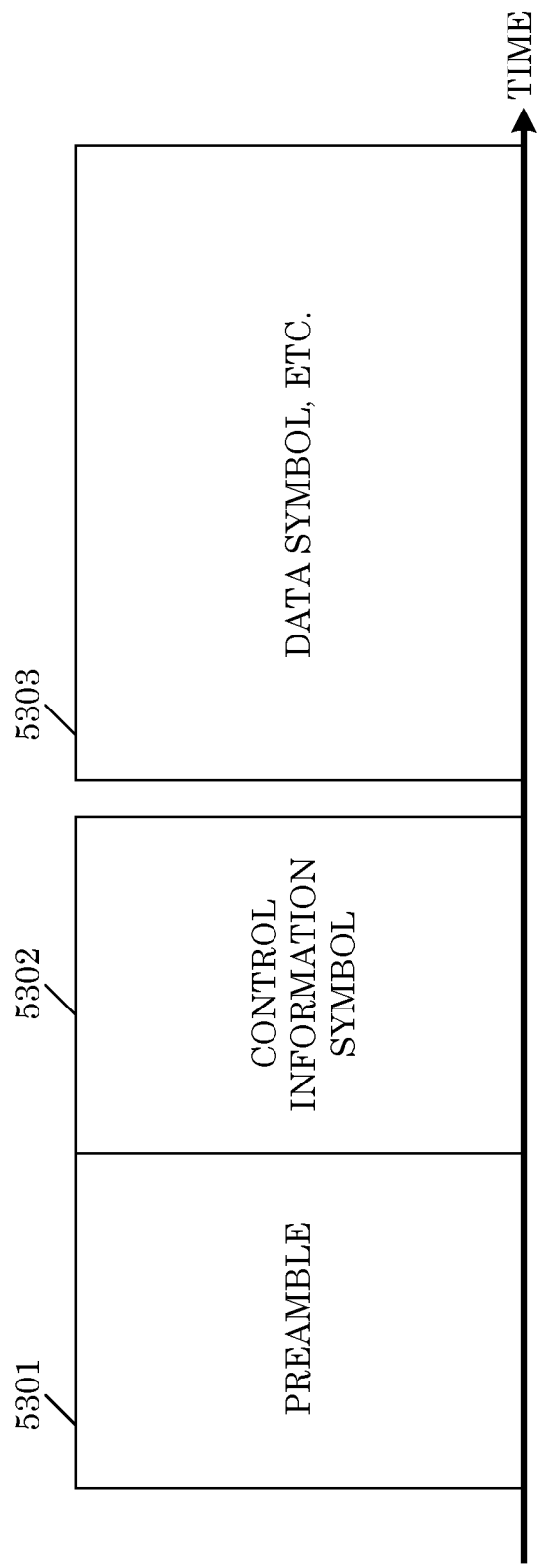
FIG. 53 illustrates one example of a frame configuration upon modulated signal transmission.

FIG. 53 illustrates one example of a frame configuration when multi-stream multi-modulated-signal transmission 5102 in FIG. 51 is performed.

In FIG. 53, time is represented on the horizontal axis. As illustrated in FIG. 53, the base station or AP transmits preamble 5301 and subsequently transmits control information symbol 5302, and subsequently transmits, for example, data symbol 5303.

Note that regarding at least data symbols, a plurality of modulated signals for a plurality of streams are transmitted at the same time and at the same frequency. Note that preamble 5301 conceivably includes a symbol for the terminal, which is the communication partner of the base station or AP, to perform signal detection, time synchronization, frequency synchronization, frequency offset estimation, channel estimation, and/or frame synchronization. For example, preamble 5301 is conceivably a PSK scheme symbol.

Moreover, as a result of a symbol for channel estimation being transmitted from a plurality of antennas, demodulation of a data symbol included in, for example, data symbol 5303 becomes possible.

Control information symbol 5302 is a symbol including, for example, information relating to the communications method of the modulated signal transmitted by the base station and AP and/or information required by the terminal to demodulate a data symbol. However, the information included in control information symbol 5302 is not limited to this example; control information symbol 5302 may include data (a data symbol), and may include other control information.

Moreover, the symbols included in the plurality of modulated signals for plurality of streams are not limited to the example illustrated in FIG. 53.

Note that hereinafter, the scheme used for "single stream modulated signal transmission 5101" in FIG. 51 may be a single-carrier scheme, and the scheme used for "multi-stream multi-modulated-signal transmission 5102" in FIG. 51 may be a single-carrier scheme or a multi-carrier scheme. Note that in the following description, the multi-carrier scheme is exemplified as the OFDM scheme. However, note that the multi-carrier scheme used is not limited to the OFDM scheme.

One characteristic of this embodiment is that CDD/CSD as described in Supplemental Information 1 is implemented upon performing single stream modulated signal transmission 5101 using a single-carrier scheme in FIG. 51.

Then, upon performing multi-stream multi-modulated-signal transmission 5102 in FIG. 51, phase change is switched between implementation and non-implementation.

Next, operations performed by the transmission device in the base station will be described with reference to FIG. 54.

Figure 54:
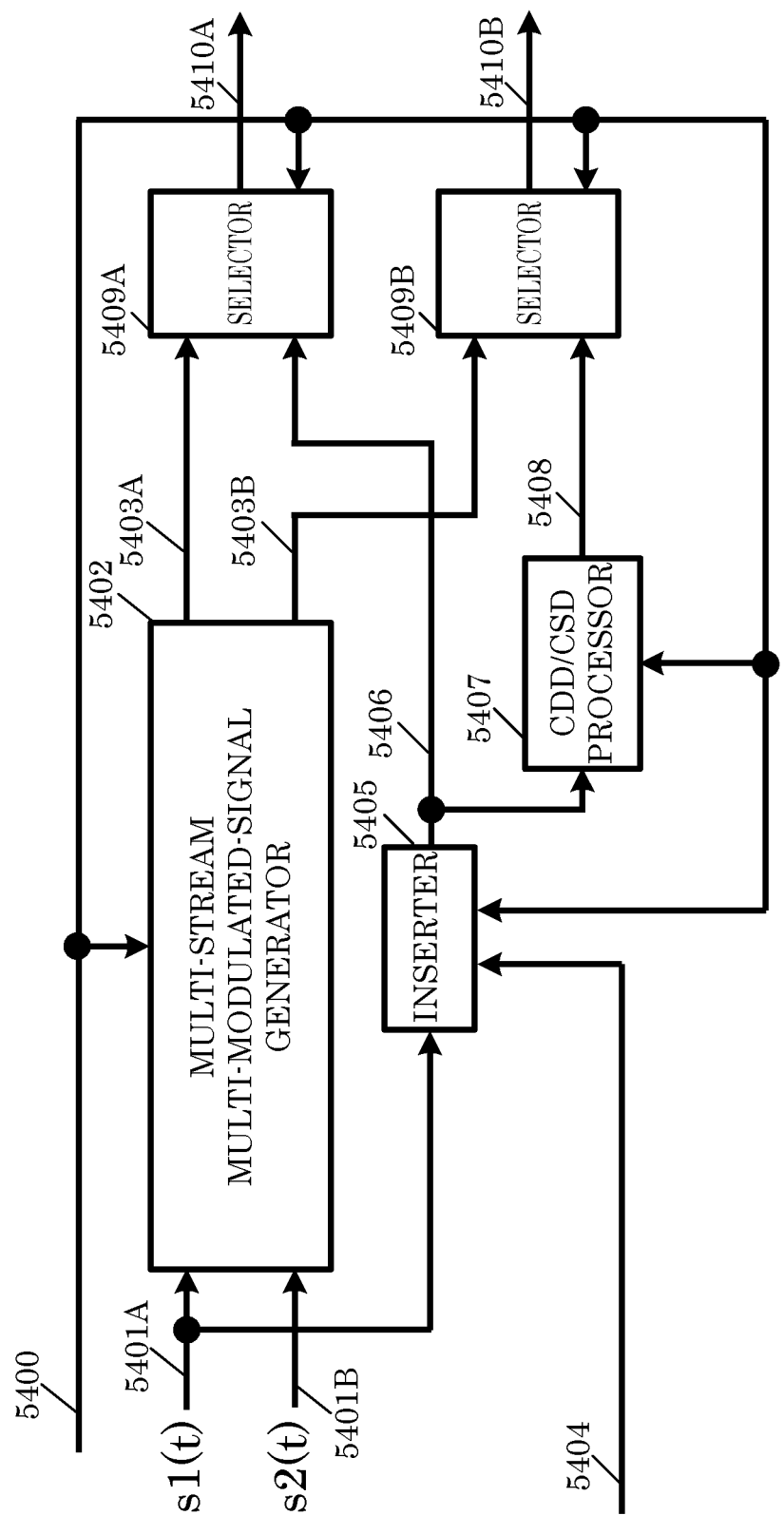
FIG. 54 illustrates one example of a configuration of a signal processor in a transmission device.

FIG. 54 illustrates one example of a configuration of signal processor 106 in, for example, the transmission device in the base station illustrated in FIG. 1 or FIG. 44.

Multi-stream multi-modulated-signal generator 5402 has the configuration illustrated in, for example, FIG. 2, FIG. 18, FIG. 19, FIG. 20, FIG. 21, FIG. 22, FIG. 28, FIG. 29, FIG. 30, FIG. 31, FIG. 32, or FIG. 33. Multi-stream multi-modulated-signal generator 5402 receives inputs of mapped signal s1(t)5401A, mapped signal s2(t)5401B, and control signal 5400.

Here, mapped signal s1(t)5401A corresponds to mapped signal 201A, mapped signal s2(t)5401B corresponds to mapped signal 201B, and control signal 5400 corresponds to control signal 200. Multi-stream multi-modulated-signal generator 5402 performs processing described with reference to, for example, FIG. 2, FIG. 18, FIG. 19, FIG. 20, FIG. 21, FIG. 22, FIG. 28, FIG. 29, FIG. 30, FIG. 31, FIG. 32, and FIG. 33, and outputs signals 5403A, 5403B.

Note that signal 5403A corresponds to baseband signal 208A in FIG. 2, signal 210A in FIG. 18, signal 210A in FIG. 19, signal 208A in FIG. 20, signal 210A in FIG. 21, signal 210A in FIG. 22, signal 208A in FIG. 28, signal 210A in FIG. 29, signal 210A in FIG. 30, signal 208A in FIG. 31, signal 210A in FIG. 32, and signal 208A in FIG. 33.

Signal 5403B corresponds to signal 210B in FIG. 2, baseband signal 208B in FIG. 18, signal 210B in FIG. 19, signal 210B in FIG. 20, signal 208B in FIG. 21, signal 210B in FIG. 22, signal 208B in FIG. 28, signal 208B in FIG. 29, signal 210B in FIG. 30, signal 210B in FIG. 31, signal 208B in FIG. 32, and signal 210B in FIG. 33.

Then, based on information included in control signal 200 relating to whether it is time to perform single stream modulated signal transmission or time to perform multi-stream multi-modulated-signal transmission, when multi-stream multi-modulated-signal generator 5402 determines that it is time to perform multi-stream multi-modulatedsignal transmission, each signal processor operates, and signals 5403A, 5403B are generated and output.

Inserter 5405 receives inputs of mapped signal 5401A, preamble and control symbol signal 5404, and control signal 5400, and based on information included in control signal 5400 relating to whether it is time to perform single stream modulated signal transmission or time to perform multi-stream multi-modulated-signal transmission, when inserter 5405 determines that it is time to perform single stream modulated signal transmission, for example, inserter 5405 generates and outputs single-carrier scheme signal 5406 in accordance with the frame configuration illustrated in FIG. 52, based on mapped signal 5401A and preamble and control symbol signal 5404.

Note that in FIG. 54, inserter 5405 is illustrated as receiving an input of mapped signal 5401A, but when generating a signal in accordance with the frame configuration illustrated in FIG. 52, mapped signal 5401A is not used.

CDD/CSD processor 5407 receives inputs of single-carrier scheme signal 5406 in accordance with the frame configuration and control signal 5400, and when control signal 5400 indicates that it is time to perform single stream modulated signal transmission, performs CDD/CSD processing on single-carrier scheme signal 5406 in accordance with the frame configuration and outputs CDD/CSD processed signal 5408 in accordance with the frame configuration.

Selector 5409A receives inputs of signal 5403A, signal 5406 in accordance with the frame configuration, and control signal 5400, and based on control signal 5400, selects either signal 5403A or signal 5406 in accordance with frame configuration, and outputs selected signal 5410A.

For example, in single stream modulated signal transmission 5101 in FIG. 51, selector 5409A outputs signal 5406 in accordance with the frame configuration as selected signal 5410A, and in multi-stream multi-modulated-signal transmission 5102 in FIG. 51, selector 5409A outputs signal 5403A as selected signal 5410A.

Selector 5409B receives inputs of signal 5403B, CDD/CSD processed signal 5408 in accordance with the frame configuration, and control signal 5400, and based on control signal 5400, selects either signal 5403B or CDD/CSD processed signal 5408 in accordance with the frame configuration, and outputs selected signal 5410B.

For example, in single stream modulated signal transmission 5101 in FIG. 51, selector 5409B outputs CDD/CSD processed signal 5408 in accordance with the frame configuration as selected signal 5410B, and in multi-stream multi-modulated-signal transmission 5102 in FIG. 51, selector 5409B outputs signal 5403B as selected signal 5410B.

Note that selected signal 5410A corresponds to processed signal 106_A in FIG. 1, FIG. 44, and selected signal 5410B corresponds to processed signal 106_B in FIG. 1, FIG. 44.

Figure 55:
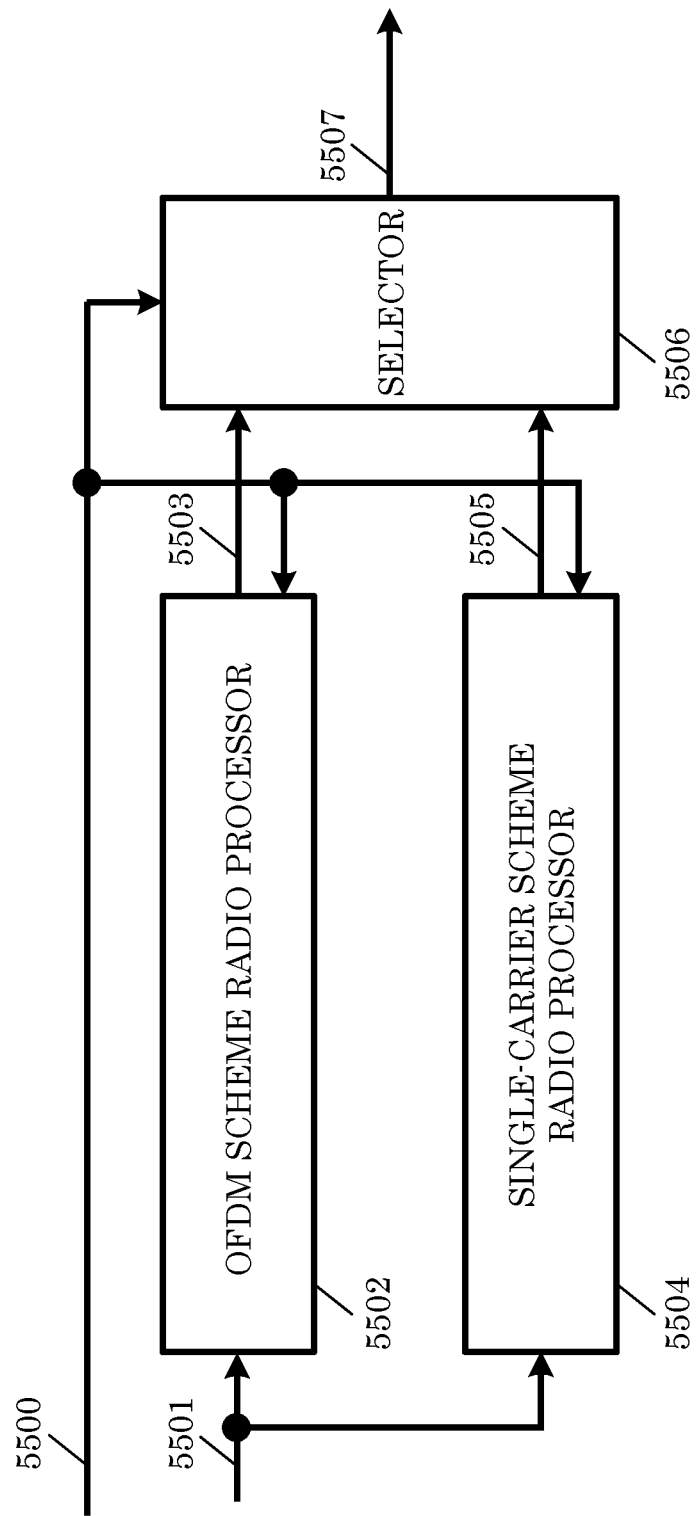
FIG. 55 illustrates one example of a configuration of a radio unit in a transmission device.

FIG. 55 illustrates one example of a configuration of radio units 107_A 107_B in FIG. 1, FIG. 44.

OFDM scheme radio unit 5502 receives inputs of processed signal 5501 and control signal 5500, and when information included in control signal 5500 relating to whether either OFDM scheme or single-carrier scheme has been selected indicates that OFDM scheme has been selected, processes processed signal 5501 and outputs OFDM scheme modulated signal 5503.

Note that OFDM is presented as an example, but another multi-carrier scheme may be used.

Single-carrier scheme radio unit 5504 receives inputs of processed signal 5501 and control signal 5500, and when information included in control signal 5500 relating to whether either OFDM scheme or single-carrier scheme has been selected indicates that single-carrier scheme has been selected, processes processed signal 5501 and outputs single-carrier scheme modulated signal 5505.

Selector 5506 receives inputs of OFDM scheme modulated signal 5503, single-carrier scheme modulated signal 5505, and control signal 5500, and when information included in control signal 5500 relating to whether either OFDM scheme or single-carrier scheme has been selected indicates that OFDM scheme has been selected, outputs OFDM scheme modulated signal 5503 as selected signal 5507, and when information included in control signal 5500 relating to whether either OFDM scheme or single-carrier scheme has been selected indicates that single-carrier scheme has been selected, outputs single-carrier scheme modulated signal 5505 as selected signal 5507.

Note that when radio unit 107_A has the configuration illustrated in FIG. 55, processed signal 5501 corresponds to signal 106_A, control signal 5500 corresponds to control signal 100, and selected signal 5507 corresponds to 108_A. Moreover, when radio unit 107_B has the configuration illustrated in FIG. 55, processed signal 5501 corresponds to signal 106_B, control signal 5500 corresponds to control signal 100, and selected signal 5507 corresponds to 108_B.

Hereinafter, the operations described above will be described further with reference to the description of Embodiment 7.

Example 1-1

In FIG. 51, in "multi-stream multi-modulated-signal transmission 5102", CDD/CSD processing is not performed, and in "multi-stream multi-modulated-signal transmission 5102", a single-carrier scheme or OFDM scheme can be selected.

Accordingly for example, phase changer 209A and/or 209B in, for example, FIG. 2, FIG. 18, FIG. 19, FIG. 20, FIG. 21, FIG. 22, FIG. 28, FIG. 29, FIG. 30, FIG. 31, FIG. 32, or FIG. 33 do not implement a phase change. Accordingly, control information (u11) for controlling ON/OFF of cyclic delay diversity (CDD/CSD) described in Embodiment 7 is ignored in "multi-stream multi-modulated-signal transmission 5102". Note that in such cases, phase changer 209A and/or 209B need not be included in multi-stream multi-modulated-signal generator 5402 illustrated in FIG. 54.

In "multi-stream multi-modulated-signal transmission 5102", the switching between ON/OFF of operation for cyclically/regularly changing the phase change value on a per-symbol basis is possible. Accordingly phase changer 205A and/or 205B in, for example, FIG. 2, FIG. 18, FIG. 19, FIG. 20, FIG. 21, FIG. 22, FIG. 28, FIG. 29, FIG. 30, FIG. 31, FIG. 32, or FIG. 33 can control the ON/OFF of a phase change operation. Accordingly, the ON/OFF of the phase change operation by phase changer 205A and/or phase changer 205B is controlled via the control information (u10) for switching between ON/OFF of operation for cyclically/regularly changing the phase change value on a per-symbol basis described in Embodiment 7.

Moreover, in FIG. 51, in "single stream modulated signal transmission 5101", cyclic delay diversity (CDD/CSD) processing is always performed. In such cases, control information (u11) for controlling ON/OFF of cyclic delay diversity (CDD/CSD) described in Embodiment 7 is not necessary.

Example 1-2

In FIG. 51, in "multi-stream multi-modulated-signal transmission 5102", CDD/CSD processing is not performed, and in "multi-stream multi-modulated-signal transmission 5102", a single-carrier scheme or OFDM scheme can be selected.

Accordingly for example, phase changer 209A and/or phase changer 209B in, for example, FIG. 2, FIG. 18, FIG. 19, FIG. 20, FIG. 21, FIG. 22, FIG. 28, FIG. 29, FIG. 30, FIG. 31, FIG. 32, or FIG. 33 do not implement a phase change. Accordingly control information (u11) for controlling ON/OFF of cyclic delay diversity (CDD/CSD) described in Embodiment 7 is ignored in "multi-stream multi-modulated-signal transmission 5102". Note that in such cases, phase changer 209A and/or phase changer 209B need not be included in multi-stream multi-modulated-signal generator 5402 illustrated in FIG. 54.

In "multi-stream multi-modulated-signal transmission 5102", the switching between ON/OFF of operation for cyclically/regularly changing the phase change value on a per-symbol basis is possible. Accordingly phase changer 205A and/or 205B in, for example, FIG. 2, FIG. 18, FIG. 19, FIG. 20, FIG. 21, FIG. 22, FIG. 28, FIG. 29, FIG. 30, FIG. 31, FIG. 32, or FIG. 33 can control the ON/OFF of a phase change operation. Accordingly, the ON/OFF of the phase change operation by phase changer 205A and/or phase changer 205B is controlled via the control information (u10) for switching between ON/OFF of operation for cyclically/regularly changing the phase change value on a per-symbol basis described in Embodiment 7.

Moreover, in "single stream modulated signal transmission", cyclic delay diversity (CDD/CSD) processing is controlled via control information (u11) for controlling ON/OFF of cyclic delay diversity (CDD/CSD) described in Embodiment 7. However, as described above, when the base station or AP transmits a modulated signal in accordance with FIG. 51, FIG. 52, and/or FIG. 53, in "single stream modulated signal transmission 5101" in FIG. 51, control information (u11) for controlling ON/OFF of cyclic delay diversity (CDD/CSD) indicates "ON", and in "single stream modulated signal transmission 5101" in FIG. 51, CDD/CSD processing is performed.

Example 1-3

In FIG. 51, in "multi-stream multi-modulated-signal transmission 5102", CDD/CSD processing is performed, and in "multi-stream multi-modulated-signal transmission 5102", a single-carrier scheme or OFDM scheme can be selected.

Accordingly for example, phase changer 209A and/or phase changer 209B in, for example, FIG. 2, FIG. 18, FIG. 19, FIG. 20, FIG. 21, FIG. 22, FIG. 28, FIG. 29, FIG. 30, FIG. 31, FIG. 32, or FIG. 33 implements a phase change or performs CDD/CSD processing. Accordingly control information (u11) for controlling ON/OFF of cyclic delay diversity (CDD/CSD) described in Embodiment 7 is ignored in "multi-stream multi-modulated-signal transmission 5102".

In "multi-stream multi-modulated-signal transmission 5102", the switching between ON/OFF of operation for cyclically/regularly changing the phase change value on a per-symbol basis is possible. Accordingly phase changer 205A and/or 205B in, for example, FIG. 2, FIG. 18, FIG. 19, FIG. 20, FIG. 21, FIG. 22, FIG. 28, FIG. 29, FIG. 30, FIG. 31, FIG. 32, or FIG. 33 can control the ON/OFF of a phase change operation. Accordingly, the ON/OFF of the phase change operation by phase changer 205A and/or 205B is controlled via the control information (u10) for switching between ON/OFF of operation for cyclically/regularly changing the phase change value on a per-symbol basis described in Embodiment 7.

Moreover, in FIG. 51, in "single stream modulated signal transmission 5101", cyclic delay diversity (CDD/CSD) processing is always performed. In such cases, control information (u11) for controlling ON/OFF of cyclic delay diversity (CDD/CSD) described in Embodiment 7 is not necessary.

Example 1-4

In FIG. 51, in "multi-stream multi-modulated-signal transmission 5102", CDD/CSD processing is performed, and in "multi-stream multi-modulated-signal transmission 5102", a single-carrier scheme or OFDM scheme can be selected.

Accordingly for example, phase changer 209A and/or 209B in, for example, FIG. 2, FIG. 18, FIG. 19, FIG. 20, FIG. 21, FIG. 22, FIG. 28, FIG. 29, FIG. 30, FIG. 31, FIG. 32, or FIG. 33 implements a phase change or performs CDD/CSD processing. Accordingly control information (u11) for controlling ON/OFF of cyclic delay diversity (CDD/CSD) described in Embodiment 7 is ignored in "multi-stream multi-modulated-signal transmission 5102".

In "multi-stream multi-modulated-signal transmission 5102", the switching between ON/OFF of operation for cyclically/regularly changing the phase change value on a per-symbol basis is possible. Accordingly phase changer 205A and/or phase changer 205B in, for example, FIG. 2, FIG. 18, FIG. 19, FIG. 20, FIG. 21, FIG. 22, FIG. 28, FIG. 29, FIG. 30, FIG. 31, FIG. 32, or FIG. 33 can control the ON/OFF of a phase change operation. Accordingly the ON/OFF of the phase change operation by phase changer 205A and/or phase changer 205B is controlled via the control information (u10) for switching between ON/OFF of operation for cyclically/regularly changing the phase change value on a per-symbol basis described in Embodiment 7.

Moreover, in "single stream modulated signal transmission", cyclic delay diversity (CDD/CSD) processing is controlled via control information (u11) for controlling ON/OFF of cyclic delay diversity (CDD/CSD) described in Embodiment 7. However, as described above, when the base station or AP transmits a modulated signal in accordance with FIG. 51, FIG. 52, and/or FIG. 53, in "single stream modulated signal transmission 5101" in FIG. 51, control information (u11) for controlling ON/OFF of cyclic delay diversity (CDD/CSD) indicates "ON", and in "single stream modulated signal transmission 5101" in FIG. 51, CDD/CSD processing is performed.

Example 1-5

In FIG. 51, in "multi-stream multi-modulated-signal transmission 5102", whether CDD/CSD processing is performed or not is selectable, and in "multi-stream multi-modulated-signal transmission 5102", a single-carrier scheme or OFDM scheme can be selected.

Accordingly based on control information (u11) for controlling ON/OFF of cyclic delay diversity (CDD/CSD) described in Embodiment 7, phase changer 209A and/or 209B in, for example, FIG. 2, FIG. 18, FIG. 19, FIG. 20, FIG. 21, FIG. 22, FIG. 28, FIG. 29, FIG. 30, FIG. 31, FIG. 32, or FIG. 33 selects whether to (i) implement a phase change or perform CDD/CSD or (i) do not implement a phase change or do not perform CDD/CSD.

In "multi-stream multi-modulated-signal transmission 5102", the switching between ON/OFF of operation for cyclically/regularly changing the phase change value on a per-symbol basis is possible. Accordingly phase changer 205A and/or phase changer 205B in, for example, FIG. 2, FIG. 18, FIG. 19, FIG. 20, FIG. 21, FIG. 22, FIG. 28, FIG. 29, FIG. 30, FIG. 31, FIG. 32, or FIG. 33 can control the ON/OFF of a phase change operation. Accordingly the ON/OFF of the phase change operation by phase changer 205A and/or phase changer 205B is controlled via the control information (u10) for switching between ON/OFF of operation for cyclically/regularly changing the phase change value on a per-symbol basis described in Embodiment 7.

Moreover, in FIG. 51, in "single stream modulated signal transmission 5101", cyclic delay diversity (CDD/CSD) processing is always performed. In such cases, control information (u11) for controlling ON/OFF of cyclic delay diversity (CDD/CSD) described in Embodiment 7 is not necessary.

Example 1-6

In FIG. 51, in "multi-stream multi-modulated-signal transmission 5102", whether CDD/CSD processing is performed or not is selectable, and in "multi-stream multi-modulated-signal transmission 5102", a single-carrier scheme or OFDM scheme can be selected.

Accordingly based on control information (u11) for controlling ON/OFF of cyclic delay diversity (CDD/CSD) described in Embodiment 7, phase changer 209A and/or 209B in, for example, FIG. 2, FIG. 18, FIG. 19, FIG. 20, FIG. 21, FIG. 22, FIG. 28, FIG. 29, FIG. 30, FIG. 31, FIG. 32, or FIG. 33 selects whether to (i) implement a phase change or perform CDD/CSD or (i) do not implement a phase change or do not perform CDD/CSD.

In "multi-stream multi-modulated-signal transmission 5102", the switching between ON/OFF of operation for cyclically/regularly changing the phase change value on a per-symbol basis is possible. Accordingly phase changer 205A and/or phase changer 205B in, for example, FIG. 2, FIG. 18, FIG. 19, FIG. 20, FIG. 21, FIG. 22, FIG. 28, FIG. 29, FIG. 30, FIG. 31, FIG. 32, or FIG. 33 can control the ON/OFF of a phase change operation. Accordingly the ON/OFF of the phase change operation by phase changer 205A and/or phase changer 205B is controlled via the control information (u10) for switching between ON/OFF of operation for cyclically/regularly changing the phase change value on a per-symbol basis described in Embodiment 7.

Moreover, in "single stream modulated signal transmission", cyclic delay diversity (CDD/CSD) processing is controlled via control information (u11) for controlling ON/OFF of cyclic delay diversity (CDD/CSD) described in Embodiment 7. However, as described above, when the base station or AP transmits a modulated signal in accordance with FIG. 51, FIG. 52, and/or FIG. 53, in "single stream modulated signal transmission 5101" in FIG. 51, control information (u11) for controlling ON/OFF of cyclic delay diversity (CDD/CSD) indicates "ON", and in "single stream modulated signal transmission 5101" in FIG. 51, CDD/CSD processing is performed.

Second Example

FIG. 51 illustrates one example of a configuration of a modulated signal transmitted by a base station or AP according to this embodiment. As FIG. 51 has already been described, repeated description will be omitted.

FIG. 52 illustrates one example of a frame configuration when single stream modulated signal transmission 5101 in FIG. 51 is performed. As FIG. 52 has already been described, repeated description will be omitted.

FIG. 53 illustrates one example of a frame configuration when multi-stream multi-modulated-signal transmission 5102 in FIG. 51 is performed. As FIG. 53 has already been described, repeated description will be omitted.

Note that hereinafter, the scheme used for "single stream modulated signal transmission 5101" in FIG. 51 may be a single-carrier scheme, and the scheme used for "multi-stream multi-modulated-signal transmission 5102" in FIG. 51 may be a single-carrier scheme or a multi-carrier scheme. Note that in the following description, the multi-carrier scheme is exemplified as the OFDM scheme. However, note that the multi-carrier scheme used is not limited to the OFDM scheme.

One characteristic of this embodiment is that CDD/CSD as described in Supplemental Information 1 is implemented upon performing single stream modulated signal transmission 5101 using a single-carrier scheme in FIG. 51.

Then, upon performing multi-stream multi-modulated-signal transmission 5102 in FIG. 51, phase change is switched between implementation and non-implementation.

Next, operations performed by the transmission device in the base station will be described with reference to FIG. 56.

Figure 56:
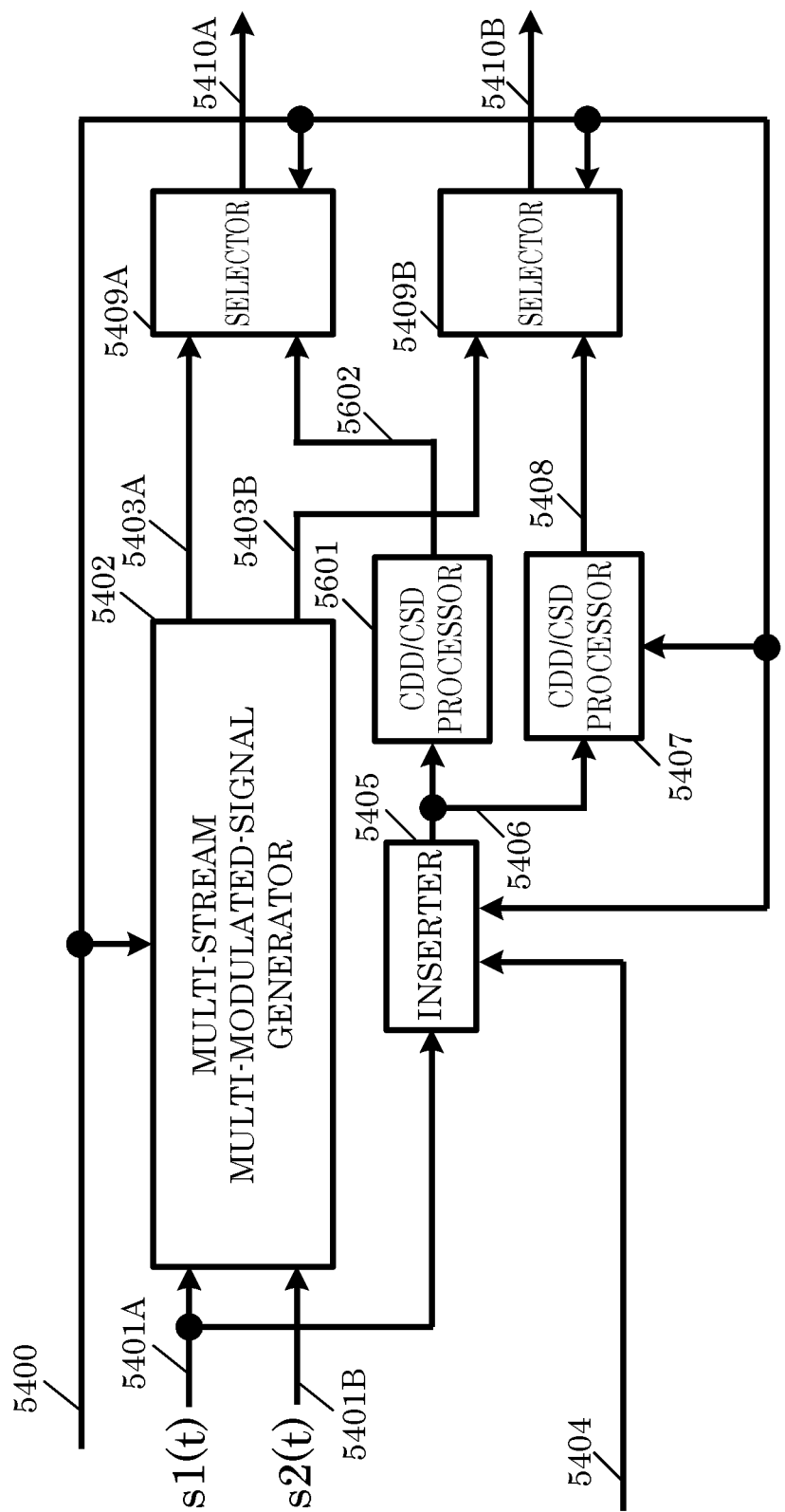
FIG. 56 illustrates one example of a configuration of a signal processor in a transmission device.

FIG. 56 illustrates one example of a configuration of signal processor 106 in, for example, the transmission device in the base station illustrated in FIG. 1 or FIG. 44. In FIG. 56, components that operate the same as in FIG. 54 share like reference marks. Accordingly repeated description will be omitted.

CDD/CSD processor 5601 receives inputs of single-carrier scheme signal 5406 in accordance with the frame configuration and control signal 5400, and when control signal 5400 indicates that it is time to perform single stream modulated signal transmission, performs CDD/CSD processing on single-carrier scheme signal 5406 in accordance with the frame configuration and outputs CDD/CSD processed signal 5602 in accordance with the frame configuration.

Selector 5409A receives inputs of signal 5403A, CDD/CSD processed signal 5602 in accordance with the frame configuration, and control signal 5400, and based on control signal 5400, selects either signal 5403A or CDD/CSD processed signal 5602 in accordance with the frame configuration in accordance with frame configuration, and outputs selected signal 5410A.

For example, in single stream modulated signal transmission 5101 in FIG. 51, selector 5409A outputs CDD/CSD processed signal 5602 in accordance with the frame configuration as selected signal 5410A, and in multi-stream multi-modulated-signal transmission 5102 in FIG. 51, selector 5409A outputs signal 5403A as selected signal 5410A.

FIG. 55 illustrates one example of a configuration of radio units 107_A 107_B in FIG. 1, FIG. 44. As FIG. 55 has already been described, repeated description will be omitted Example 2-1

In FIG. 51, in "multi-stream multi-modulated-signal transmission 5102", CDD/CSD processing is not performed, and in "multi-stream multi-modulated-signal transmission 5102", a single-carrier scheme or OFDM scheme can be selected.

Accordingly for example, phase changer 209A and/or 209B in, for example, FIG. 2, FIG. 18, FIG. 19, FIG. 20, FIG. 21, FIG. 22, FIG. 28, FIG. 29, FIG. 30, FIG. 31, FIG. 32, or FIG. 33 do not implement a phase change. Accordingly control information (u11) for controlling ON/OFF of cyclic delay diversity (CDD/CSD) described in Embodiment 7 is ignored in "multi-stream multi-modulated-signal transmission 5102". Note that in such cases, phase changer 209A and/or phase changer 209B need not be included in multi-stream multi-modulated-signal generator 5402 illustrated in FIG. 56.

In "multi-stream multi-modulated-signal transmission 5102", the switching between ON/OFF of operation for cyclically/regularly changing the phase change value on a per-symbol basis is possible. Accordingly phase changer 205A and/or phase changer 205B in, for example, FIG. 2, FIG. 18, FIG. 19, FIG. 20, FIG. 21, FIG. 22, FIG. 28, FIG. 29, FIG. 30, FIG. 31, FIG. 32, or FIG. 33 can control the ON/OFF of a phase change operation. Accordingly the ON/OFF of the phase change operation by phase changer 205A and/or phase changer 205B is controlled via the control information (u10) for switching between ON/OFF of operation for cyclically/regularly changing the phase change value on a per-symbol basis described in Embodiment 7.

Moreover, in FIG. 51, in "single stream modulated signal transmission 5101", cyclic delay diversity (CDD/CSD) processing is always performed. In such cases, control information (u11) for controlling ON/OFF of cyclic delay diversity (CDD/CSD) described in Embodiment 7 is not necessary.

Example 2-2

In FIG. 51, in "multi-stream multi-modulated-signal transmission 5102", CDD/CSD processing is not performed, and in "multi-stream multi-modulated-signal transmission 5102", a single-carrier scheme or OFDM scheme can be selected.

Accordingly for example, phase changer 209A and/or 209B in, for example, FIG. 2, FIG. 18, FIG. 19, FIG. 20, FIG. 21, FIG. 22, FIG. 28, FIG. 29, FIG. 30, FIG. 31, FIG. 32, or FIG. 33 do not implement a phase change. Accordingly control information (u11) for controlling ON/OFF of cyclic delay diversity (CDD/CSD) described in Embodiment 7 is ignored in "multi-stream multi-modulated-signal transmission 5102". Note that in such cases, phase changer 209A and/or phase changer 209B need not be included in multi-stream multi-modulated-signal generator 5402 illustrated in FIG. 54.

In "multi-stream multi-modulated-signal transmission 5102", the switching between ON/OFF of operation for cyclically/regularly changing the phase change value on a per-symbol basis is possible. Accordingly phase changer 205A and/or phase changer 205B in, for example, FIG. 2, FIG. 18, FIG. 19, FIG. 20, FIG. 21, FIG. 22, FIG. 28, FIG. 29, FIG. 30, FIG. 31, FIG. 32, or FIG. 33 can control the ON/OFF of a phase change operation. Accordingly the ON/OFF of the phase change operation by phase changer 205A and/or phase changer 205B is controlled via the control information (u10) for switching between ON/OFF of operation for cyclically/regularly changing the phase change value on a per-symbol basis described in Embodiment 7.

Moreover, in "single stream modulated signal transmission", cyclic delay diversity (CDD/CSD) processing is controlled via control information (u11) for controlling ON/OFF of cyclic delay diversity (CDD/CSD) described in Embodiment 7. However, as described above, when the base station or AP transmits a modulated signal in accordance with FIG. 51, FIG. 52, and/or FIG. 53, in "single stream modulated signal transmission 5101" in FIG. 51, control information (u11) for controlling ON/OFF of cyclic delay diversity (CDD/CSD) indicates "ON", and in "single stream modulated signal transmission 5101" in FIG. 51, CDD/CSD processing is performed.

Example 2-3

In FIG. 51, in "multi-stream multi-modulated-signal transmission 5102", CDD/CSD processing is performed, and in "multi-stream multi-modulated-signal transmission 5102", a single-carrier scheme or OFDM scheme can be selected.

Accordingly for example, phase changer 209A and/or 209B in, for example, FIG. 2, FIG. 18, FIG. 19, FIG. 20, FIG. 21, FIG. 22, FIG. 28, FIG. 29, FIG. 30, FIG. 31, FIG. 32, or FIG. 33 implements a phase change or performs CDD/CSD processing. Accordingly control information (u11) for controlling ON/OFF of cyclic delay diversity (CDD/CSD) described in Embodiment 7 is ignored in "multi-stream multi-modulated-signal transmission 5102".

In "multi-stream multi-modulated-signal transmission 5102", the switching between ON/OFF of operation for cyclically/regularly changing the phase change value on a per-symbol basis is possible. Accordingly phase changer 205A and/or 205B in, for example, FIG. 2, FIG. 18, FIG. 19, FIG. 20, FIG. 21, FIG. 22, FIG. 28, FIG. 29, FIG. 30, FIG. 31, FIG. 32, or FIG. 33 can control the ON/OFF of a phase change operation. Accordingly, the ON/OFF of the phase change operation by phase changer 205A and/or phase changer 205B is controlled via the control information (u10) for switching between ON/OFF of operation for cyclically/regularly changing the phase change value on a per-symbol basis described in Embodiment 7.

Moreover, in FIG. 51, in "single stream modulated signal transmission 5101", cyclic delay diversity (CDD/CSD) processing is always performed. In such cases, control information (u11) for controlling ON/OFF of cyclic delay diversity (CDD/CSD) described in Embodiment 7 is not necessary.

Example 2-4

In FIG. 51, in "multi-stream multi-modulated-signal transmission 5102", CDD/CSD processing is performed, and in "multi-stream multi-modulated-signal transmission 5102", a single-carrier scheme or OFDM scheme can be selected.

Accordingly for example, phase changer 209A and/or 209B in, for example, FIG. 2, FIG. 18, FIG. 19, FIG. 20, FIG. 21, FIG. 22, FIG. 28, FIG. 29, FIG. 30, FIG. 31, FIG. 32, or FIG. 33 implements a phase change or performs CDD/CSD processing. Accordingly, control information (u11) for controlling ON/OFF of cyclic delay diversity (CDD/CSD) described in Embodiment 7 is ignored in "multi-stream multi-modulated-signal transmission 5102".

In "multi-stream multi-modulated-signal transmission 5102", the switching between ON/OFF of operation for cyclically/regularly changing the phase change value on a per-symbol basis is possible. Accordingly phase changer 205A and/or 205B in, for example, FIG. 2, FIG. 18, FIG. 19, FIG. 20, FIG. 21, FIG. 22, FIG. 28, FIG. 29, FIG. 30, FIG. 31, FIG. 32, or FIG. 33 can control the ON/OFF of a phase change operation. Accordingly, the ON/OFF of the phase change operation by phase changer 205A and/or phase changer 205B is controlled via the control information (u10) for switching between ON/OFF of operation for cyclically/regularly changing the phase change value on a per-symbol basis described in Embodiment 7.

Moreover, in "single stream modulated signal transmission", cyclic delay diversity (CDD/CSD) processing is controlled via control information (u11) for controlling ON/OFF of cyclic delay diversity (CDD/CSD) described in Embodiment 7. However, as described above, when the base station or AP transmits a modulated signal in accordance with FIG. 51, FIG. 52, and/or FIG. 53, in "single stream modulated signal transmission 5101" in FIG. 51, control information (u11) for controlling ON/OFF of cyclic delay diversity (CDD/CSD) indicates "ON", and in "single stream modulated signal transmission 5101" in FIG. 51, CDD/CSD processing is performed.

Example 2-5

In FIG. 51, in "multi-stream multi-modulated-signal transmission 5102", whether CDD/CSD processing is performed or not is selectable, and in "multi-stream multi-modulated-signal transmission 5102", a single-carrier scheme or OFDM scheme can be selected.

Accordingly based on control information (u11) for controlling ON/OFF of cyclic delay diversity (CDD/CSD) described in Embodiment 7, phase changer 209A and/or 209B in, for example, FIG. 2, FIG. 18, FIG. 19, FIG. 20, FIG. 21, FIG. 22, FIG. 28, FIG. 29, FIG. 30, FIG. 31, FIG. 32, or FIG. 33 selects whether to (i) implement a phase change or perform CDD/CSD or (i) do not implement a phase change or do not perform CDD/CSD.

In "multi-stream multi-modulated-signal transmission 5102", the switching between ON/OFF of operation for cyclically/regularly changing the phase change value on a per-symbol basis is possible. Accordingly phase changer 205A and/or 205B in, for example, FIG. 2, FIG. 18, FIG. 19, FIG. 20, FIG. 21, FIG. 22, FIG. 28, FIG. 29, FIG. 30, FIG. 31, FIG. 32, or FIG. 33 can control the ON/OFF of a phase change operation. Accordingly, the ON/OFF of the phase change operation by phase changer 205A and/or 205B is controlled via the control information (u10) for switching between ON/OFF of operation for cyclically/regularly changing the phase change value on a per-symbol basis described in Embodiment 7.

Moreover, in FIG. 51, in "single stream modulated signal transmission 5101", cyclic delay diversity (CDD/CSD) processing is always performed. In such cases, control information (u11) for controlling ON/OFF of cyclic delay diversity (CDD/CSD) described in Embodiment 7 is not necessary.

Example 2-6

In FIG. 51, in "multi-stream multi-modulated-signal transmission 5102", whether CDD/CSD processing is performed or not is selectable, and in "multi-stream multi-modulated-signal transmission 5102", a single-carrier scheme or OFDM scheme can be selected.

Accordingly based on control information (u11) for controlling ON/OFF of cyclic delay diversity (CDD/CSD) described in Embodiment 7, phase changer 209A and/or 209B in, for example, FIG. 2, FIG. 18, FIG. 19, FIG. 20, FIG. 21, FIG. 22, FIG. 28, FIG. 29, FIG. 30, FIG. 31, FIG. 32, or FIG. 33 selects whether to (i) implement a phase change or perform CDD/CSD or (i) do not implement a phase change or do not perform CDD/CSD.

In "multi-stream multi-modulated-signal transmission 5102", the switching between ON/OFF of operation for cyclically/regularly changing the phase change value on a per-symbol basis is possible. Accordingly phase changer 205A and/or 205B in, for example, FIG. 2, FIG. 18, FIG. 19, FIG. 20, FIG. 21, FIG. 22, FIG. 28, FIG. 29, FIG. 30, FIG. 31, FIG. 32, or FIG. 33 can control the ON/OFF of a phase change operation. Accordingly, the ON/OFF of the phase change operation by phase changer 205A and/or 205B is controlled via the control information (u10) for switching between ON/OFF of operation for cyclically/regularly changing the phase change value on a per-symbol basis described in Embodiment 7.

Moreover, in "single stream modulated signal transmission", cyclic delay diversity (CDD/CSD) processing is controlled via control information (u11) for controlling ON/OFF of cyclic delay diversity (CDD/CSD) described in Embodiment 7. However, as described above, when the base station or AP transmits a modulated signal in accordance with FIG. 51, FIG. 52, and/or FIG. 53, in "single stream modulated signal transmission 5101" in FIG. 51, control information (u11) for controlling ON/OFF of cyclic delay diversity (CDD/CSD) indicates "ON", and in "single stream modulated signal transmission 5101" in FIG. 51, CDD/CSD processing is performed.

Third Example

Figure 57:
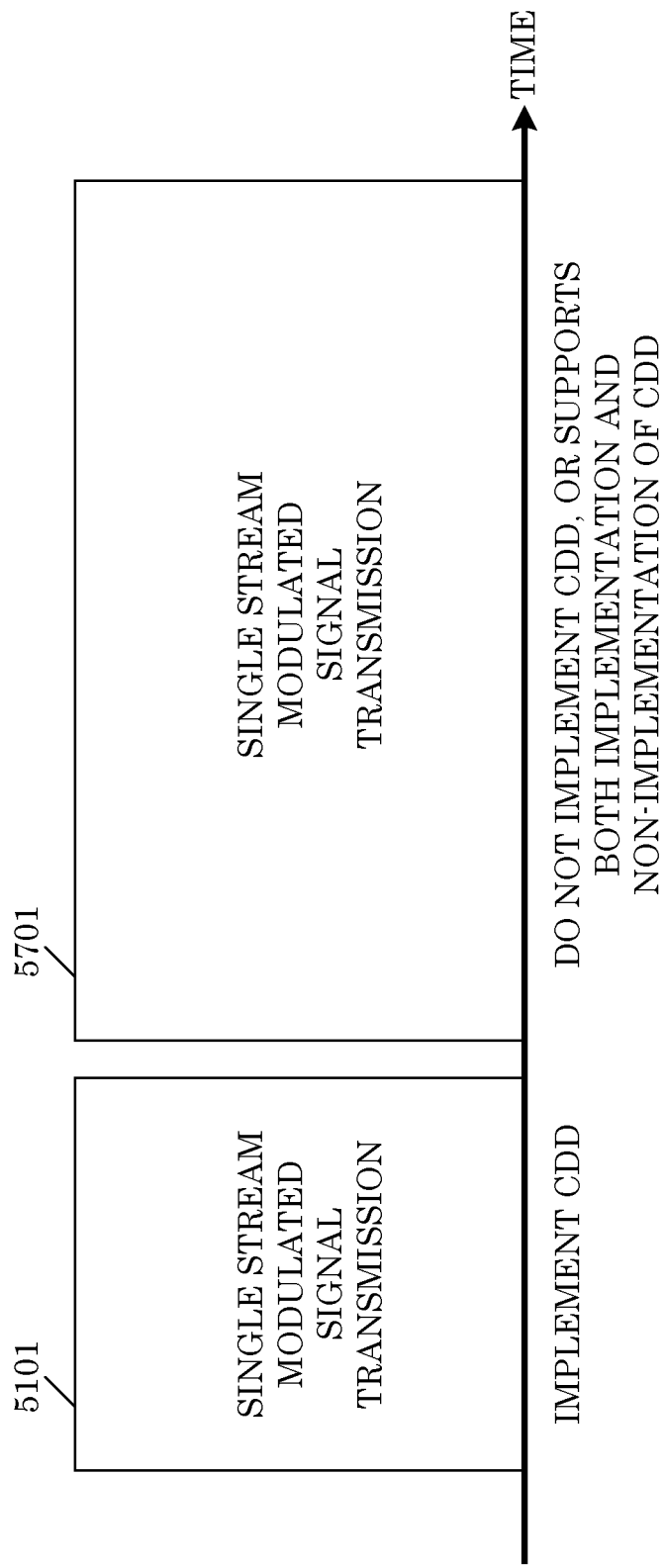
FIG. 57 illustrates one example of a frame configuration of a modulated signal.

FIG. 57 illustrates one example of a configuration of a modulated signal transmitted by a base station or AP according to this embodiment.

In FIG. 57, time is represented on the horizontal axis. Operations that are the same as in FIG. 51 share like reference marks. As illustrated in FIG. 57, the transmission device in the base station or AP performs "single stream modulated signal transmission 5101" and subsequently performs "single stream modulated signal transmission 5701".

FIG. 52 illustrates one example of a frame configuration when single stream modulated signal transmission 5101 in FIG. 57 is performed. As FIG. 52 has already been described, repeated description will be omitted.

Figure 58:
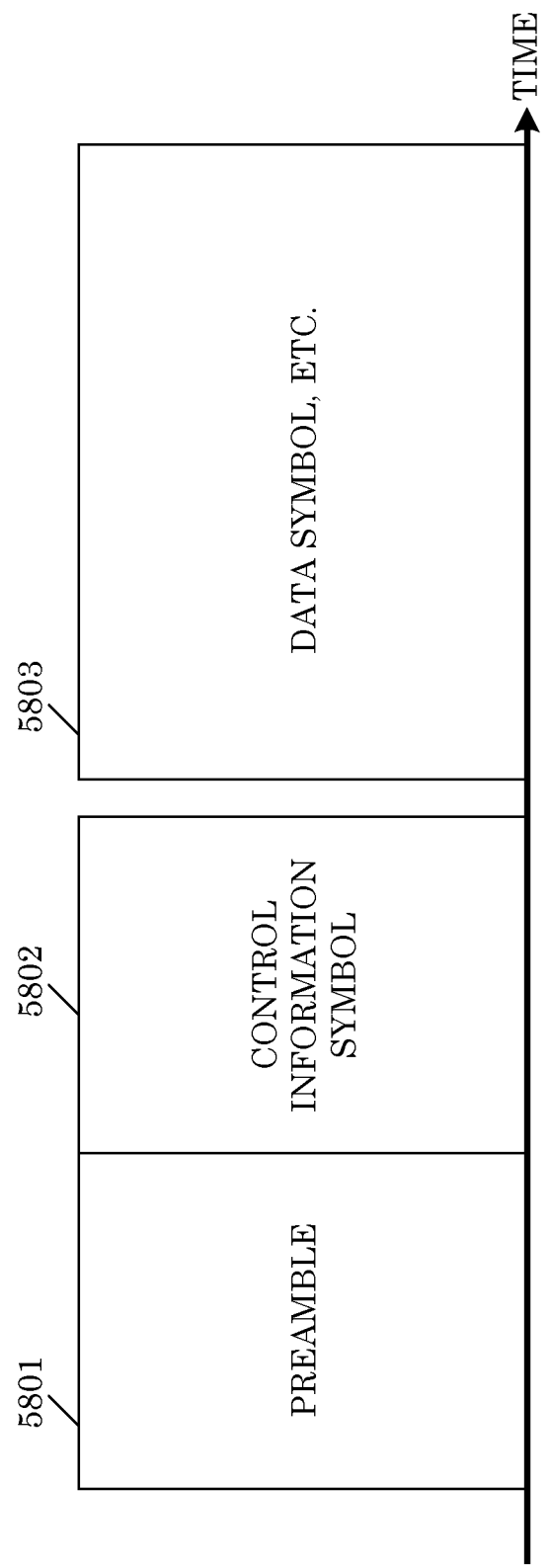
FIG. 58 illustrates one example of a frame configuration upon modulated signal transmission.

FIG. 58 illustrates one example of a frame configuration when single stream modulated signal transmission 5701 in FIG. 57 is performed.

In FIG. 58, time is represented on the horizontal axis. As illustrated in FIG. 58, the base station or AP transmits preamble 5801 and subsequently transmits control information symbol 5802, and subsequently transmits, for example, data symbol 5803. Note that preamble 5801, control information symbol, 5802, and, for example, data symbol 5803 are each transmitted via a single stream.

Preamble 5801 conceivably includes a symbol for the terminal, which is the communication partner of the base station or AP, to perform signal detection, time synchronization, frequency synchronization, frequency offset estimation, channel estimation, and/or frame synchronization. For example, preamble 5801 is conceivably a PSK scheme symbol.

Control information symbol 5802 is a symbol including, for example, information relating to the communications method of the modulated signal transmitted by the base station and AP and/or information required by the terminal to demodulate a data symbol. However, the information included in control information symbol 5802 is not limited to this example; control information symbol 5802 may include other control information.

Note that hereinafter, the scheme used for "single stream modulated signal transmission 5101" in FIG. 57 may be a single-carrier scheme, and the scheme used for "single stream modulated signal transmission 5701" in FIG. 57 may be a single-carrier scheme or a multi-carrier scheme. Note that in the following description, the multi-carrier scheme is exemplified as the OFDM scheme. However, note that the multi-carrier scheme used is not limited to the OFDM scheme.

In this embodiment, CDD/CSD as described in Supplemental Information 1 is implemented upon performing single stream modulated signal transmission 5101 using a single-carrier scheme in FIG. 51.

Example 3-1

In FIG. 57, in "single stream modulated signal transmission 5701", CDD/CSD processing is not performed, and in "single stream modulated signal transmission 5701", a single-carrier scheme or OFDM scheme can be selected.

When "single stream modulated signal transmission 5701" is performed, it is possible to select "multi-stream multi-modulated-signal transmission" instead of "single stream modulated signal transmission". Note that since "multi-stream multi-modulated-signal transmission" has already been described, repeated description will be omitted.

Next, operations performed by the transmission device in the base station will be described with reference to FIG. 54.

FIG. 54 illustrates one example of a configuration of signal processor 106 in, for example, the transmission device in the base station illustrated in FIG. 1 or FIG. 44. As the general operations illustrated in FIG. 54 have already been described, repeated description will be omitted.

In this example, in FIG. 57, when "single stream modulated signal transmission 5101" is performed, CDD/CSD processing is performed, and when "single stream modulated signal transmission 5701" is performed, CDD/CSD processing is not performed.

As the operations performed by inserter 5405 have already been described, repeated description will be omitted.

CDD/CSD unit 5407 switches the CDD/CSD processing ON and OFF based on control signal 5400. CDD/CSD unit 5407 knows the timing of the "single stream modulated signal transmission 5101" in FIG. 57 from information included in control signal 5400 indicating whether it is time to transmit a plurality of modulated signals for a plurality of streams or time to transmit a single stream modulated signal.

In such cases, CDD/CSD unit 5407 determines to perform cyclic delay diversity based on control information (u11) included in control signal 5400 for controlling ON/OFF of cyclic delay diversity (CDD/CSD) described in Embodiment 7. Accordingly when "single stream modulated signal transmission 5101" in FIG. 57 is performed, CDD/CSD unit 5407 performs signal processing for cyclic delay diversity and outputs CDD/CSD processed signal 5408 in accordance with the frame configuration.

CDD/CSD unit 5407 knows the timing of the "single stream modulated signal transmission 5701" in FIG. 57 from information included in the control signal indicating whether it is time to transmit a plurality of modulated signals for a plurality of streams or time to transmit a single stream modulated signal.

CDD/CSD unit 5407 determines to not perform cyclic delay diversity based on control information (u11) included in control signal 5400 for controlling ON/OFF of cyclic delay diversity (CDD/CSD) described in Embodiment 7. Accordingly when "single stream modulated signal transmission 5701" in FIG. 57 is performed, CDD/CSD unit 5407 does not perform signal processing for cyclic delay diversity, and, for example, does not output a signal.

Selector 5409A receives inputs of signal 5403A, signal 5406 in accordance with the frame configuration, and control signal 5400, and based on control signal 5400, selects either signal 5403A or signal 5406 in accordance with frame configuration, and outputs selected signal 5410A. Accordingly when "single stream modulated signal transmission 5101" is performed and when "single stream modulated signal transmission 5701" is performed, in either case, selector 5409A outputs signal 5406 in accordance with the frame configuration as selected signal 5410A.

When "single stream modulated signal transmission 5101" is performed, selector 5409B outputs CDD/CSD processed signal 5408 in accordance with the frame configuration as selected signal 5410B, and when "single stream modulated signal transmission 5701" is performed, for example, does not output selected signal 5410B.

As the operations performed by radio units 107_A, 107_B in the base station illustrated in FIG. 1, FIG. 44 have already been described, repeated description will be omitted.

Example 3-2

In FIG. 57, in "single stream modulated signal transmission 5701", whether CDD/CSD processing is performed or not is selectable, and in "single stream modulated signal transmission 5701", a single-carrier scheme or OFDM scheme can be selected.

When "single stream modulated signal transmission 5701" is performed, it is possible to select "multi-stream multi-modulated-signal transmission" instead of "single stream modulated signal transmission". Note that since "multi-stream multi-modulated-signal transmission" has already been described, repeated description will be omitted.

Next, operations performed by the transmission device in the base station will be described with reference to FIG. 54.

FIG. 54 illustrates one example of a configuration of signal processor 106 in, for example, the transmission device in the base station illustrated in FIG. 1 or FIG. 44. As the general operations illustrated in FIG. 54 have already been described, repeated description will be omitted.

In this example, in FIG. 57, when "single stream modulated signal transmission 5101" is performed, CDD/CSD processing is performed, and when "single stream modulated signal transmission 5701" is performed, whether to perform CDD/CSD processing or not is selectable.

As the operations performed by inserter 5405 have already been described, repeated description will be omitted.

CDD/CSD unit 5407 switches the CDD/CSD processing ON and OFF based on control signal 5400. CDD/CSD unit 5407 knows the timing of the "single stream modulated signal transmission 5101" in FIG. 57 from information included in control signal 5400 indicating whether it is time to transmit a plurality of modulated signals for a plurality of streams or time to transmit a single stream modulated signal.

In such cases, CDD/CSD unit 5407 determines to perform cyclic delay diversity based on control information (u11) included in control signal 5400 for controlling ON/OFF of cyclic delay diversity (CDD/CSD) described in Embodiment 7. Accordingly when "single stream modulated signal transmission 5101" in FIG. 57 is performed, CDD/CSD unit 5407 performs signal processing for cyclic delay diversity, and outputs CDD/CSD processed signal 5408 in accordance with the frame configuration.

CDD/CSD unit 5407 knows the timing of the "single stream modulated signal transmission 5701" in FIG. 57 from information included in the control signal indicating whether it is time to transmit a plurality of modulated signals for a plurality of streams or time to transmit a single stream modulated signal.

When "single stream modulated signal transmission 5701" is performed, CDD/CSD unit 5407 determines to not perform cyclic delay diversity based on control information (u11) included in control signal 5400 for controlling ON/OFF of cyclic delay diversity (CDD/CSD) described in Embodiment 7.

Accordingly when "single stream modulated signal transmission 5701" in FIG. 57 is performed, CDD/CSD unit 5407 does not perform signal processing for cyclic delay diversity, and, for example, does not output a signal.

Next, operations different from this example will be described.

CDD/CSD unit 5407 knows the timing of the "single stream modulated signal transmission 5701" in FIG. 57 from information included in the control signal indicating whether it is time to transmit a plurality of modulated signals for a plurality of streams or time to transmit a single stream modulated signal.

When "single stream modulated signal transmission 5701" is performed, CDD/CSD unit 5407 determines to perform cyclic delay diversity based on control information (u11) included in control signal 5400 for controlling (the ON/OFF of) cyclic delay diversity (CDD/CSD) described in Embodiment 7.

Accordingly when "single stream modulated signal transmission 5701" in FIG. 57 is performed, CDD/CSD unit 5407 performs signal processing for cyclic delay diversity and outputs CDD/CSD processed signal 5408 in accordance with the frame configuration.

Selector 5409A receives inputs of signal 5403A, signal 5406A in accordance with the frame configuration, and control signal 5400, and based on control signal 5400, selects either signal 5403A or signal 5406 in accordance with frame configuration, and outputs selected signal 5410A.

Accordingly when "single stream modulated signal transmission 5101" is performed and when "single stream modulated signal transmission 5701" is performed, in either case, selector 5409A outputs signal 5406 in accordance with the frame configuration as selected signal 5410A.

When "single stream modulated signal transmission 5101" is performed, selector 5409B outputs CDD/CSD processed signal 5408 in accordance with the frame configuration as selected signal 5410B.

When "single stream modulated signal transmission 5701" is performed, when selector 5409B determines to not perform CDD/CSD processing in "single stream modulated signal transmission 5701", selector 5409B, for example, does not output selected signal 5410B.

When "single stream modulated signal transmission 5701" is performed, when selector 5409B determines to perform CDD/CSD processing in "single stream modulated signal transmission 5701", selector 5409B outputs CDD/CSD processed signal 5408 in accordance with the frame configuration as selected signal 5410B.

As the operations performed by radio units 107_A, 107_B in the base station illustrated in FIG. 1, FIG. 44 have already been described, repeated description will be omitted.

As described above, control over whether to implement a phase change or not and control over whether to perform CDD/CSD or not based on, for example, the number of transmission streams and/or the transmission method can be done in an appropriate manner. This makes it possible to achieve an advantageous effect in which it is possible to improve data reception quality of the communication partner.

An advantageous characteristic is that, by performing CDD/CSD, the probability that data reception quality of the communication partner will improve increases, and, for example, when single stream transmission is performed, it is possible to effectively use the plurality of transmitting antennas of the transmission device. Another advantageous characteristic is that, when performing multi-stream transmission, based the propagation/communications environment and/or phase change support by the communication partner, for example, it is possible to achieve favorable data reception quality by controlling whether a phase change is implemented or not.

Note that although FIG. 54 is used as an example of a portion of the configuration of signal processor 106 illustrated in FIG. 1 and/or FIG. 44, the configurations illustrated in any one of FIG. 2, FIG. 18, FIG. 19, FIG. 20, FIG. 21, FIG. 22, FIG. 28, FIG. 29, FIG. 30, FIG. 31, FIG. 32, and FIG. 33 may be implemented.

For example, in the configurations illustrated in FIG. 2, FIG. 18, FIG. 19, FIG. 20, FIG. 21, FIG. 22, FIG. 28, FIG. 29, FIG. 30, FIG. 31, FIG. 32, and FIG. 33, when single stream transmission is performed, mapped signal 201B of s2(t) is nullified.

In weighting synthesizer 203, as precoding matrix F, for example, any of the following can be applied.

[MATH. 149]
$$F(i) = \begin{pmatrix} \beta & 0 \\ \beta & 0 \end{pmatrix} \quad \text{Equation (149)}$$

[MATH. 150]
$$F(i) = \begin{pmatrix} 0 & \beta \\ 0 & \beta \end{pmatrix} \quad \text{Equation (150)}$$

[MATH. 151]
$$F(i) = \begin{pmatrix} \alpha & 0 \\ \beta & 0 \end{pmatrix} \quad \text{Equation (151)}$$

[MATH. 152]
$$F(i) = \begin{pmatrix} 0 & \alpha \\ 0 & \beta \end{pmatrix} \quad \text{Equation (152)}$$

Note that a may be an actual number, and, alternatively may be an imaginary number. Note that B may be an actual number, and, alternatively may be an imaginary number. However, a is not zero, and B is not zero.

The above was described in terms of expressions, the signal may be split instead of implementing the weighting synthesis (calculation using a matrix) as per the expressions above.

In single stream cases, phase changers 205A, 205B do not implement a phase change. In other words, input signals are output as-is.

Moreover, in single stream cases, phase changers 209A, 209B may perform signal processing for CDD/CSD instead of implementing a phase change.

Embodiment A9

In Supplemental Information 4, for example, it is stated that phase changers may be included before and after weighting synthesizer 203 in the configurations illustrated in, for example, FIG. 2, FIG. 18, FIG. 19, FIG. 20, FIG. 21, FIG. 22, FIG. 28, FIG. 29, FIG. 30, FIG. 31, FIG. 32, and FIG. 33.

In this embodiment, supplemental information regarding this point will be given.

Figure 59:
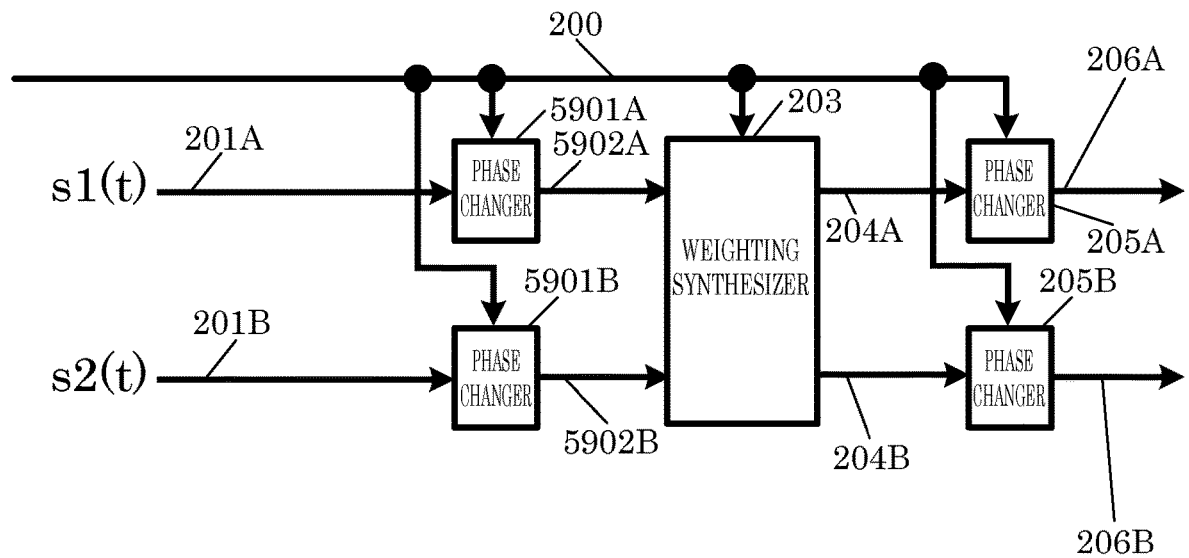
FIG. 59 illustrates one example of how phase changers are arranged before and after a weighting synthesizer.

A first example of how phase changers are arranged before and after weighting synthesizer 203 is illustrated in FIG. 59. In FIG. 59, components that operate the same as in, for example, FIG. 2 share like reference marks. Accordingly descriptions that overlap with, for example, FIG. 2 will be omitted. As illustrated in FIG. 59, phase changer 5901A receives inputs of mapped signal s1(t)201A and control signal 200, and, for example, based information on the phase change method included in control signal 200, implements a phase change on mapped signal s1(t)201A and outputs phase-changed signal 5902A.

Similarly phase changer 5901B receives inputs of mapped signal s2(t)201B and control signal 200, and, for example, based information on the phase change method included in control signal 200, implements a phase change on mapped signal s2(t)201B and outputs phase-changed signal 5902B.

Then, phase-changed signal 206A is input into inserter 207A illustrated in, for example, FIG. 2, and phase-changed signal 206B is input into inserter 207B illustrated in, for example, FIG. 2.

Figure 60:
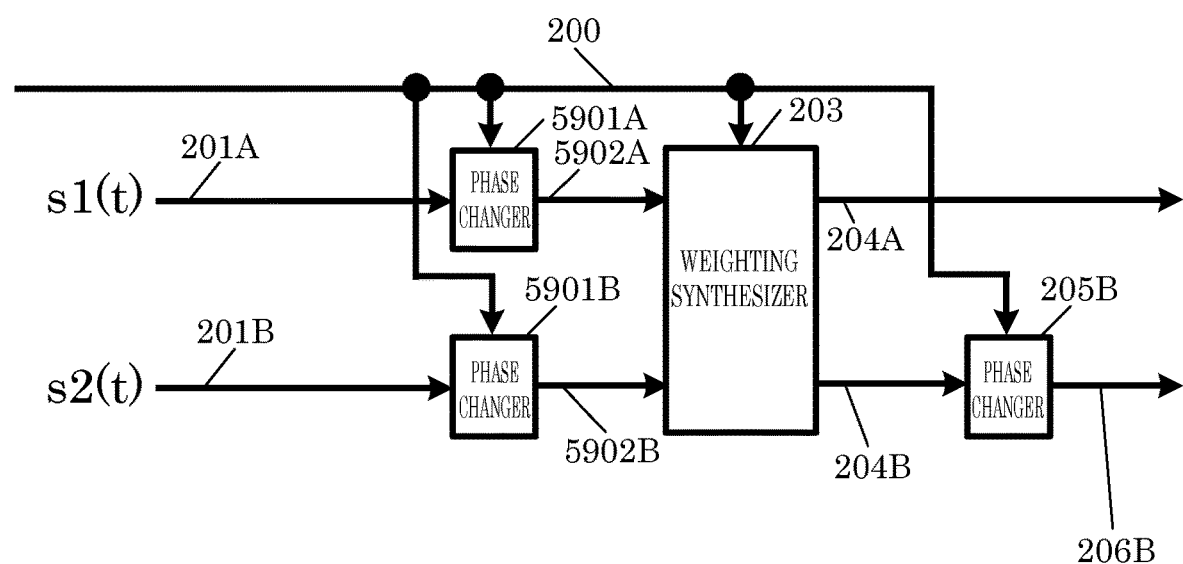
FIG. 60 illustrates one example of how phase changers are arranged before and after a weighting synthesizer.

A second example of how phase changers are arranged before and after weighting synthesizer 203 is illustrated in FIG. 60. In FIG. 60, components that operate the same as in, for example, FIG. 2 share like reference marks. Accordingly descriptions that overlap with, for example, FIG. 2 will be omitted. Moreover, components that operate the same as in FIG. 59 share like reference marks. Accordingly descriptions that overlap with FIG. 59 will be omitted.

Unlike FIG. 59, in FIG. 60, phase changer 205A is not inserted after weighting synthesizer 203; only phase changer 205B is inserted after weighting synthesizer 203.

Then, weighting synthesized signal 204A is input into inserter 207A illustrated in, for example, FIG. 2, and phase-changed signal 206B is input into inserter 207B illustrated in, for example, FIG. 2.

Figure 61:
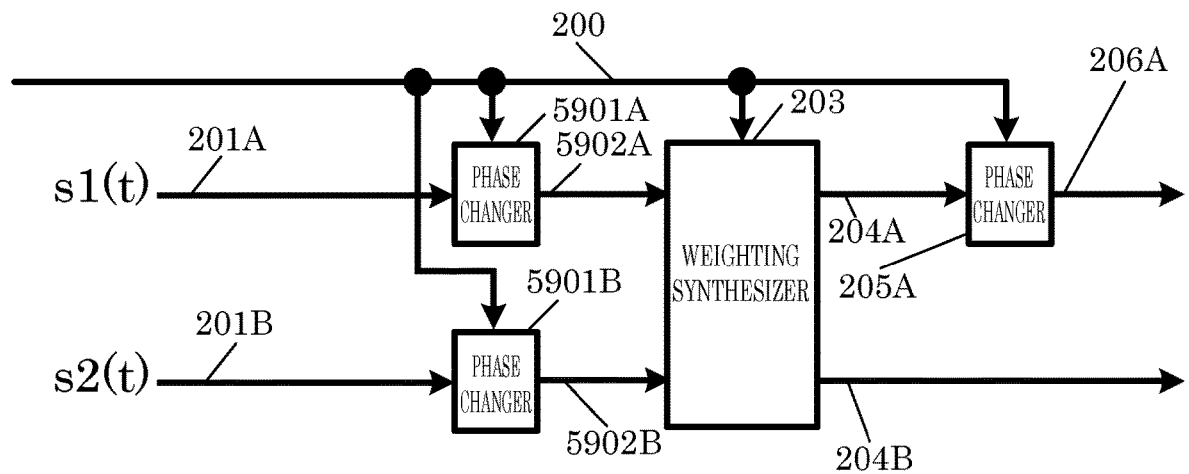
FIG. 61 illustrates one example of how phase changers are arranged before and after a weighting synthesizer.

A third example of how phase changers are arranged before and after weighting synthesizer 203 is illustrated in FIG. 61. In FIG. 61, components that operate the same as in, for example, FIG. 2 share like reference marks. Accordingly descriptions that overlap with, for example, FIG. 2 will be omitted. Moreover, components that operate the same as in FIG. 59 share like reference marks. Accordingly, descriptions that overlap with FIG. 59 will be omitted.

Unlike FIG. 60, in FIG. 61, phase changer 205A is inserted after weighting synthesizer 203 on the top line, but phase changer 205A is not present on the bottom line.

Then, phase-changed signal 206A is input into inserter 207A illustrated in, for example, FIG. 2, and weighting synthesized signal 204B is input into inserter 207B illustrated in, for example, FIG. 2.

Figure 62:
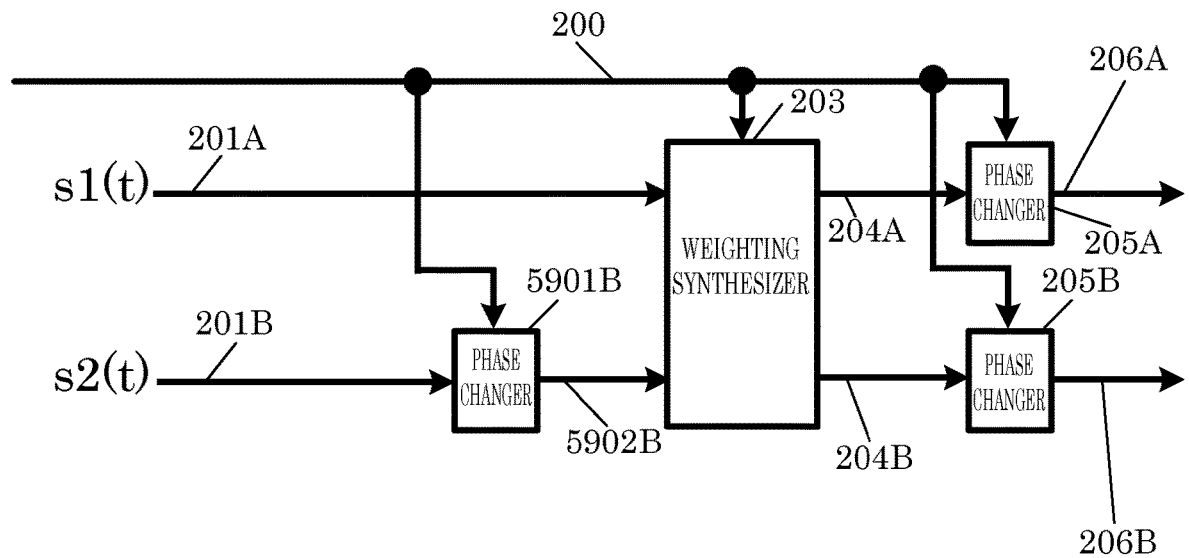
FIG. 62 illustrates one example of how phase changers are arranged before and after a weighting synthesizer.

A fourth example of how phase changers are arranged before and after weighting synthesizer 203 is illustrated in FIG. 62. In FIG. 62, components that operate the same as in, for example, FIG. 2 share like reference marks. Accordingly descriptions that overlap with, for example, FIG. 2 will be omitted. Moreover, components that operate the same as in FIG. 59 share like reference marks. Accordingly descriptions that overlap with FIG. 59 will be omitted.

Unlike FIG. 59, in FIG. 62, phase changer 5901B is inserted before the weighting synthesizer, but phase changer 5901A is not provided.

Then, phase-changed signal 206A is input into inserter 207A illustrated in, for example, FIG. 2, and phase-changed signal 206B is input into inserter 207B illustrated in, for example, FIG. 2.

Figure 63:
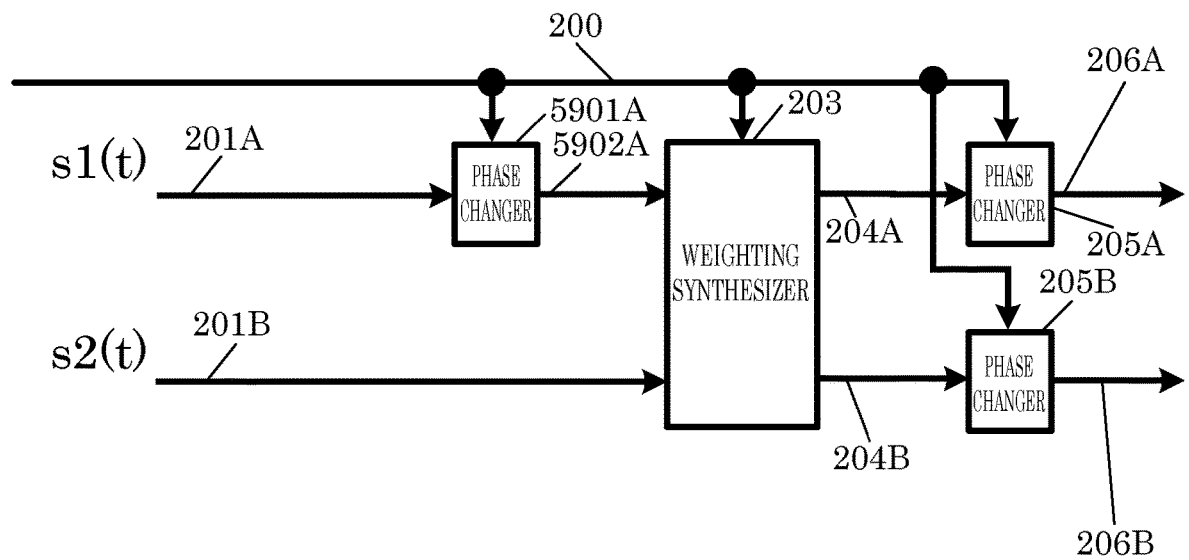
FIG. 63 illustrates one example of how phase changers are arranged before and after a weighting synthesizer.

A fifth example of how phase changers are arranged before and after weighting synthesizer 203 is illustrated in FIG. 63. In FIG. 63, components that operate the same as in, for example, FIG. 2 share like reference marks. Accordingly descriptions that overlap with, for example, FIG. 2 will be omitted. Moreover, components that operate the same as in FIG. 59 share like reference marks. Accordingly descriptions that overlap with FIG. 59 will be omitted.

Unlike FIG. 62, in FIG. 63, phase changer 5901A is inserted after weighting synthesizer 203 on the top line, but phase changer 5901B is not present on the bottom line.

Then, phase-changed signal 206A is input into inserter 207A illustrated in, for example, FIG. 2, and phase-changed signal 206B is input into inserter 207B illustrated in, for example, FIG. 2.

Figure 64:
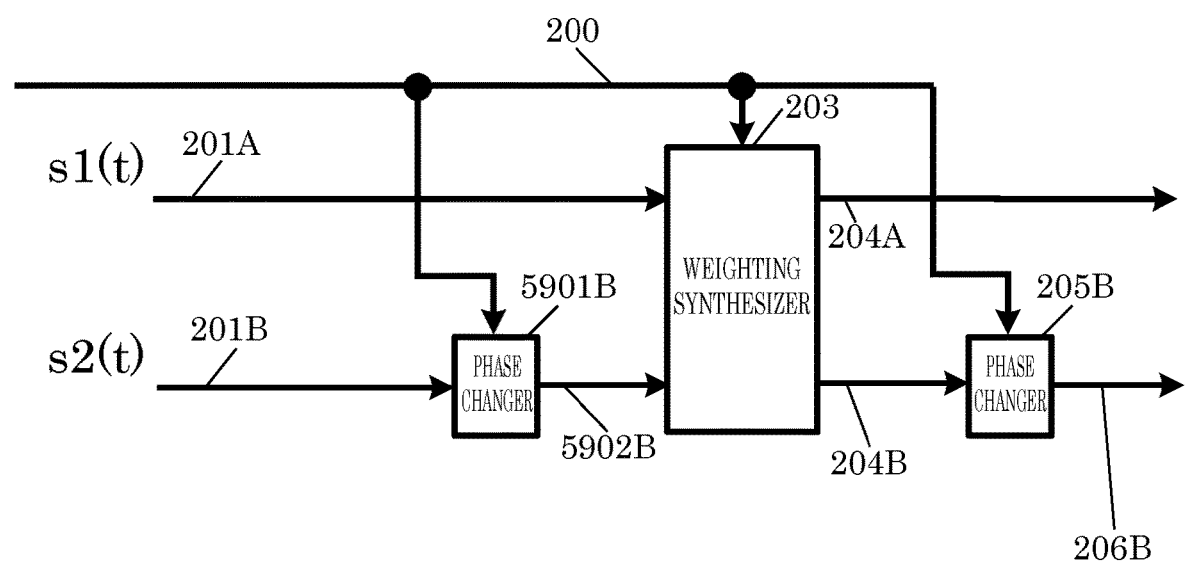
FIG. 64 illustrates one example of how phase changers are arranged before and after a weighting synthesizer.

A sixth example of how phase changers are arranged before and after weighting synthesizer 203 is illustrated in FIG. 64. In FIG. 64, components that operate the same as in, for example, FIG. 2 share like reference marks. Accordingly descriptions that overlap with, for example, FIG. 2 will be omitted. Moreover, components that operate the same as in FIG. 59 share like reference marks. Accordingly descriptions that overlap with FIG. 59 will be omitted.

In FIG. 64, phase changers 5901B, 205B are present before and after weighting synthesizer 203, on the bottom line, and phase changers 5901A, 205A are present before and after weighting synthesizer 203, on the top line.

Then, weighting synthesized signal 204A is input into inserter 207A illustrated in, for example, FIG. 2, and phase-changed signal 206B is input into inserter 207B illustrated in, for example, FIG. 2.

Figure 65:
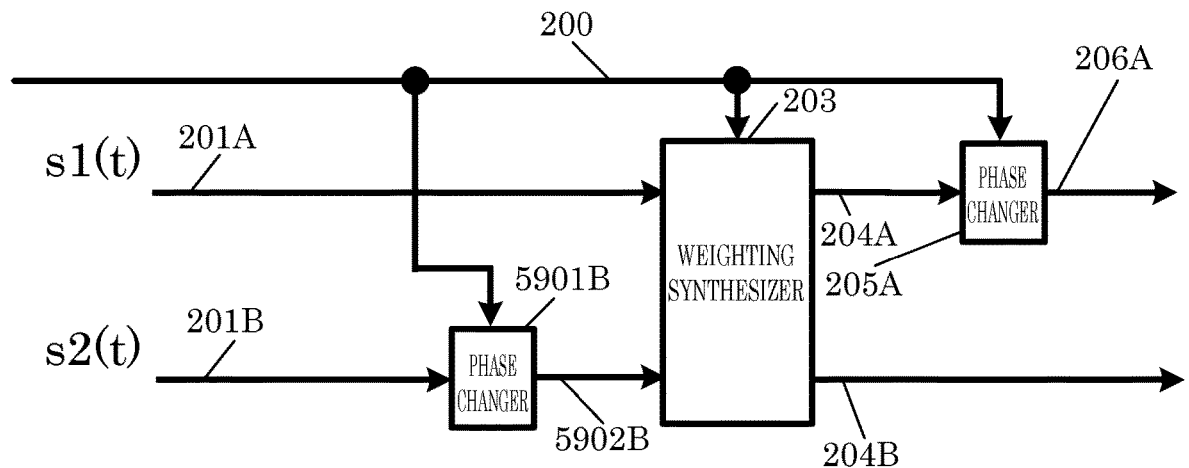
FIG. 65 illustrates one example of how phase changers are arranged before and after a weighting synthesizer.

A seventh example of how phase changers are arranged before and after weighting synthesizer 203 is illustrated in FIG. 65. In FIG. 65, components that operate the same as in, for example, FIG. 2 share like reference marks. Accordingly descriptions that overlap with, for example, FIG. 2 will be omitted. Moreover, components that operate the same as in FIG. 59 share like reference marks. Accordingly descriptions that overlap with FIG. 59 will be omitted.

In FIG. 65, phase changers 5901B, 205A are present before and after weighting synthesizer 203, on the bottom and top lines, respectively and phase changers 5901A, 205B are not present before and after weighting synthesizer 203, on the top and bottom lines, respectively.

Then, phase-changed signal 206A is input into inserter 207A illustrated in, for example, FIG. 2, and weighting synthesized signal 204B is input into inserter 207B illustrated in, for example, FIG. 2.

Figure 66:
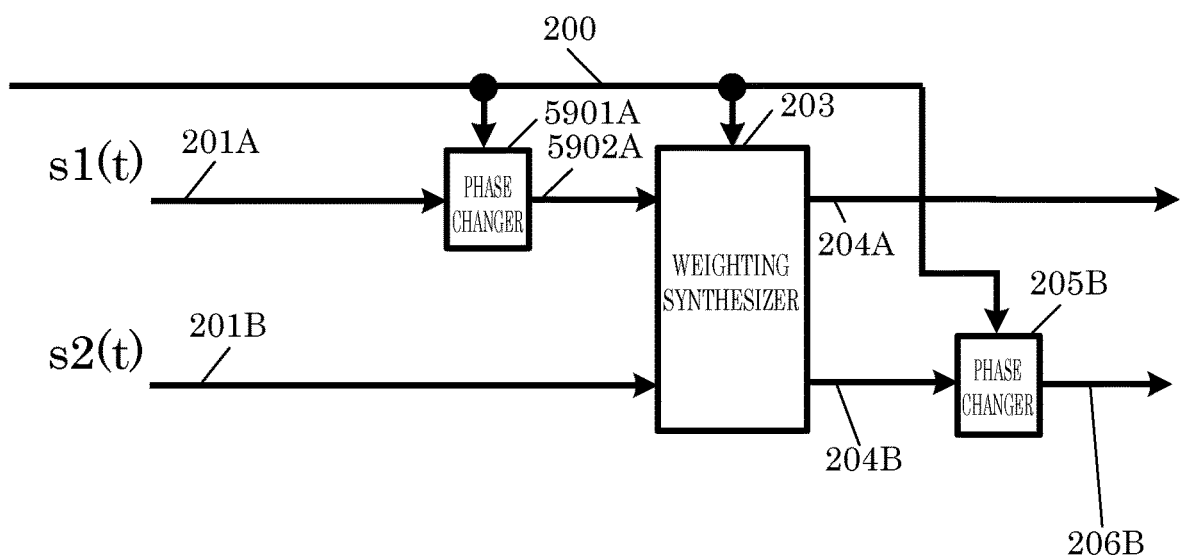
FIG. 66 illustrates one example of how phase changers are arranged before and after a weighting synthesizer.

An eighth example of how phase changers are arranged before and after weighting synthesizer 203 is illustrated in FIG. 66. In FIG. 66, components that operate the same as in, for example, FIG. 2 share like reference marks. Accordingly descriptions that overlap with, for example, FIG. 2 will be omitted. Moreover, components that operate the same as in FIG. 59 share like reference marks. Accordingly descriptions that overlap with FIG. 59 will be omitted.

In FIG. 66, phase changers 5901A, 205B are present before and after weighting synthesizer 203, on the top and bottom lines, respectively and phase changers 5901B, 205A are not present before and after weighting synthesizer 203, on the bottom and top lines, respectively.

Then, weighting synthesized signal 204B is input into inserter 207A illustrated in, for example, FIG. 2, and phase-changed signal 206B is input into inserter 207B illustrated in, for example, FIG. 2.

Figure 67:
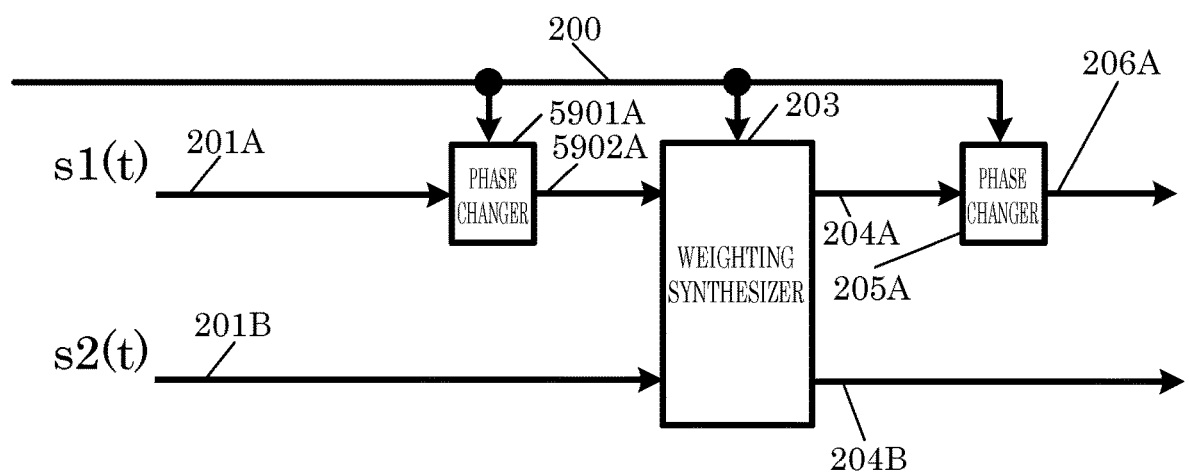
FIG. 67 illustrates one example of how phase changers are arranged before and after a weighting synthesizer.

A ninth example of how phase changers are arranged before and after weighting synthesizer 203 is illustrated in FIG. 67. In FIG. 67, components that operate the same as in, for example, FIG. 2 share like reference marks. Accordingly descriptions that overlap with, for example, FIG. 2 will be omitted. Moreover, components that operate the same as in FIG. 59 share like reference marks. Accordingly descriptions that overlap with FIG. 59 will be omitted.

In FIG. 67, phase changers 5901A, 205A are present before and after weighting synthesizer 203, on the top and bottom lines, respectively and phase changers 5901B, 205B are not present before and after weighting synthesizer 203, on the bottom and top lines, respectively.

Then, phase-changed signal 206A is input into inserter 207A illustrated in, for example, FIG. 2, and weighting synthesized signal 204B is input into inserter 207B illustrated in, for example, FIG. 2.

The embodiments described in the present disclosure may be implemented using these configurations.

The phase change method used by phase changers 5901A, 5901B, 205A, and 205B in FIG. 59, FIG. 60, FIG. 61, FIG. 62, FIG. 63, FIG. 64, FIG. 65, FIG. 66, and FIG. 67 is, for example, set according to control signal 200.

Embodiment A10

In this embodiment, an example of a robust communications method will be given.

First Example

Figure 68:
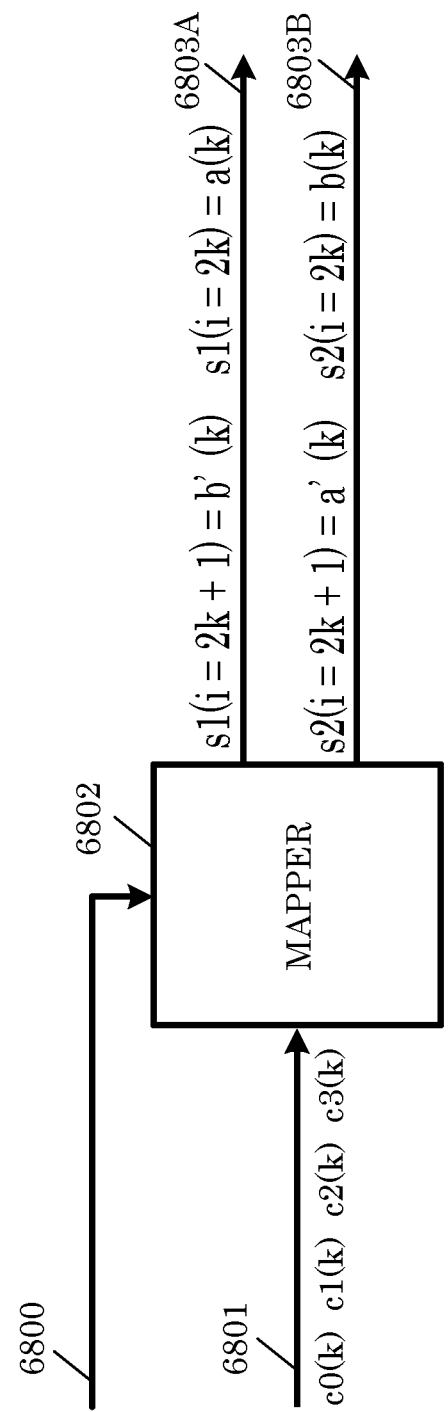
FIG. 68 illustrates operations performed by a mapper.

FIG. 68 illustrates operations performed by mapper 104 in FIG. 1 of a base station or AP.

Mapper 6802 receives inputs of encoded data 6801 and control signal 6800, and when a robust transmission method is specified by control signal 6800, performs mapping processes such as those described below, and outputs mapped signals 6803A, 6803B.

Note that control signal 6800 corresponds to control signal 100 in FIG. 1, encoded data 6801 corresponds to encoded data 103 in FIG. 1, mapper 6802 corresponds to mapper 104 in FIG. 1, mapped signal 6803A corresponds to baseband signal 105_1, which is a mapped signal, in FIG. 1, and mapped signal 6801B corresponds to baseband signal 105_2, which is a mapped signal, in FIG. 1.

For example, mapper 6802 receives inputs of bit c0(k), bit c1(k), bit c2(k), and bit c3(k) as encoded data 6801. Note that k is an integer that is greater than or equal to 0.

For example, mapper 6802 performs QPSK modulation on the following bits, so as to obtain mapped signal a(k) from bit c0(k) and bit c1(k), obtain mapped signal b(k) from bit c2(k) and bit c3(k), obtain mapped signal a'(k) from bit c0(k) and bit c1(k), and obtain mapped signal b'(k) from bit c2(k) and bit c3(k).

Mapped signal 6803A whose symbol number i=2k is represented as s1(i=2k), mapped signal 6803B whose symbol number i=2k is represented as s2(i=2k), mapped signal 6803A whose symbol number i=2k+1 is represented as s1(i=2k+1), and mapped signal 6803B whose symbol number i=2k+1 is represented as s2(i=2k+1).

s1(i=2k) is expressed as a(k), s2(i=2k) is expressed as b(k), s1(i=2k+1) is expressed as b'(k), and s2(i=2k+1) is expressed as a'(k).

Next, the relationship between "a(k) and a'(k)" and "b(k) and b'(k)" will be described.

Figure 69:
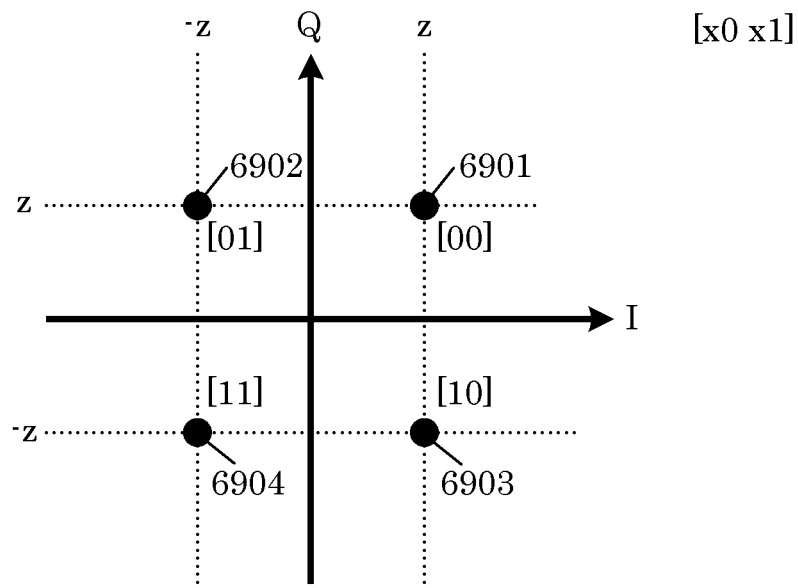
FIG. 69 illustrates one example of a signal point arrangement in mapping.

FIG. 69 illustrates an example of an distribution of signal points in an in-phase I-orthogonal Q plane when QPSK is used, and illustrates the relationship between signal points for the values for bit x0 and bit x1.

When bits [x0 x1]=[0 0] (i.e., when x0 is 0 and x1 is 0), in-phase component I is set to z and orthogonal component Q is set to z, which matches signal point 6901. Note that z is an actual number that is greater than 0.

When bits [x0 x1]=[0 1] (i.e., when x0 is 0 and x1 is 1), in-phase component I is set to −z and orthogonal component Q is set to z, which matches signal point 6902.

When bits [x0 x1]=[1 0] (i.e., when x0 is 1 and x1 is 0), in-phase component I is set to z and orthogonal component Q is set to −z, which matches signal point 6903.

When bits [x0 x1]=[1 1] (i.e., when x0 is 1 and x1 is 1), in-phase component I is set to −z and orthogonal component Q is set to −z, which matches signal point 6904.

Figure 70:
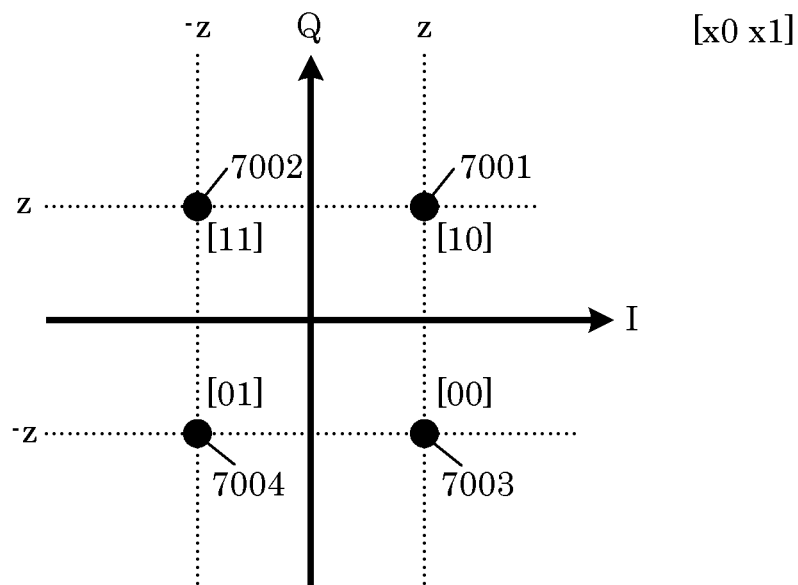
FIG. 70 illustrates one example of a signal point arrangement in mapping.

FIG. 70 illustrates an example of an distribution of signal points in an in-phase I-orthogonal Q plane when QPSK is used, and illustrates the relationship between signal points for the values for bit x0 and bit x1. However, "the relationship between signal points for the values for bit x0 and bit x1" in FIG. 69 and "the relationship between signal points for the values for bit x0 and bit x1" in FIG. 70 are different.

When bits [x0 x1]=[0 0] (i.e., when x0 is 0 and x1 is 0), in-phase component I is set to z and orthogonal component Q is set to −z, which matches signal point 7003. Note that z is an actual number that is greater than 0.

When bits [x0 x1]=[0 1] (i.e., when x0 is 1 and x1 is 1), in-phase component I is set to −z and orthogonal component Q is set to −z, which matches signal point 7004.

When bits [x0 x1]=[1 0] (i.e., when x0 is 0 and x1 is 0), in-phase component I is set to z and orthogonal component Q is set to z, which matches signal point 7001.

When bits [x0 x1]=[1 1] (i.e., when x0 is 1 and x1 is 1), in-phase component I is set to −z and orthogonal component Q is set to z, which matches signal point 7002.

Figure 71:
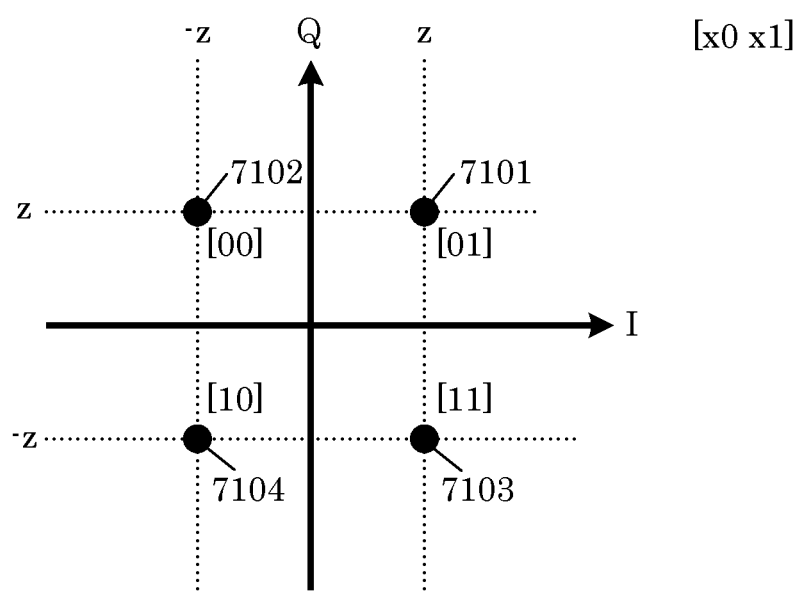
FIG. 71 illustrates one example of a signal point arrangement in mapping.

FIG. 71 illustrates an example of an distribution of signal points in an in-phase I-orthogonal Q plane when QPSK is used, and illustrates the relationship between signal points for the values for bit x0 and bit x1. However, "the relationship between signal points for the values for bit x0 and bit x1" in FIG. 71 is different from "the relationship between signal points for the values for bit x0 and bit x1" in FIG. 69 and "the relationship between signal points for the values for bit x0 and bit x1" in FIG. 70.

When bits [x0 x1]=[0 0] (i.e., when x0 is 0 and x1 is 0), in-phase component I is set to −z and orthogonal component Q is set to z, which matches signal point 7102. Note that z is an actual number that is greater than 0.

When bits [x0 x1]=[0 1] (i.e., when x0 is 0 and x1 is 1), in-phase component I is set to z and orthogonal component Q is set to z, which matches signal point 7101.

When bits [x0 x1]=[1 0] (i.e., when x0 is 1 and x1 is 0), in-phase component I is set to −z and orthogonal component Q is set to −z, which matches signal point 7104.

When bits [x0 x1]=[1 1] (i.e., when x0 is 1 and x1 is 1), in-phase component I is set to z and orthogonal component Q is set to −z, which matches signal point 7103.

Figure 72:
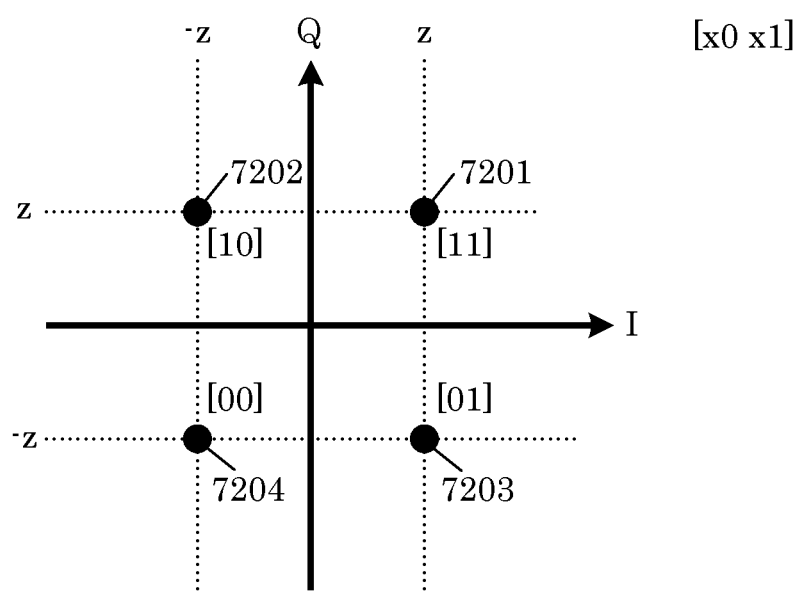
FIG. 72 illustrates one example of a signal point arrangement in mapping.

FIG. 72 illustrates an example of an distribution of signal points in an in-phase I-orthogonal Q plane when QPSK is used, and illustrates the relationship between signal points for the values for bit x0 and bit x1. However, "the relationship between signal points for the values for bit x0 and bit x1" in FIG. 72 is different from "the relationship between signal points for the values for bit x0 and bit x1" in FIG. 69, "the relationship between signal points for the values for bit x0 and bit x1" in FIG. 70, and "the relationship between signal points for the values for bit x0 and bit x1" in FIG. 71.

When bits [x0 x1]=[0 0] (i.e., when x0 is 0 and x1 is 0), in-phase component I is set to −z and orthogonal component Q is set to −z, which matches signal point 7204. Note that z is an actual number that is greater than 0.

When bits [x0 x1]=[0 1] (i.e., when x0 is 1 and x1 is 1), in-phase component I is set to z and orthogonal component Q is set to −z, which matches signal point 7203.

When bits [x0 x1]=[1 0] (i.e., when x0 is 1 and x1 is 0), in-phase component I is set to −z and orthogonal component Q is set to z, which matches signal point 7202.

When bits [x0 x1]=[1 1] (i.e., when x0 is 1 and x1 is 1), in-phase component I is set to z and orthogonal component Q is set to z, which matches signal point 7201.

For example, in order to generate a(k), the mapping illustrated in FIG. 69 is used. For example, c0(k)=0 and c1(k)=0, signal point 6901 is mapped using the mapping illustrated in FIG. 69, and signal point 6901 corresponds to a(k).

In order to generate a'(k), the mapping to be used is set to any one of the mapping illustrated in FIG. 69, the mapping illustrated in FIG. 70, the mapping illustrated in FIG. 71, or the mapping illustrated in FIG. 72.

<1>

In order to generate a'(k) when the mapping to be used is set to the mapping illustrated in FIG. 69, since c0(k)=0 and c1(k)=0, signal point 6901 is mapped using the mapping illustrated in FIG. 69, and signal point 6901 corresponds to a'(k).

<2>

In order to generate a'(k) when the mapping to be used is set to the mapping illustrated in FIG. 70, since c0(k)=0 and c1(k)=0, signal point 7003 is mapped using the mapping illustrated in FIG. 70, and signal point 7003 corresponds to a'(k).

<3>

In order to generate a'(k) when the mapping to be used is set to the mapping illustrated in FIG. 71, since c0(k)=0 and c1(k)=0, signal point 7102 is mapped using the mapping illustrated in FIG. 71, and signal point 7102 corresponds to a'(k).

<4>

In order to generate a'(k) when the mapping to be used is set to the mapping illustrated in FIG. 72, since c0(k)=0 and c1(k)=0, signal point 7204 is mapped using the mapping illustrated in FIG. 72, and signal point 7204 corresponds to a'(k).

As described above, the relationship between "bits (for example x0, x1) to be transmitted for generation of a(k) and the distribution of signal points" and the relationship between "bits (for example x0, x) to be transmitted for generation of a'(k) and the distribution of signal points" may be the same, and, alternatively may be different.

An example of a case in which the relationships are the same is one in which FIG. 69 is used to generate a(k) and FIG. 69 is used to generate a'(k) as described above.

Examples of cases in which the relationships are different include those in which FIG. 69 is used to generate a(k) and FIG. 70 is used to generate a'(k), FIG. 69 is used to generate a(k) and FIG. 71 is used to generate a'(k), and FIG. 69 is used to generate a(k) and FIG. 72 is used to generate a'(k), as described above.

Other examples include "the modulation scheme for generating a(k) and the modulation scheme for generating a'(k) are different" and "the signal point distribution in the in-phase I-orthogonal Q plane for generating a(k) and the signal point distribution in the in-phase I-orthogonal Q plane for generating a'(k) are different".

For example, as described above, QPSK may be used as the modulation scheme for generating a(k), and a signal point distribution modulation scheme other than QPSK may be used as the modulation scheme for generating a'(k). Moreover, the signal point distribution in the in-phase I-orthogonal Q plane for generating a(k) may be the distribution illustrated in FIG. 69, and the signal point distribution in the in-phase I-orthogonal Q plane for generating a'(k) may be a distribution different from that illustrated in FIG. 69.

Note that "different signal point distributions in the in-phase I-orthogonal Q plane" means, for example, when the coordinates of four signal points in the in-phase I-orthogonal Q plane for generating a(k) are distributed as illustrated in FIG. 69, at least one of the four signal points in the in-phase I-orthogonal Q plane for generating a'(k) does not overlap with any one of the four signal points in FIG. 69.

For example, in order to generate b(k), the mapping illustrated in FIG. 69 is used. For example, c2(k)=0 and c3(k)=0, signal point 6901 is mapped using the mapping illustrated in FIG. 69, and signal point 6901 corresponds to b(k).

In order to generate b'(k), the mapping to be used is set to any one of the mapping illustrated in FIG. 69, the mapping illustrated in FIG. 70, the mapping illustrated in FIG. 71, or the mapping illustrated in FIG. 72.

<5>

In order to generate b'(k) when the mapping to be used is set to the mapping illustrated in FIG. 69, since c2(k)=0 and c3(k)=0, signal point 6901 is mapped using the mapping illustrated in FIG. 69, and signal point 6901 corresponds to b'(k).

<6>

In order to generate b'(k) when the mapping to be used is set to the mapping illustrated in FIG. 70, since c2(k)=0 and c3(k)=0, signal point 7003 is mapped using the mapping illustrated in FIG. 70, and signal point 7003 corresponds to b'(k).

<7>

In order to generate b'(k) when the mapping to be used is set to the mapping illustrated in FIG. 71, since c2(k)=0 and c3(k)=0, signal point 7102 is mapped using the mapping illustrated in FIG. 71, and signal point 7102 corresponds to b'(k).

<8>

In order to generate b'(k) when the mapping to be used is set to the mapping illustrated in FIG. 72, since c2(k)=0 and c3(k)=0, signal point 7204 is mapped using the mapping illustrated in FIG. 72, and signal point 7204 corresponds to b'(k).

As described above, the relationship between "bits (for example x0, x1) to be transmitted for generation of b(k) and the distribution of signal points" and the relationship between "bits (for example x0, x1) to be transmitted for generation of b'(k) and the distribution of signal points" may be the same, and, alternatively may be different.

An example of a case in which the relationships are the same is one in which FIG. 69 is used to generate b(k) and FIG. 69 is used to generate b'(k) as described above.

Examples of cases in which the relationships are different include those in which FIG. 69 is used to generate b(k) and FIG. 70 is used to generate b'(k), FIG. 69 is used to generate b(k) and FIG. 71 is used to generate b'(k), and FIG. 69 is used to generate b(k) and FIG. 72 is used to generate b'(k), as described above.

Other examples include "the modulation scheme for generating b(k) and the modulation scheme for generating b'(k) are different" and "the signal point distribution in the in-phase I-orthogonal Q plane for generating b(k) and the signal point distribution in the in-phase I-orthogonal Q plane for generating b'(k) are different".

For example, as described above, QPSK may be used as the modulation scheme for generating b(k), and a signal point distribution modulation scheme other than QPSK may be used as the modulation scheme for generating b'(k). Moreover, the signal point distribution in the in-phase I-orthogonal Q plane for generating b(k) may be the distribution illustrated in FIG. 69, and the signal point distribution in the in-phase I-orthogonal Q plane for generating b'(k) may be a distribution different from that illustrated in FIG. 69.

Note that "different signal point distributions in the in-phase I-orthogonal Q plane" means, for example, when the coordinates of four signal points in the in-phase I-orthogonal Q plane for generating b(k) are distributed as illustrated in FIG. 69, at least one of the four signal points in the in-phase I-orthogonal Q plane for generating b'(k) does not overlap with any one of the four signal points in FIG. 69.

As described above, since mapped signal 6803A corresponds to mapped signal 105_1 in FIG. 1 and mapped signal 6803B corresponds to mapped signal 105_2 FIG. 1, mapped signal 6803A and mapped signal 6803B are applied with a phase change and/or weighting synthesis processing based on, for example, FIG. 2, FIG. 18, FIG. 19, FIG. 20, FIG. 21, FIG. 22, FIG. 28, FIG. 29, FIG. 30, FIG. 31, FIG. 32, FIG. 33, FIG. 59, FIG. 60, FIG. 61, FIG. 62, FIG. 63, FIG. 64, FIG. 65, FIG. 66, and FIG. 67, which correspond to signal processor 106 illustrated in FIG. 1.

Second Example

Hereinbefore, the transmission device included in the base station or AP was exemplified as having the configuration in FIG. 1, but here operations for when the transmission device in the base station or AP has the configuration illustrated in FIG. 73, which differs from FIG. 1, will be described.

Figure 73:
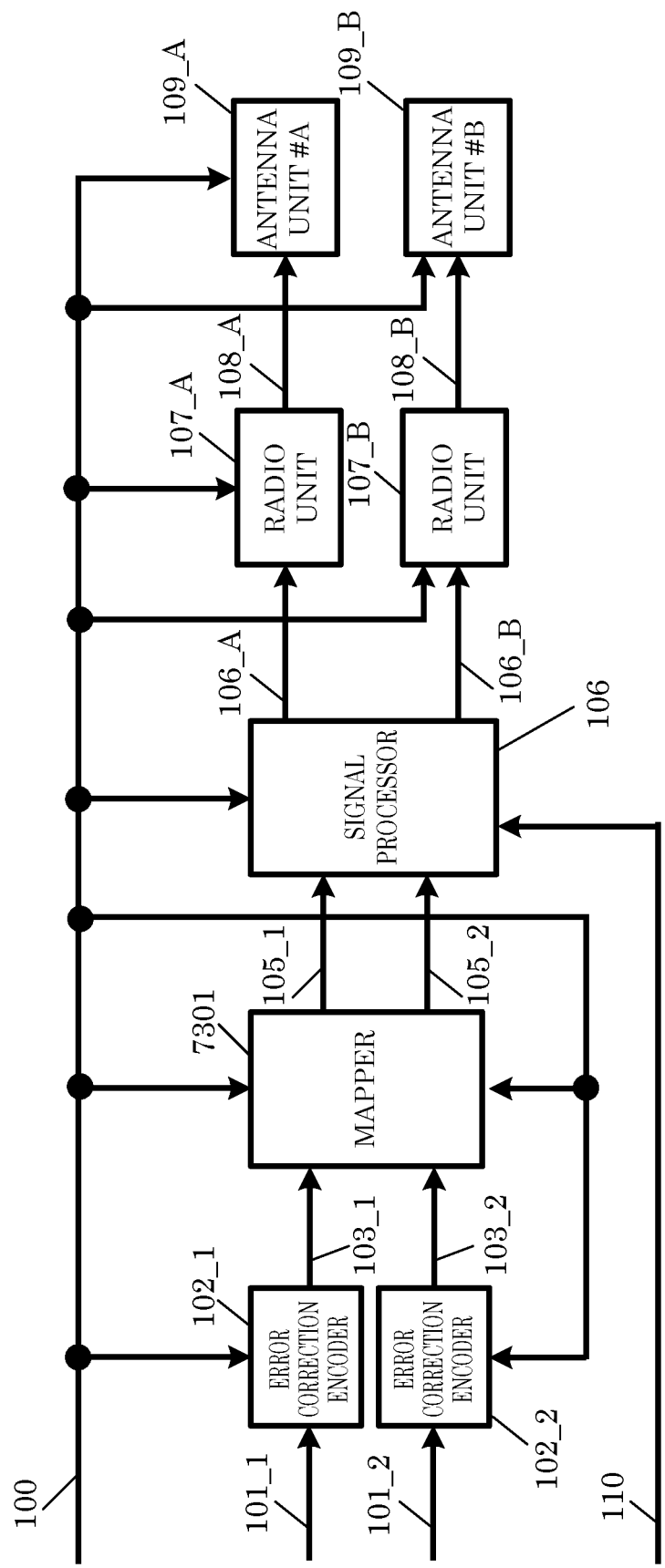
FIG. 73 illustrates one example of a configuration of a transmission device.

In FIG. 73, components that operate the same as in FIG. 1, FIG. 44 share like reference marks. Accordingly repeated description thereof will be omitted.

Mapper 7301 illustrated in FIG. 73 receives inputs of encoded data 103_1, 103_2, and control signal 100, performs mapping based on information relating to a mapping method included in control signal 100, and outputs mapped signals 1051, 105_2.

Figure 74:
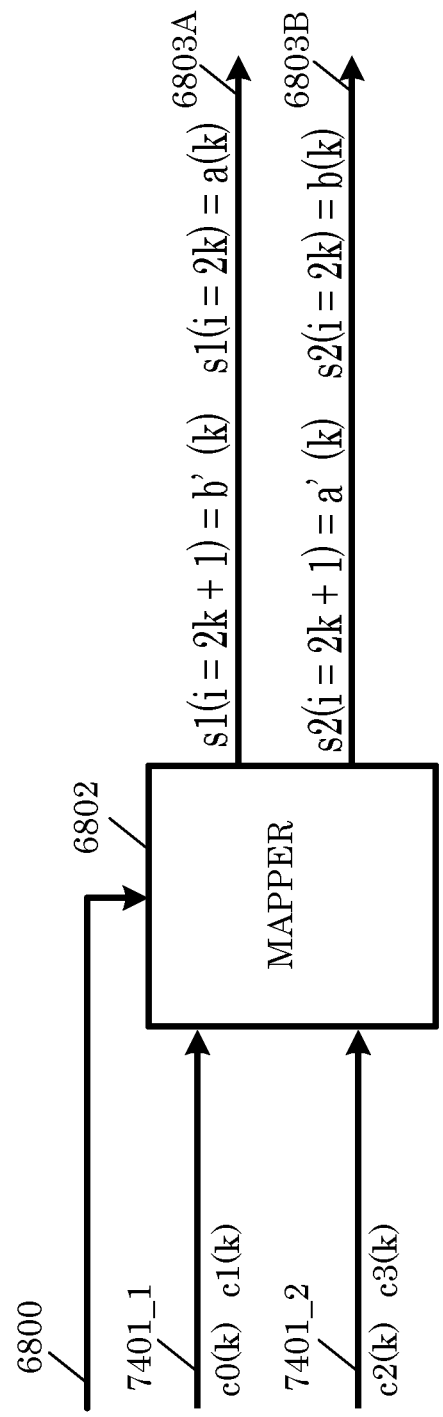
FIG. 74 illustrates operations performed by a mapper.

FIG. 74 illustrates operations performed by mapper 7301 illustrated in FIG. 73. In FIG. 74, components that operate the same as in FIG. 68 share like reference marks. Accordingly repeated description thereof will be omitted.

Mapper 6802 receives inputs of encoded data 7401_1, 7401_2, and control signal 6800, and when a robust transmission method is specified by control signal 6800, performs mapping processes such as those described below, and outputs mapped signals 6803A, 6803B.

Note that control signal 6800 corresponds to control signal 100 in FIG. 73, encoded data 7401_1 corresponds to encoded data 103_1 in FIG. 73, encoded data 7401_2 corresponds to encoded data 103_2 in FIG. 73, mapper 6802 corresponds to mapper 7301 in FIG. 73, mapped signal 6803A corresponds to mapped signal 105_1 in FIG. 73, and mapped signal 6801B corresponds to mapped signal 105_2 in FIG. 73.

For example, mapper 6802 receives inputs of bit c0(k) and bit c1(k) as encoded data 7401_1, and bit c2(k), and bit c3(k) as encoded data 7401_2. Note that k is an integer that is greater than or equal to 0.

Mapper 6802 performs QPSK modulation on the following bits, so as to obtain mapped signal a(k) from bit c0(k) and bit c1(k), obtain mapped signal b(k) from bit c2(k) and bit c3(k), obtain mapped signal a'(k) from bit c0(k) and bit c1(k), and obtain mapped signal b'(k) from bit c2(k) and bit c3(k).

Mapped signal 6803A whose symbol number i=2k is represented as s1(i=2k), mapped signal 6803B whose symbol number i=2k is represented as s2(i=2k), mapped signal 6803A whose symbol number i=2k+1 is represented as s1(i=2k+1), and mapped signal 6803B whose symbol number i=2k+1 is represented as s2(i=2k+1).

s1(i=2k) is expressed as a(k), s2(i=2k) is expressed as b(k), s1(i=2k+1) is expressed as b'(k), and s2(i=2k+1) is expressed as a'(k).

Next, the relationship between "a(k) and a'(k)" and "b(k) and b'(k)" will be described with reference to FIG. 69, FIG. 70, FIG. 71, and FIG. 72.

As described above, since mapped signal 6803A corresponds to mapped signal 105_1 in FIG. 73 and mapped signal 6803B corresponds to mapped signal 105_2 FIG. 73, mapped signal 6803A and mapped signal 6803B are applied with a phase change and/or weighting synthesis processing based on, for example, FIG. 2, FIG. 18, FIG. 19, FIG. 20, FIG. 21, FIG. 22, FIG. 28, FIG. 29, FIG. 30, FIG. 31, FIG. 32, FIG. 33, FIG. 59, FIG. 60, FIG. 61, FIG. 62, FIG. 63, FIG. 64, FIG. 65, FIG. 66, and FIG. 67, which correspond to signal processor 106 illustrated in FIG. 73.

Third Example

Hereinbefore, the transmission device included in the base station or AP was exemplified as having the configuration in FIG. 1, but here operations for when the transmission device in the base station or AP has the configuration illustrated in FIG. 73, which differs from FIG. 1, will be described.

In FIG. 73, components that operate the same as in FIG. 1, FIG. 44 share like reference marks. Accordingly, repeated description thereof will be omitted.

Mapper 7301 illustrated in FIG. 73 receives inputs of encoded data 103_1, 103_2, and control signal 100, performs mapping based on information relating to a mapping method included in control signal 100, and outputs mapped signals 1051, 105_2.

Figure 75:
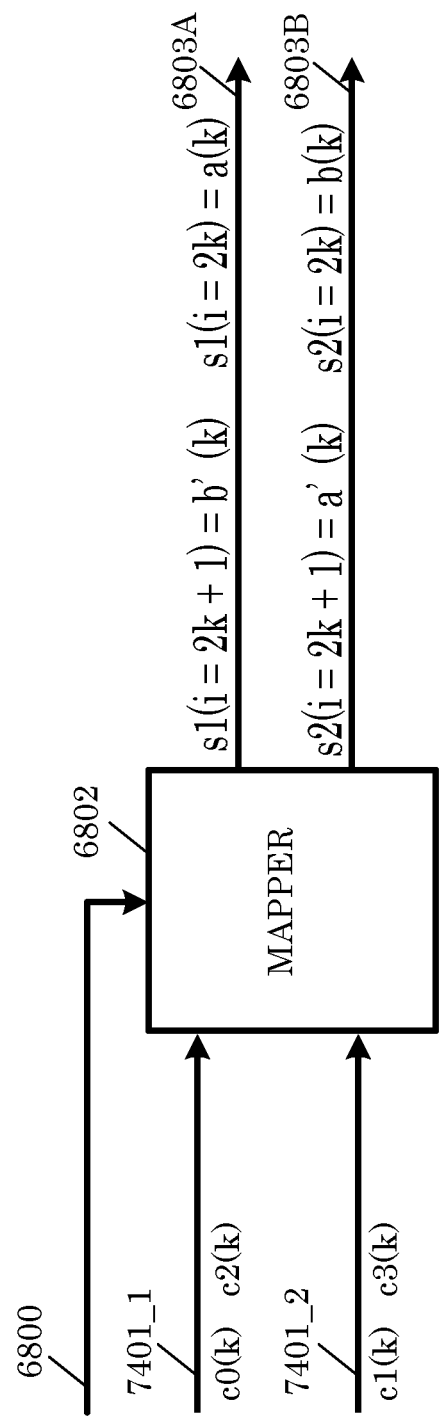
FIG. 75 illustrates operations performed by a mapper.

FIG. 75 illustrates operations performed by mapper 7301 illustrated in FIG. 73. In FIG. 75, components that operate the same as in FIG. 68, FIG. 74 share like reference marks. Accordingly, repeated description thereof will be omitted.

Mapper 6802 receives inputs of encoded data 7401_1, 7401_2, and control signal 6800, and when a robust transmission method is specified by control signal 6800, performs mapping processes such as those described below, and outputs mapped signals 6803A, 6803B.

Note that control signal 6800 corresponds to control signal 100 in FIG. 73, encoded data 7401_1 corresponds to encoded data 103_1 in FIG. 73, encoded data 7401_2 corresponds to encoded data 103_2 in FIG. 73, mapper 6802 corresponds to mapper 7301 in FIG. 73, mapped signal 6803A corresponds to mapped signal 105_1 in FIG. 73, and mapped signal 6801B corresponds to mapped signal 105_2 in FIG. 73.

For example, mapper 6802 receives inputs of bit c0(k) and bit c2(k) as encoded data 74011, and bit c1(k), and bit c3(k) as encoded data 7401_2. Note that k is an integer that is greater than or equal to 0.

Mapper 6802 performs QPSK modulation on the following bits, so as to obtain mapped signal a(k) from bit c0(k) and bit c1(k), obtain mapped signal b(k) from bit c2(k) and bit c3(k), obtain mapped signal a'(k) from bit c0(k) and bit c1(k), and obtain mapped signal b'(k) from bit c2(k) and bit c3(k).

Mapped signal 6803A whose symbol number i=2k is represented as s1(i=2k), mapped signal 6803B whose symbol number i=2k is represented as s2(i=2k), mapped signal 6803A whose symbol number i=2k+1 is represented as s1(i=2k+1), and mapped signal 6803B whose symbol number i=2k+1 is represented as s2(i=2k+1).

s1(i=2k) is expressed as a(k), s2(i=2k) is expressed as b(k), s1(i=2k+1) is expressed as b'(k), and s2(i=2k+1) is expressed as a'(k).

Next, the relationship between "a(k) and a'(k)" and "b(k) and b'(k)" will be described with reference to FIG. 69, FIG. 70, FIG. 71, and FIG. 72.

As described above, since mapped signal 6803A corresponds to mapped signal 105_1 in FIG. 73 and mapped signal 6803B corresponds to mapped signal 105_2 FIG. 73, mapped signal 6803A and mapped signal 6803B are applied with a phase change and/or weighting synthesis processing based on, for example, FIG. 2, FIG. 18, FIG. 19, FIG. 20, FIG. 21, FIG. 22, FIG. 28, FIG. 29, FIG. 30, FIG. 31, FIG. 32, FIG. 33, FIG. 59, FIG. 60, FIG. 61, FIG. 62, FIG. 63, FIG. 64, FIG. 65, FIG. 66, and FIG. 67, which correspond to signal processor 106 illustrated in FIG. 73.

Fourth Example

Figure 76:
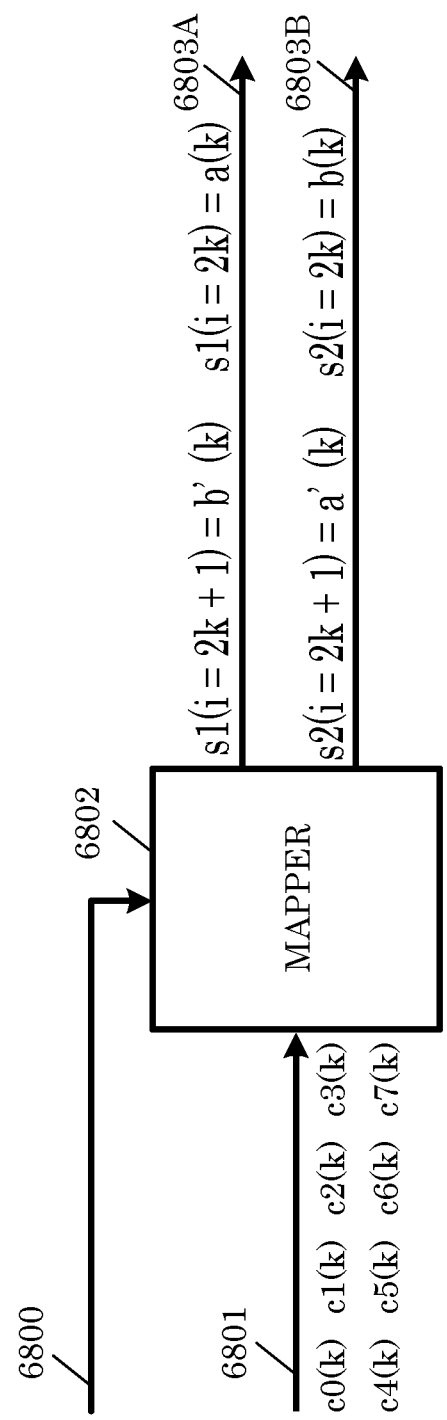
FIG. 76 illustrates operations performed by a mapper.

FIG. 76 illustrates operations performed by mapper 104 in FIG. 1 of a base station or AP. In FIG. 76, components that operate the same as in FIG. 68 share like reference marks.

Mapper 6802 receives inputs of encoded data 6801 and control signal 6800, and when a robust transmission method is specified by control signal 6800, performs mapping processes such as those described below, and outputs mapped signals 6803A, 6803B.

Note that control signal 6800 corresponds to control signal 100 in FIG. 1, encoded data 6801 corresponds to encoded data 103 in FIG. 1, mapper 6802 corresponds to mapper 104 in FIG. 1, mapped signal 6803A corresponds to mapped signal 105_1 in FIG. 1, and mapped signal 6801B corresponds to mapped signal 105_2 in FIG. 1.

For example, mapper 6802 receives inputs of bit c0(k), bit c1(k), bit c2(k), bit c3(k), bit c4(k), bit c5(k), bit c6(k), and bit c7(k) as encoded data 6801. Note that k is an integer that is greater than or equal to 0.

Mapper 6802 performs a modulation using a modulation scheme having 16 signal points, such as 16QAM, on the following bits, so as to obtain mapped signal a(k) from bit c0(k), bit c1(k), bit c2(k), and bit c3(k), obtain mapped signal b(k) from bit c4(k), bit c5(k), bit c6(k), and bit c7(k), obtain mapped signal a'(k) from bit c0(k), bit c1(k), bit c2(k), and bit c3(k), and obtain mapped signal b'(k) from bit c4(k), bit c5(k), bit c6(k), and bit c7(k).

Mapped signal 6803A whose symbol number i=2k is represented as s1(i=2k), mapped signal 6803B whose symbol number i=2k is represented as s2(i=2k), mapped signal 6803A whose symbol number i=2k+1 is represented as s1(i=2k+1), and mapped signal 6803B whose symbol number i=2k+1 is represented as s2(i=2k+1).

s1(i=2k) is expressed as a(k), s2(i=2k) is expressed as b(k), s1(i=2k+1) is expressed as b'(k), and s2(i=2k+1) is expressed as a'(k).

Regarding the relationship between "a(k) and a'(k)" and "b(k) and b'(k)", as described above, for example, the relationship between "bits (for example x0, x1, x2, x3, since there are 16 signal points) to be transmitted for generation of a(k) and the distribution of signal points" and the relationship between "bits (for example x0 x1, x2, x3) to be transmitted for generation of a'(k) and the distribution of signal points" may be the same, and, alternatively may be different.

Other examples include "the modulation scheme for generating a(k) and the modulation scheme for generating a'(k) are different" and "the signal point distribution in the in-phase I-orthogonal Q plane for generating a(k) and the signal point distribution in the in-phase I-orthogonal Q plane for generating a'(k) are different".

Note that "different signal point distributions in the in-phase I-orthogonal Q plane" means, for example, when the coordinates of 16 signal points in the in-phase I-orthogonal Q plane for generating a(k), at least one of the 16 signal points in the in-phase I-orthogonal Q plane for generating a'(k) does not overlap with any one of the 16 signal points in the in-phase I-orthogonal Q plane for generating a(k).

Regarding the relationship between "a(k) and a'(k)" and "b(k) and b'(k)", as described above, for example, the relationship between "bits (for example x0, x1, x2, x3, since there are 16 signal points) to be transmitted for generation of b(k) and the distribution of signal points" and the relationship between "bits (for example x0 x1, x2, x3) to be transmitted for generation of b'(k) and the distribution of signal points" may be the same, and, alternatively may be different.

Other examples include "the modulation scheme for generating b(k) and the modulation scheme for generating b'(k) are different" and "the signal point distribution in the in-phase I-orthogonal Q plane for generating b(k) and the signal point distribution in the in-phase I-orthogonal Q plane for generating b'(k) are different".

Note that "different signal point distributions in the in-phase I-orthogonal Q plane" means, for example, when the coordinates of 16 signal points in the in-phase I-orthogonal Q plane for generating b(k), at least one of the 16 signal points in the in-phase I-orthogonal Q plane for generating b'(k) does not overlap with any one of the 16 signal points in the in-phase I-orthogonal Q plane for generating b(k).

As described above, since mapped signal 6803A corresponds to mapped signal 105_1 in FIG. 1 and mapped signal 6803B corresponds to mapped signal 105_2 FIG. 1, mapped signal 6803A and mapped signal 6803B are applied with a phase change and/or weighting synthesis processing based on, for example, FIG. 2, FIG. 18, FIG. 19, FIG. 20, FIG. 21, FIG. 22, FIG. 28, FIG. 29, FIG. 30, FIG. 31, FIG. 32, FIG. 33, FIG. 59, FIG. 60, FIG. 61, FIG. 62, FIG. 63, FIG. 64, FIG. 65, FIG. 66, and FIG. 67, which correspond to signal processor 106 illustrated in FIG. 1.

Fifth Example

Hereinbefore, the transmission device included in the base station or AP was exemplified as having the configuration in FIG. 1, but here operations for when the transmission device in the base station or AP has the configuration illustrated in FIG. 73, which differs from FIG. 1, will be described.

In FIG. 73, components that operate the same as in FIG. 1, FIG. 44 share like reference marks. Accordingly repeated description thereof will be omitted.

Mapper 7301 illustrated in FIG. 73 receives inputs of encoded data 103_1, 103_2, and control signal 100, performs mapping based on information relating to a mapping method included in control signal 100, and outputs mapped signals 1051, 105_2.

Figure 77:
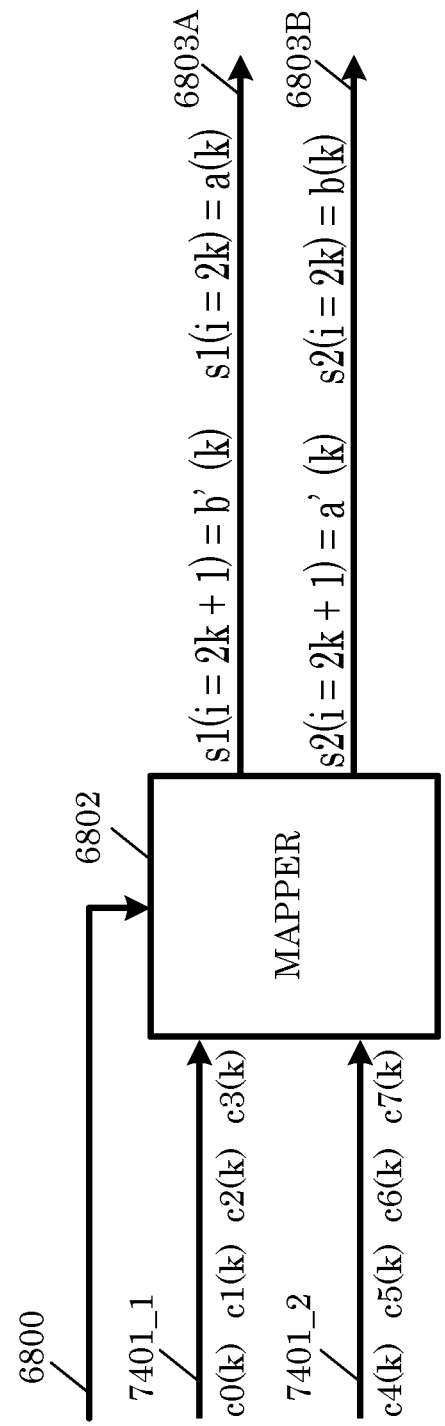
FIG. 77 illustrates operations performed by a mapper.

FIG. 77 illustrates operations performed by mapper 7301 illustrated in FIG. 73. In FIG. 77, components that operate the same as in FIG. 68, FIG. 74 share like reference marks. Accordingly, repeated description thereof will be omitted.

Mapper 6802 receives inputs of encoded data 7401_1, 7401_2, and control signal 6800, and when a robust transmission method is specified by control signal 6800, performs mapping processes such as those described below, and outputs mapped signals 6803A, 6803B.

Note that control signal 6800 corresponds to control signal 100 in FIG. 73, encoded data 7401_1 corresponds to encoded data 103_1 in FIG. 73, encoded data 7401_2 corresponds to encoded data 103_2 in FIG. 73, mapper 6802 corresponds to mapper 7301 in FIG. 73, mapped signal 6803A corresponds to mapped signal 105_1 in FIG. 73, and mapped signal 6801B corresponds to mapped signal 105_2 in FIG. 73.

For example, mapper 6802 receives inputs of bit c0(k), bit c1(k), bit c2(k), and bit c3(k) as encoded data 74011, and receives inputs of bit c4(k), bit c5(k), bit c6(k), and bit c7(k) as encoded data 7401_2. Note that k is an integer that is greater than or equal to 0.

Mapper 6802 performs a modulation using a modulation scheme having 16 signal points, such as 16QAM, on the following bits, so as to obtain mapped signal a(k) from bit c0(k), bit c1(k), bit c2(k), and bit c3(k), obtain mapped signal b(k) from bit c4(k), bit c5(k), bit c6(k), and bit c7(k), obtain mapped signal a'(k) from bit c0(k), bit c1(k), bit c2(k), and bit c3(k), and obtain mapped signal b'(k) from bit c4(k), bit c5(k), bit c6(k), and bit c7(k).

Mapped signal 6803A whose symbol number i=2k is represented as s1(i=2k), mapped signal 6803B whose symbol number i=2k is represented as s2(i=2k), mapped signal 6803A whose symbol number i=2k+1 is represented as s1(i=2k+1), and mapped signal 6803B whose symbol number i=2k+1 is represented as s2(i=2k+1).

s1(i=2k) is expressed as a(k), s2(i=2k) is expressed as b(k), s1(i=2k+1) is expressed as b'(k), and s2(i=2k+1) is expressed as a'(k).

Next, the relationship between "a(k) and a'(k)" and "b(k) and b'(k)" will be described with reference to the fourth example.

As described above, since mapped signal 6803A corresponds to mapped signal 105_1 in FIG. 73 and mapped signal 6803B corresponds to mapped signal 105_2 FIG. 73, mapped signal 6803A and mapped signal 6803B are applied with a phase change and/or weighting synthesis processing based on, for example, FIG. 2, FIG. 18, FIG. 19, FIG. 20, FIG. 21, FIG. 22, FIG. 28, FIG. 29, FIG. 30, FIG. 31, FIG. 32, FIG. 33, FIG. 59, FIG. 60, FIG. 61, FIG. 62, FIG. 63, FIG. 64, FIG. 65, FIG. 66, and FIG. 67, which correspond to signal processor 106 illustrated in FIG. 73.

Sixth Example

Hereinbefore, the transmission device included in the base station or AP was exemplified as having the configuration in FIG. 1, but here operations for when the transmission device in the base station or AP has the configuration illustrated in FIG. 73, which differs from FIG. 1, will be described.

In FIG. 73, components that operate the same as in FIG. 1, FIG. 44 share like reference marks. Accordingly repeated description thereof will be omitted.

Mapper 7301 illustrated in FIG. 73 receives inputs of encoded data 103_1, 103_2, and control signal 100, performs mapping based on information relating to a mapping method included in control signal 100, and outputs mapped signals 1051, 105_2.

Figure 78:
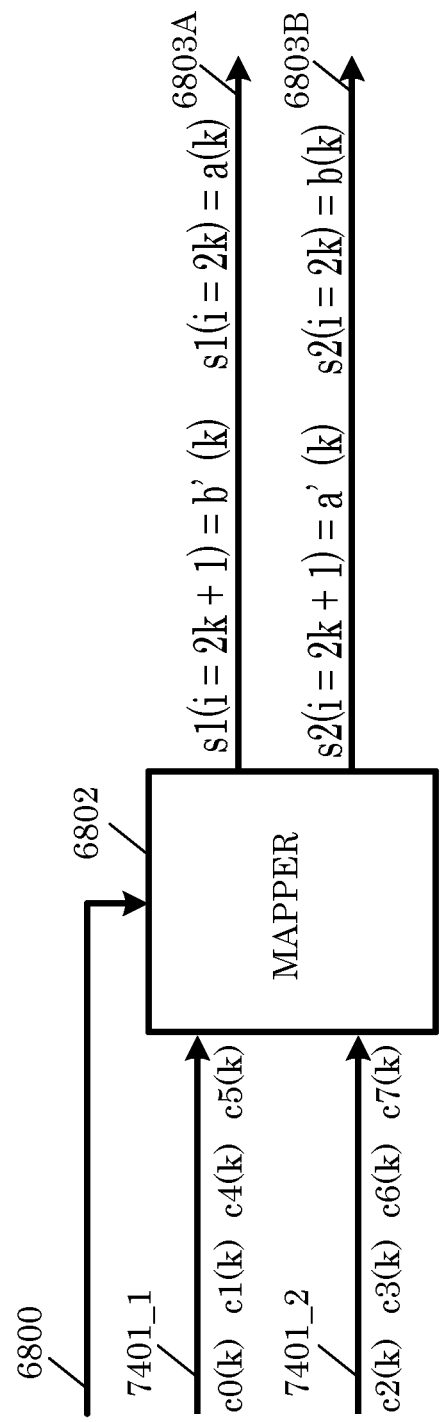
FIG. 78 illustrates operations performed by a mapper.

FIG. 78 illustrates operations performed by mapper 7301 illustrated in FIG. 73. In FIG. 78, components that operate the same as in FIG. 68, FIG. 74 share like reference marks. Accordingly, repeated description thereof will be omitted.

Mapper 6802 receives inputs of encoded data 7401_1, 7401_2, and control signal 6800, and when a robust transmission method is specified by control signal 6800, performs mapping processes such as those described below, and outputs mapped signals 6803A, 6803B.

Note that control signal 6800 corresponds to 100 in FIG. 73, encoded data 7401_1 corresponds to encoded data 103_1 in FIG. 73, encoded data 7401_2 corresponds to encoded data 103_2 in FIG. 73, mapper 6802 corresponds to mapper 7301 in FIG. 73, mapped signal 6803A corresponds to mapped signal 105_1 in FIG. 73, and mapped signal 6801B corresponds to mapped signal 105_2 in FIG. 73.

For example, mapper 6802 receives inputs of bit c0(k), bit c1(k), bit c4(k), and bit c5(k) as encoded data 74011, and receives inputs of bit c2(k), bit c3(k), bit c6(k), and bit c7(k) as encoded data 7401_2. Note that k is an integer that is greater than or equal to 0.

Mapper 6802 performs modulation using a modulation scheme that uses 16 signal points, such as 16QAM, on, for example, bit c0(k), bit c1(k), bit c2(k), and bit c3(k), to obtain mapped signal a(k).

Mapper 6802 performs modulation using a modulation scheme that uses 16 signal points, such as 16QAM, on, for example, bit c4(k), bit c5(k), bit c6(k), and bit c7(k), to obtain mapped signal b(k), on bit c0(k), bit c1(k), bit c2(k), and bit c3(k) to obtain mapped signal a'(k), and on bit c4(k), bit c5(k), bit c6(k), and bit c7(k) to obtain mapped signal b'(k).

Mapped signal 6803A whose symbol number i=2k is represented as s1(i=2k), mapped signal 6803B whose symbol number i=2k is represented as s2(i=2k), mapped signal 6803A whose symbol number i=2k+1 is represented as s1(i=2k+1), and mapped signal 6803B whose symbol number i=2k+1 is represented as s2(i=2k+1).

s1(i=2k) is expressed as a(k), s2(i=2k) is expressed as b(k), s1(i=2k+1) is expressed as b'(k), and s2(i=2k+1) is expressed as a'(k).

Next, the relationship between "a(k) and a'(k)" and "b(k) and b'(k)" will be described with reference to the fourth example.

As described above, since mapped signal 6803A corresponds to mapped signal 105_1 in FIG. 73 and mapped signal 6803B corresponds to mapped signal 105_2 FIG. 73, mapped signal 6803A and mapped signal 6803B are applied with a phase change and/or weighting synthesis processing based on, for example, FIG. 2, FIG. 18, FIG. 19, FIG. 20, FIG. 21, FIG. 22, FIG. 28, FIG. 29, FIG. 30, FIG. 31, FIG. 32, FIG. 33, FIG. 59, FIG. 60, FIG. 61, FIG. 62, FIG. 63, FIG. 64, FIG. 65, FIG. 66, and FIG. 67, which correspond to signal processor 106 illustrated in FIG. 73.

As described above, as a result of the transmission device transmitting a modulated signal, advantageous effects such as the reception device being able to achieve high data reception quality and, for example, in environments in which direct waves are dominant, favorable data reception quality can be realized are achievable.

Note that a configuration in which the communications method (transmission method) described in this embodiment is selectable by the base station or AP and a configuration in which the terminal described in Embodiments A1, A2, and A4 transmit a reception capability notification symbol may be combined.

For example, when the terminal notifies the base station or AP that it supports phase change demodulated via information 3601 relating to phase change demodulation support in FIG. 38, or notifies the base station or AP that it supports the transmission method (communications method) described in this embodiment via information 3702 relating to compatibility regarding reception for a plurality of streams, the base station or AP can determine to transmit a plurality of modulated signals for a plurality of streams via the transmission method (communications method) described in this embodiment and then transmit the modulated signals. Accordingly the terminal can achieve high data reception quality and the base station or AP takes into consideration the communications method supported by the terminal and the communications environment, for example, and accurately generates and transmits a modulated signal receivable by the terminal to achieve an advantageous effect of an improvement in data transmission efficiency in the system including the base station or AP and terminal.

Various aspects of the embodiments according to the present disclosure also include the following.

A transmission device according to a first aspect of the present disclosure includes: a weighting synthesizer that generates a first precoded signal and a second precoded signal by performing a precoding process on a first baseband signal and a second baseband signal; a first pilot inserter that outputs a third signal by inserting a pilot signal into the first precoded signal; a first phase changer that outputs a fourth signal by applying a first phase change to the second precoded signal; a second pilot inserter that outputs a fifth signal by inserting a pilot signal into the fourth signal; and a second phase changer that outputs a sixth signal by applying a second phase change to the fifth signal.

A transmission method according to a second aspect of the present disclosure includes: generating a first precoded signal and a second precoded signal by performing a precoding process on a first baseband signal and a second baseband signal; outputting a third signal by inserting a pilot signal into the first precoded signal; outputting a fourth signal by applying a first phase change to the second precoded signal; outputting a fifth signal by inserting a pilot signal into the fourth signal; and outputting a sixth signal by applying a second phase change to the fifth signal.

Hereinbefore, various embodiments have been described with reference to the drawings, but it goes without saying that the present disclosure is not limited to these examples. One skilled in the art would recognize that various modifications or corrections may be made within the scope of the claims, and that the resulting embodiments would also fall within the technical concept of the present disclosure. Moreover, various components in the above embodiments may be arbitrarily combined without materially departing from the scope of the present disclosure.

The above embodiments present examples in which the present disclosure is implemented via hardware, but the present disclosure may be implemented via software in connection with hardware.

Moreover, functional blocks used in the descriptions of the embodiments are typically implemented as LSI circuits, which are integrated circuits having input and output terminals. These functional blocks may each be implemented as a separate chip, and, alternatively two or more or all of the functional blocks may be collectively implemented as a single chip. Here, the circuit integration is exemplified as LSI, but depending on the degree of integration, the integration may be referred to as IC, system LSI, super LSI, or ultra LSI.

Moreover, the circuit integration technique is not limited to LSI, implementation may be realized via a dedicated circuit or a general purpose processor. After manufacturing of the LSI circuit, a programmable field programmable gate array (FPGA) or a reconfigurable processor which is reconfigurable in connection or settings of circuit cells inside the LSI circuit may be used.

Furthermore, if an integrated circuit technology that replaces LSI emerges as semiconductor technology advances or when a derivative technology is established, it goes without saying that the functional blocks may be integrated by using such technology. Implementation of biotechnology for example, is a possibility.

INDUSTRIAL APPLICABILITY

The present disclosure can be widely applied to communications systems that transmit modulated signals from a plurality of antennas.

REFERENCE MARKS IN THE DRAWINGS

102 error correction encoder
104 mapper
106 signal processor
107A, 107B radio unit
109A, 109B antenna unit

The invention claimed is:
1. A transmission apparatus comprising:
a signal processing circuit that, in operation, generates control signals and data streams, the control signals being generated by performing a cyclic shift diversity scheme, the data streams being phase-rotated by first signal processing and phase-adjusted by second signal processing; and
a transmitter that, in operation, transmits the control signals and the data streams through multiple antennas in a single carrier mode, wherein
in the first signal processing, data symbols included in each of the data streams are phase-rotated using a phase rotation value that is defined per data symbol included in the data symbols, according to an order of the data symbols,
in the second signal processing, the data symbols included in each of the data streams are phase-adjusted using a phase adjustment value that is defined per data stream included in the data streams, and
the control signals are generated from control data having a field indicating whether the data streams are modulated using the single carrier mode or not.

2. A transmission method executed by a transmission apparatus, comprising:
- generating control signals and data streams, the control signals being generated by performing a cyclic shift diversity scheme, the data streams being phase-rotated by first signal processing and phase-adjusted by second signal processing; and
- transmitting the control signals and the data streams through multiple antennas in a single carrier mode, wherein
- in the first signal processing, data symbols included in each of the data streams are phase-rotated using a phase rotation value that is defined per data symbol included in the data symbols, according to an order of the data symbols,
- in the second signal processing, the data symbols included in each of the data streams are phase-adjusted using a phase adjustment value that is defined per data stream included in the data streams, and
- the control signals are generated from control data having a field indicating whether the data streams are modulated using the single carrier mode or not.

* * * * *